(12) United States Patent
Sandborn et al.

(10) Patent No.: US 6,930,235 B2
(45) Date of Patent: Aug. 16, 2005

(54) SYSTEM AND METHOD FOR RELATING ELECTROMAGNETIC WAVES TO SOUND WAVES

(75) Inventors: Michael T. Sandborn, Brandon, FL (US); Mark D. Sandborn, Alpharetta, GA (US)

(73) Assignee: MS Squared, Mango, FL (US)

( * ) Notice: Subject to any disclaimer, the term of this patent is extended or adjusted under 35 U.S.C. 154(b) by 308 days.

(21) Appl. No.: 10/099,336

(22) Filed: Mar. 14, 2002

(65) Prior Publication Data

US 2002/0176591 A1 Nov. 28, 2002

Related U.S. Application Data

(60) Provisional application No. 60/276,221, filed on Mar. 15, 2001, and provisional application No. 60/327,240, filed on Oct. 5, 2001.

(51) Int. Cl.$^7$ .............................................. G09B 15/02
(52) U.S. Cl. .................................... 84/483.2; 84/464 R
(58) Field of Search .......................... 84/470 R, 471 R, 84/472–475, 477 R, 478, 479–480, 483.1, 483.2, 484, 485 SR

(56) References Cited

U.S. PATENT DOCUMENTS

| | | | |
|---|---|---|---|
| 3,643,540 A | 2/1972 | Rosenstock et al. | 84/484 |
| 4,089,125 A | 5/1978 | Enz et al. | 35/8 R |
| 4,158,921 A | 6/1979 | Stolpen | 35/70 |
| 4,716,806 A | 1/1988 | Forrest | 84/474 |
| 4,736,320 A | 4/1988 | Bristol | 364/300 |
| 5,386,757 A | 2/1995 | Derrick | 84/473 |
| 6,046,724 A | 4/2000 | Hvass | 345/150 |
| 6,124,540 A | 9/2000 | Lotito | 84/483.2 |
| 6,137,042 A * | 10/2000 | Kurtzberg et al. | 84/477 R |
| 6,317,873 B1 | 11/2001 | Townsend | 717/7 |
| 6,321,190 B1 | 11/2001 | Bernardes et al. | 704/8 |
| 6,327,702 B1 | 12/2001 | Sauntry et al. | 717/5 |
| 6,330,530 B1 | 12/2001 | Horiguchi et al. | 704/4 |
| 6,332,138 B1 | 12/2001 | Hull et al. | 707/5 |
| 6,336,214 B1 | 1/2002 | Sundaresan | 717/8 |
| 6,338,033 B1 | 1/2002 | Bourbonnais et al. | 704/3 |
| 6,392,131 B2 | 5/2002 | Boyer | 84/424 |
| 6,686,529 B2 * | 2/2004 | Kim | 84/464 R |
| 2002/0178896 A1 * | 12/2002 | George | 84/477 R |

* cited by examiner

Primary Examiner—Jeffrey W Donels
(74) Attorney, Agent, or Firm—Thomas, Kayden, Horstemeyer & Risley, L.L.P.

(57) ABSTRACT

A system for relating electromagnetic waves to harmonic sound waves that includes a memory with logic, and a processor configured with the logic to assign one fundamental color of a color spectrum of twelve analogous colors to one of twelve fundamental tones of a musical 5$^{th}$ relationship, wherein the tones are represented by notes, wherein the processor is further configured with the logic to consecutively associate the remaining analogous colors to the tones.

104 Claims, 113 Drawing Sheets

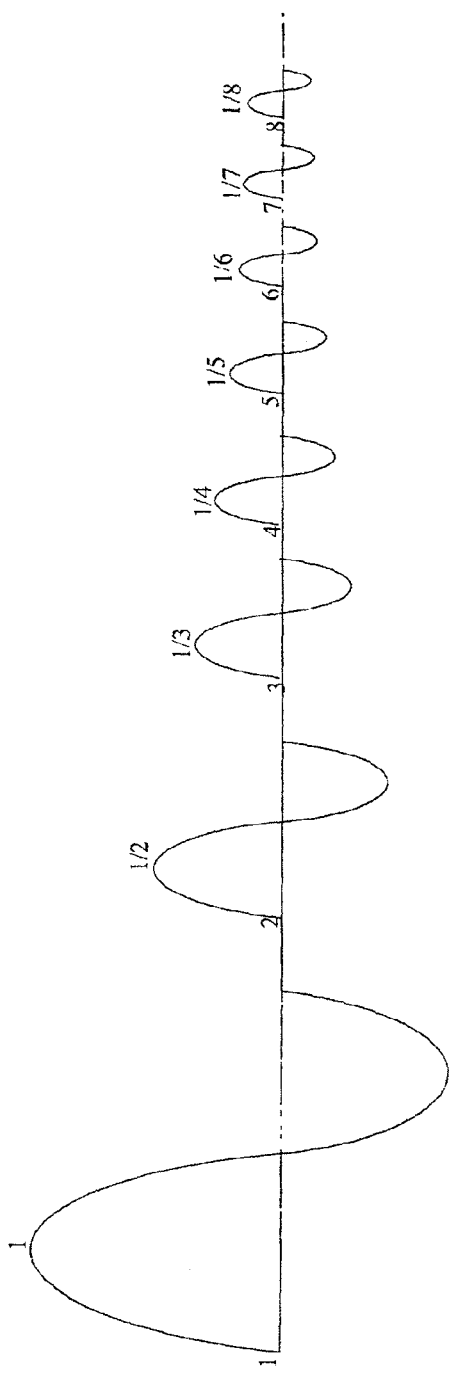
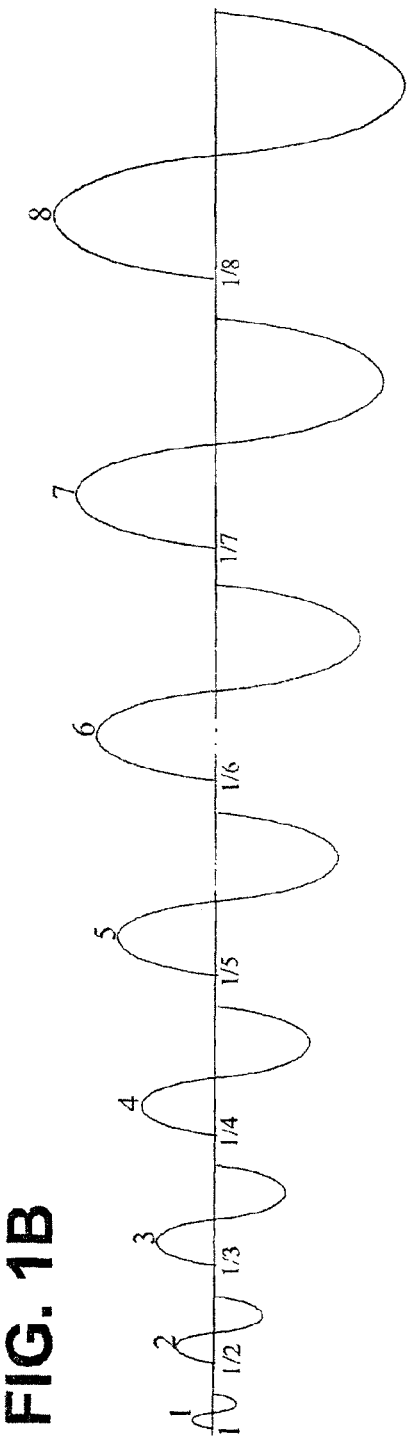
FIG. 1A
FIG. 1B

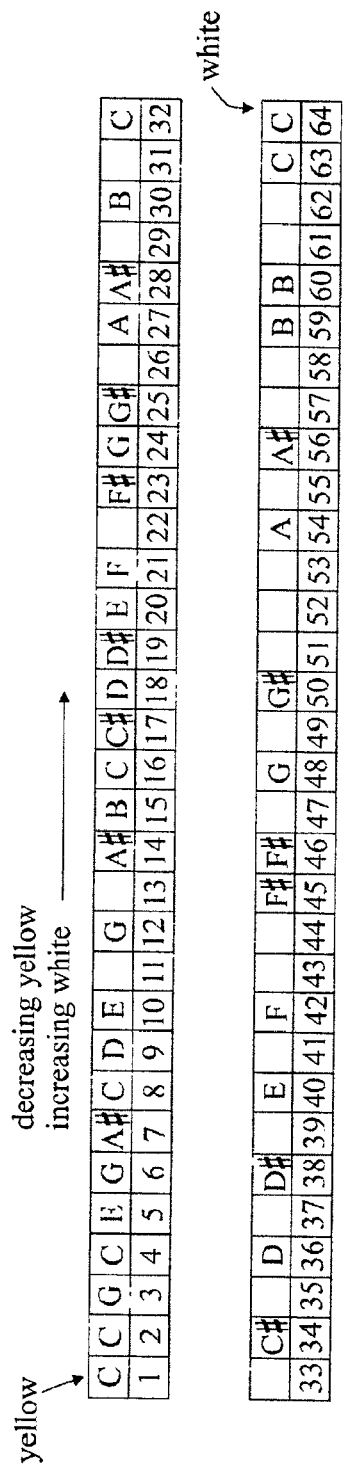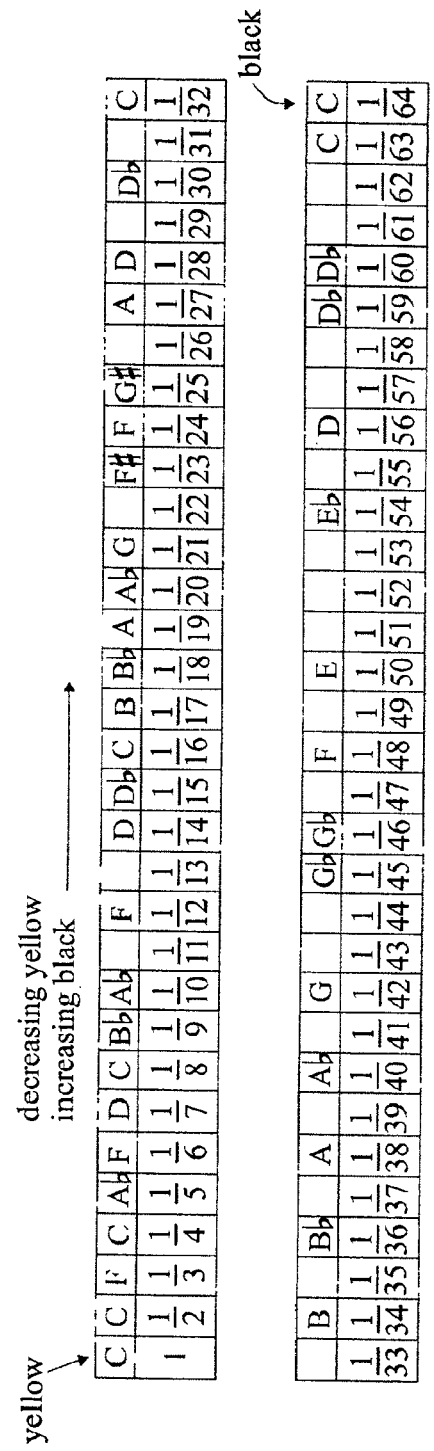
FIG. 10A
FIG. 10B

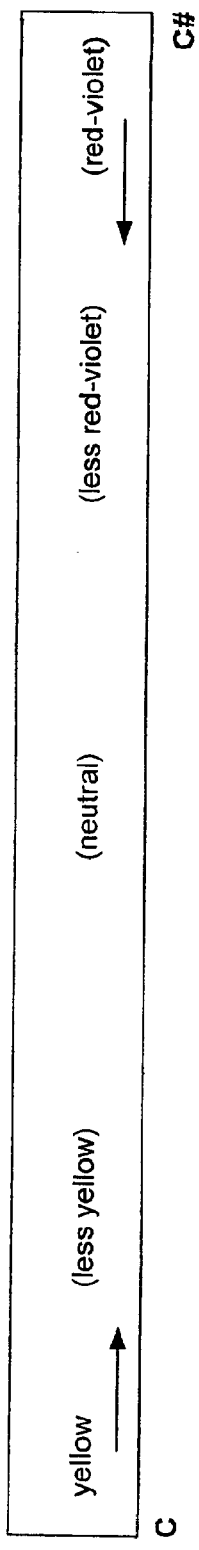
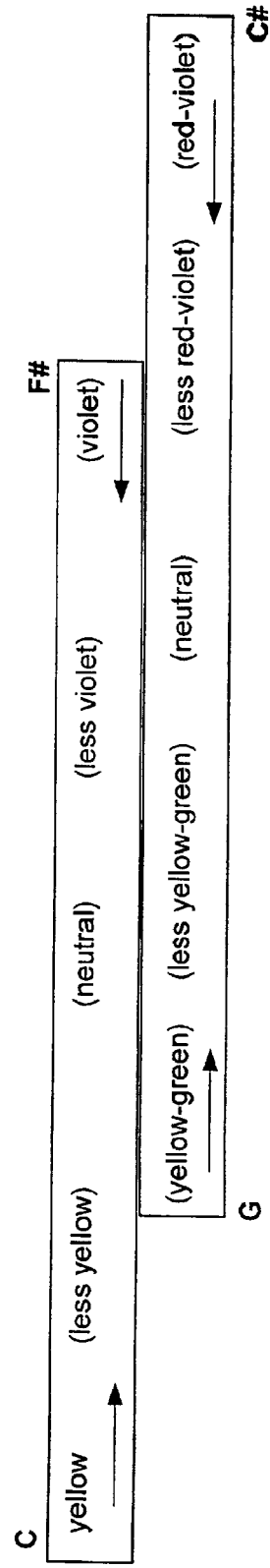
FIG. 19A
FIG. 19B 4 tone quarter cycle    2 tone quarter cycle      2 tone quarter cycle    4 tone quarter cycle

FIG. 29F    Prime Spin

FIG. 29G  Inversion Spin
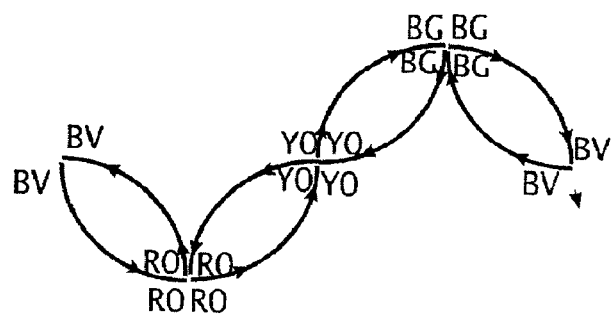
FIG. 29H  Retrograde-Prime Spin
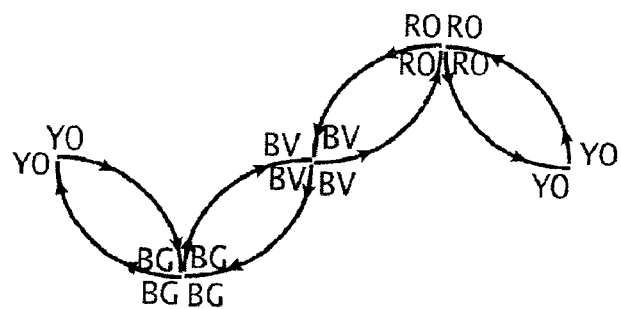
FIG. 29I  Retrograde-Inversion Spin
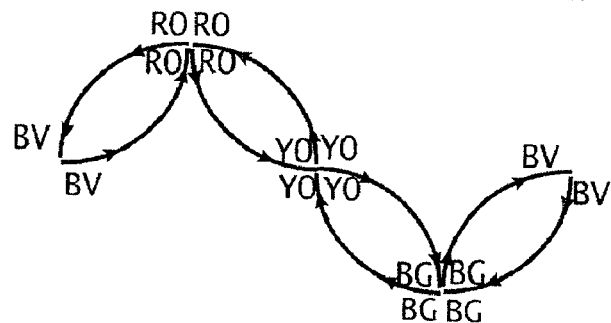

SYSTEM AND METHOD FOR RELATING ELECTROMAGNETIC WAVES TO SOUND WAVES

CROSS-REFERENCE TO RELATED APPLICATION

This application claims priority to copending U.S. provisional applications entitled, "Unified Wave Notation System and Notation Software Application" having Ser. No. 60/276,221, filed Mar. 15, 2001, and Applications of Unified Wave Color to Instruments and Teaching Materials" having Ser. No. 60/327,240, filed Oct. 5, 2001, both of which are entirely incorporated herein by reference.

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention is generally related to energy, and, more particularly, is related to a system and method for describing energy wave functions.

BACKGROUND OF THE INVENTION

All systems, from a higher level view to an atomic view, are based on principles of waves. For instance, although most will recognize the familiar V=IR as Ohm's law, the principles of Ohm's law are derived from the understanding of electromagnetic wave propagation in conducting media. The application of the familiar V=IR formula is a language used to describe the underlying wave principles occurring in an electronic circuit. Similarly, wave principles underlie other systems, such as particle wave structures, atomic wave structures, encryption systems, and even software code, to name a few. Software languages are a system of terms, or a language, used to describe certain organizations of 1's and 0's, which in turn, control on/off switches in computers.

One mechanism for describing wave structures is in the form of color. For instance, some prior art mechanisms disclose systems for converting sound signals into light by converting sound waves to electrical signals processed by a series of filters. The filters have a corresponding color display, and the signals are processed to provide one or more mixtures of the color displays. Thus, the color spectrum describes the sound wave by providing a simple mathematical frequency conversion expanded by multiples of two octaves. Other mechanisms in the prior art disclose systems for filtering music in 11 variable width frequency bands, in which every interval results in a preset color display. Further, the colors are chosen from what visually looks best. Another mechanism discloses a system as the above, but where a fourband model is used, in which one similarly chooses a color visualization based on sound influences based on what seems most visually appropriate. As noted, current mechanisms for describing wave structure provide a broad, or higher level view, which lack detailed information of the wave structure, and thus provide limited information. What is needed is a system and method for providing a detailed description of wave structures.

Thus, a heretofore unaddressed need exists in the industry to address the aforementioned deficiencies and inadequacies.

SUMMARY OF THE INVENTION

The present invention can be viewed as providing, among other things, a system for relating electromagnetic waves to harmonic sound waves that includes a memory with logic, and a processor configured with the logic to assign one fundamental color of a color spectrum of twelve analogous colors to one of twelve fundamental tones of a musical $5^{th}$ relationship, wherein the tones are represented by notes, wherein the processor is further configured with the logic to consecutively associate the remaining analogous colors to the tones.

The present invention can be viewed as providing, among other things, a method for relating electromagnetic waves to harmonic sound waves. The method can generally be described as including the steps of assigning one fundamental color of a color spectrum of twelve analogous colors to one of twelve fundamental tones of a musical $5^{th}$ relationship, wherein the tones are represented by notes; and consecutively associating the remaining analogous colors to the tones.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 1A–1B are schematic representations of the individual waves of the first eight harmonics of a harmonic series, in accordance with an embodiment of the invention.

FIGS. 10A and 10B are schematic representations of the changes in color tint based on increasing and decreasing octave frequencies of a $2^n$ octave series, in accordance with an embodiment of the invention.

FIGS. 19A–19C are schematic representations of the steps used to determine the color in between two consecutive chromatic tones, in accordance with an embodiment of the invention.

FIGS. 29A–29I are schematic representations of current loops and corresponding spin characteristics, in accordance with an atomic physics embodiment of the color wave system described in association with FIGS. 1–28.

DETAILED DESCRIPTION OF THE PREFERRED EMBODIMENT

Figure 2A:
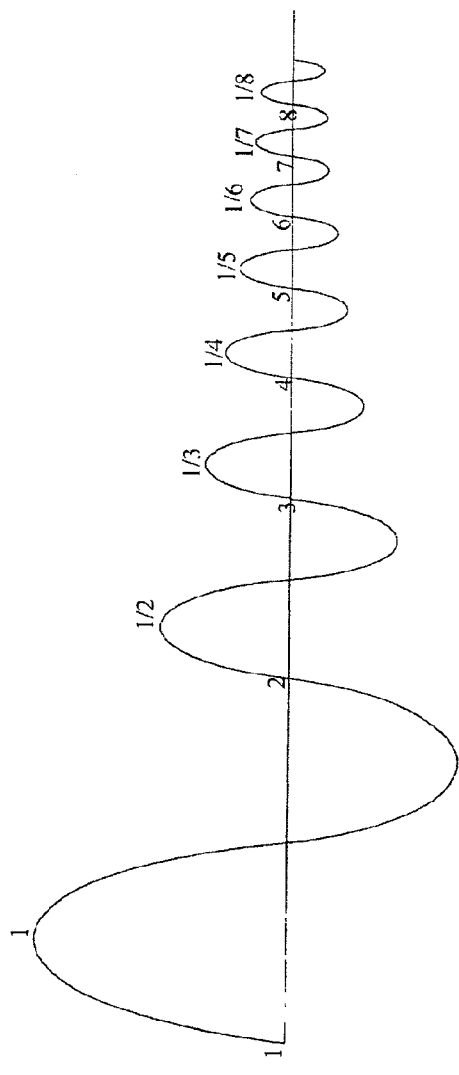
FIGS. 2A–2C are schematic representations of the grouping of the individual waves of the first eight harmonics of the harmonic series of FIGS. 1A and 1B into a continuous wave and the representation of the completion of octaves as completing a wave, in accordance with an embodiment of the invention.

The preferred embodiments of the wave language system now will be described more fully hereinafter with reference to the accompanying drawings, in which preferred embodiments of the wave language system are shown. Principles of music, color, wave theory, and number theory will be discussed below and combined to provide a system and method, herein referred to as the wave language system, for relating harmonic waves to electromagnetic waves. The wave language system can describe the formation of language origins, compared to language sounds such as vowel sounds and consonant sounds, words or sound organizations, sentences or word organizations, paragraphs or sentence organizations, chapters or paragraph organizations, and books or chapter organizations, which are then given physical, visual, and aural descriptions or designations. The wave language system provides a bridge between different fields of art and physics. A core argument is that music is chemistry, and chemistry is music. Music is physics and physics is music. Music is simply the study of wave structures generally and the language defined in the wave language system is the language, which describes music, and particles, and atoms, and molecules, and systems. For example, using the wave language system, a music composition can easily be made which is organized solely and completely upon the neutron or the theoretical element 168 wave structure. The wave language system functions as a system which can be copied into different mediums—a system of notes for the generation of musical sound waves—a system of machined parts for the purpose of generating electromagnetic waves in the form of a particle, element, or molecule—a system for deconstructing existing wave systems such as the deconstructing of a musical composition or a particle or an atom or a molecule, or any system. For example, machines already exist for the purpose of smashing atoms and/or particles together to make new particles or atoms, and machines already exist which deconstruct molecules and manufacture new ones. The wave language system describes new ways to do both through simple wave manipulation rather than more physical (brute-force) methods. The wave language system shows how waves can be manipulated under general field conditions so that their spins can be altered causing waves to bond or to break bonds without requiring excessive amounts of energy. In this example the wave language system can be incorporated into a computing system or control mechanism of a machine which describes in simple and complex displays and readouts the state of the described field and what manipulations or adjustments might be required. This is comparable to a software program which has a high level idea of relationships such as how to make a spreadsheet, and a high level language in which the idea is written, and a low level language which relates the high level language to the computer which runs it.

FIGS. 1–20 will be used to describe how the wave language system can be used to relate electromagnetic waves and harmonic sound waves, or more generally any harmonic wave process. FIGS. 21–22 will then be used to describe how the wave language system can be used to determine the color of an electromagnetic wave (defined as a current loop). FIGS. 23–28 will then analogize the wave language system to the principles of word, sentence, paragraph, chapter, and book organization. FIGS. 29–64 will then be used to illustrate different implementations of the wave language system. Although described using these embodiments, it will be understood by those having ordinary skill in the art that the wave language system can be embodied in many different forms and should not be construed as limited to the embodiments set forth herein; rather, these embodiments are provided so that this disclosure will be thorough and complete, and will fully convey the scope of the wave language system to those having ordinary skill in the art. Furthermore, all "examples" given herein are intended to be non-limiting, and among others.

A natural overtone harmonic series is defined in the wave language system by the order of numbers 1, 2, 3, 4, 5, etc., and a natural undertone harmonic series is defined by the inversion of the order of numbers or 1,½, ⅓, ¼, ⅕, etc. A harmonic series is a series of independent waves resulting from a harmonic energy process. FIG. 1A shows simple representations of the first 8 individual waves of the overtone harmonic series. In the wave language system, the integer numbers 1 through 8 define the harmonic frequency order, and the fractions define the relative amplitudes and wavelengths. FIG. 1B shows the first 8 individual waves of the undertone harmonic series. The inversion of the order of numbers 1,½, ⅓, ¼, ⅕, etc., define the harmonic frequency order, and the integer numbers define the relative amplitudes and wavelengths.

Figure 2B:
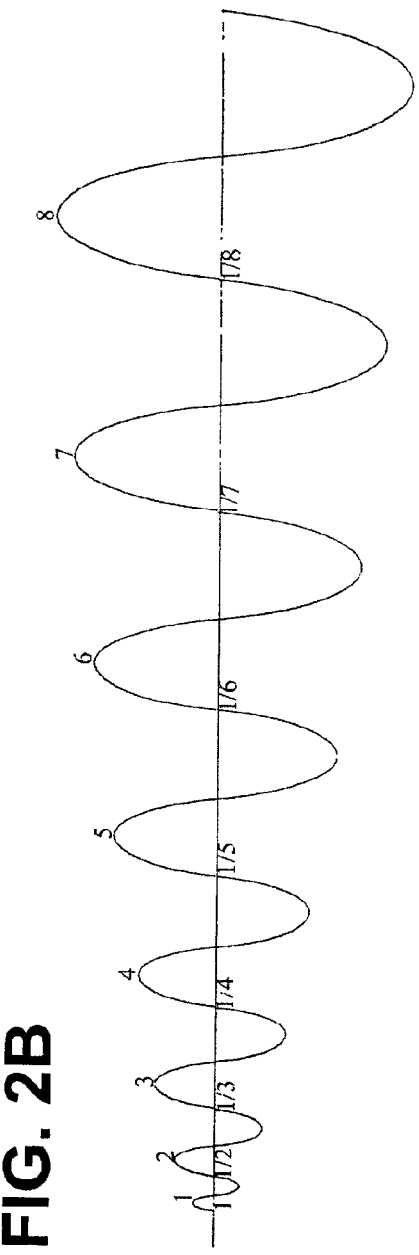

The harmonic series of independent waves is the result of a single or continuous energy process, which experiences harmonic energy change. The merging of the independent waves of a harmonic series to form a continuously, harmonically changing wave then expresses the harmonic energy change as shown in FIGS. 2A and 2B. FIG. 2A shows the merged individual waves of the overtone harmonic series as expressed in FIG. 1A. FIG. 2B shows the merged individual waves of the undertone harmonic series as expressed in FIG. 1B. In FIGS. 2A and 2B, the wave language system defines nodes, anti-nodes, and amplitudes as points in time, which reflect a particular expression of individual waves on the harmonic energy curve. A distinction is to be drawn between the position of the individual waves on the energy curve, and the individual waves. Each individual wave defines a specific time reference. For example, if harmonic 1 is at a frequency of 1 Hertz (Hz), which cycles once per second, then harmonic 1 defines a counting time unit of 1 second. Subsequently, overtone harmonic 2 will be a 2 Hz. wave, which defines a counting time of 0.5 seconds. If frequency is viewed as the manner of counting time, then each wave defines a different dimension of time because each change in counting changes how the speed with which time passes is perceived.

In FIGS. 2A–2B, each multiple or division of 2 is defined musically as an octave. The octave is recognized as the same tone at a different frequency, or different time dimension. Perception is understood in psychophysics to be a reflection of physical reality such that the recognition of octaves is a reflection of the physical fact that octaves are indeed the same tone in a different time dimension. The expression of the harmonic energy process as shown in FIGS. 2A–B is continuous. In order for each multiple or division of 2 to be a repetition of overtone harmonic 1 or undertone harmonic 1 within the continuous energy process, the harmonic series of independent waves should move through an energy wave motion which repeats at every octave. This octave energy wave, shown in FIG. 2C, will be defined by the wave language system as the overtone harmonic wave. FIG. 2D shows a simplified representation of how each independent wave in the overtone harmonic series is located on the overtone harmonic wave. The above description can be applied similarly to the undertone harmonic series of independent waves resulting in an undertone harmonic wave.

Figure 2C:
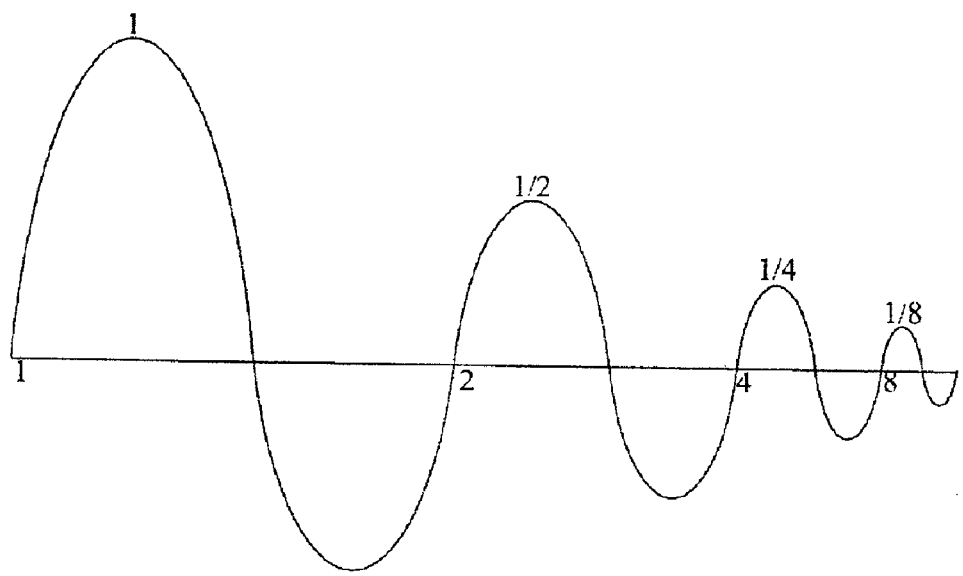
Figure 2D:
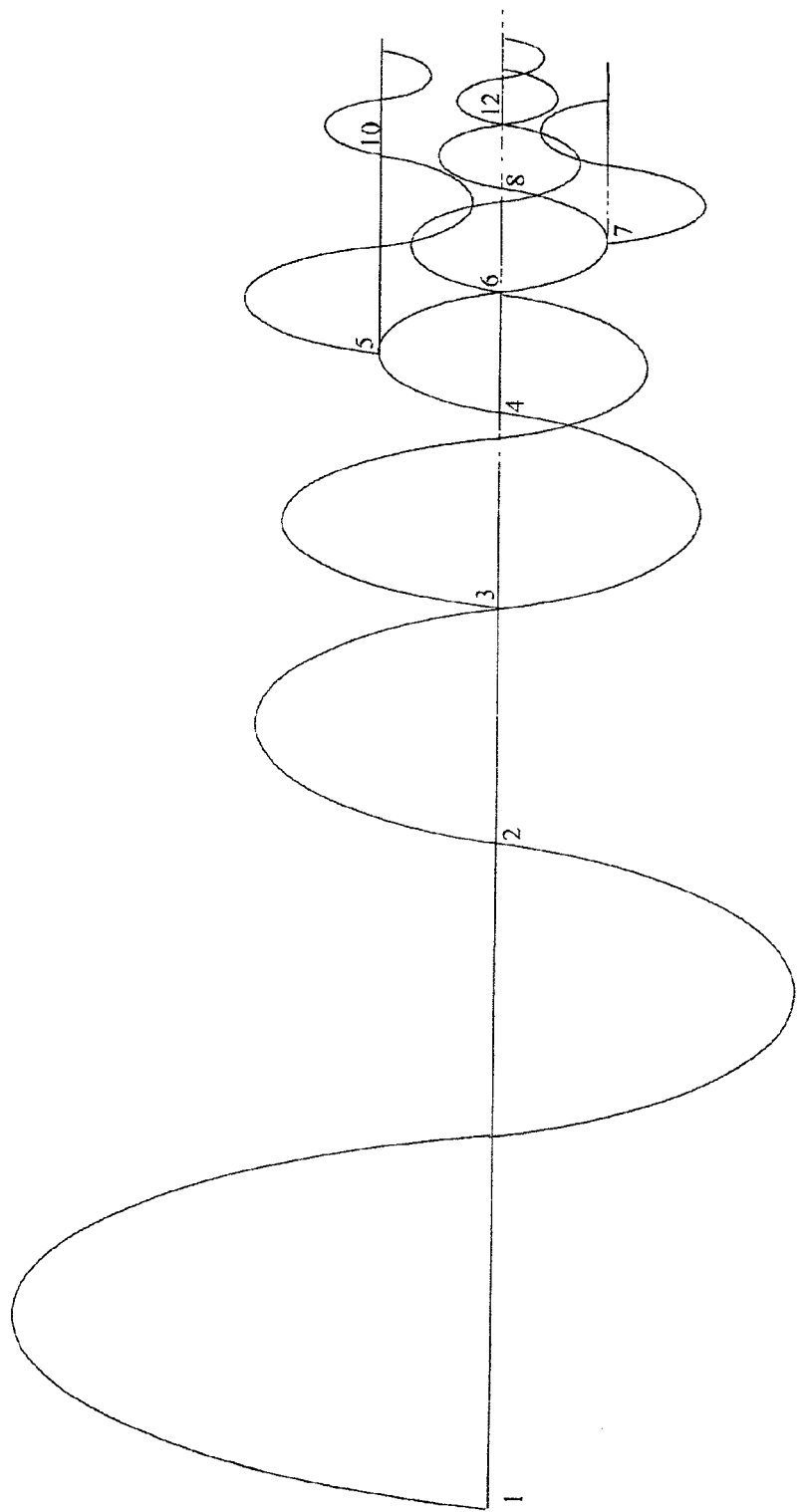
FIG. 2D is a schematic representation of the harmonic relationship between individual harmonic series, in accordance with an embodiment of the invention.
Figure 3:
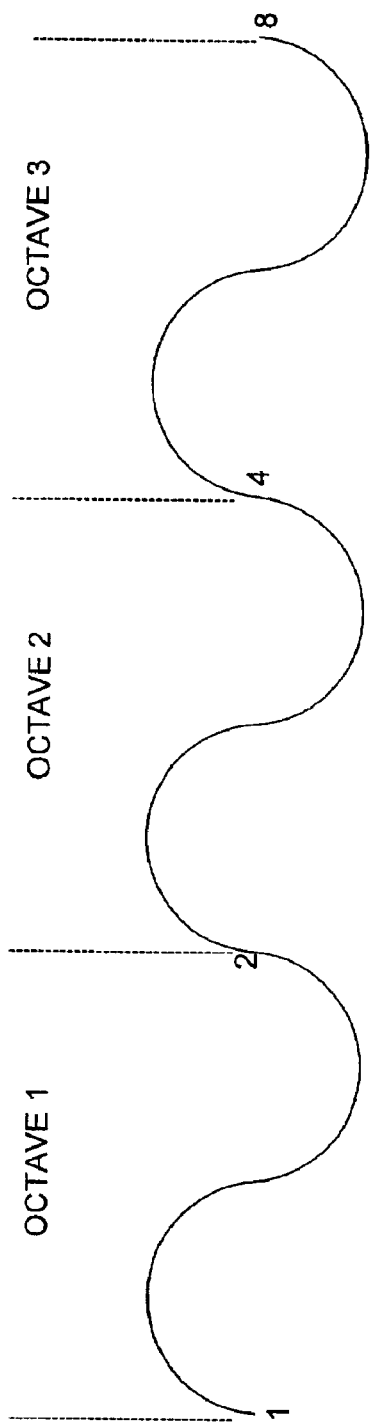
FIG. 3 is a schematic representation of the harmonic wave of FIG. 2C when a constantly changing time perception is assumed, in accordance with an embodiment of the invention.

Under the wave language system, if the changing time element described above is eliminated by assuming a constantly changing time perception as the fundamental time perception, then the overtone harmonic wave of FIG. 2C can be viewed as a sine wave and the succession of harmonic octaves can be viewed as a continuous sine wave, as shown in FIG. 3. Multiples of 2 or octaves are illustrated in the wave language system as nodes of the sine wave. A constantly changing time perception is defined by a constantly shifting time reference. For example, if positioned at overtone harmonic 1, then the perception of time 1 is fundamental. If the person moves to overtone harmonic 2, then the time reference shifts from 1 to ½ so that ½ is now referenced as 1 and 1 is now 2. This process occurs in music when there is a perception shift between octaves yet each octave is still perceived as the same musical tone, and the frequency change between each octave is perceived to be the same.

Figure 4:
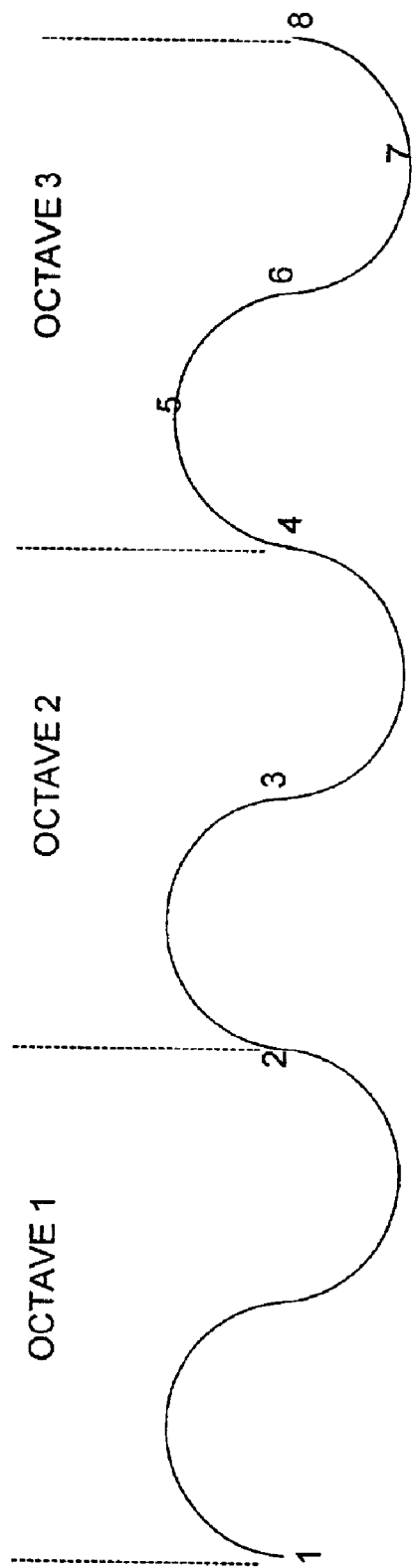
FIG. 4 is a schematic representation of the harmonic wave of FIG. 3 showing additional harmonic positions, in accordance with an embodiment of the invention.
Figure 5:
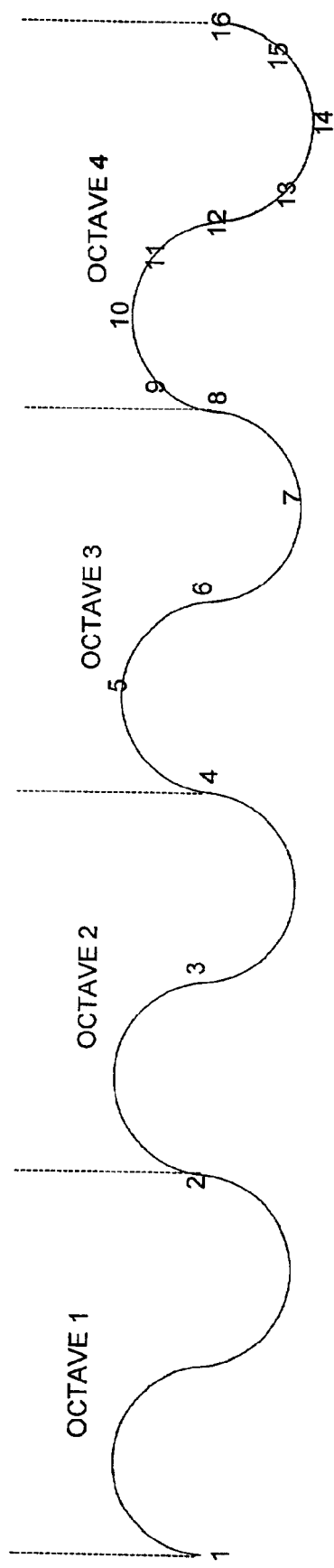
FIG. 5 is a schematic representation of the harmonic wave of FIG. 4, with the addition of a $4^{th}$ octave in order to illustrate the filling of the harmonic wave, in accordance with an embodiment of the invention.

FIG. 4 shows that harmonics other than multiples or divisions of 2 are described by the wave language system as defining points on the harmonic wave, whether undertone or overtone. For example, harmonic 3 and its octaves define the "anti-node" of the harmonic wave. Harmonics 5 and 7 and their octaves define the maximum amplitudes of the harmonic wave. Each harmonic after the third harmonic octave acts to fill out the harmonic wave function, as shown in FIG. 5. As the harmonics of the harmonic wave approach infinity, the harmonic wave approaches a continuous line function.

In view of the above description, several relationships are helpful in enabling the wave language system to tie wave functions with music. First, the fundamental relationship is the multiple of 2, since it defines repetition or sameness. The number 2 defines the same wave position for differing time elements. Another point is that the closest numerical association different than 2 is 3. The number 3 is the first number different from the fundamental number 1 and its replicates. The wave language system uses the number 3 to define the anti-node wave position and the number 3 therefore represents a type of harmonic opposite. Finally, in the wave language system, the diametrically-opposed numerical association is defined by harmonics 5 and 7. These numbers represent opposite direction wave properties and clearly establish properties of harmonic direction. The numbers 5 and 7 represent positive and negative maximum amplitude wave positions. The numbers 5 and 7 also represent a property of positive and negative charge.

Comparing the above relationships to some principals of music, the following considerations take on greater meaning. First, the most fundamental musical relationship is the octave (multiple of 2), which is aurally recognized as the same tone but in a different time element. Second, the closest perceptually recognized tone relationship is the musical $5^{th}$ (3/2) or its inverse component the musical $4^{th}$ (4/3) based on harmonic 3 and its inverse ⅓. Thirdly, the most distant perceptually recognized tone relationship is the tri-tone, √2. The maximum amplitude ratios (for example, harmonics 5 and 7 in FIG. 4), provided by numbers 7/5 (1.4) and 10/7 (1.4286), fall within the aurally recognized tri-tone range provided by √2 (1.4142).

Figure 6A:
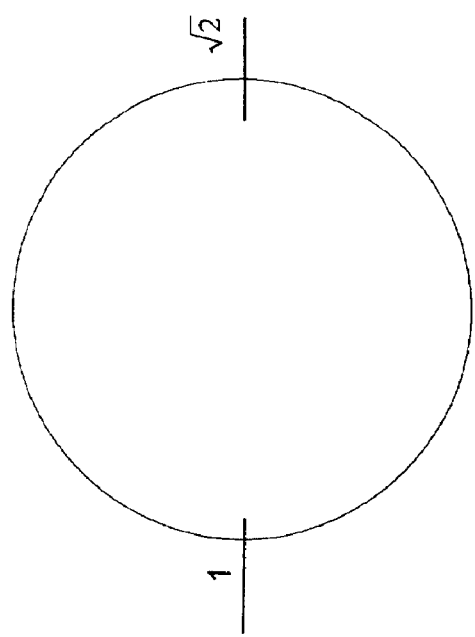
FIGS. 6A and 6B are schematic representations of the position of an anti-node, as related to the most distant perceptually recognized tone, on a circle and a corresponding harmonic wave, in accordance with an embodiment of the invention.
Figure 6B:
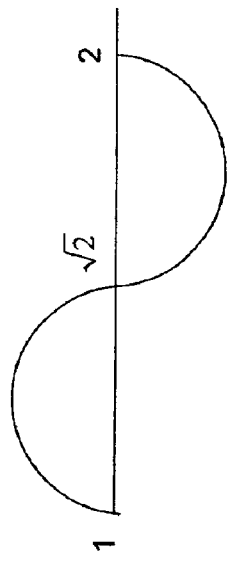

The wave language system relates wave functions (e.g., a sine wave) to circles, similar to phasor diagrams in electronics. FIG. 6A illustrates this relationship, showing the harmonic 1 at an arbitrary point on a circle. The most distant point on a circle is the opposite side of the circle, or what the wave language system refers to as the anti-node of a wave (FIG. 6B). Considering that the tri-tone, √2, is the most distant perceptually recognized tone (or number), then the wave language system positions it opposite that of 1, as shown in FIGS. 6A and 6B. Note that this midpoint is different from the midpoint of the harmonic wave defined by 3 and its octave multiples.

Figure 7A:
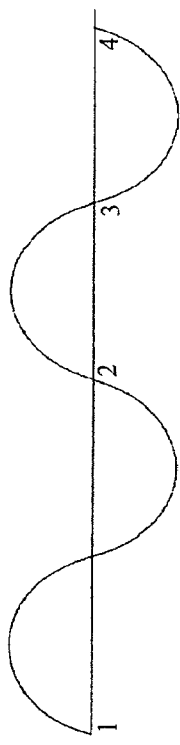
FIGS. 7A–7D are schematic representations of the organization of multiple harmonic waves on a greater continuous harmonic wave through wave bonding, in accordance with an embodiment of the invention.

The √2 anti-node is achieved, according to the wave language system, by means of a greater harmonic wave resulting from natural organizations of multiple individual harmonic waves. One method used for achieving this greater wave is using what the wave language system describes as a node to anti-node harmonic wave bonding process. The wave language system describes three fundamental harmonic wave bonds: the node to node bond, the node to anti-node bond, and the node to maximum amplitude bond. Of these three bonds the most fundamental bond is the bonding of nodes to achieve a continuous harmonic wave. FIG. 7A illustrates the node-to-node harmonic wave bond. The second most fundamental harmonic wave bond is the node-to-anti-node bond illustrated in FIG. 7B. A series of node-to-anti-node bonds can be organized and simply illustrated as shown in FIG. 7C. Shown is the second octave of each wave. The first octave is implied to conserve space in the drawing.

Figure 7B:
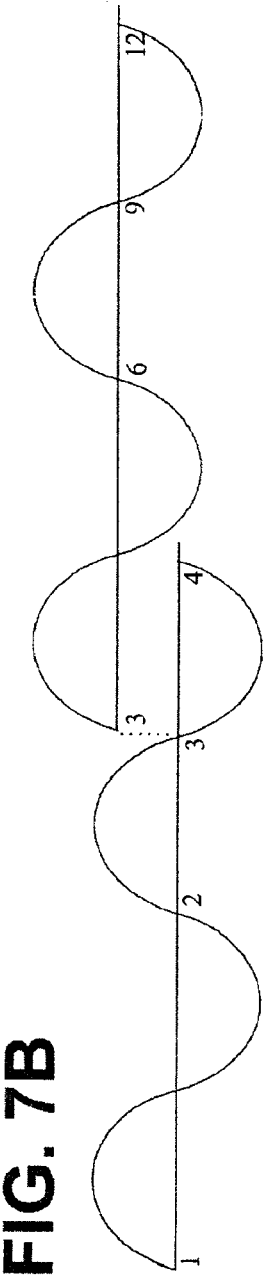
Figure 7C:
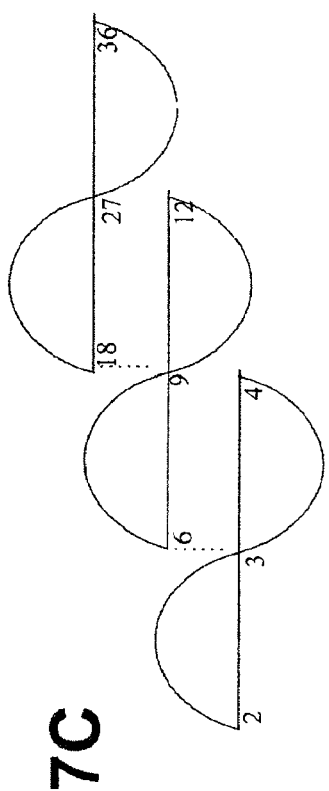

Note that the anti-node wave of FIG. 7B is represented by the wave language system as having an opposite charge from the second half wave cycle of the harmonic wave it is bonding to (as defined by opposing amplitudes). It could just as easily be represented as having the same charge. This difference or similarity in charge is due to differences in the function of independent waves bonded through a harmonic energy process and the internal energy process of each wave. The energy process for each wave is governed by the properties of that wave. The fundamental properties of each individual wave are governed by the orientation in space, which in turn is governed by its position relative to other waves.

Figure 7D:
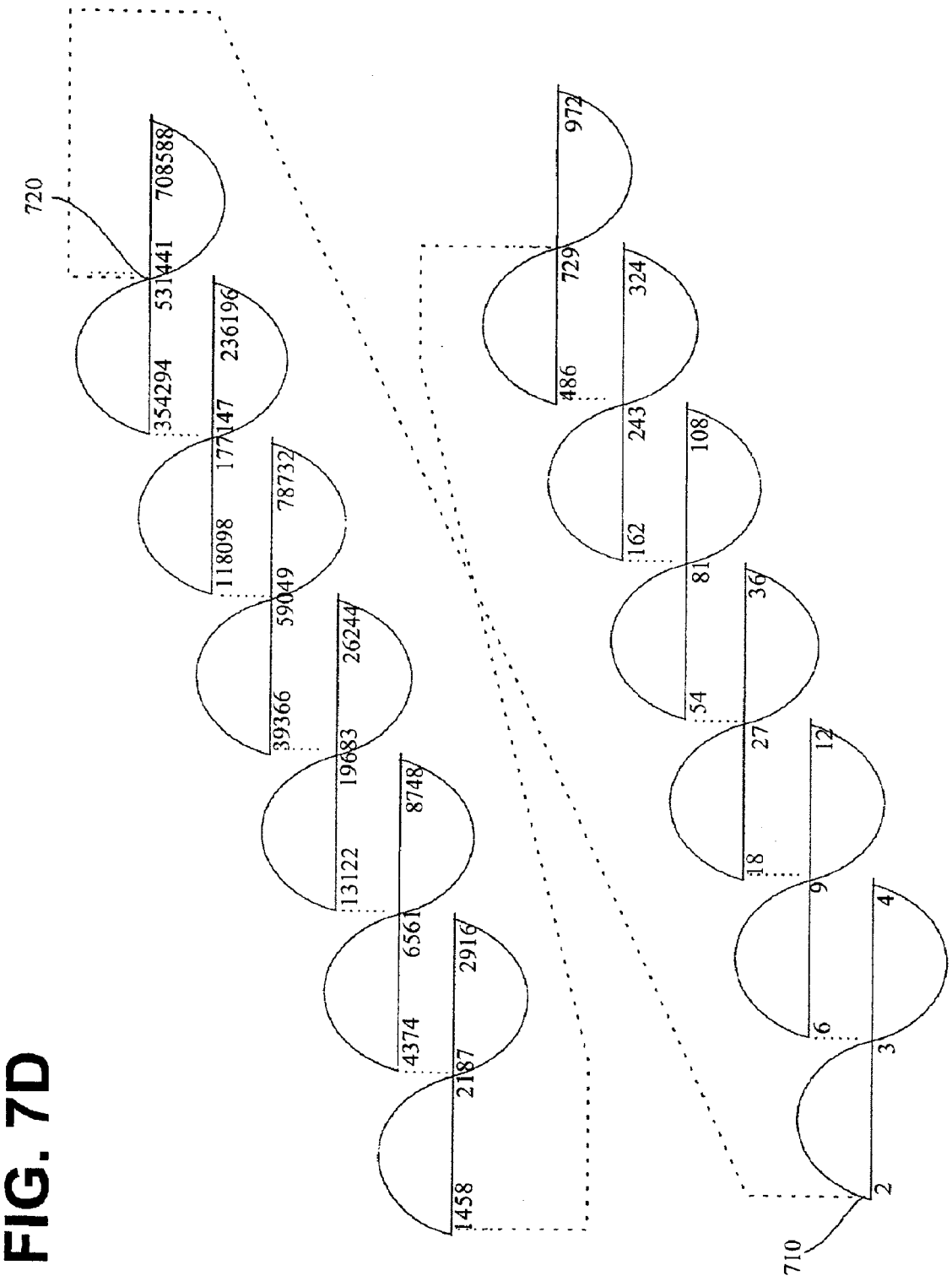

The continuous node-to-anti-node bonding describes general, macro principles of wave relationships, which are described by the wave language system as being circular in nature. FIG. 7D shows that the series of node-to-anti-node bonds are described by the wave language system as including a total of 12 harmonic waves before a repetition occurs. The 13th harmonic wave would bond to the anti-node of the 12th harmonic wave (720), which has a defined harmonic relative to the reference wave (710) of 531441. 531441 or octaves of 531441 are within the recognition range of the reference wave (710) in terms of tone recognition (the 19th octave of 2 is 524288. 531441 is approximately 24 cents off from 524288 which places it within the recognition range, as explained below).

Figure 8A:
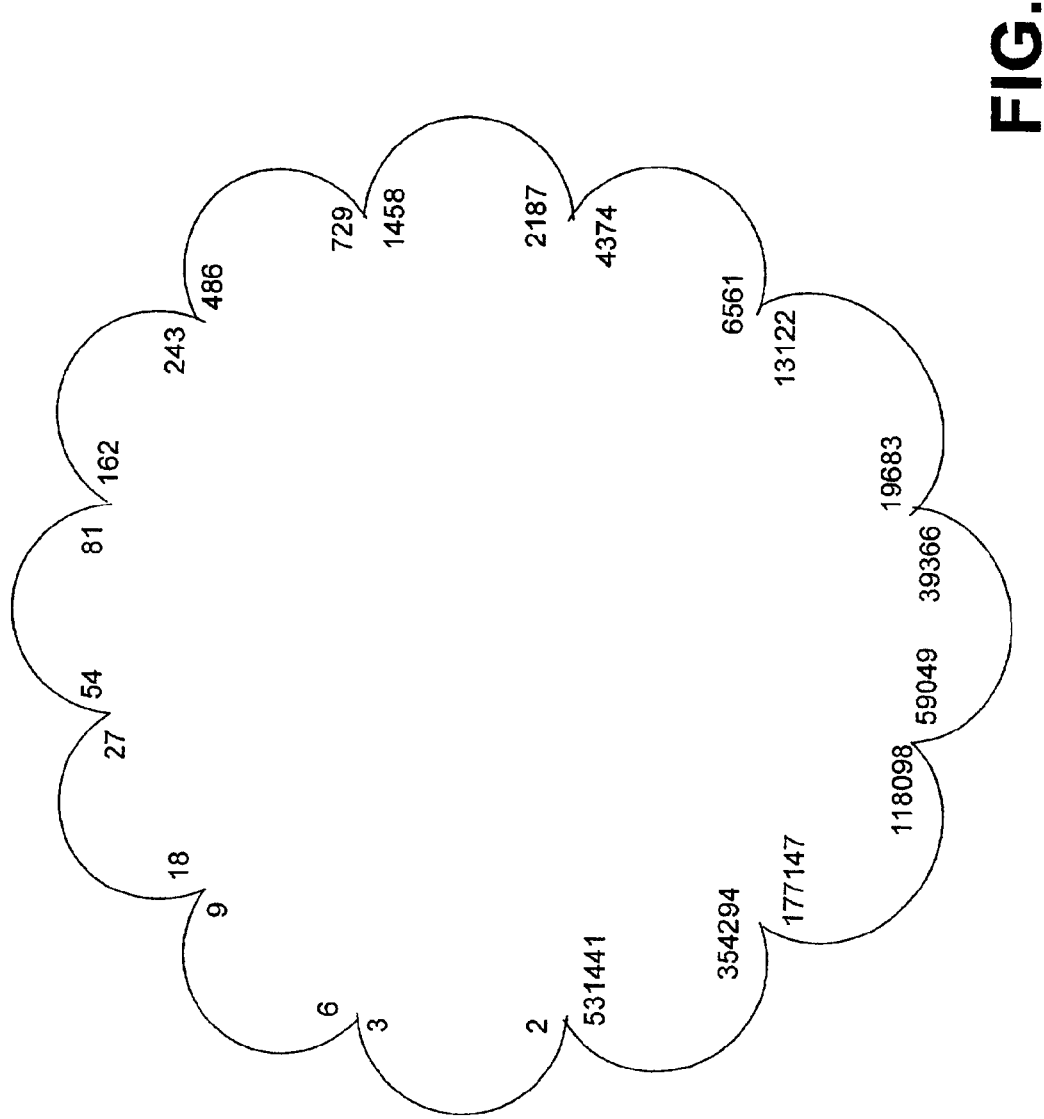
FIGS. 8A–8C are schematic representations of the circular and wave nature of the anti-node to node wave bonding process and their relationship to multiples of 3, in accordance with an embodiment of the invention.
Figure 8B:
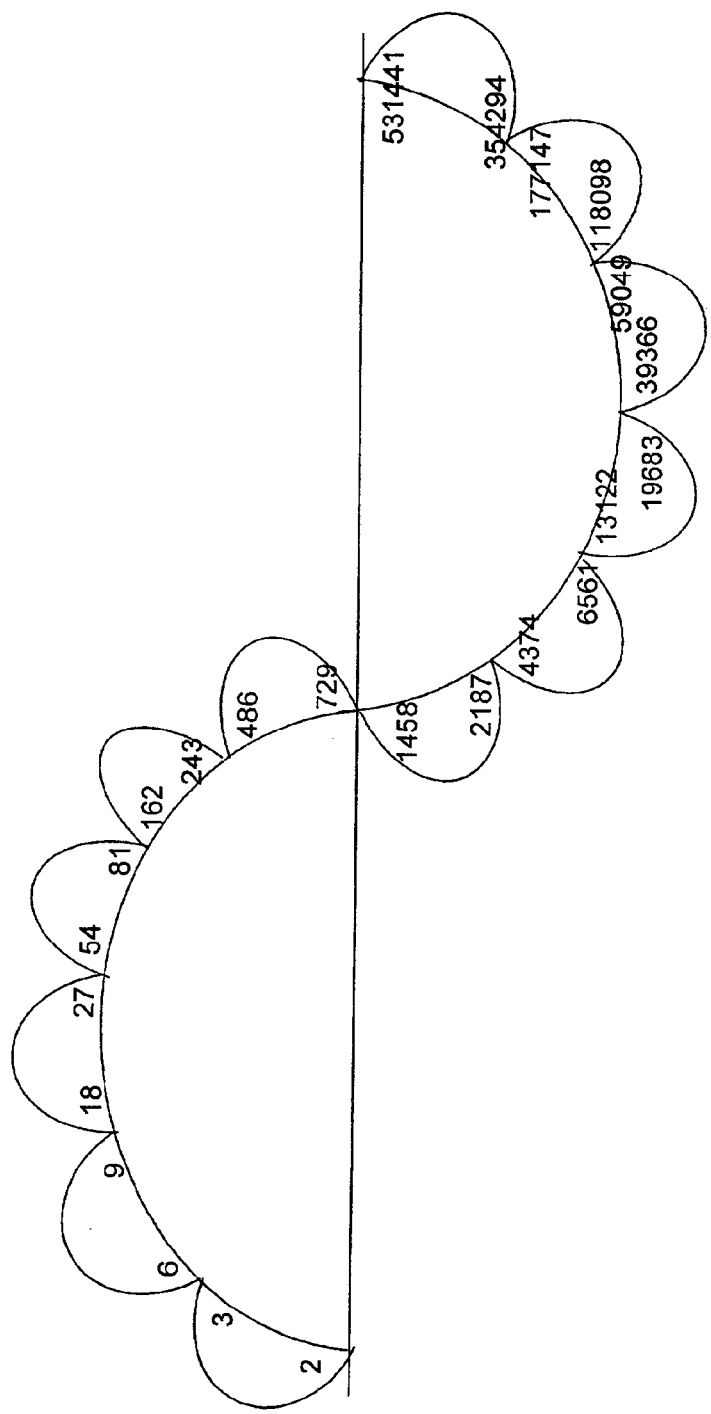
Figure 8C:
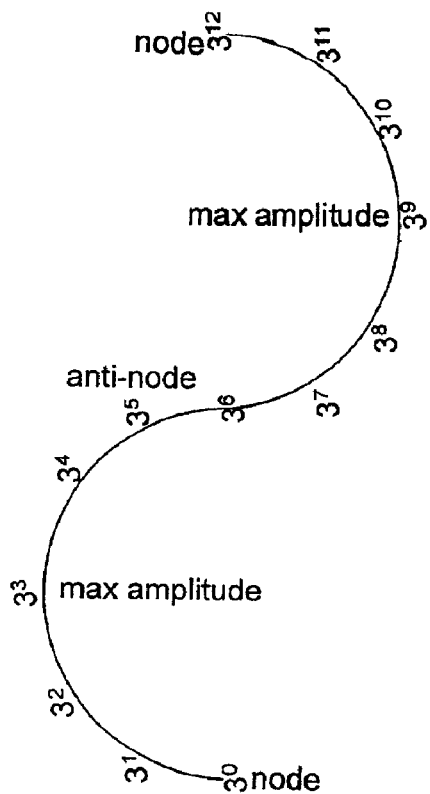
Figure 8C:
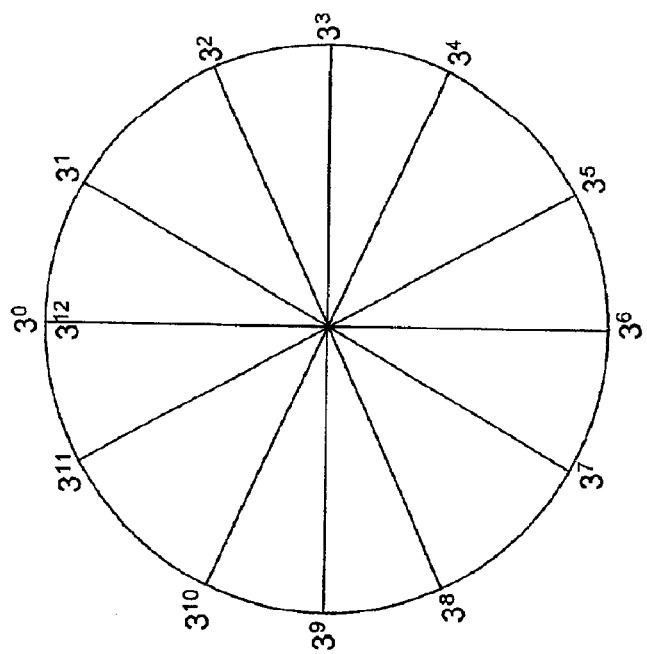

Just as the repetition of the octave in the harmonic series defines a circular or wave motion, the repetition of the octave in the node to anti-node bonded wave structure (FIG. 7D) is defined in the wave language system as a circular or wave motion, as shown in FIGS. 8A and 8B. FIG. 8C is a schematic representation of the circular and wave structures of FIGS. 8A and 8B as they relate to multiples of 3. A tone circle based on multiples 3 can also be created, as will be described below.

Figure 9A:
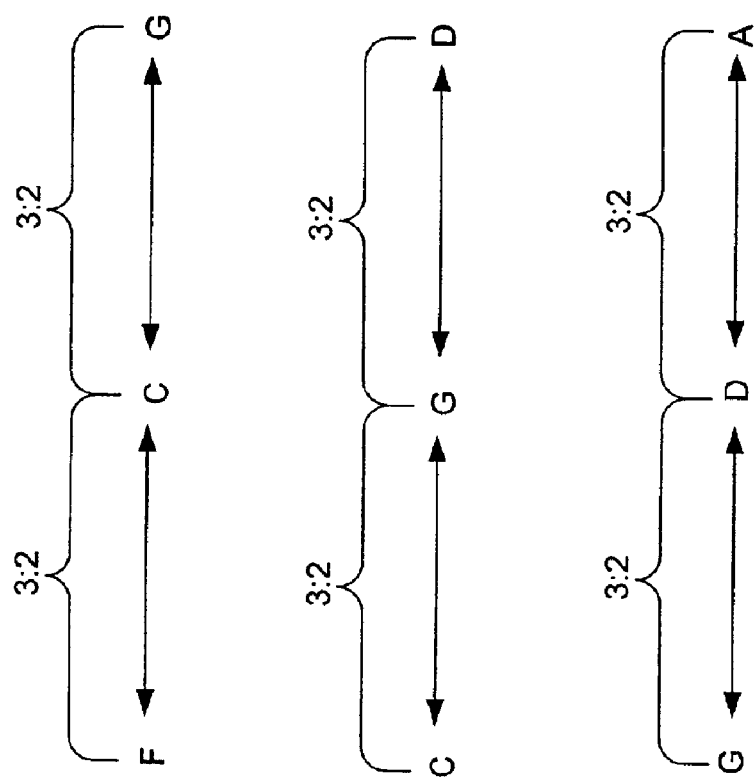
FIGS. 9A–9C are schematic representations of how the circular and wave structures described in association with FIGS. 8A–8C relate to harmonic tones, in accordance with an embodiment of the invention.
Figure 9B:
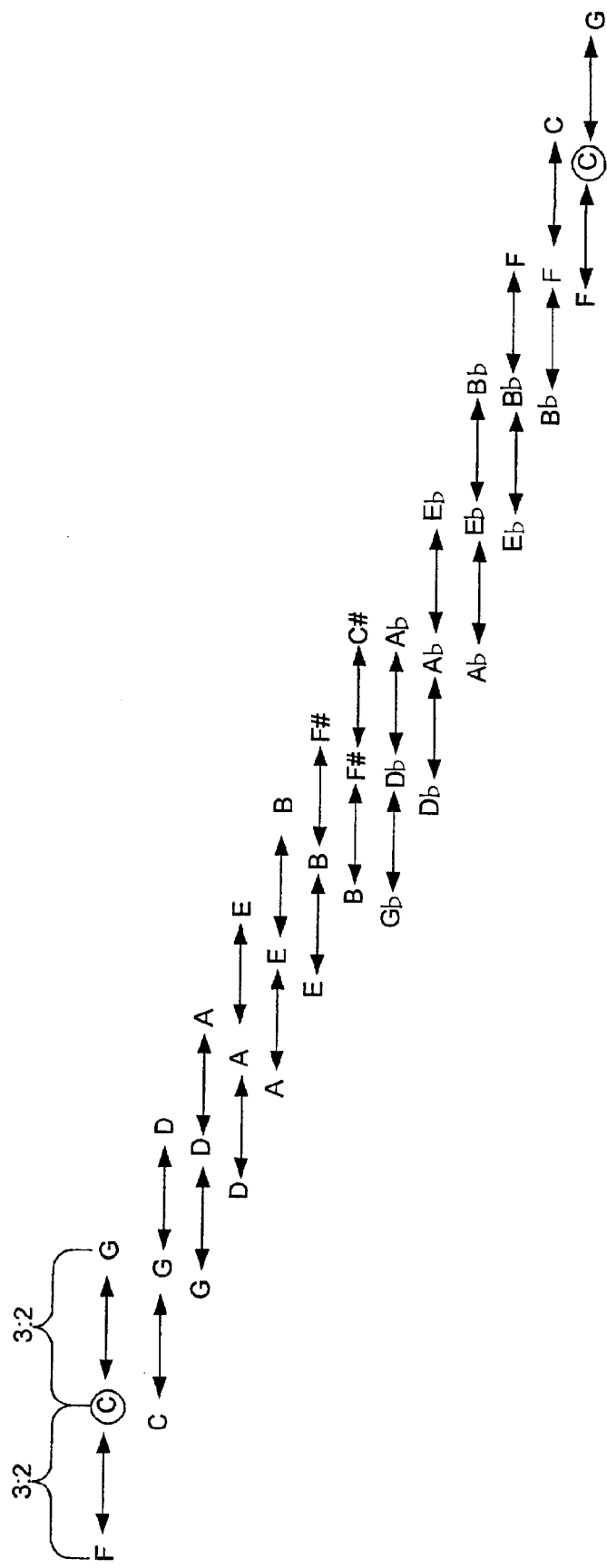
Figure 9C:
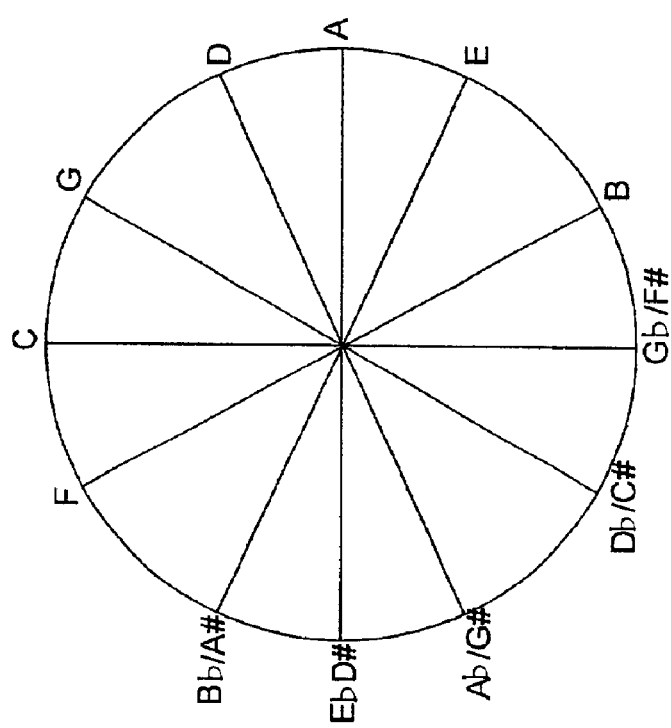

In a harmonic series, the 3rd harmonic is the first tone different from the fundamental. This fact means that the 3rd harmonic will have the closest perceived association to the fundamental over all other tones. This principle can then be described by the wave language system as forming a circle of tone relationships that corresponds to the node-to-antinode circle since both occupy positions on a circle in increments that are multiples of 3. In FIG. 9A, the ratio 3:2 is used to define the interval of the distance or frequency separation between the 2nd and 3rd harmonics. The 2nd harmonic is the octave of the fundamental, which means the 3rd harmonic is effectively being related to the fundamental by its 3:2 relationship. This strong harmonic relationship provides a measured equal step to compare to a color circle, as will be described below. Referring to FIG. 9B, if the tones F and G are placed on either side of C then a relationship is established where C is a dominant or reference tone and F and G are closely related to C as it's overtone and undertone 3rd harmonics. In the same way, G can be chosen as a reference tone, which means C and D are closely related tones to G. And again, if D is chosen as the reference tone, G and A will be closely related tones to D. The wave language system organizes a series of thirteen 3:2 relationships beginning with F-C-G and ending with F-C-G to complete a circuit from the 3:2 tone series, as indicated in FIG. 9B, and to form a circle, as shown in FIG. 9C, which is defined musically as a circle of 5ths. Within this circle of tones each tone is related to its overtone 3rd harmonic, such as C to G, and its undertone 3rd harmonic, such as C to F. Note how this relates to the circle and wave structure of FIG. 8C. Each new multiple of 3 defines a new musical tone. Since the multiples of 3 are limited to 12 before repeating, there are 12 fundamental tones.

With the wave language system describing the numbers as related to waves, and waves related to tones, another step of the wave language system in relating harmonic waves to the electromagnetic spectrum focuses on color. The wave language system incorporates several considerations to describe the color association to the harmonic wave-music representation as described above. First, octaves in color are achieved through changes in energy intensity. The change in energy intensity is governed by the gray scale. Webber/Fechner psychology studies in intensity perception attempted to show that perception of light intensity generally followed energy doublings like octaves in sound. Consider the $2^n$ octave series, and assume the "C" overtone and undertone harmonic series, for example. The $2^n$ overtone octave series moves progressively higher until it exceeds the high end of the human hearing range. The $2^n$ undertone octave series moves progressively lower in frequency until it exceeds the low end of the human hearing range. All $2^n$ tones, both undertone and overtone, are repetitions of the fundamental tone at higher and lower frequencies. For the "C" color-tone representing the color yellow, for example, the "C" overtone octave series moves to progressively lighter yellow tints until it effectively becomes white, as shown in FIG. 10A. The "C" undertone series moves to progressively darker yellow shades until it effectively becomes black, as shown in FIG. 10B. If the fundamental "C" is placed at the center of the hearing range, then a pure yellow hue is the starting color position. As the harmonic series progresses through the octaves, the "C" color tone becomes lighter (overtone) fading to white or darker (undertone) fading to black.

Figure 11:
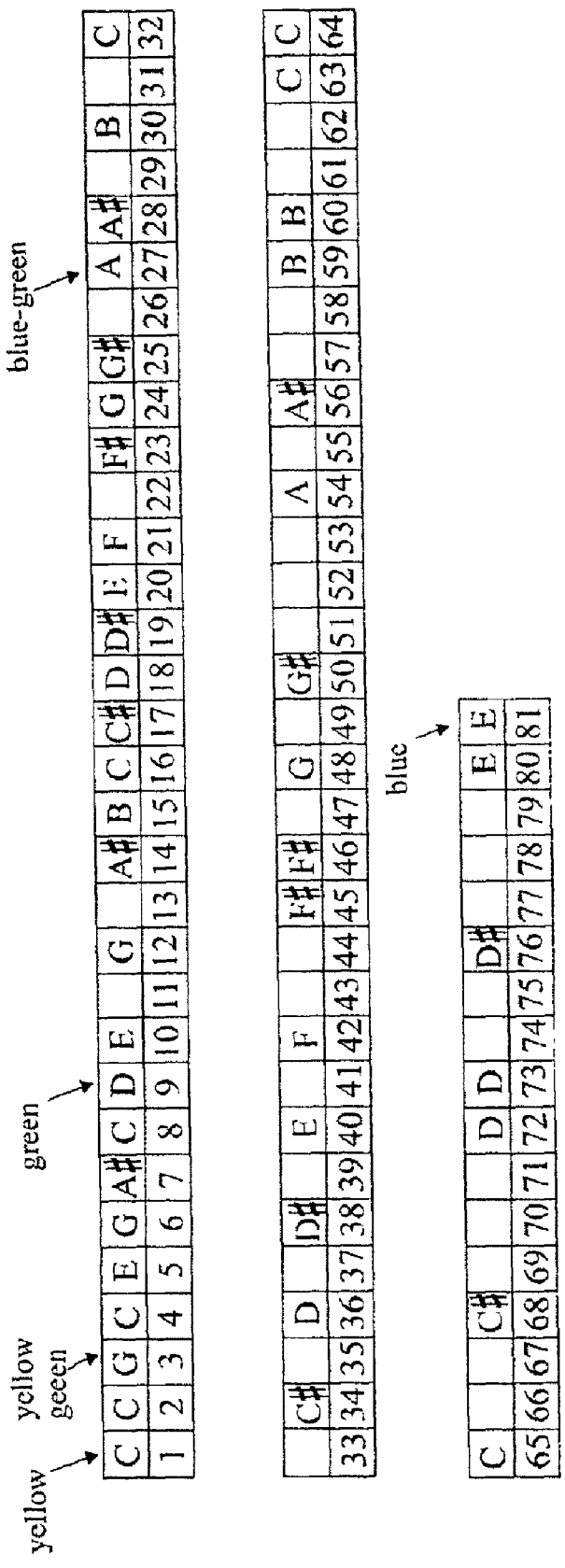
FIG. 11 is a schematic representation of a mathematical series based on a $3^n$ and its relationship to analogous color, in accordance with an embodiment of the invention.

Another consideration used by the wave language system is that the closest perceived tone relationship is the musical $5^{th}$ and the closest color association is the analogous color. An analogous color is a neighboring color such that no other defined color is found in between neighboring colors; and it is similar in color to its neighbor. For example, if there are 12 defined colors and yellow and yellow-green are similar colors, and consecutive colors such that no other fundamental color exists between yellow and yellow-green, then yellow and yellow-green are analogous colors. Consider the mathematical series based on $3^n$. The wave language system describes this mathematical series as a cycling through analogous colors-tones. In the wave language system, the color-tone yellow is arbitrarily designated as the starting color-tone, such that every multiple of three (3) within the harmonic series represents a new analogous tone, as represented in FIG. 11. Every harmonic of a harmonic series starts a new harmonic series (an imbedded series). As discussed above, the first imbedded series different in color-tone from the fundamental is the $3^{rd}$ harmonic imbedded series. In the "C" overtone series, the $3^{rd}$ harmonic is "G" and represents a new color-tone Yellow-Green. This means that in terms of imbedded series the multiple of three defines a new harmonic color-tone series (which also applies to the undertone series as defining undertone $3^{rd}$ harmonic or analogous color-tones).

Figure 12:
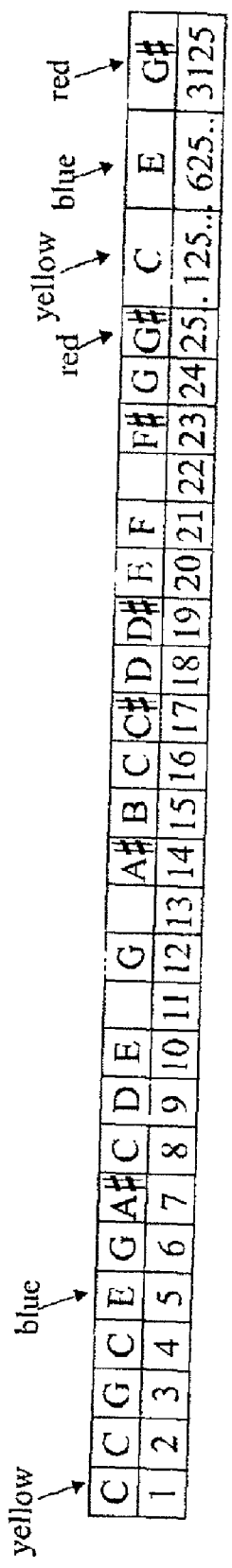
FIG. 12 is a schematic representation of a mathematical series based on a $5^n$ mathematical series and its relationship to a primary color-tone triad, in accordance with an embodiment of the invention.

Another consideration incorporated in the wave language system is the mathematical series based on $5^n$. The $5^n$ series is described by the wave language system as generating a repeating primary color-tone triad. In the "C" overtone harmonic series, with "C" defined as a yellow "C" color-tone, the primary color-tone triad is formed by the color-tones, yellow (C), blue (E), and red (G sharp) (which also applies to the undertone series as undertone primary color-tone functions), as shown in FIG. 12.

Figure 13A:
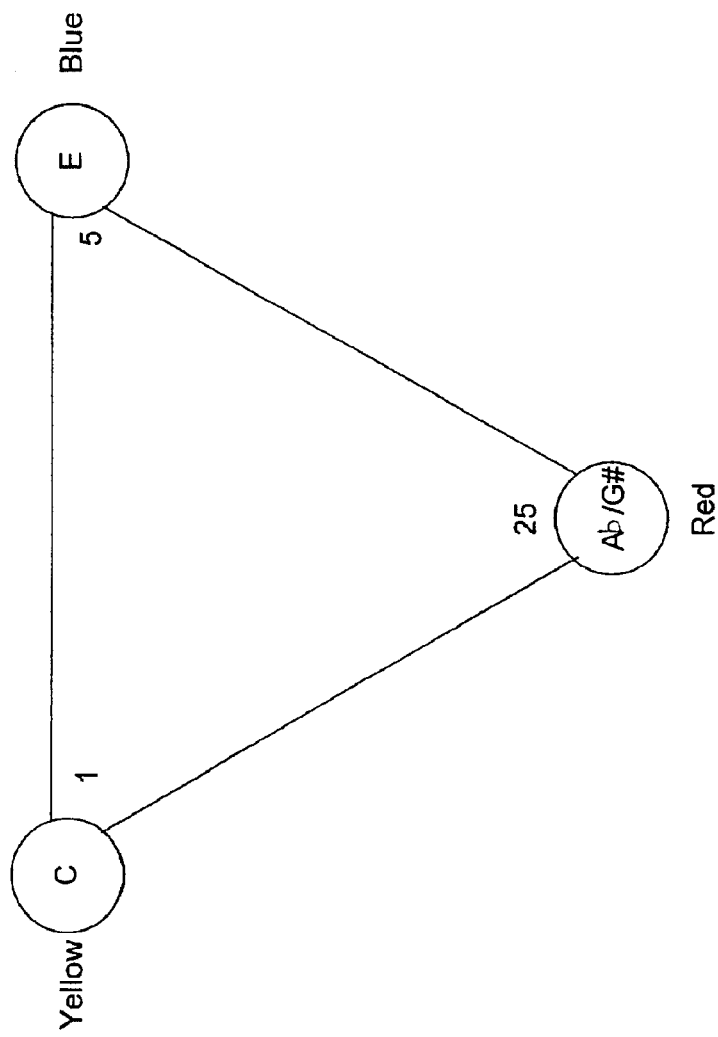
FIGS. 13A–13C are schematic representations of how the primary and the analogous color positions of the harmonic series form related color triangles, in accordance with an embodiment of the invention.
Figure 13B:
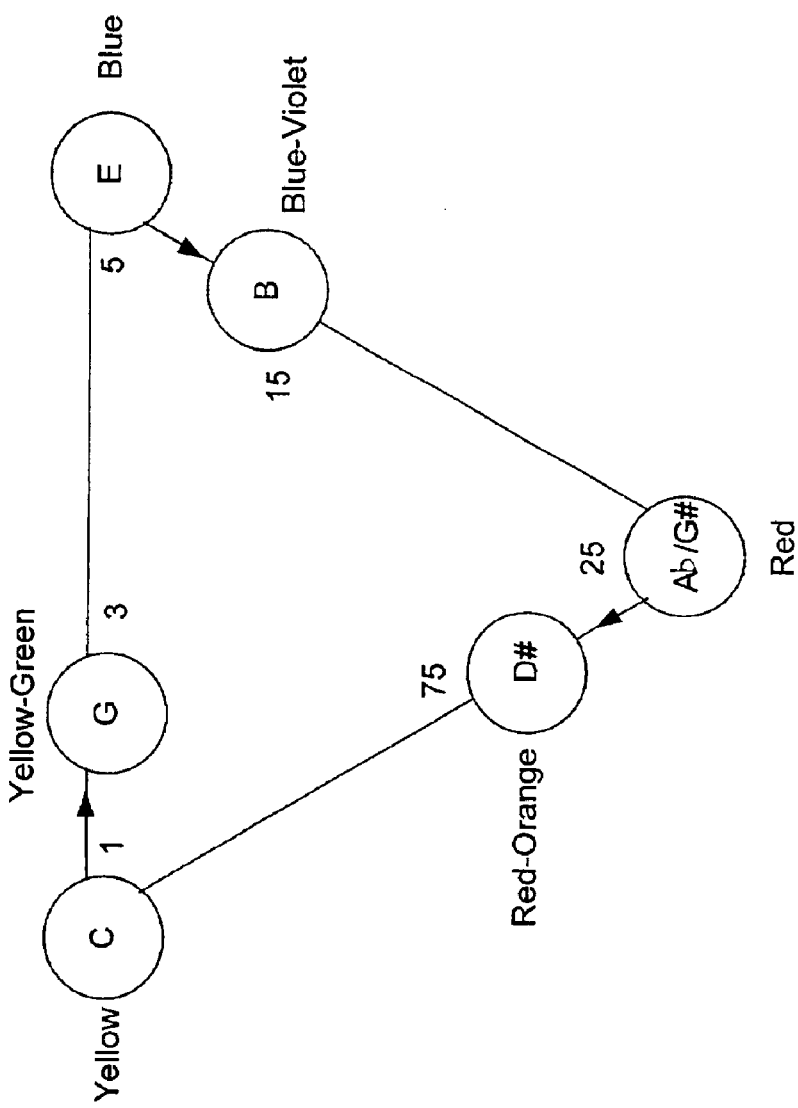
Figure 13C:
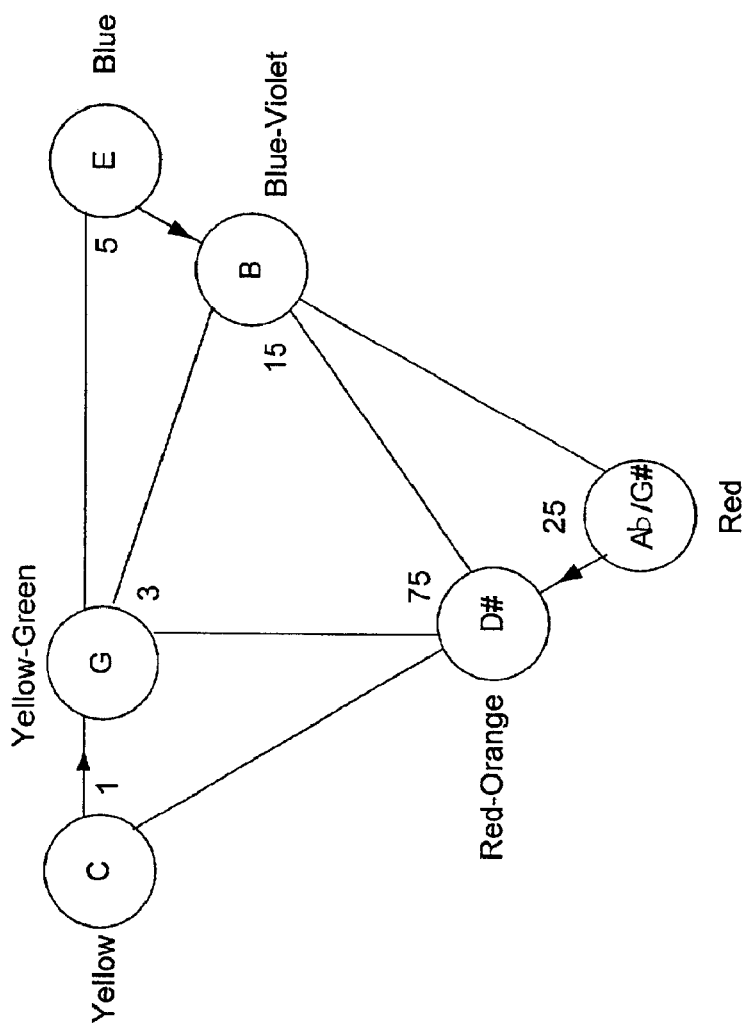

The $2^n$, $3^n$, and $5^n$ basic harmonic mathematical color structures form the core of the harmonic color-tones. Every imbedded harmonic series can be reduced to the basic color functions $2^n$, $3^n$, and $5^n$. For example, the "C" (Yellow) overtone series contains {C, G, and E} as its fundamental color-tone positions. G is an embedded series within the "C" Overtone series and contains {G, D, and B} as its fundamental color-tone positions. E is an embedded series within the "C" overtone series and contains {E, B, and G sharp} as its fundamental color-tone positions. FIGS. 13A–13C are a visual recap of the description above. FIG. 13A illustrates how the wave language system describes the primary color positions of the harmonic series as occupying positions in a color triangle. FIG. 13B illustrates how each primary can be described as having an associated analogous color at its $3^{rd}$ harmonic (1×3, 5×3, 25×3). FIG. 13C illustrates how the wave language system describes the analogous colors as forming their own harmonic series primary color triangle (e.g. 3, 3×5=15, 15×5=75). Thus, each new primary triad has associated analogous colors, which form new primary triads. The wave language system describes this repeating harmonic function in the form of a triadic color spiral, which can continue indefinitely. The simplest color relationship is the change in tint or shade, which changes the color to a lighter or darker color and is a function of the harmonic octave $2^2$. The fundamental difference in color is the analogous color relationship, which is a function of the third harmonic or $3^n$. The fundamental structural color relationship is the primary color relationship, which is a function of the $5^{th}$ harmonic or $5^n$ series.

Figure 14A:
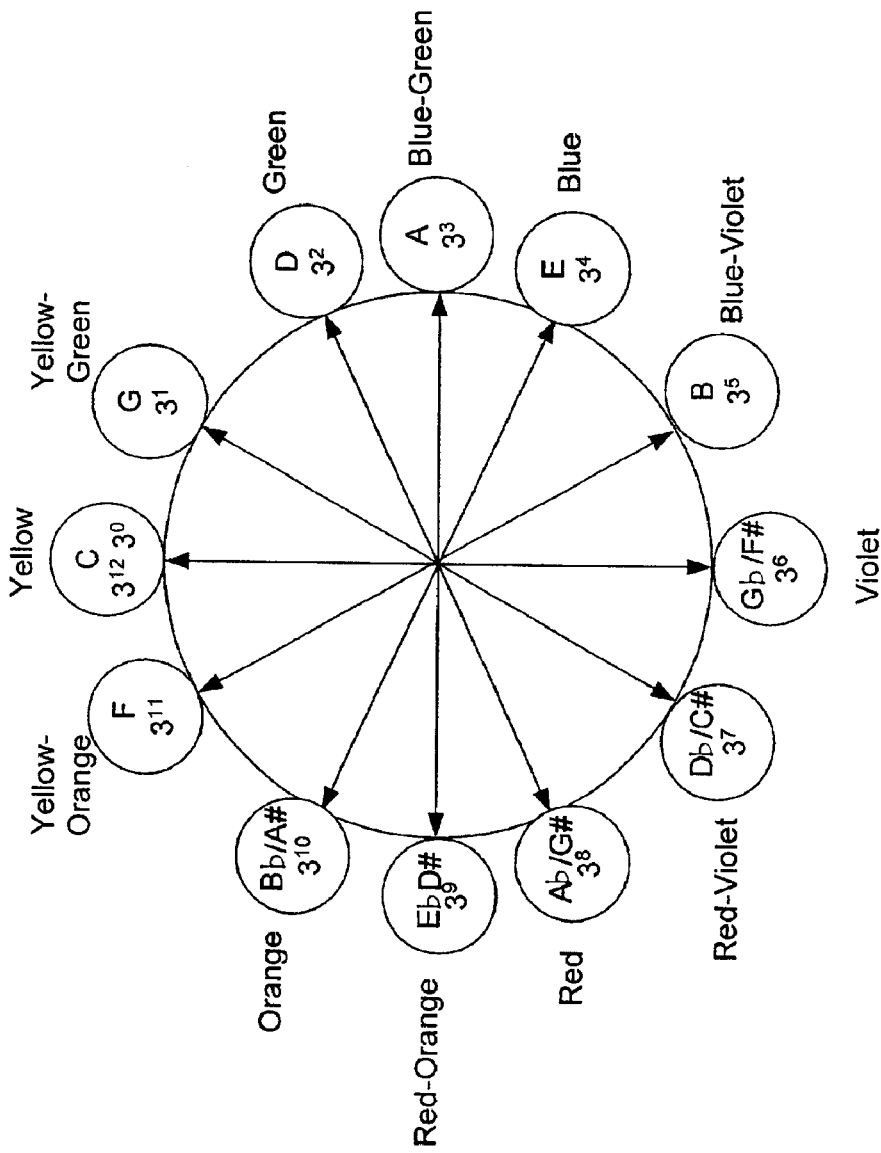
FIG. 14A is a schematic representation of a color circle and how the positions of the color circle relate to musical 5ths, in accordance with an embodiment of the invention.
Figure 14B:
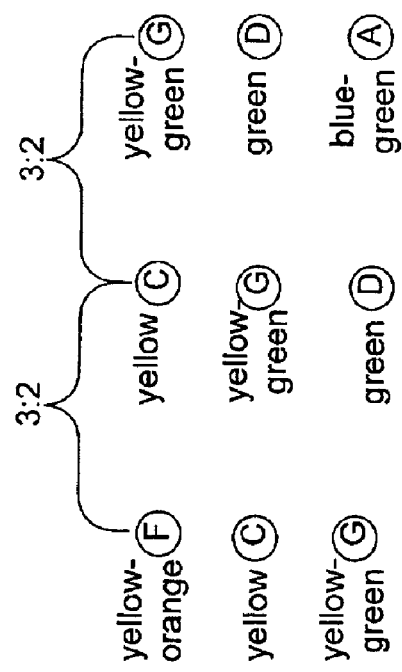
FIG. 14B is schematic representations of how the analogous colors relate to musical 5ths, in accordance with an embodiment of the invention.

Using the wave language system, a color circle is developed from the color triangles with color positions that correspond to the 5th relationship described above. FIG. 14A is a schematic representation of the color circle. Each 5th relationship can be described as an analogous color relationship. (Note that reference to FIG. 14A is based on overtones but it can also be applied to undertones). This relationship can be further illustrated by an examination of the 5ths (3:2) relationship and color influence. FIG. 14B compares the colors yellow-orange, yellow, and yellow-green to the tones F, C, and G. These colors are closely related because of large amounts of yellow found in yellow-orange and yellow-green. In comparison, the tones F and G relate to C by their positions within the C overtone and C undertone harmonic series. Because of their harmonic positions, C dominates the 3:2 intervals of C up to G and C down to F. In the same way, the "color" of G dominates the colors of C and D, and the color of D dominates the colors of G and A, and so on. This color-tone relationship described using the wave language system completes a circular structure.

The diametrically opposed or destructive interference relationship is described by the wave language system as the complementary color relationship. When complementary colors are mixed, the result destroys color leaving gray. Blue-green and red-orange are an example of a complementary pair. The concept of complementary pairs is a fundamental color-tone relationship. Consider the basic perceived behavior of colors using yellow as a reference color. Yellow-orange and yellow-green are closely related to yellow because each color is perceived to have a significant proportion of yellow with limited proportions of red or blue. Yellow and red, or yellow and blue are typically considered to be unrelated colors. That is to say, yellow, red, and blue are independent colors. Violet, found between red and blue, has no color relationship to yellow. It is the psychological opposite. When yellow and violet are blended the color properties of yellow and violet are destroyed and become a neutral gray, as will be described below. Such a blending does not necessarily destroy visual perception, but instead destroys the perception of color. The tri-tone relationship, such as C and F# has a destructive interference harmonic wave relationship. As noted in FIG. 14A, each tri-tone is described by the wave language system as a complementary color relationship.

Figure 15:
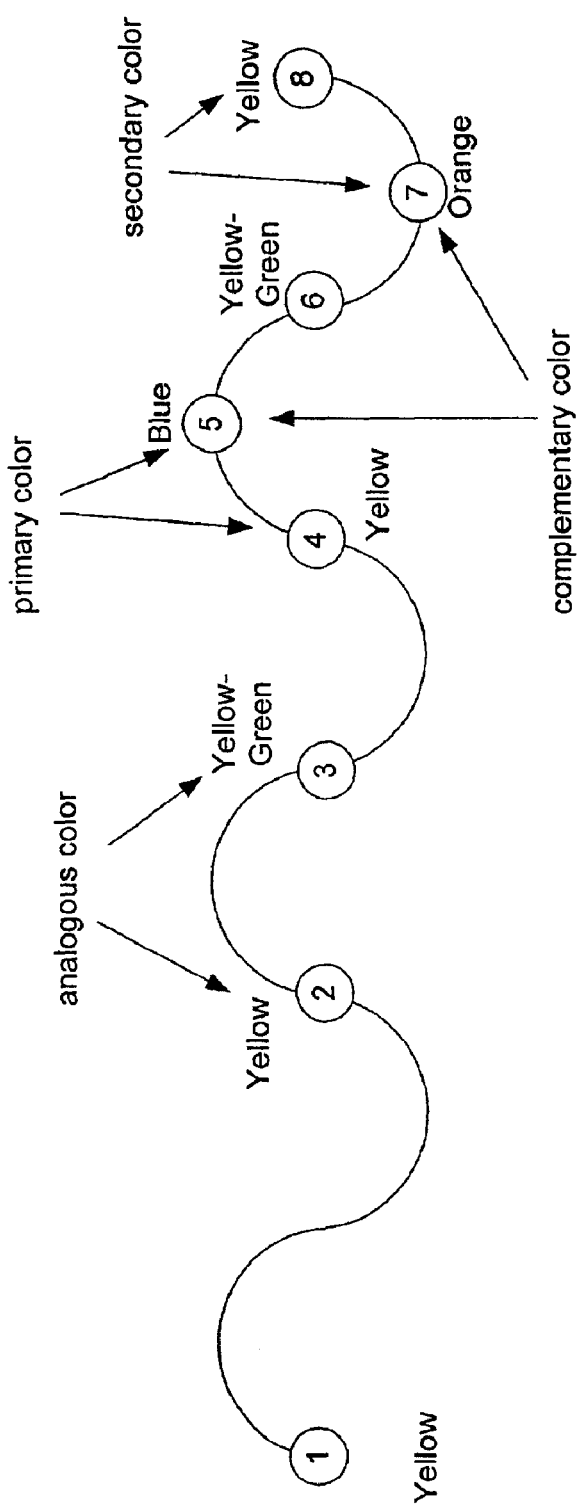
FIG. 15 is a schematic representation of how the positions on the color circle relate to the harmonic wave, in accordance with an embodiment of the invention.

By the wave language system employing the color to harmonic associations, the harmonic wave can be described in the wave language system with color, as illustrated in FIG. 15. Note that the analogous color defines the node/anti-node relationship. The complementary color defines the positive to negative maximum amplitude relationship. The node to maximum amplitude is defined by a primary or secondary color relationship. A secondary color is defined by the Webster Dictionary as the color resulting from equal mixtures of two primaries. The wave language system extends this definition further, wherein the secondary colors are the complementary primaries such that, for example, if yellow, blue, and red are defined to be primaries, then the complements of each of these colors are secondaries, and these secondaries form their own primary color relationship. As an aside, if the quarks of the proton are based on yellow, blue, and red, then the quarks of the electron will be based on violet, orange, and green. The term secondary then means complement of an opposing primary. In the wave function, if yellow is the node, and blue is the amplitude and the primary of yellow, then orange is the complement of blue and thus the secondary of yellow.

In the wave language system, the color-sound relationship is not limited to defining the 12 principle tones or frequencies defined by multiples of 3. Practically any number and any frequency can be defined and described by color. The first step in determining the absolute number or frequency color is to compare mixtures of overtone and undertone harmonic waves. When the positions of the overtone and undertone series are described as applying to the greater color circle (example, FIG. 14A), the individual numbers of frequencies or colors do not align. For example, harmonic 45 calculated from overtone numbers produces the ratio 45/32 (1.40625), and calculated from the undertone numbers produces the ratio 64/45 (1.422). Both of these numbers are within the effective aurally recognizable range of $\sqrt{2}$. In fact, the multiplicative center between these two numbers is the $\sqrt{2}$, as illustrated in example equation (Eq.) 1 below:

$$45/32 \times 32(\sqrt{2})/45 = \sqrt{2} - - - - \sqrt{2} \times 32(\sqrt{2})/45 = 64/45 \qquad \text{Eq.1}$$

Figure 16A:
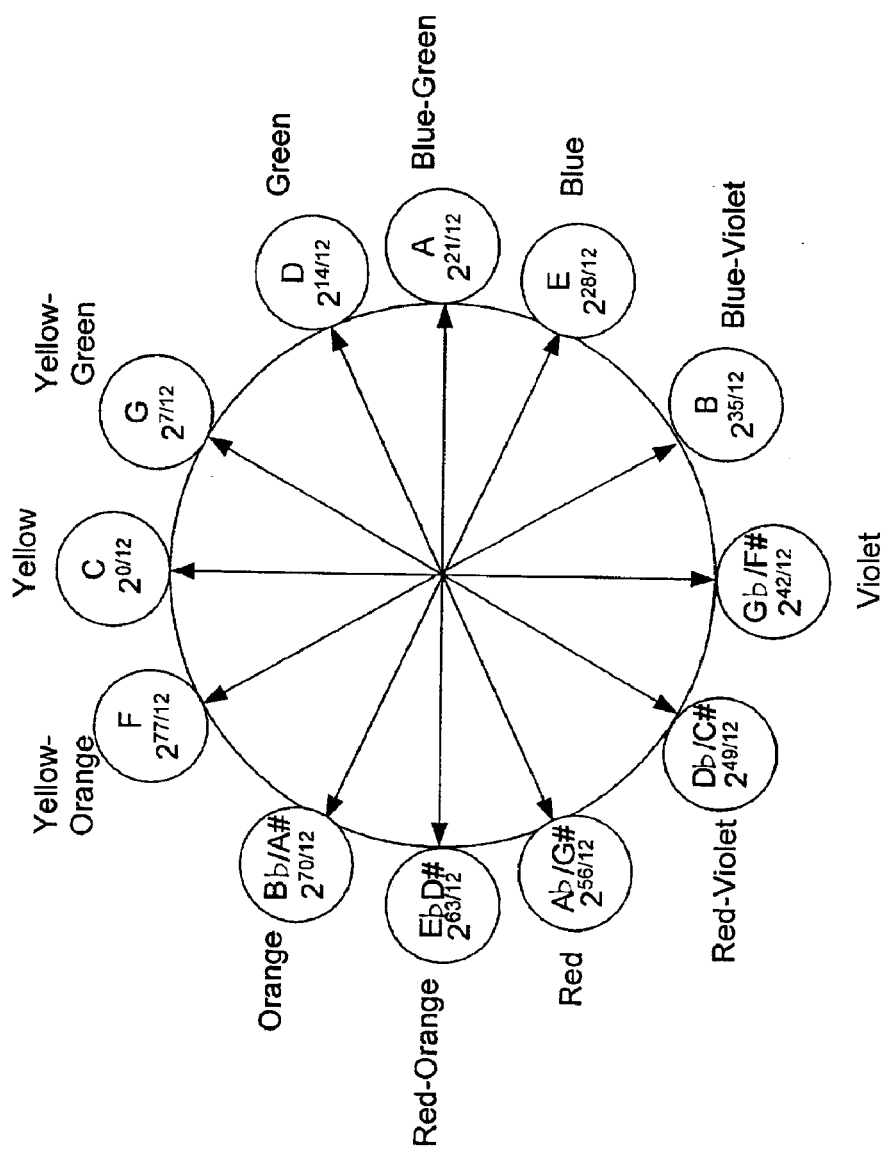
FIG. 16A is a schematic representation of an equal tempered color-tone-number circle based on roots of 2, in accordance with an embodiment of the invention.

The combined harmonic directions can be described by the wave language system as yielding the common equal tempered western music system of tones and yielding a resultant equal tempered color-tone-number circle based on roots of 2, as shown in FIG. 16A. For example, assume a single frequency defined as yellow. And from that frequency, generate an overtone and an undertone wave. The positions defined on the opposite side of circular space will be separated by equal distances from the square root of two. This relationship establishes the existence of the square root of two as the fundamental opposite of 1, which in this case is yellow. But the definition of space used by the wave language system is such that all equal and opposite functions must exist otherwise space cannot exist. Thus, according to the wave language system, at the most fundamental level of energy, there must exist a 1 and a square root of 2, or for example, yellow and violet. If we begin with yellow and violet, and both form overtone and undertone wave functions, then the overtone function from yellow and the undertone function from violet will be separated by equal distances from an equal tempered blue-green ($2^{(3/12)}$). And the undertone function from yellow, and the overtone function from violet, will be equidistant from red-orange ($2^{(9/12)}$), the complement of blue-green.

Figure 16B:
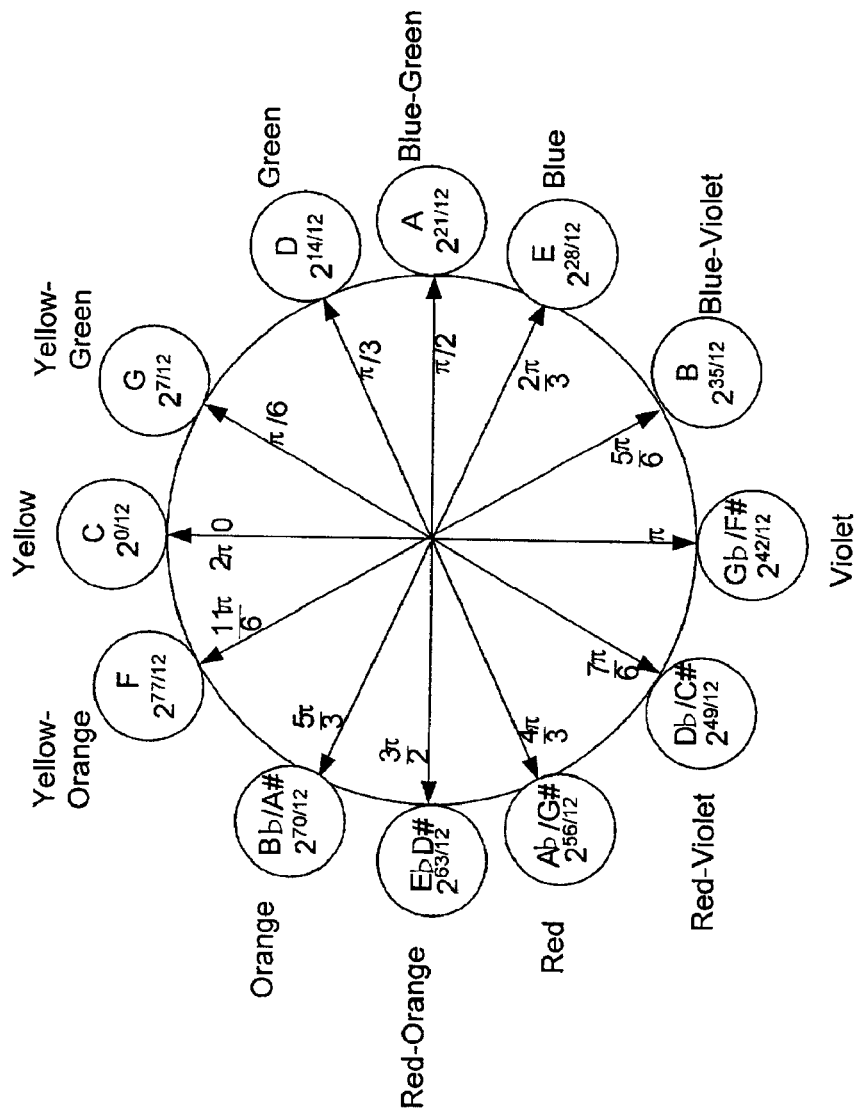
FIG. 16B is a schematic representation of fundamental vector directions of color based on equal angle divisions of a circle, in accordance with an embodiment of the invention.

Now the wave language system has been used to describe 4 of the 12 fundamental colors as equal tempered color positions. These four equal tempered positions then are related to each other by the wave language system through overtones and undertones such that the space between them will subsequently be divided by equal means. Thus, if there are 12 fundamental tones, then there are 12 fundamental equal tempered tone positions, which define color-tone centers. The difference between overtone/undertone and equal tempered positions is described by the wave language system as being one of function. The overtone and undertone positions are described as being actual wave positions. The equal tempered positions are described as being a general reference point used in defining viable energy ranges of association and definition, which becomes important in the formation of electromagnetic wave structures. FIG. 16B illustrates that the establishment of equal tempered color centers establishes the fundamental vector directions of color based on equal angle divisions of a circle. The existence of direction neutral color vectors establishes the fundamental order of space regardless of starting number or orientation of charge. The equal tempered or direction neutral color vectors provide a mechanism for defining the relative color of harmonic numbers (harmonic color vectors).

Figure 17:
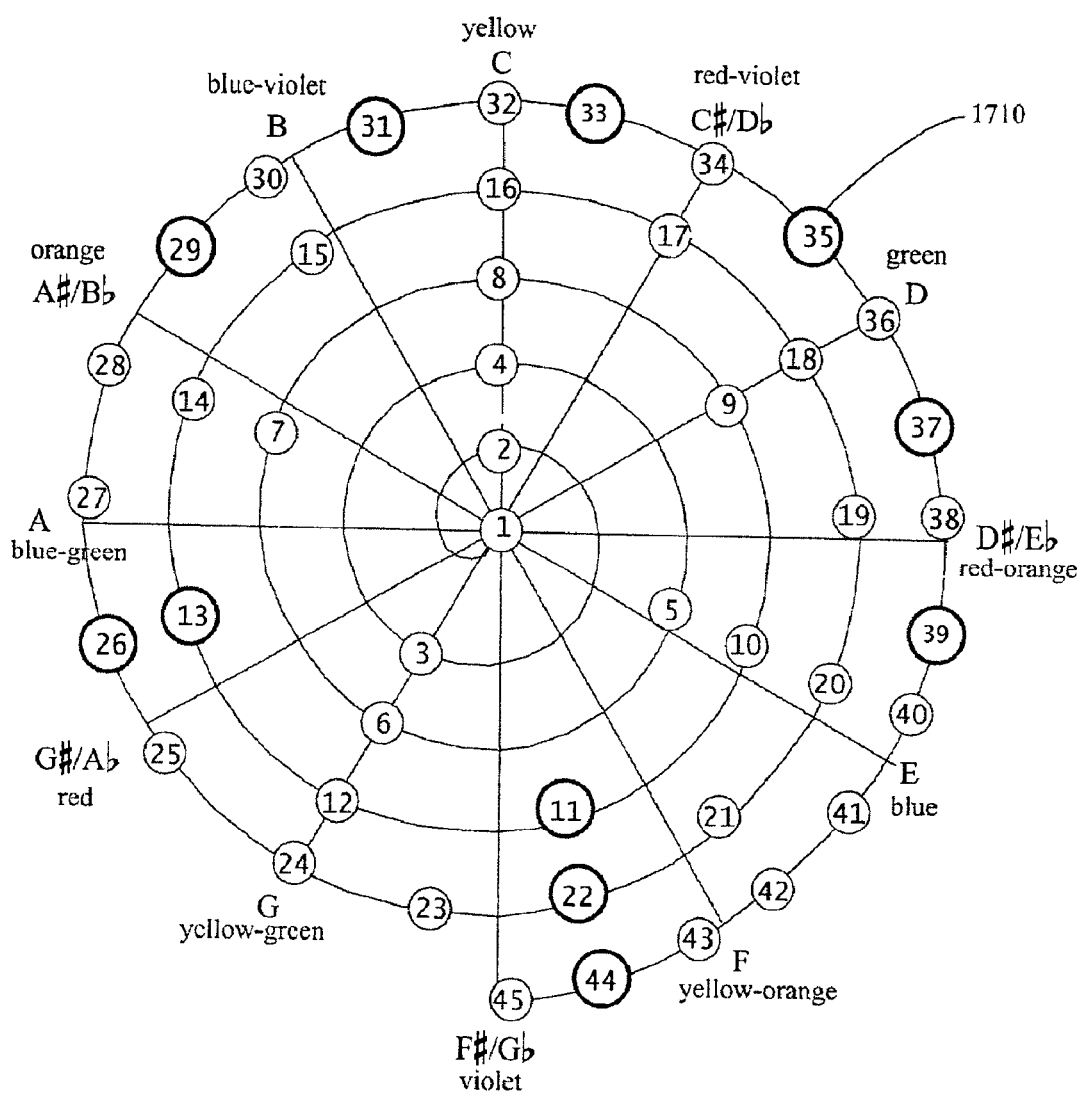
FIG. 17 is a schematic representation of color positions on a spiral for the first 45 overtone harmonics, in accordance with an embodiment of the invention.
Figure 18:
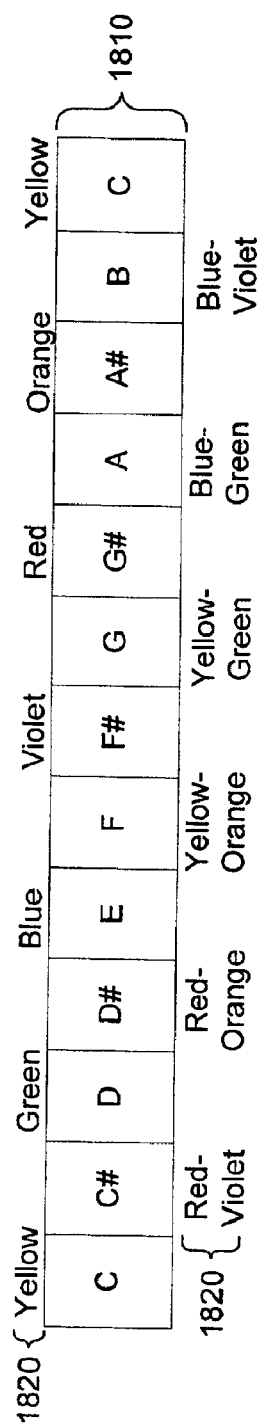
FIG. 18 is a schematic representation of how the color positions on the spiral of FIG. 17 have a tone pattern that is equivalent to the musical chromatic scale, in accordance with an embodiment of the invention.

FIG. 17 shows the first 45 overtone harmonics described using the wave language system, starting with a yellow tone. Note that as the series progresses, an alternating color pattern develops consisting of nearly complementary colors. For example, red-violet is very close to being the complement of yellow. Note that as the harmonic series progresses, inter-tone positions begin to occur which do not fall near the 12 defined color vector positions. The center area between vector positions is defined to be gray and is represented by a larger circle with a heavier outline 1710. Further analysis of FIG. 17 reveals a tone pattern that is equivalent to the musical chromatic scale or consecutive notes in the western music tradition, as shown in FIG. 18. Shown is the chromatic scale 1810 and the harmonic color pattern 1820.

Analysis of the color in between neutral vector color positions is described by the wave language system in at least two different ways. First, the inter-tone color is the result of two nearly complementary colors. For example, consider the harmonics 16 and 17 or equivalently, C and C#, or equivalently, yellow and red-violet. FIG. 19A shows the direct physical blend of these colors, which results in a significantly reduced chroma (increased gray), or nearly neutral color. However, the color range between the two color positions is described by the wave language system in terms of color rotation and color comparison. When color reference or comparison is accounted for, a fundamental reference range from yellow to violet and from yellow-green to red-violet is generated. FIG. 19B shows these fundamental reference relationships. The combined results of these two color references is a neutral gray area between consecutive harmonic color positions. The area between the 12 fundamental tones is defined by the wave language system as the microtone area.

Figure 19C:
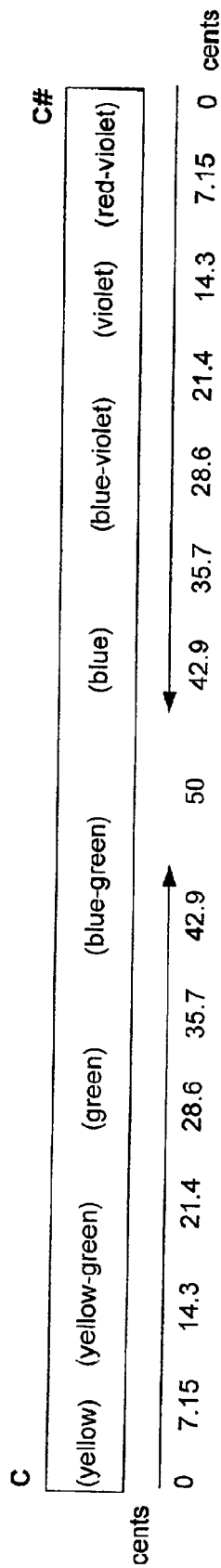

The secondary color effect is to view this color range in terms of the color rotation between yellow and red-violet as shown in FIG. 19C. For reference the cent division is included in the wave language system to identify color centers and midpoint between color centers. A comparison of the chroma interaction (FIG. 19B) with the color rotation (FIG. 19C) introduces areas of numerical color influence on both the macro and micro scale. The effective color of yellow extends to green but not really beyond it. The effective area of each color vector can then be defined by the wave language system as the effective area it encapsulates. A general proof of this is the aural recognition of tones.

First, frequencies within 6 cents of a tone typically cannot be functionally differentiated from the fundamental tone in the most optimal circumstances. This compares directly with the microtone color limitation to 7 cents on either side of color-tone center. Second, frequencies within 14 to 15 cents are within a generally acceptable range. Note that 14.3 cents defines the center of the analogous microtone color. Third, frequencies from 14 to 21 cents off from just tunings are considered viable but cannot be as effectively ignored. This microtone range has completely passed to a new microtone color (yellow-green in the example). Fourth, frequencies from 21 to 28 cents off from just tunings are the end of the functional range. 28 cents is the center of the next color (green in this example). This position is the center between primary colors (yellow and blue in this example) and thus represents a neutrality of color dominance between color primaries. Fifth, frequencies from 28 to 36 cents are aurally unacceptable and are given the name "wolf" to describe a very unpleasant sound compared historically to the howling of a wolf. In color this position represents the midpoint between color complements yellow and violet. In chroma this area represents the visible end of the color range. Sixth, frequencies from 36 to 50 cents cannot effectively be identified with a tone. Finally, frequencies beyond 50 cents will begin to be identified with the next chromatic tone.

The physical manifestations of what the wave language system describes as inter-tones occur in any harmonic series. The further out a harmonic series is taken, the more tones occur which fall in between the 12 fundamental neutral vector positions. Absent the wave language system, no theory or language exists to describe these inter-tone frequencies. Generally theorists simply consider frequencies that are aurally close enough to the fundamental tones to be useful. All frequencies can occur in bends and vibratos but there is no language or methodology to account for them in any useful way.

What must be made clear is the difference between a harmonic spiral generated from a harmonic series, and the organization of vector space resulting from the simultaneous existence of overtones and undertones. Vector space is a term used by the wave language system to understand how to define the individual harmonics of an overtone or undertone series but is not itself a harmonic series. It is a function or language that describes the union of overtone and undertone space and provides the means to define frequencies relative to the 12 fundamental neutral vectors.

Describing a mixture of overtones and undertones as being used to define a neutral vector space that accurately describes the color circle implies that color is the result of the mixture of overtone and undertone harmonic waves. The description that the mixture or bonding of overtone and undertone harmonic waves is different from the description of the node-to-node or anti-node-to-node bonding described above. This mixture description utilized by the wave language system is a complete unification of the harmonic waves. If overtone is described by the wave language system as expansion then undertone is compression, and if overtone is described by the wave language system as losing energy, then undertone is gaining energy, and the unification of overtone and undertone harmonic waves is described as a sharing of energy functions resulting in what the wave language system describes as a current loop or an electromagnetic wave. The current loop is independent from its constituent parts to the extent that the current loop formed from the constituent parts is a new wave function. The current loop wave, or electromagnetic wave, retains the harmonic properties of each constituent harmonic wave and forms a new type of harmonic series based on the relationships between the overtone and undertone harmonics. The ability to define all overtone and undertone frequencies by color provides the mechanism to define all frequencies of the electromagnetic wave by color.

The manner in which the wave language system describes the color of the current loop wave harmonics will now be discussed. The portion of the wave language system described above provides the framework that is incorporated in the balance of the wave language system described below in order to associate color to music (i.e., provide a direct connection between electromagnetic (EM) waves and harmonic sound waves). The analogous color pattern of EM waves does not match the chromatic color pattern of harmonic sound waves. But analogous color can be obtained from the greater harmonic color circle which includes both overtone and undertone harmonic wave properties. The comparison of electromagnetic waves to harmonic sound waves preferably includes consideration of the order of numbers and it's inversion, or rather, on what is described by the wave language system as an overtone harmonic wave bonded with an undertone harmonic wave. The following points show how the wave language system is used to calculate the color of a bonded harmonic wave.

First, for the bonded harmonic 1, the color of the overtone and undertone fundamentals are the same. Both fundamentals begin at the same frequency or energy. The undertone wave moves from a length of 1 to a length of 2 and the overtone wave moves from a length of 1 to a length of ½. The undertone amplitude increases from 1 to 2 and the overtone amplitude decreases from 1 to ½. The bonded wave shows a decrease in amplitude from 1 to ½, and an increase wavelength from 1 to 2. The color is thus calculated by the color relationship between 1 and 1, which means the color of the overtone and undertone fundamentals are the same.

Second, for the bonded harmonic 2, the second bonded harmonic has the same color as the fundamental. The overtone harmonic moves from ½ to ⅓ and the undertone harmonic moves from 2 to 3. The color is calculated by the color relationship between ½ and 2 or 2 octaves, which means the second bonded harmonic has the same color as the fundamental.

Third, for the bonded harmonic 3, the overtone harmonic moves from ⅓ to ¼ and the undertone harmonic moves from 3 to 4. The color is calculated by the color relationship between ⅓ and 3 which is 3 octaves plus 2 chromatic tones which equates to a total color change of 2 chromatic colors.

Fourth, for the bonded harmonic 4, the color is the same as the fundamental. The overtone harmonic moves from ¼ to ⅕ and the undertone harmonic moves from 4 to 5. The color is calculated by the color relationships between ¼ and 4 or 4 octaves, which is the same color as the fundamental.

Fifth, for the bonded harmonic 5, the color is calculated by the color relationship between ⅕ and 5, which is 4 octaves and 8 chromatic tones for a total color change of 8 chromatic colors. The overtone harmonic moves from ⅕ to ⅙ and the undertone harmonic moves from 5 to 6.

Figure 20:
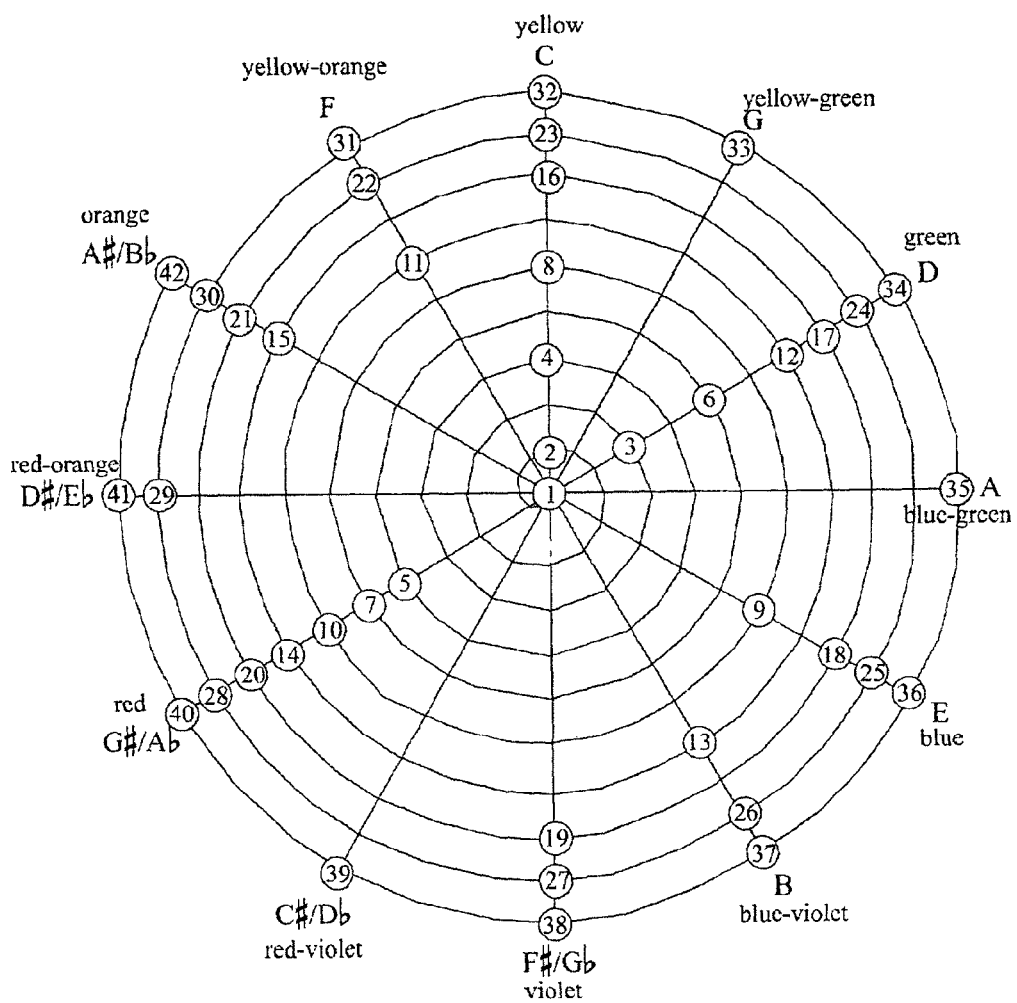
FIG. 20 is a schematic representation of a spiral used to determine the color of a bonded harmonic wave using overtone and undertone harmonics, in accordance with an embodiment of the invention.

Steps 1 through 6 show a pattern developing. Bonded harmonic 1 shows a harmonic distance of 1. Bonded harmonic 2 shows a harmonic distance of 4. Bonded harmonic 3 shows a harmonic distance of 9. Bonded harmonic 4 shows a harmonic distance of 16. The series which describes these numbers is the square of the harmonic series or $1^2, 2^2, 3^2, 4^2$, etc. The color of each current loop harmonic is then preferably calculated by squaring the harmonic number and then determining the color of the squared number relative to the fundamental color. The squared number defines the total harmonic distance between the overtone and undertone components of the current loop wave. As the current loop harmonic series develops, the analogous color pattern of the electromagnetic wave is generated, as illustrated in FIG. 20. Beyond the current loop harmonic 42, the area in between the 12 fundamental neutral color vectors is defined by the analogous color range.

The above described method associated with the wave language system is the first step in language development in that it can be described analogously as sounds such as a vowel sound or a consonant sound. The next step is to create, analogously, complex sounds or words, which include not only the construction of words but the inflection or emotional expression of words, which implies a variety of meanings to a word. In the context of waves, the color frequency is a single sound. The harmonic wave is a sound unit, which implies the fundamental frequency of the harmonic wave, which is a single sound. For example, a vibrating string that produces a harmonic wave will be referenced to the fundamental tone regardless of how many harmonics are produced. But, the "color" of the harmonic wave can be manipulated by amplifying or dampening certain frequencies.

Color is the language of the electromagnetic wave defined, according to the wave language system, by the current loop, which is a bonded overtone and undertone harmonic wave. The bonding of an overtone and undertone harmonic wave occurs under symmetry conditions when the energy gap from one octave to the next of the overtone harmonic wave equals the energy gap from one octave to the next of the undertone harmonic wave. The overtone harmonic wave loses energy during the course of the wave function and the undertone harmonic wave gains energy during the course of the wave function, which means that when the two waves are bonded, what one wave loses the other wave gains, thus creating what is described by the wave language system as an energy loop or current loop. A current loop can exist in symmetry and non-symmetry conditions. In non-symmetry conditions the color of the current loop will be determined by the harmonic distance relationship between overtone and undertone harmonic waves. In symmetry conditions, the color will be determined by the nodal positions of the current loop and the overtone or undertone environment as described below.

Figure 21A:
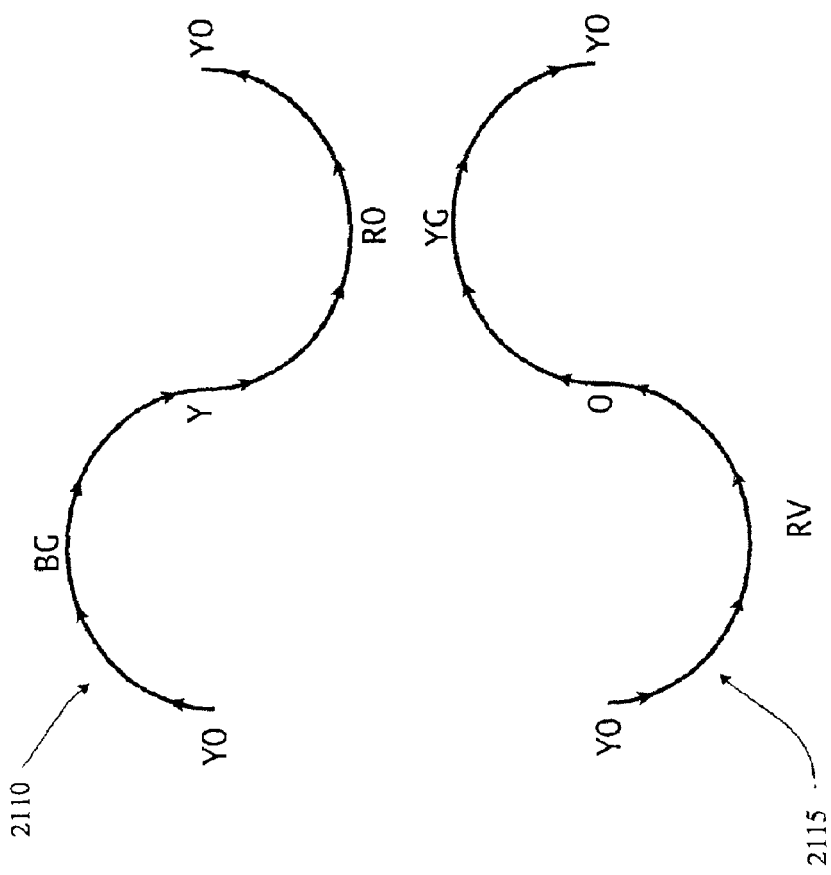
FIGS. 21A–21F are schematic representations of bonded overtone and undertone harmonic series represented as waves called current loops, in accordance with an embodiment of the invention.

FIG. 21A shows a simplified representation of a symmetrical electromagnetic wave according to the wave language system. The yellow-orange (YO) overtone harmonic wave 2110 is preferably comprised of a starting yellow-orange node, a yellow (Y) anti-node, an ending yellow-orange node, a blue-green (BG) maximum amplitude, and a red-orange (RO) maximum amplitude. The yellow-orange undertone harmonic wave 2115 is comprised of a starting yellow-orange node, an orange (O) anti-node, an ending yellow-orange node, a red-violet (RV) maximum amplitude, and a yellow-green (YG) maximum amplitude. The energy gap for the overtone and undertone harmonic waves is described by the wave language system as extending from a yellow-orange defined frequency to an octave yellow-orange defined frequency.

Figure 21B:
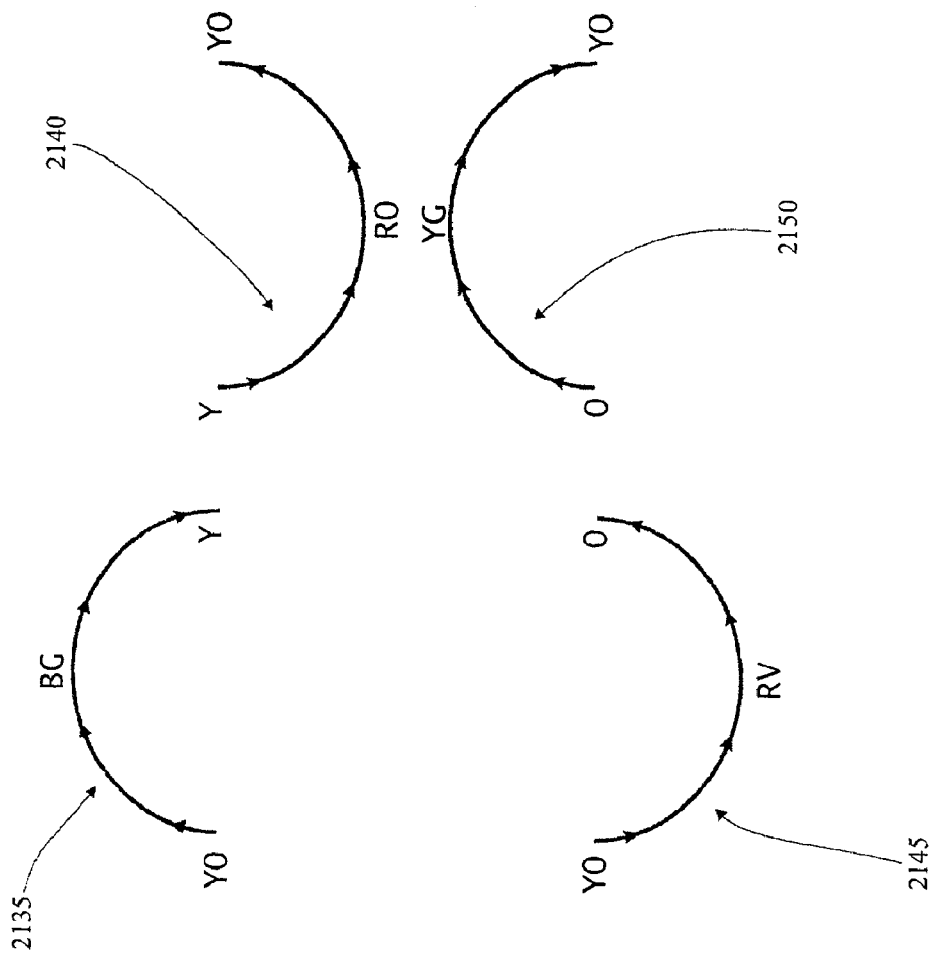
Figure 21C:
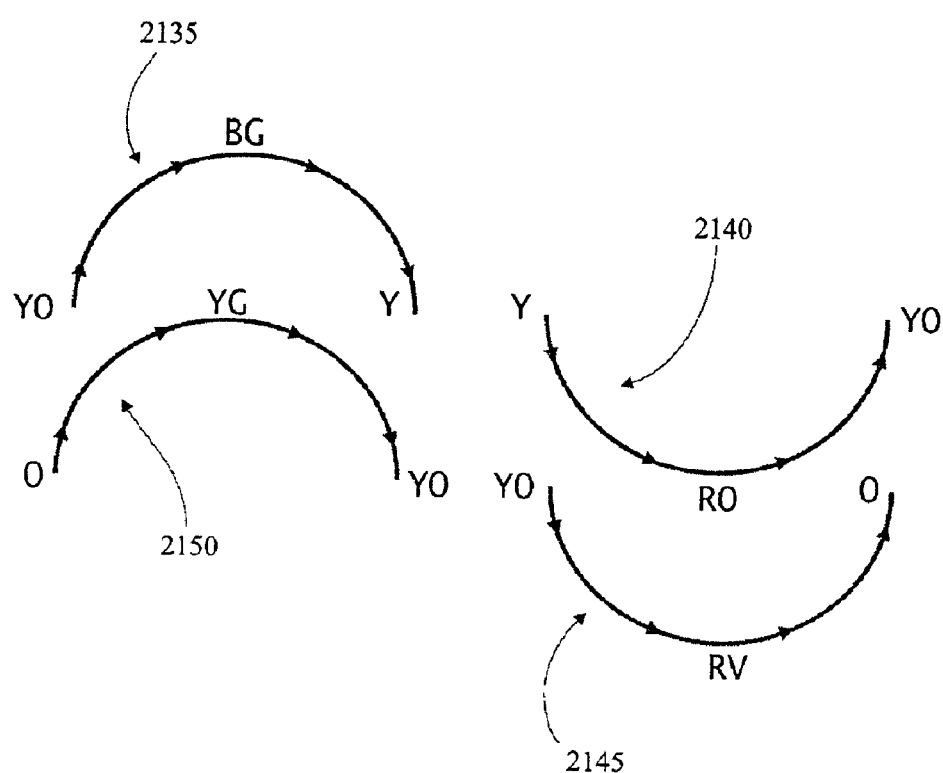
Figure 21D:
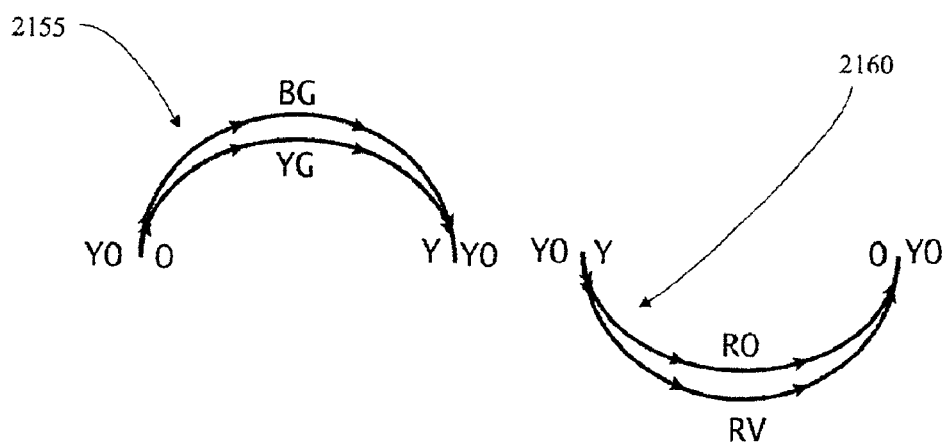
Figure 21E:
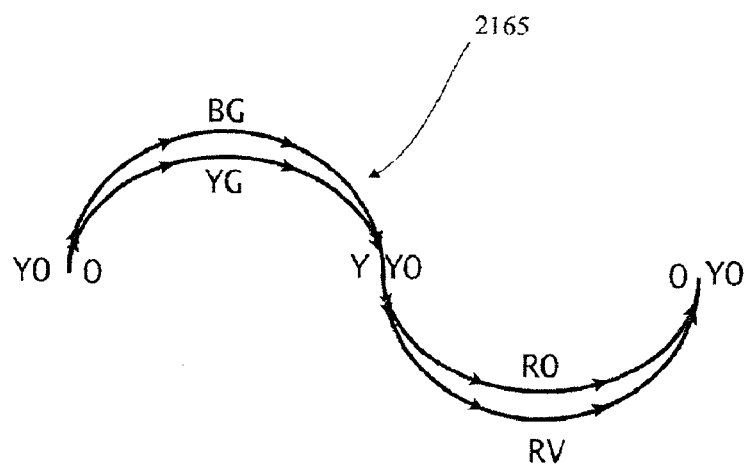

The bonding of the harmonic waves is described by the wave language system as occurring in half-wave cycles shown in FIGS. 21B–21E. As shown in FIGS. 21B and 21C, the overtone wave, first-half cycle 2135 covers the same general energy range as the undertone wave, second-half cycle 2150. The undertone wave, first-half cycle 2145 covers the same general energy range as the overtone wave, second-half cycle 2140. The overtone wave, first-half cycle 2135 (FIG. 21C) bonds with the undertone wave, second-half cycle 2150 (FIG. 21C) to create a current loop 2155 (FIG. 21D). The undertone wave, first-half cycle 2145 (FIG. 21C) bonds with the overtone wave, second-half cycle 2140 (FIG. 21C) to create a current loop 2160 (FIG. 21D). The current loops can exist independently or can bond to form a complete current loop wave 2165, as shown in FIG. 21E.

Figure 21F:
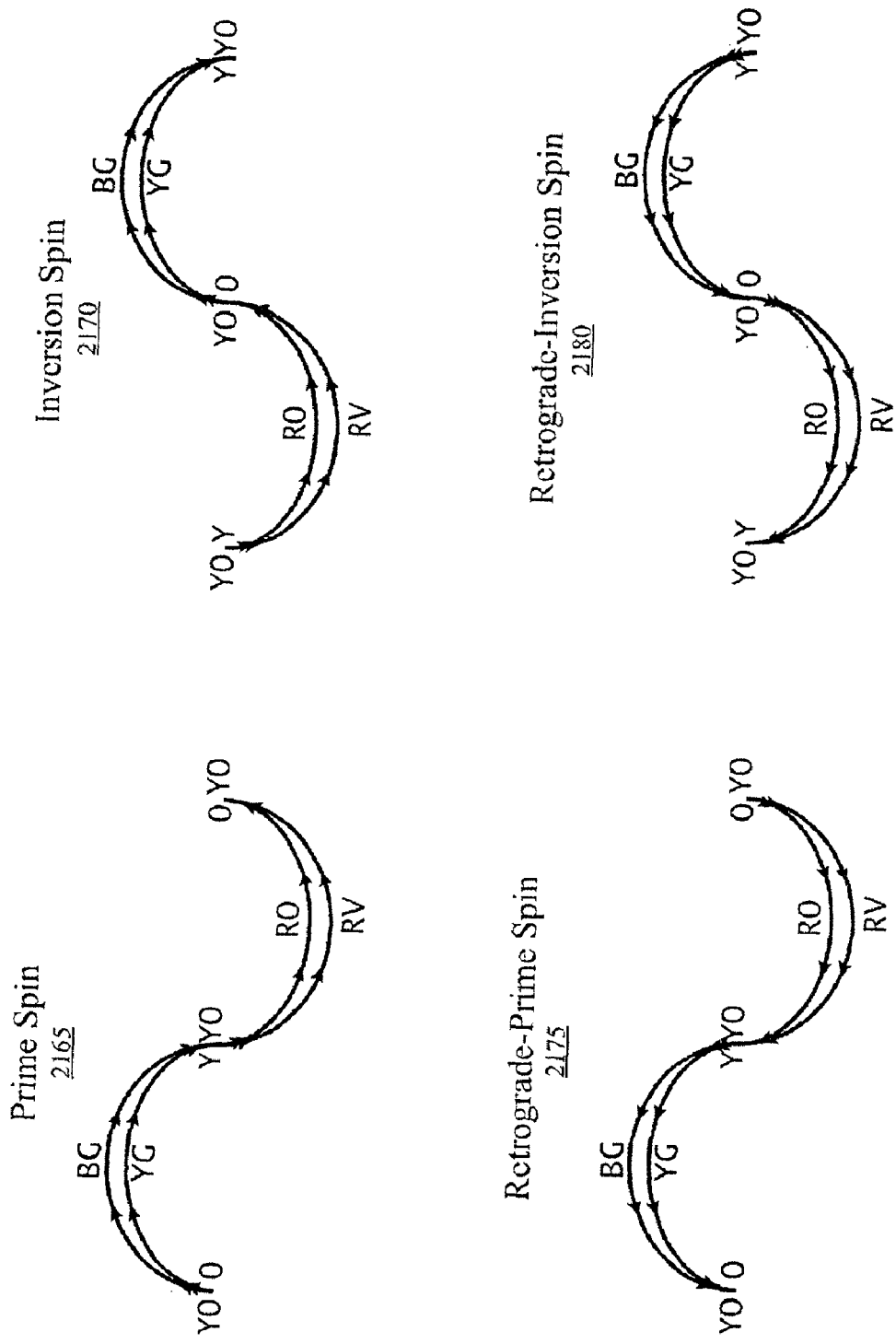

The color of a current loop wave is described by the wave language system as being determined by spin and placement within an overtone or undertone wave structure, as shown in FIG. 21F. The fundamental current loop wave 2165 is called the prime spin. If the prime spin current loop wave 2165 is placed within an overtone environment then the color of the wave is determined by the first-half overtone wave cycle 2135 (FIG. 21B), which is defined by the starting node position, which in this example is yellow-orange. The first-half overtone wave cycle 2135 is then representative of the current loop wave 2165 found in an overtone environment.

The current loop wave can be inverted so that the second-half wave cycle 2160 (FIG. 21D) comes before the first-half wave cycle 2155 (FIG. 21D). The current loop wave cycle order inversion is called inversion spin 2170 (FIG. 21F). In the inversion spin, the second-half cycle 2160 (FIG. 21D) is the functional first wave cycle and defines the inversion spin current loop wave 2170 (FIG. 21F) and the wave color. The color of the inversion spin current loop wave 2170 found within an overtone environment is determined by the yellow anti-node which is the starting position of the overtone harmonic wave second-half cycle 2140 (FIG. 21C). Since a current loop is a self-contained unit, the inversion spin does not strictly apply to the intire current loop wave in an inversion spin configuration. Rather, it also describes a single current loop in a second half cycle energy configuration.

The current loop wave can be reversed, according to the wave language system, so that the energy flows backwards through the harmonic positions. The reversal of energy flow is called retrograde spin. A prime spin, current loop wave 2165 (FIG. 21F) which is reversed is called a retrograde-prime spin, current loop wave 2175 (FIG. 21F). The color of the retrograde-prime spin, current loop wave 2175 found within an overtone environment is determined by the ending yellow-orange node of the overtone wave 2110 (FIG. 21A), which is the starting position of the retrograde overtone wave.

The current loop wave can be inverted and reversed, according to the wave language system, by inverting the cycle order and reversing the energy flow. The inversion and reversal is called a retrograde-inversion spin. The color of a retrograde inversion spin current loop wave 2180 (FIG. 21F) found within an overtone environment is defined by the yellow anti-node of the overtone harmonic wave 2110 (FIG. 21A) which is the starting position of the retrograde-inversion overtone wave.

The wave language system described above in FIGS. 21A–21F is similarly applied for determining the color of the current loop wave in an undertone environment such that it is applied to an undertone harmonic wave, which becomes the dominant wave in an undertone environment.

Figure 22A:
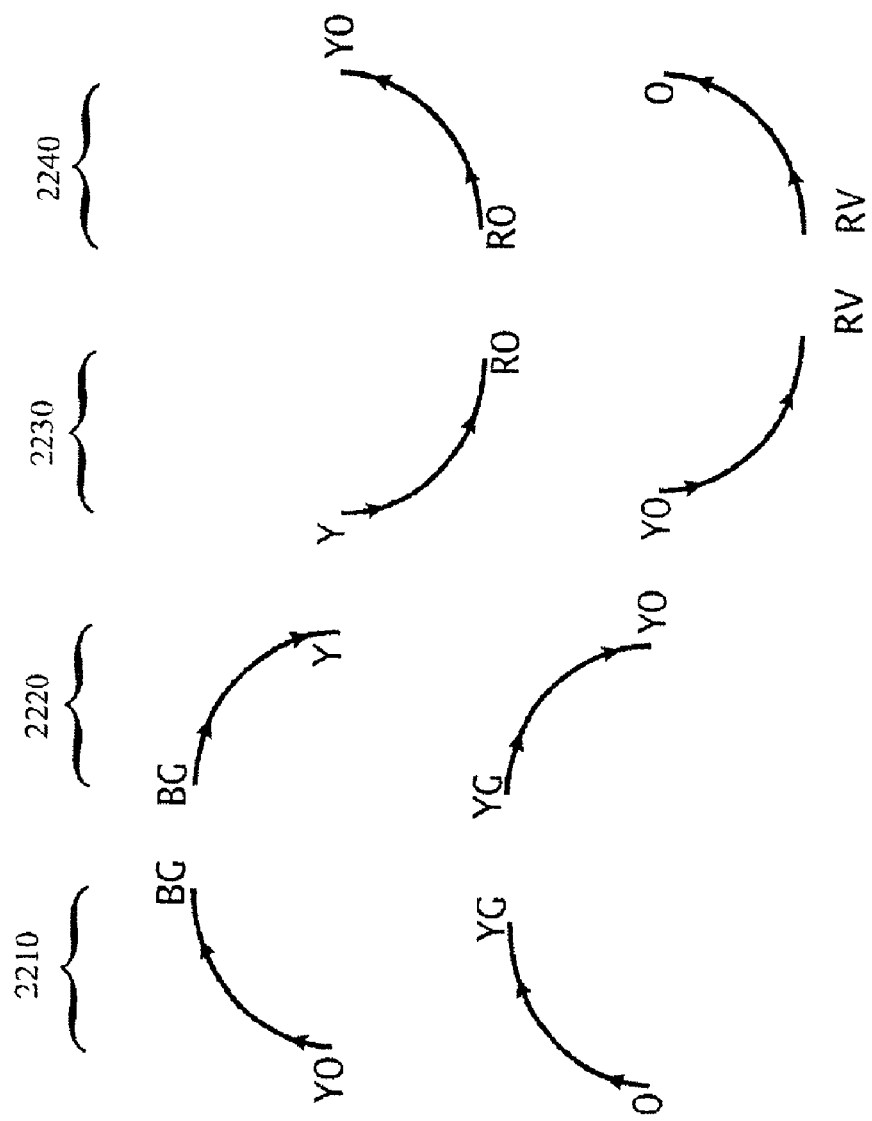
FIGS. 22A–22B are schematic representations of the current loop waves, in accordance with an embodiment of the invention.
Figure 22B:
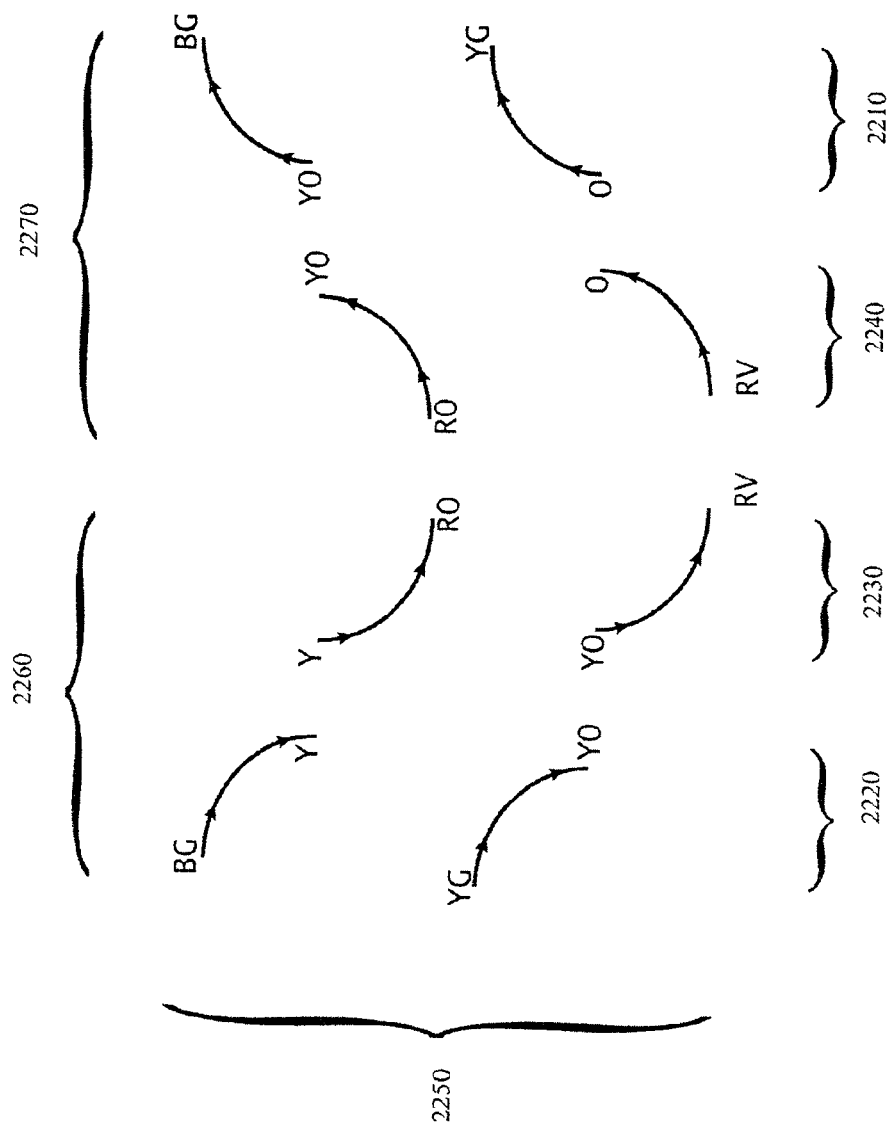
Figure 23:
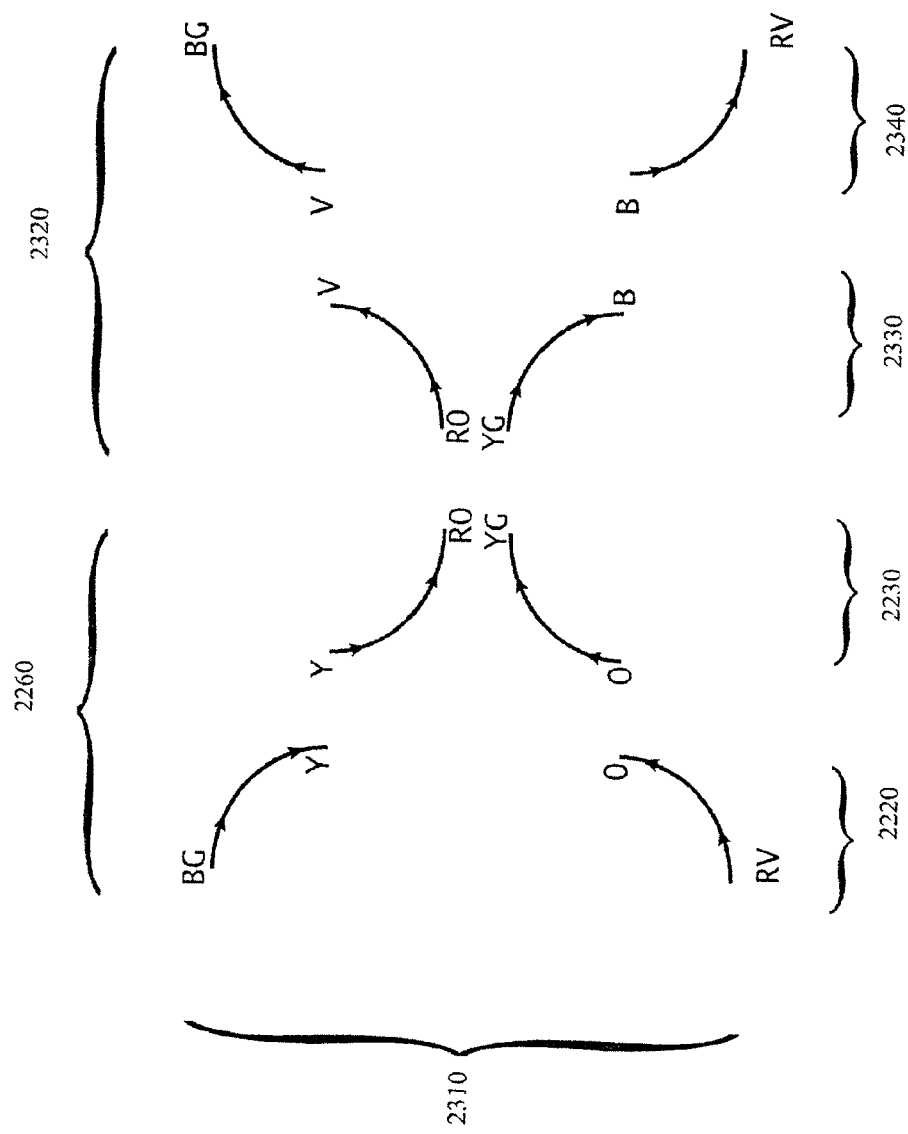
FIG. 23 is a schematic representation of the current loop waves, in accordance with an embodiment of the invention.

Current loop waves are described by the wave language system as capable of being subdivided into quarter wave cycles and then re-assembled to create neutral or gray color current loop waves. FIG. 22A shows the quarter division of the current loop wave. Shown is the first-quarter wave cycle 2210, the second-quarter wave cycle 2220, the third-quarter wave cycle 2230, and the fourth-quarter wave cycle 2240. FIG. 22B shows the re-ordering of the quarter cycles so that the wave moves from amplitude to amplitude rather than from node to node. There are two types of wave re-organization as described by the wave language system. The first involves the second and third quarter wave cycles (2260). Each energy step is comprised of three chromatic tones, for example an energy step from blue-green to yellow or from yellow to red-orange. This type of wave organization is described by the wave language system as a 3-3 current loop wave to reflect the three chromatic steps for each quarter wave cycle. The second re-organization involves the first and fourth wave cycles (2270). Each energy step is comprised of either two chromatic steps or four chromatic steps, for example, from yellow-orange to blue-green, and from red-orange to yellow-orange. This type of wave organization is described by the wave language system as a 4-2 current loop wave to reflect the four chromatic steps and the two chromatic steps of the quarter wave cycles.

Current loops and neutral current loops can be bonded as half-wave cycles to create a wide array of current loop waves. A particular organization which is fundamental to harmonic wave structures is the 3-3 current loop wave which is comprised of two 3-3 half wave cycles 2310 (FIG. 23), for example, a 3-3 current loop 2260 taken from a yellow-orange current loop wave, and a 3-3 current loop 2320 taken from a blue-violet current loop wave. Shown are the second and third quarter waves cycles (2220, 2230) of the yellow-orange current loop wave, and the second and third quarter wave cycles (2330, 2340) of the blue-violet current loop wave. The 3-3 current loop wave is described by the wave language system as a perceptual wave. The positions of the perceptual wave are equal tempered such that they can be defined by roots of 2 and are perceived to have equal steps from position to position. The fundamental relationship between overtone and undertone environments is the square root of 2 as defined in the 3-3 current loop wave relationship. FIGS. 6A and 6B describe the perceptual wave.

The current loops that are not 3-3 or 4-2 current loops are described by the wave language system as charged current loops. Charge is determined by first or second half wave cycle, by spin, by the color vector position in vector space, and by the position of the current loop within a harmonic structure. The 3-3 current loop is described by the wave language system to be neutral without direction except as implied by its overtone or undertone environment. The color of a 3-3 current loop is fundamentally gray but can be influenced to slight coloration by emphasizing an overtone or undertone environment. Just as with charged current loops, the properties of spin effect the color of a 3-3 current loop. The 4-2 current loop is described by the wave language system as having a natural direction as implied by the natural dominance of 4 chromatic step quarter wave cycle over the 2 chromatic step wave cycle. The color of the 4-2 current loop is fundamentally gray but is influenced to a slight coloration by emphasis of overtone or undertone environment. Just as with charged current loops the properties of spin effect the color of the 4-2 current loop.

The current loops clearly define, by analogy to word structures, the simple words of a language. They encompass the fundamental 12 expressions of color, the range of tints and shades, the gray scale, and the totality of orientations and charge or neutrality. Combinations of current loops (complex words or sentences or even larger structures) result in color and gray mixtures yielding the entire color spectrum and the entire chroma spectrum. Thus the current loops of the wave language system express the entire array of energy expressions, and the use of color as the description of the energy expression array is the most effective means of description because the color/chroma/grayscale mixture is the only human perception which can simultaneously express all elements and relationships of the energy range.

Figure 24:
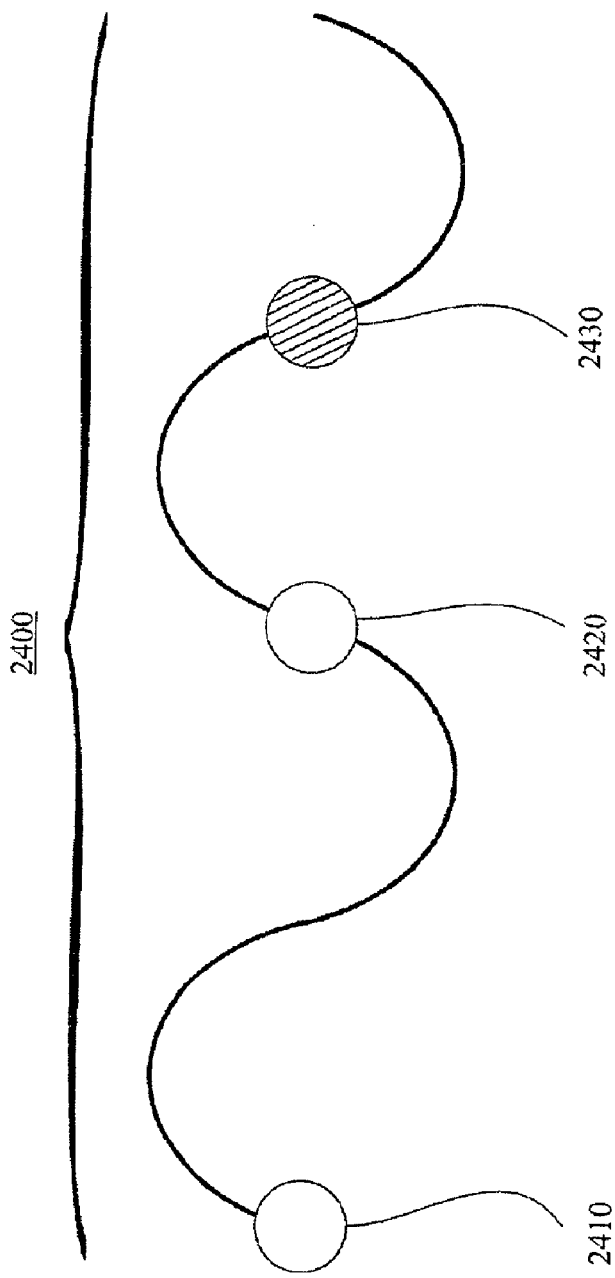
FIG. 24 is a schematic representation of a harmonic grouping of current loops or their representations based on harmonics 1, 2, 3, and called vector waves, in accordance with an embodiment of the invention.

The fundamental ordering of current loop waves and other unitary current loop organizations is described by the wave language system as the vector wave 2400 (FIG. 24). (Unitary current loop organizations are those current loop organizations that become unified as a single wave structure capable of being represented as a single wave. An example of such a structure is the alpha wave). The vector wave 2400 is described as including three current loop waves or unitary current loop organizations that form two octaves of energy. The current loops are shown as circles or loops and are connected by a harmonic wave organization. The first octave of the current loop harmonic wave is comprised of a single current loop wave or unitary current loop organization 2410, which encompasses the energy range of the first octave. The second octave is comprised of a single current loop or unitary current loop organization 2420 that encompasses the energy range of the second octave, and a single neutral current loop or neutral current loop organization 2430 that encompasses an octave energy range beginning at the anti-node of the second octave harmonic wave (each neutral current loop or neutral current loop organization position is illustrated with diagonal lines). The vector wave 2400 is itself a macro current loop. Energy flows through the octaves to the anti-node current loop 2430 and then cycles back to the starting node 2410 completing a unitary current loop structure.

Figure 25:
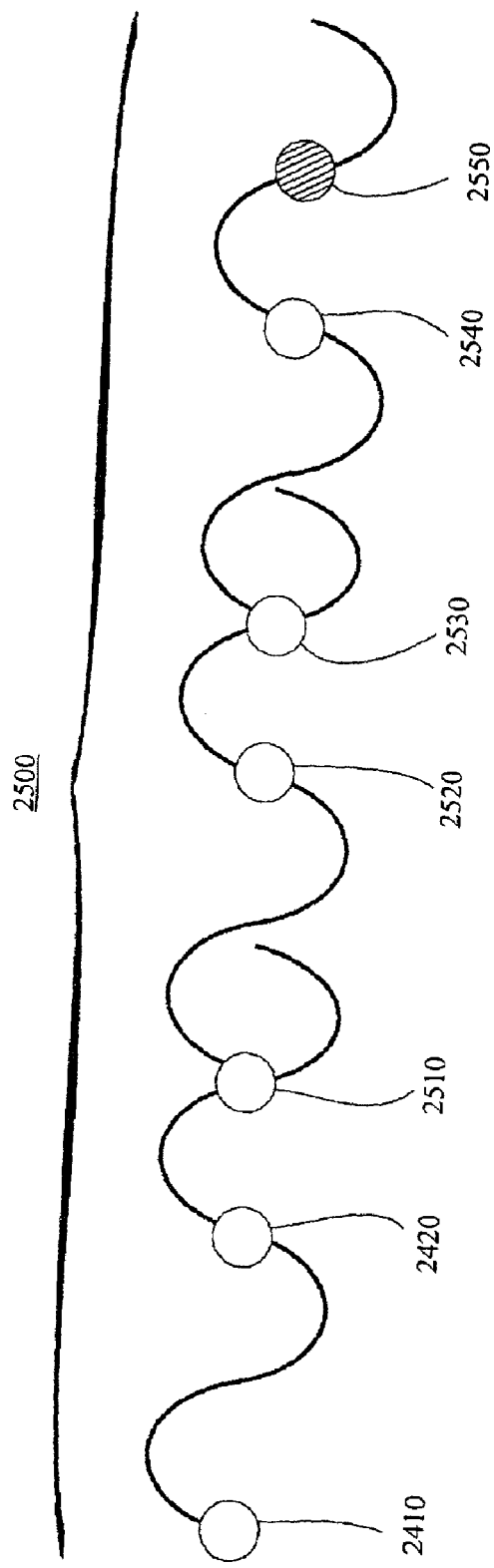
FIG. 25 is a schematic representation of a harmonic grouping of the current loops or their representations based on harmonics 1, 2, 3, 6, 9, 18, 27, and called vector set waves, in accordance with an embodiment of the invention.
Figure 26:
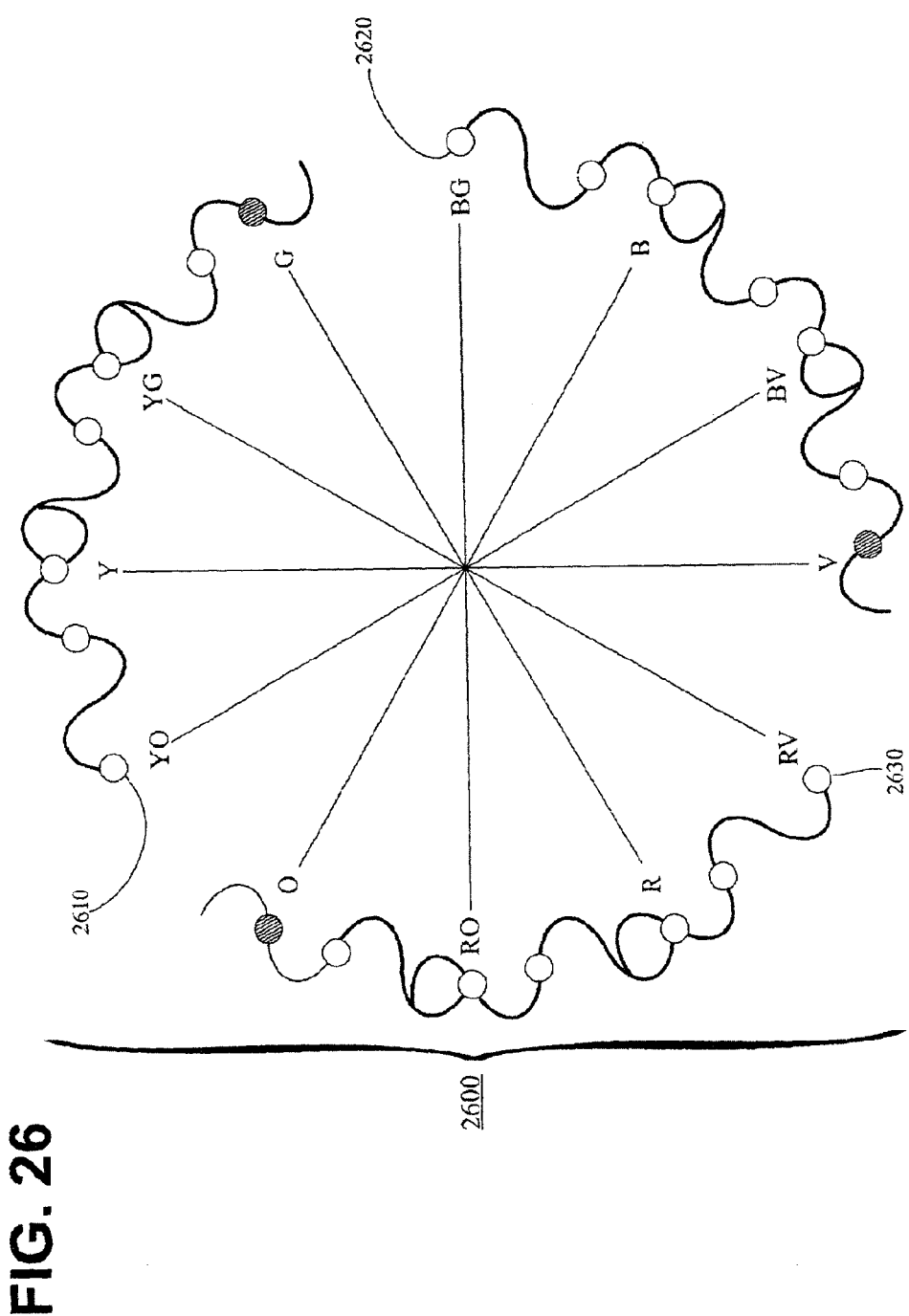
FIG. 26 is a schematic representation of a harmonic grouping of the vector set waves or their representations based on harmonics 1, 5, 25, and called a 3-vector set wave, in accordance with an embodiment of the invention.

Three vector waves can be bonded, according to the wave language system, to complete a vector set 2500 (FIG. 25, which incorporates parts of FIG. 24). When one vector wave is bonded to the next vector wave, the bonding position is the anti-node position 2430 (FIG. 24) of the first vector wave to the node position 2410 of the next vector wave. The anti-node position 2430 of the first vector wave is changed from a neutral wave to a charged wave, which becomes the first octave 2410 of the next vector wave.

The vector set 2500 is comprised of a starting node 2410, an octave node 2420, an anti-node/starting node 2510, and an octave node 2520, an anti-node/starting node 2530, an octave node 2540, and a neutral anti-node 2550. The vector set wave 2500 is a macro current loop. Energy flows through the octaves to the anti-node current loop 2550 and then cycles back to the starting node 2410.

Three vector set waves are organized, according to the wave language system, to encompass the entirety of vector space (FIG. 26), and are defined in the wave language system as a 3-vector set wave 2600. The 3-vector set wave 2600 is comprised of a vector set beginning at a defined harmonic 1 (2610), a vector set beginning at a defined harmonic 5 (2620), and a vector set beginning at a defined harmonic 25 (2630). Note the similarity to the description associated with FIGS. 13A–13C.

Figure 27A:
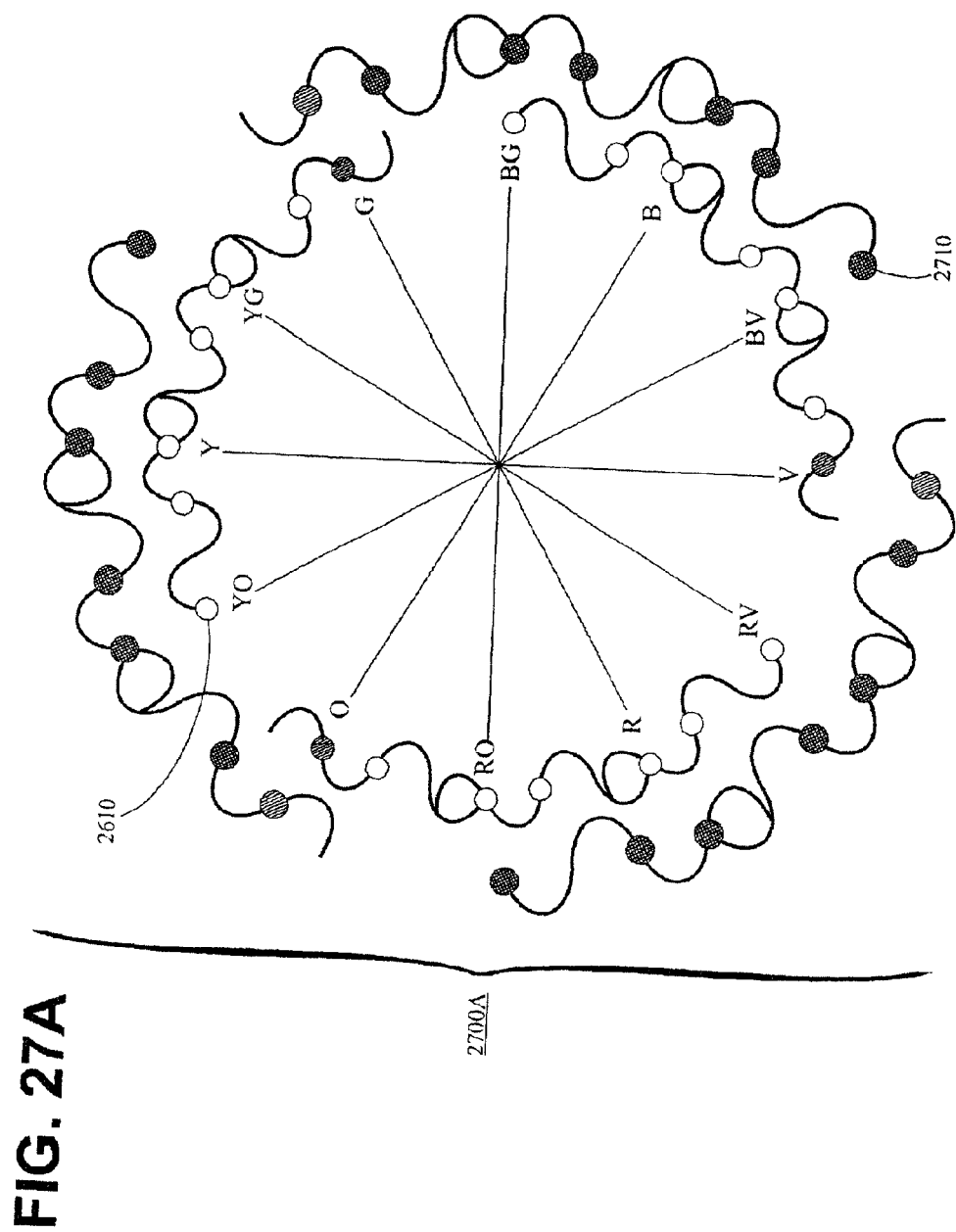
FIGS. 27A–27C are schematic representations of a harmonic grouping of overtone and undertone 3-vector set waves or their representations based on the relationship between 1 and the square root of 2, and the representation of the relationship between two such groupings based on harmonic 225, in accordance with an embodiment of the invention.

The 3-vector set wave 2600 can be overtone or undertone as determined by its component waves and wave relationships existing within an overtone or undertone environment. An overtone 3-vector set wave can be bonded with an undertone 3-vector set wave through the perceptual wave relationship which is based on the square root of 2 (see FIGS. 6A–6B). The bonded overtone and undertone 3-vector sets are defined by the wave language system as particle harmonic wave structures 2700A (FIG. 27A). FIG. 27A shows an overtone 3-vector set wave beginning with yellow-orange 2610 and identified by white circles representing unitary current loop organizations, and an undertone 3-vector set wave beginning with blue-violet 2710 and identified by cross-hatched circles representing unitary current loop organizations.

Figure 27B:
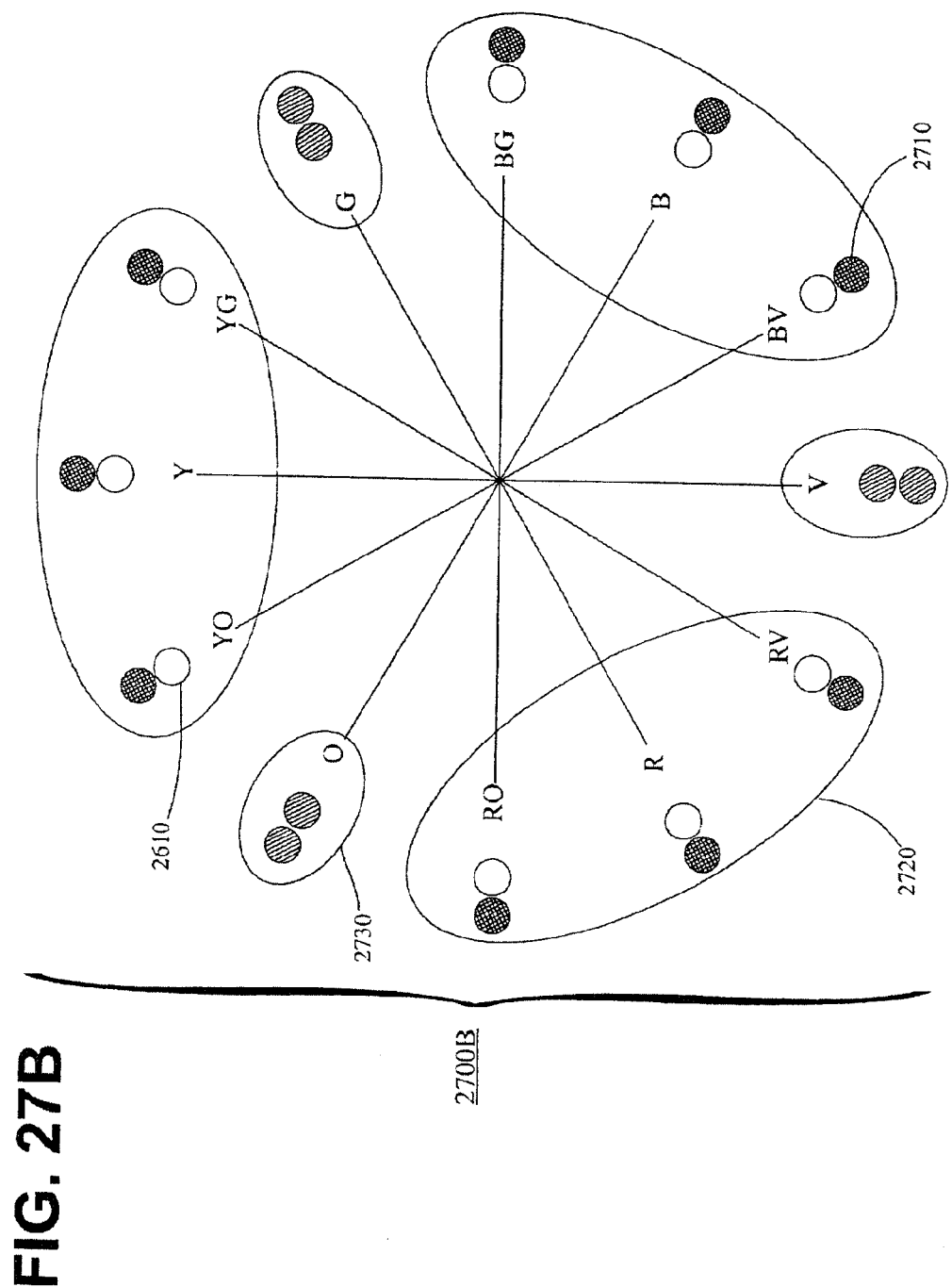

FIG. 27B shows a more simplified representation 2700B of the particle harmonic wave structure 2700A of FIG. 27A. The undertone 3-vector set wave is the outer circle and is identified as starting at 2710, and is represented by cross hatched circles. The overtone 3-vector set wave is the inner circle and is identified as starting at 2610, and is represented by white circles. For both the overtone and undertone 3-vector set waves, the neutral positions of the vector sets are identified by diagonal lines. The charged unitary current loop organizations are enclosed within the larger ovals 2720, and the neutral charge unitary current loop organizations are enclosed within the smaller ovals 2730.

Two particle harmonic waves consisting of a two-color separation can be described by the wave language system as being bonded to create an atomic harmonic wave 2700C. In the example the first particle harmonic wave has 3-vector set waves beginning at overtone yellow-orange 2610 and undertone blue-violet 2710, and the second particle harmonic wave has 3 vector set waves beginning at overtone red-orange 2740 and undertone blue-green 2750. Note that red-orange (RO) is 2 colors removed from yellow-orange (YO), and blue-green (BG) is two colors removed from blue-violet (BV). The center of the charged unitary current loops found within the larger ovals of the yellow-orange/blue-violet particle harmonic wave is matched against the neutral unitary current loops of the red-orange/blue-green particle harmonic wave, and vice-versa. If the yellow-orange/blue-violet particle harmonic wave is defined to be positive, then the red-orange/blue-green particle harmonic wave will be defined to be negative with the total wave structure being neutral.

Figure 27C:
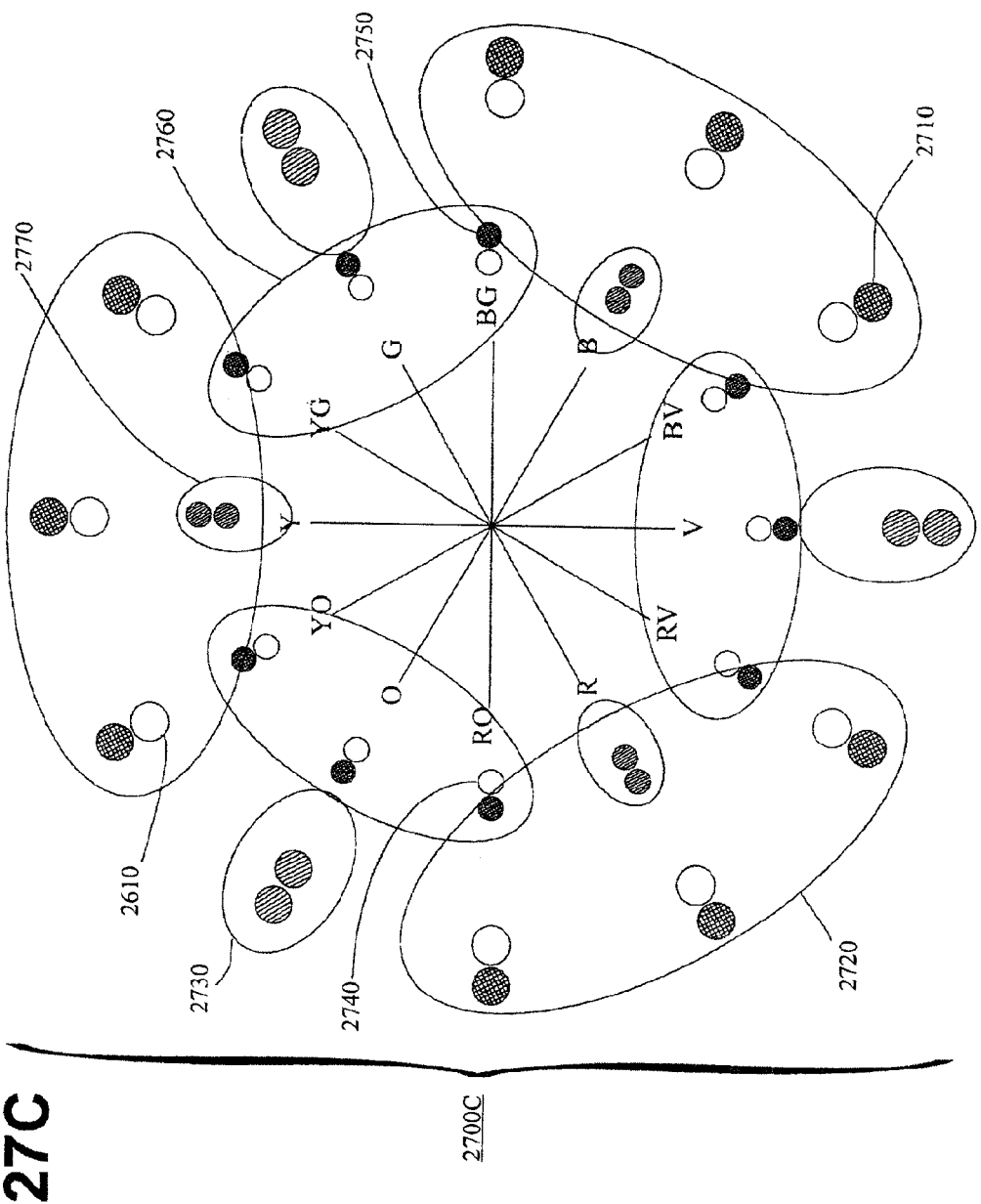

The organization of words into sentences and larger word organizations is the organization of current loops to form part, or all, of the particle harmonic wave structures of FIG. 27B and the atomic harmonic wave structures of FIG. 27C. The general principle is to create larger current loops or energy circuits that involve a generalized first-half wave cycle and a generalized second-half wave cycle.

Within the generalized idea of wave cycle organization in the wave language system there exists a guiding principle called key. Examples in music are keys such as the C Major key or the A Minor key or any of the major keys or natural minor keys or harmonic minor keys, or any other defined musical keys. A musical key is a group of tones that form a closed loop, or circle, or current loop, within vector space. Subsequently, with the correlation to color, a musical key is a group of colors, or electromagnetic waves, or unitary current loop organizations that form a closed loop or closed circuit within vector space.

Figure 28A:
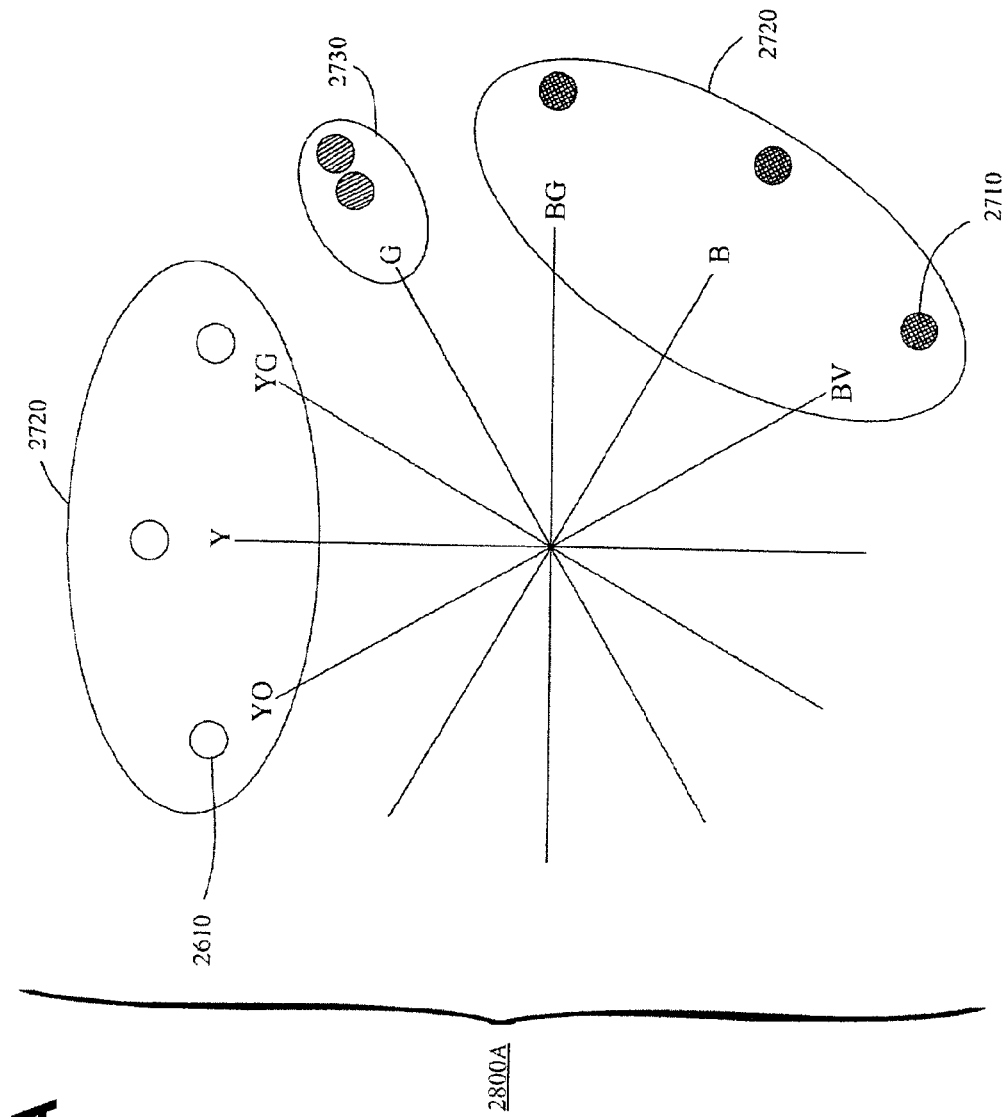
FIGS. 28A–28B are schematic representations of a musical key found within the harmonic groupings of overtone and undertone 3-vector set waves, in accordance with an embodiment of the invention.
Figure 28B:
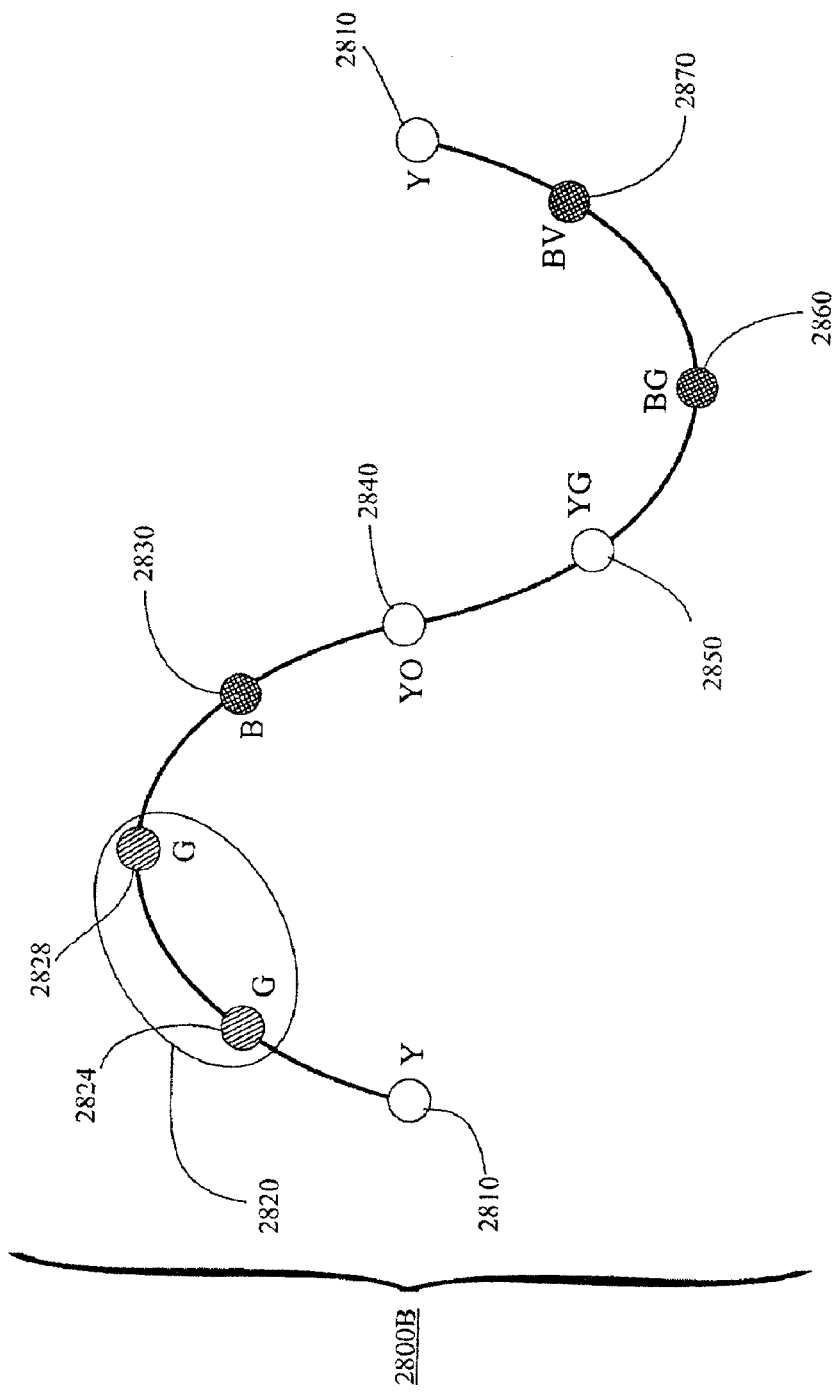

An example of key is the C Major key or yellow Major key (FIG. 28A), which is described by the wave language system as being comprised of a dominant yellow-orange overtone vector set (starting with yellow-orange 2610, represented by white circles with a neutral ending position represented by a circle with diagonal lines) and a subdominant blue-violet undertone vector set (starting with blue-violet 2710, represented by circles with hatched (cross hatched) lines with neutral ending position represented by circle with diagonal lines). The dominant colors of the key are the overtone charged colors yellow-orange, yellow, and yellow-green. The tonic of the key is described by the wave language system as the yellow energy position because it represents the center of gravity/charge for the dominant vector set. The tonic of a key is the tone, which the key is recognized to center on. For example, C is the tonic of C Major, A is the tonic of A minor. The tonic is understood to be the perceptual place of rest. In music it acts as the point of origin (or implied point of origin) and the point of conclusion (or implied point of conclusion). Further analysis of this perception allows a definition of tonic to include the inertial center of the key where musical energy is focused. Work is implied in moving away from tonic. The structure of key implies a dominant tonic and a sub-dominant tonic based on major and minor and overtone and undertone. In each case, the tonic is the center of the vector set as described, unless Minor keys are involved. Minor involves a retrograde vector set spin, which shifts the center of gravity by one vector set position. Energy movement through the key is described by the wave language system as the scale wave 2800B (FIG. 28B). The scale wave 2800B begins with yellow 2810, which is the tonic of the key or the dominant center of charge/gravity. The next quarter wave position is green 2824 belonging to the overtone vector set. The next quarter wave position is green 2828 belonging to the undertone vector set. The two green positions are described by the wave language system as transition positions 2820 because they are the same color or same tone and are played simultaneously in the playing of the scale wave. The next quarter wave position is blue 2830 belonging to the undertone vector set. The start of the second-half wave cycle is yellow-orange 2840 belonging to the overtone vector set. The next quarter wave position is yellow-green 2850 belonging to the overtone vector set. The next quarter wave position is blue-green 2860 belonging to the undertone vector set. The last quarter wave position is blue-violet 2870 belonging to the undertone vector set. Within the scale wave 2800B, yellow-orange and blue-violet are complementary colors-tones and neutralize each other. The yellow-orange node 2840 then represents a functionally neutral position. The yellow tonic 2810 represents a neutral position as the center of charge/gravity in that it represents an inertial position. The undertone green amplitude position 2828 is a neutral energy position found at the end of the undertone vector set. The blue-green amplitude position 2860 is charged and represents a direct connection to the natural minor key, which has blue-green as its tonic. The key structure 2800A and its scale wave 2800B then represent in the wave language system an even more global means of wave organization because the scale wave can be bonded to other scale waves through node, anti-node, and amplitude positions.

The totality of wave structures described by the wave language system and presented in diagrams 1 through 28 represent, in whole and in part, the basic language elements of sounds, words, sentences, paragraphs, chapters, and books. Some implementations as physical, visual, and aural transmission or expression of the above described wave language system will now be described for physics, music, language, and software, with the understanding that the wave language system can be embodied in many other different forms.

One embodiment, the atomic physics embodiment, is described below and is an extension of the description of vector waves and vector wave sets. The wave language system can be used to represent the details of particle formation (and atomic formation), with the understanding that what is presented below is simply a more detailed explanation of the wave language system described above as applied to particle formation. The fact that there is a direct comparison between the particle wave structures of the proton and electron and neutron to the atomic wave structures of Bismuth (atomic level proton) and the currently unknown atomic level electron, and the currently unknown atomic level neutron, means that there is an overlap in technology between particle physics and atomic physics (chemistry) which are currently considered to by widely separated fields. The fact that the described wave structures of the wave language system show for the first time a clear picture of how waves organize means that the entire field of chemical bonding can be re-evaluated based on harmonic properties.

Figure 29A:
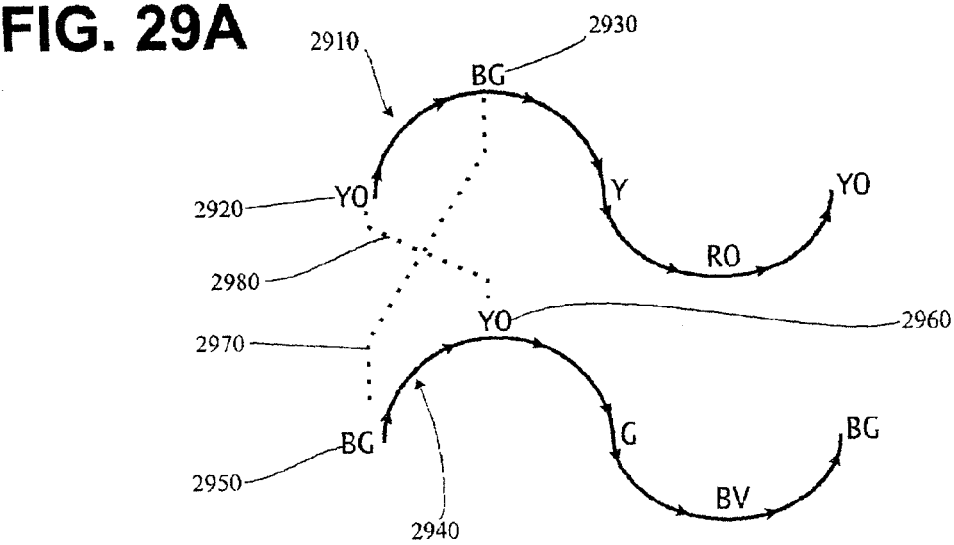
Figure 29B:
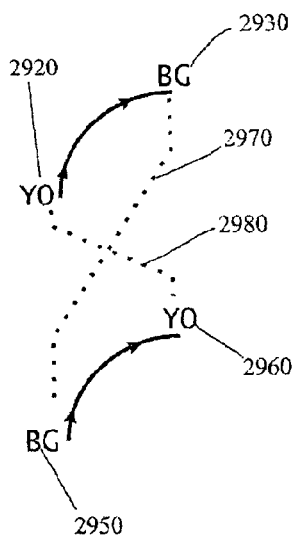
Figure 29C:
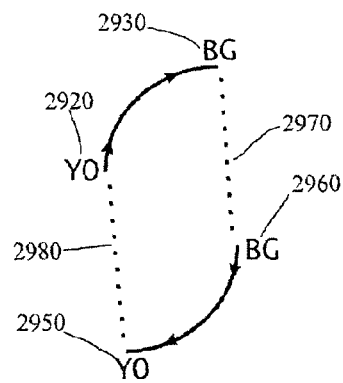
Figure 29D:
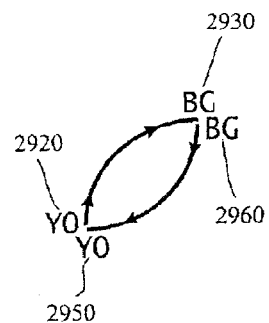
Figure 29E:
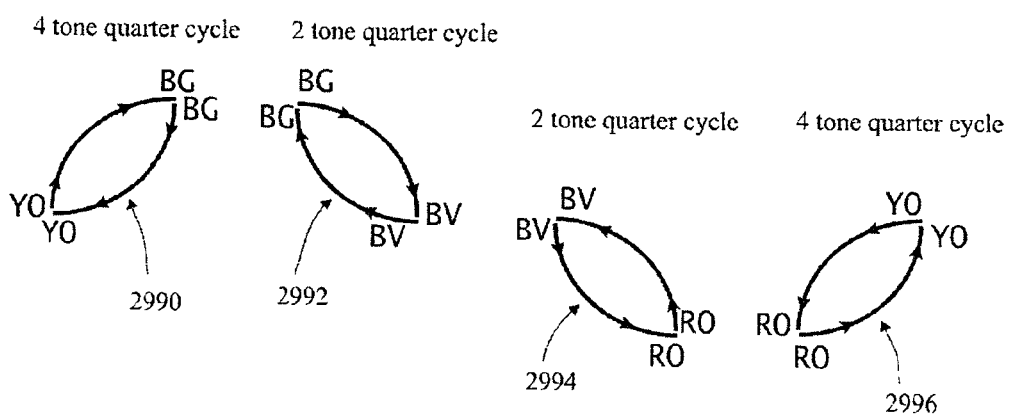
Figure 29E:
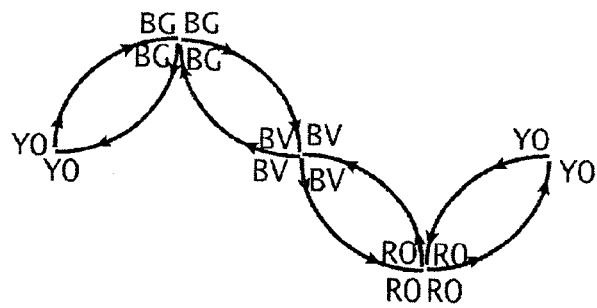

FIG. 29A shows a yellow-orange overtone harmonic wave 2910, and a blue-green undertone harmonic wave 2940, in accordance with an atomic physics embodiment. The starting node 2920 of the yellow-orange overtone harmonic wave 2910 is represented by yellow-orange which matches the color, and therefore the frequency (or octave of the frequency) of the amplitude position 2960 of the blue-green undertone harmonic wave 2940. The starting node 2950 of the blue-green undertone harmonic wave 2940 is represented by blue-green which matches the color, and therefore the frequency (or octave of the frequency) of the amplitude position 2930 of the yellow-orange undertone harmonic wave 2910. A current loop bond 2980 is then established between the yellow-orange positions and the blue-green positions 2970. FIG. 29B shows the quarter cycle wave in isolation. FIG. 29C shows the quarter cycle waves re-oriented to match up color to color or frequency to frequency. FIG. 29D shows the resulting quarter cycle current loop. This particular quarter cycle current loop encompasses a 4 tone range counted in chromatic tone steps. For example, starting with YO and moving to BG, the tone steps are V, YG, R, BG, or 4 chromatic steps. The name of this quarter cycle current loop is then a 4-tone quarter cycle current loop or 4-quarter cycle current loop. FIG. 29E shows the four-quarter cycles of a current loop wave comprised of two 4-tone quarter cycle current loops and two 2 tone quarter cycle current loops. Each half-wave cycle is called a 4-2 current loop because it is comprised of a 4-tone quarter cycle current loop and a 2-tone quarter cycle current loop. The charge of a 4-2 current loop is neutral. FIG. 29F shows the 4-2 current loop octave wave. 4-2 current loop waves are capable of having their spins reversed and inverted, which means that they have prime spins, inversion spins, retrograde-prime spins, and retrograde-inversion spins. FIG. 29F then shows the prime spin orientation of a YO, 4-2 current loop wave. FIG. 29G shows the inversion spin of a YO, 4-2 current loop wave. FIG. 29H shows the retrograde prime spin of a YO, 4-2 current loop wave. FIG. 29I shows the retrograde-inversion spin of a YO, 4-2 current loop wave. FIGS. 29A–29I are shown with a particular group of colors or frequencies which identify the wave organizations. Therefore, the wave shown in FIG. 29F, and all it's component parts and spins, are not limited to the specific selection of tones/frequencies described, but include any selection of tones/frequencies which form the required relationships of the wave.

Figure 30A:
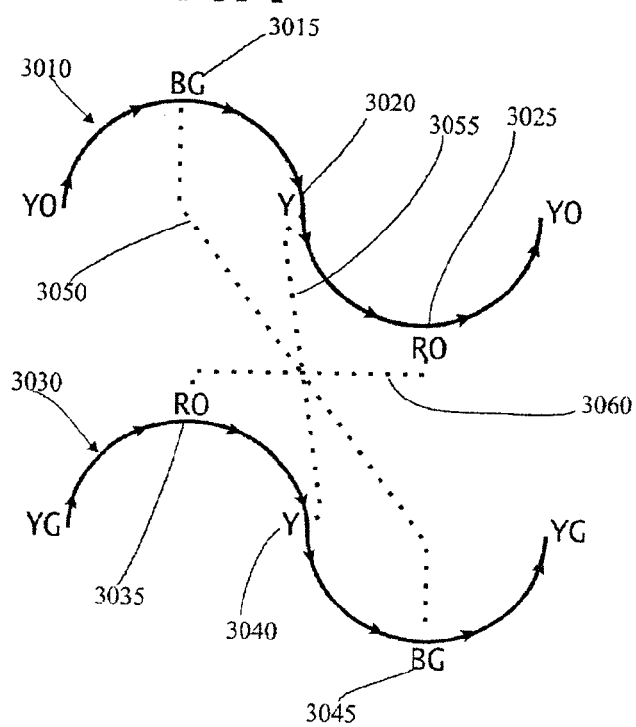
FIGS. 30A–30E are schematic representations of current loops and corresponding spin characteristics, in accordance with an atomic physics embodiment of the color wave system described in association with FIGS. 1–28.
Figure 30B:
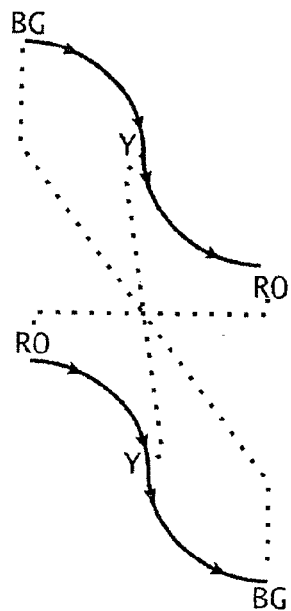
Figure 30C:
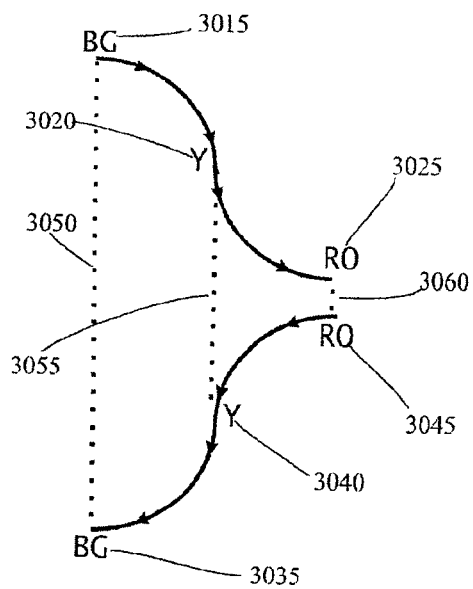
Figure 30D:
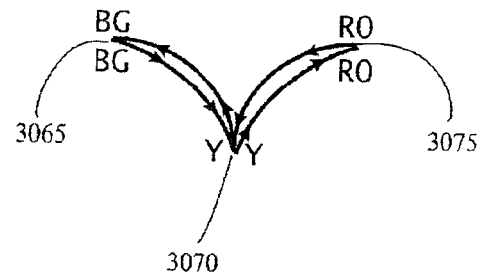
Figure 30E:
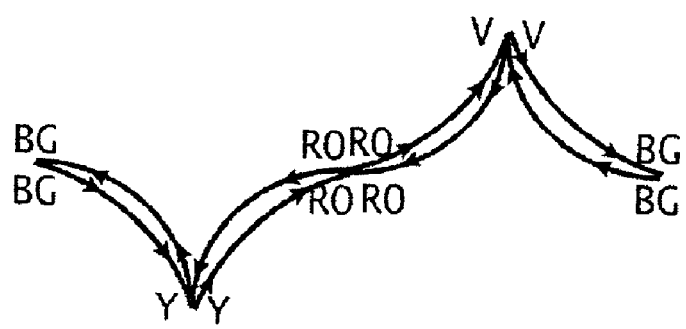

FIG. 30A shows a yellow-orange overtone harmonic wave 3010 and a yellow-green undertone harmonic wave 3030, in accordance with an atomic physics embodiment. The first amplitude position 3015 of the YO overtone harmonic wave 3010 matches with the second amplitude position 3045 of the YG undertone harmonic wave 3030 and is connected with a current loop bond 3050. The anti-node position 3020 of the YO overtone harmonic wave 3010 matches with the anti-node position 3040 of the YG undertone harmonic wave 3030 and is connected with a current loop bond 3055. The second amplitude position 3025 of the YO overtone harmonic wave 3010 matches the first amplitude position 3035 of the YG undertone harmonic wave 3030 and is connected with a current loop bond 3060. FIG. 30B shows these wave points in isolation. FIG. 30C shows these wave points re-oriented to match up color to color (frequency to frequency). FIG. 30D shows the resulting current loop, which is comprised of two 3-tone quarter wave cycles. The charge of the 3-3 current loop is neutral and directionless between overtone and undertone which makes it capable of acting as an overtone or undertone current loop. FIG. 30E shows an octave wave comprised of 3-3 current loops. FIGS. 30A–30E are shown with a particular group of colors or frequencies which identify the wave organizations. Therefore, the wave shown in FIG. 30E, and all it's component parts, are not limited to the specific selection of tones/frequencies described, but include any selection of tones/frequencies that form the required relationships of the wave.

Figure 31A:
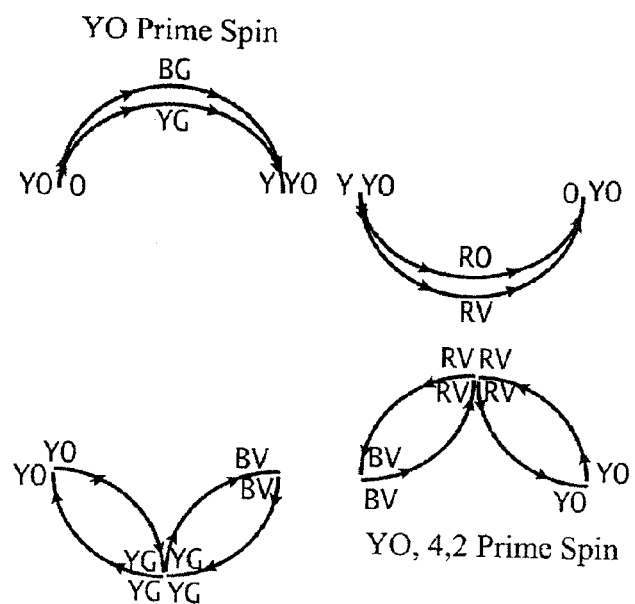
FIGS. 31A–31E are schematic representations of the bonding of current loops to form the particle equivalent of an alpha wave, in accordance with an atomic physics embodiment of the color wave system described in association with FIGS. 1–28.
Figure 31B:
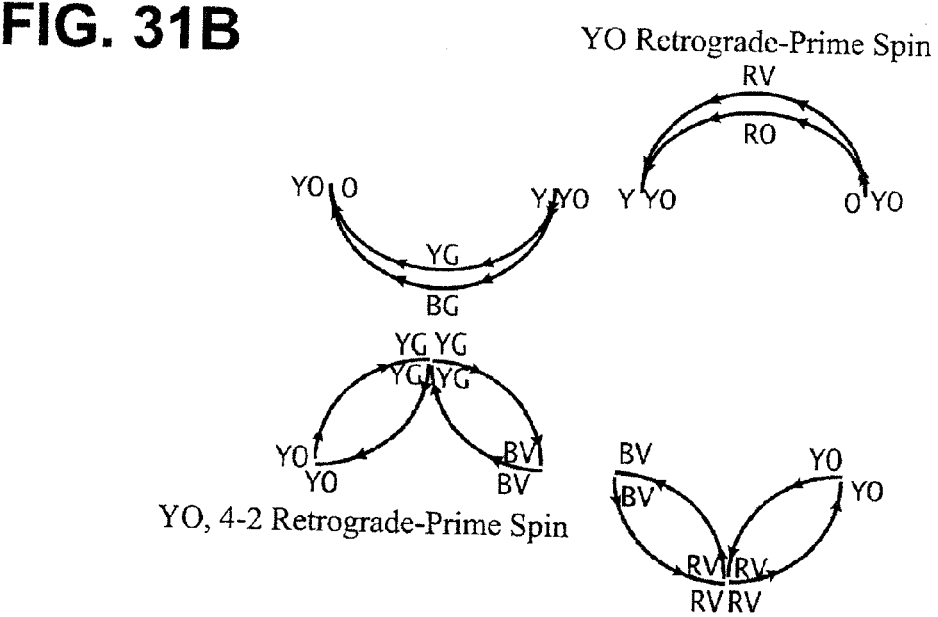

Individual current loops do not account for all possible energy existence within time and space. This fact makes it possible to use the wave structures of the wave language system to bond multiple different types of current loops together to fill out the available positions. FIG. 31A shows an example of a prime spin current loop wave and an example of a 4-2 prime spin current loop wave which can be bonded because their nodes, anti-nodes, and amplitudes form functional current loop bonding relationships. FIG. 31B shows an example of a retrograde-prime spin current loop wave and an example of a retrograde-prime spin 4-2 current loop wave which can be bonded because their nodes, anti-nodes, and amplitudes form functional current loop bonding relationships. The waves in FIGS. 31A and 31B can be bonded together to form a complete wave function which accounts for all available physical and time based options.

Figure 31C:
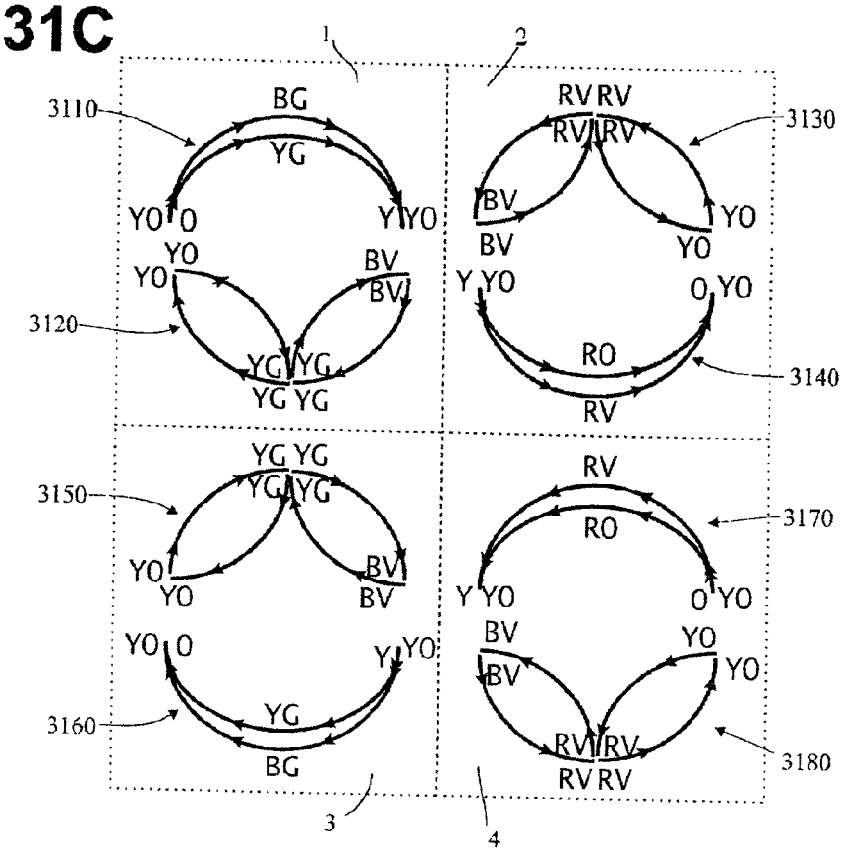
Figure 31D:
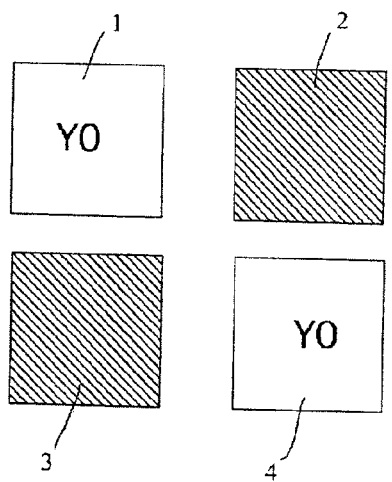
Figure 31E:
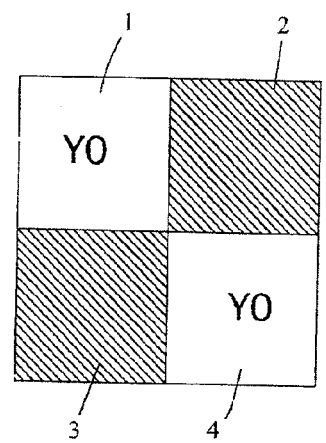

Each half-wave cycle is viewed as a quadrant or quarter of the entire wave structure, as shown in FIG. 31C. The first quadrant (1) is comprised of a first-half cycle charged current loop (3110) and a second-half cycle neutral-charged current loop (3120), which makes the first quadrant (1) charged. The second quadrant (2) is comprised of a second half cycle charged current loop (3140) which is read as neutral charge, and a first-half cycle 4-2 neutral charged current loop (3130) which makes the second quadrant (2) neutral charged. The third quadrant (3) is comprised of a second-half cycle charged current loop (3160) which is read as neutral charge, and a first-half cycle 4-2 neutral charged current loop (3150) which makes the third quadrant neutral charged. The fourth quadrant (4) is comprised of a first-half cycle charged current loop, and a second-half cycle 4-2 neutral charged current loop, which makes the fourth quadrant charged. FIG. 31D shows a simplified representation of the complete wave structure of FIG. 31C. Quadrants 1 and 4 are shown as a colored square (here identified by a color name, for example, YO for yellow orange). Quadrants 2 and 3 are shown as squares with diagonal lines to represent light gray. FIG. 31E shows the four quadrants grouped to form a larger square. Quadrants 2 and 3 are shown with diagonal lines. This structure represents the particle equivalent of an alpha wave. (At the atomic level the alpha wave is the nucleus of the helium atom consisting of 2 protons (positive charge) and two neutral particles generally referred to as neutrons).

Figure 32A:
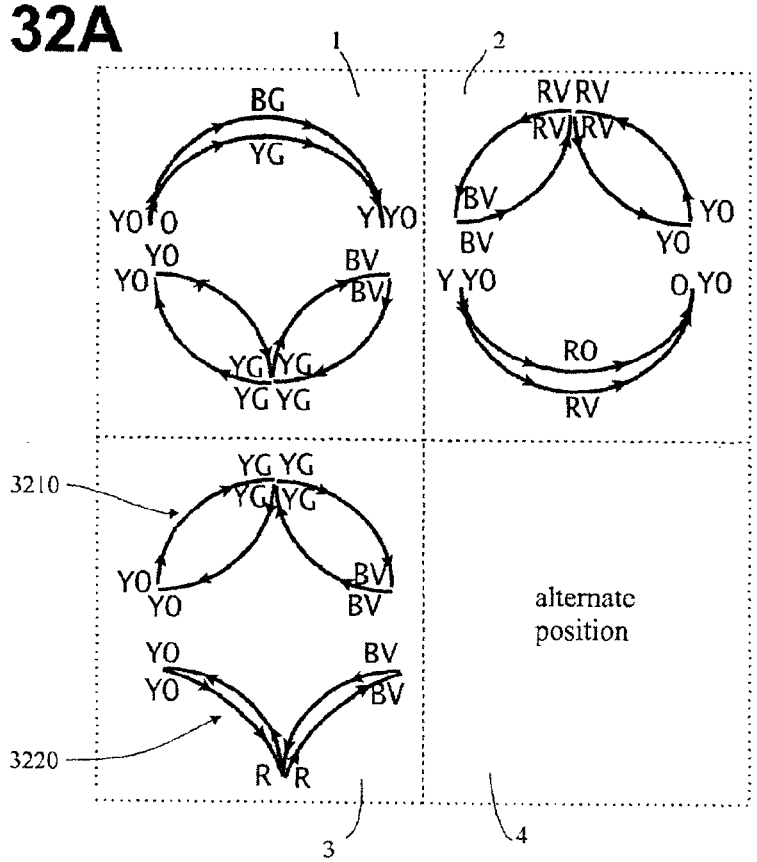
FIGS. 32A–32C are schematic representations of the development of wave structures using current loops, in accordance with an atomic physics embodiment of the color wave system described in association with FIGS. 1–28.
Figure 32B:
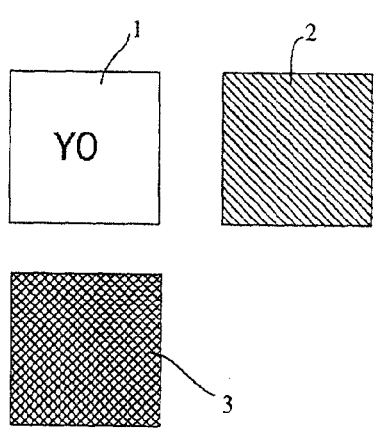
Figure 32C:
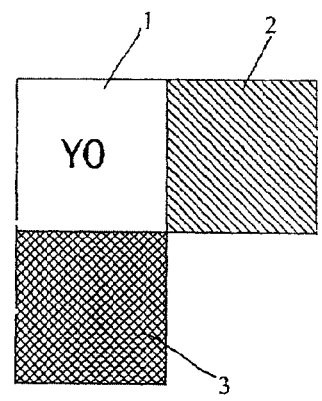

A quadrant can be filled by a 4-2 neutral charged current loop and a 3-3 neutral charged current loop. This configuration yields a neutral and directionless wave structure. FIG. 32A shows how the particle alpha wave can be re-organized to include this configuration. For example, if quadrants 1 and 2 have normal current loop configurations as shown in FIG. 31C, then either quadrant 3 or quadrant 4 will have an altered configuration. The third quadrant 3 contains a 4-2 neutral charged current loop 3210, and a 3-3 neutral charge current loop 3220. This configuration is capable of switching back and forth between quadrants 3 and 4 as required to mimic the alpha wave structure. FIG. 32B shows the third quadrant with the altered configuration represented as a cross-hatch filled square. FIG. 32C shows the three quadrants (1, 2, 3) with the cross-hatch quadrant 3.

Figure 33A:
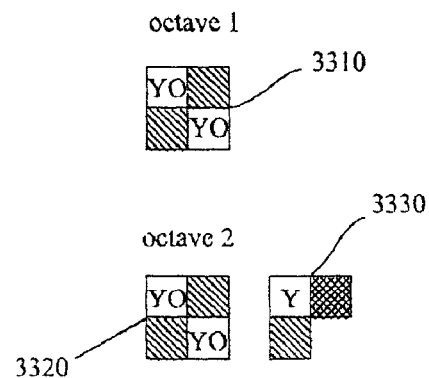
FIGS. 33A–33D are schematic representations of atomic elements using the wave structures described in FIGS. 32A–32C, in accordance with an atomic physics embodiment of the color wave system described in association with FIGS. 1–28.
Figure 33B:
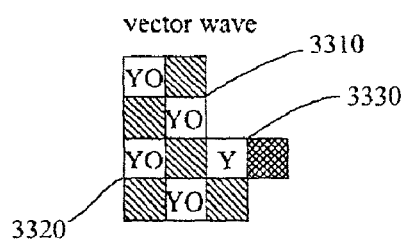

A particle alpha wave represents a specific frequency or color or number. A vector wave, according to the wave language system, is comprised of a fundamental harmonic wave represented by harmonic 1, and a second octave harmonic wave represented by harmonics 2 and 3. Harmonic 3 is the anti-node position of the harmonic wave and must be neutral or it will act as the start of a new wave beginning at harmonic 3. Alpha waves can be organized to form a vector wave. FIG. 33A shows an alpha wave placed in the harmonic 1 position 3310, and an alpha wave placed in the harmonic 2 position 3320, and an altered alpha wave 3330 which uses the directionless current loop to mimic the alpha wave function. The altered alpha wave functions as a neutralized wave position fulfilling the requirements necessary for it to act as the anti-node of the vector wave. FIG. 33B shows the simplified representation of the vector wave.

Figure 33C:
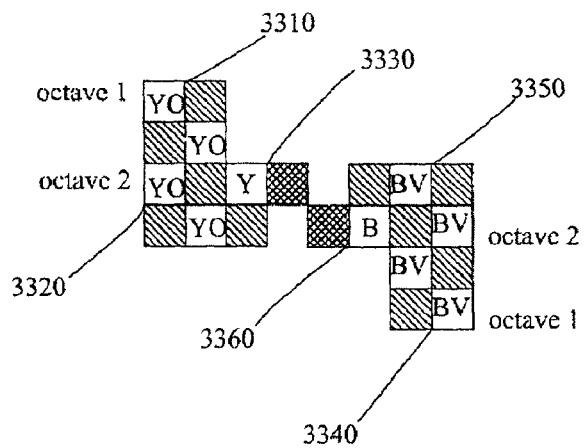

Physical waves described by the wave language system as vector waves and their components (with the exception of the alpha wave) do not naturally occur in isolation. They are always paired with their complementary wave structure related by the square root of 2 (or octaves of the square root of 2). FIG. 33C, for example, shows a yellow-orange overtone vector wave paired with a blue-violet undertone vector wave, where the yellow-orange fundamental alpha wave and the blue-violet fundamental alpha wave are related by an octave of the square root of 2. The blue-violet undertone vector wave is comprised of a fundamental or harmonic 1 blue-violet alpha wave 3340, an undertone octave or harmonic 2 blue-violet alpha wave 3350, and a third harmonic altered blue alpha wave 3360. This wave structure developed using the wave language system describes, at the atomic level, the formation of the element Neon (or an isotope thereof).

Figure 33D:
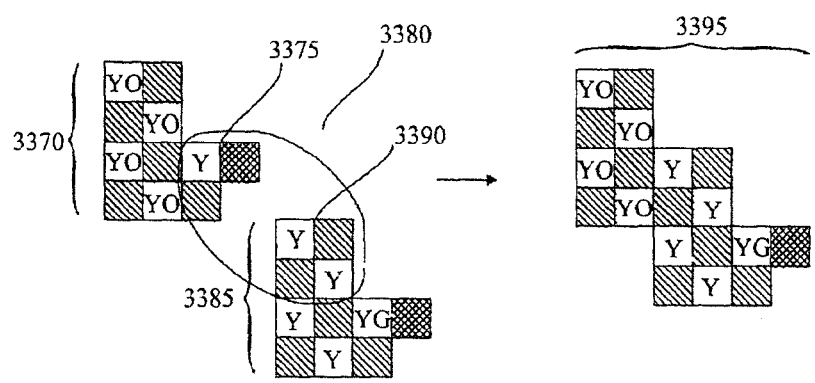

When two vector waves are joined, they are joined using a node-to-anti-node bond. The anti-node of the first vector wave is also the starting node of the second vector wave. FIG. 33D shows a yellow-orange vector wave 3370 and a yellow vector wave 3385. The circle 3380 encircles the anti-node 3375 of the first vector wave 3370, which is defined by a yellow color, and the fundamental node 3390 of the second vector wave 3385 which also is defined by a yellow color. Since the node 3390 of the second vector wave represents a completed alpha wave it can replace the anti-node 3375 of the first vector wave 3370. The new structure is a two vector wave structure 3395 wherein the node of the second vector wave also acts as the anti-node of the first vector wave.

Figure 34A:
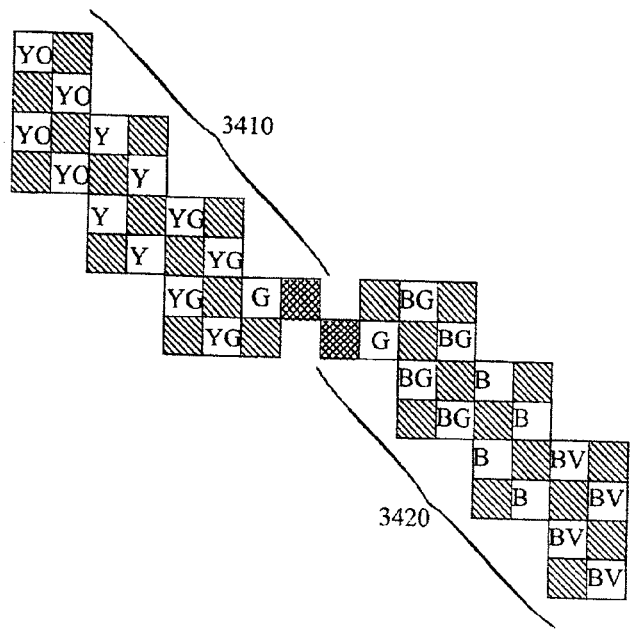
FIGS. 34A and 34B are schematic representations of vector sets with altered alpha waves, in accordance with an atomic physics embodiment of the color wave system described in association with FIGS. 1–28.
Figure 34B:
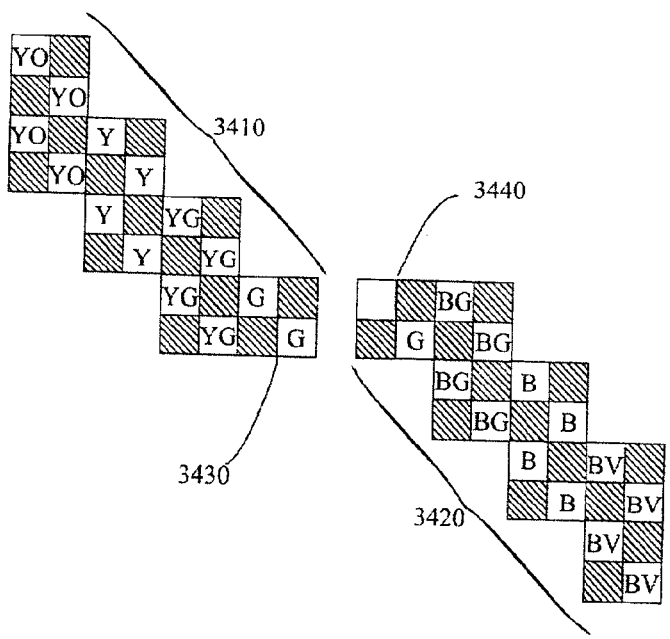

FIG. 34A shows an overtone three vector set 3410 paired with an undertone three vector set 3420. FIG. 34B shows an overtone three vector set 3410 with the altered alpha wave anti-node replaced with a natural alpha wave 3430 (see FIG. 31C), and an undertone 3 vector set 3420 with the altered alpha wave anti-node replaced with a natural alpha wave 3440 (see FIG. 31C).

Figure 35A:
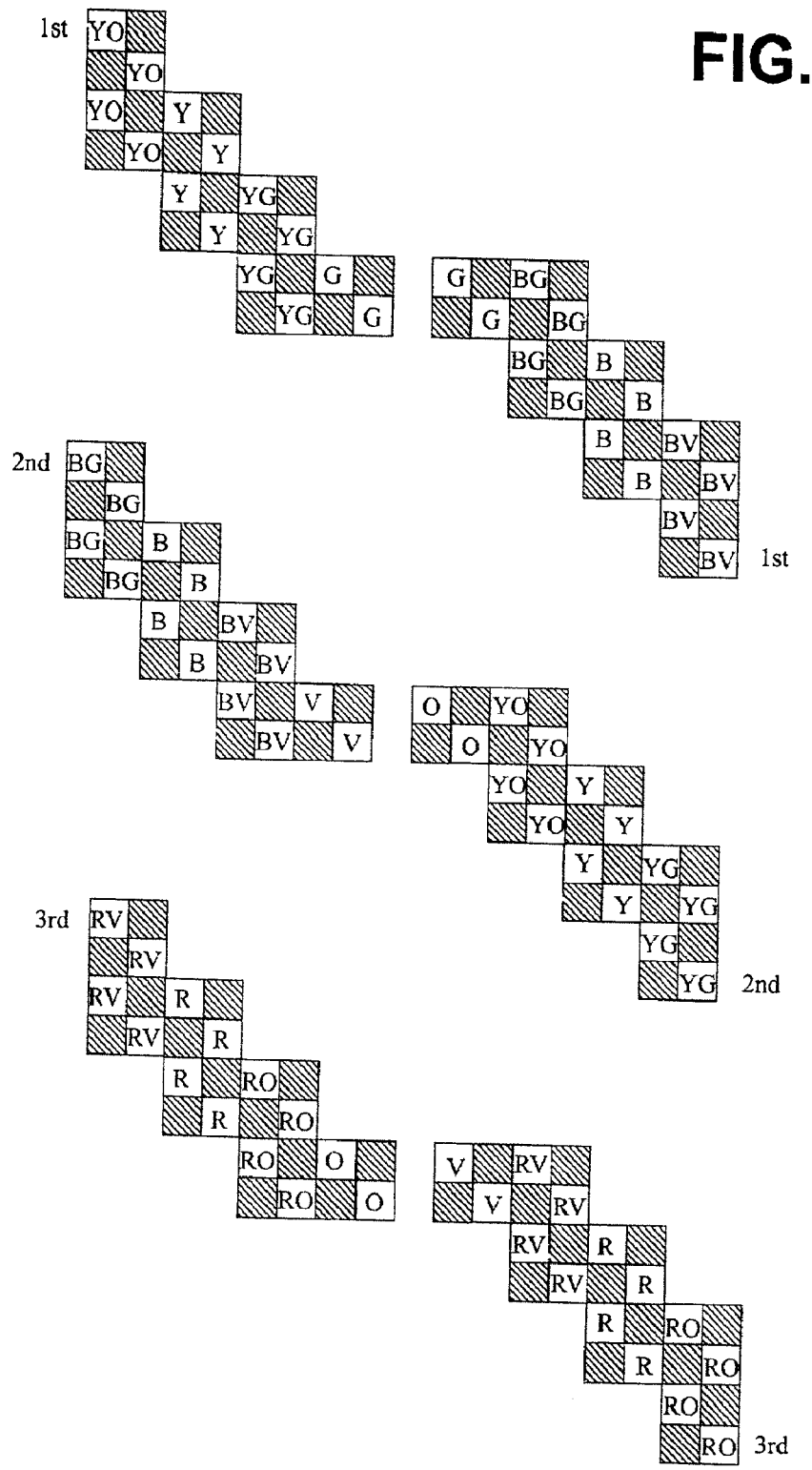
FIGS. 35A–35G are schematic representations of vector sets with alpha waves, in accordance with an atomic physics embodiment of the color wave system described in association with FIGS. 1–28.
Figure 35B:
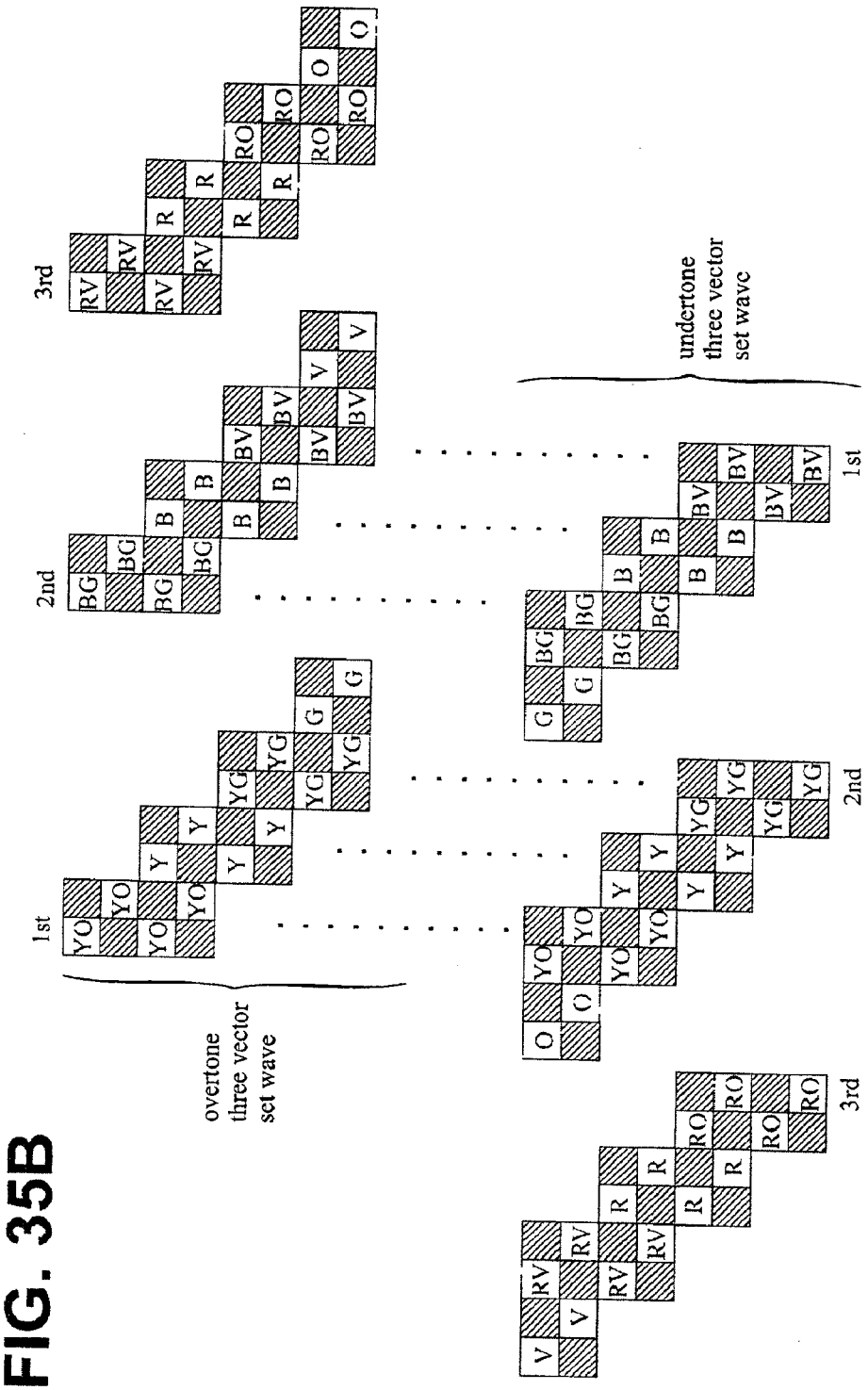
Figure 35C:
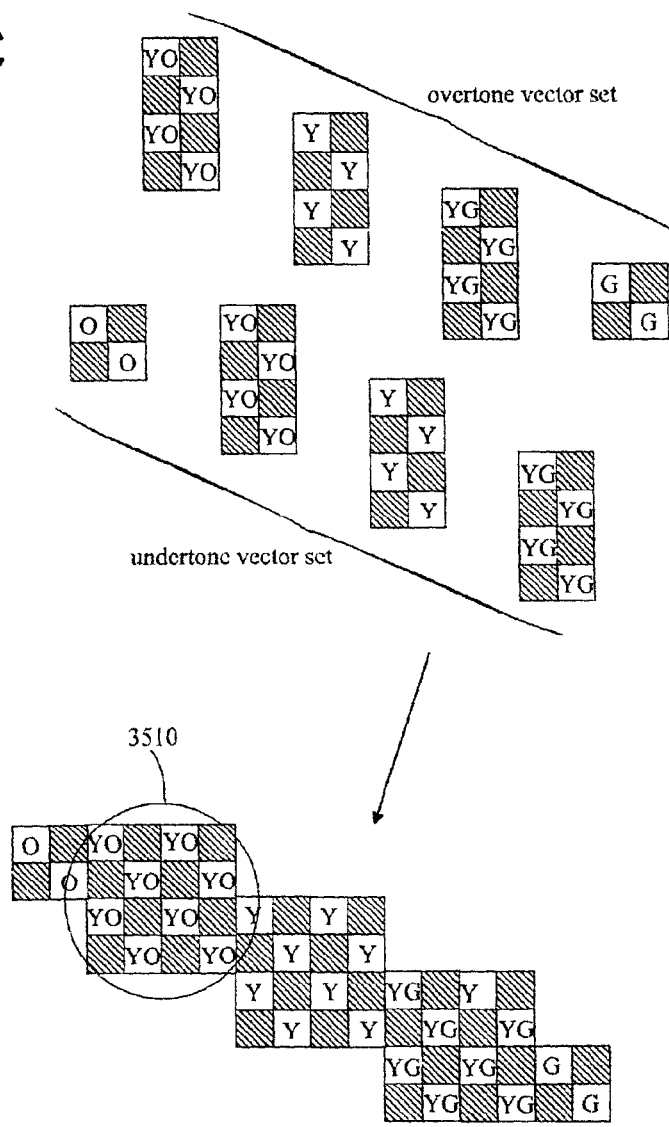
Figure 35D:
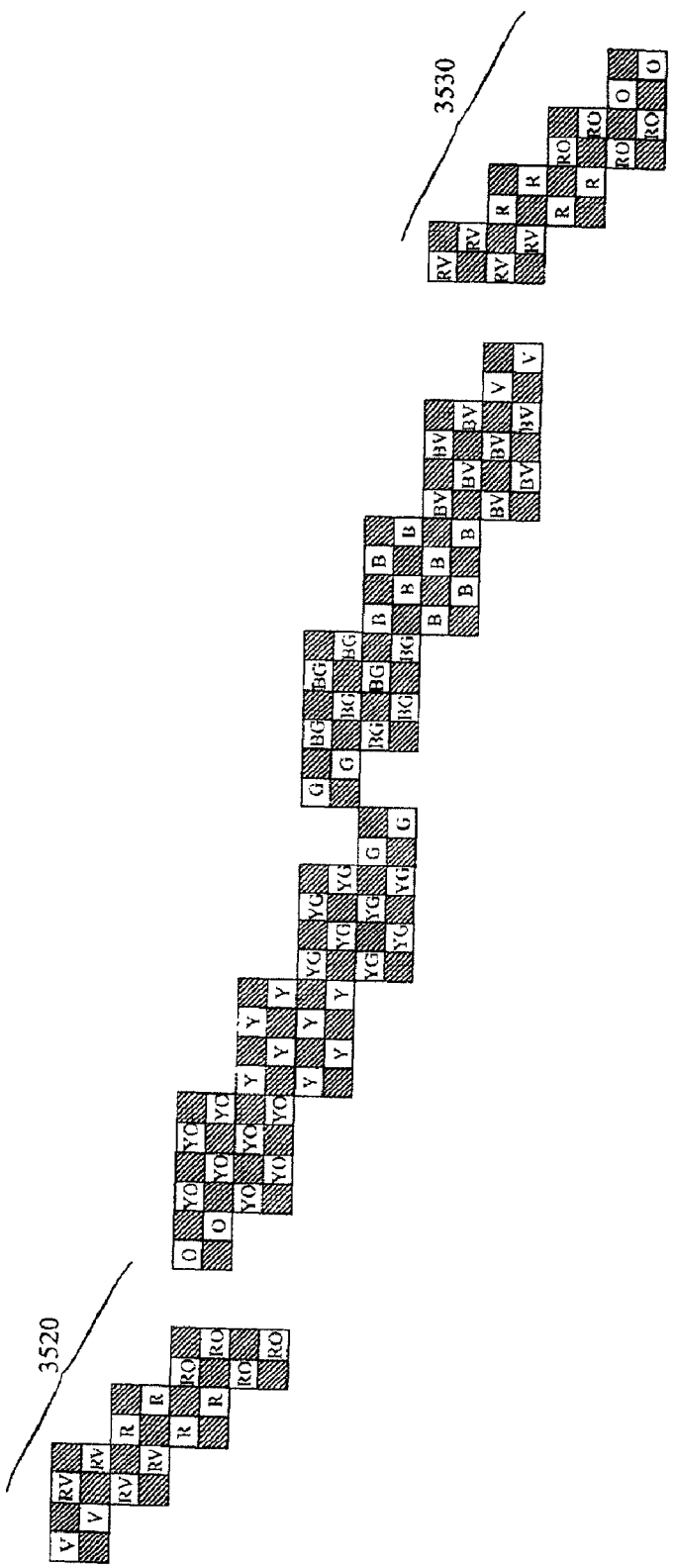
Figure 35E:
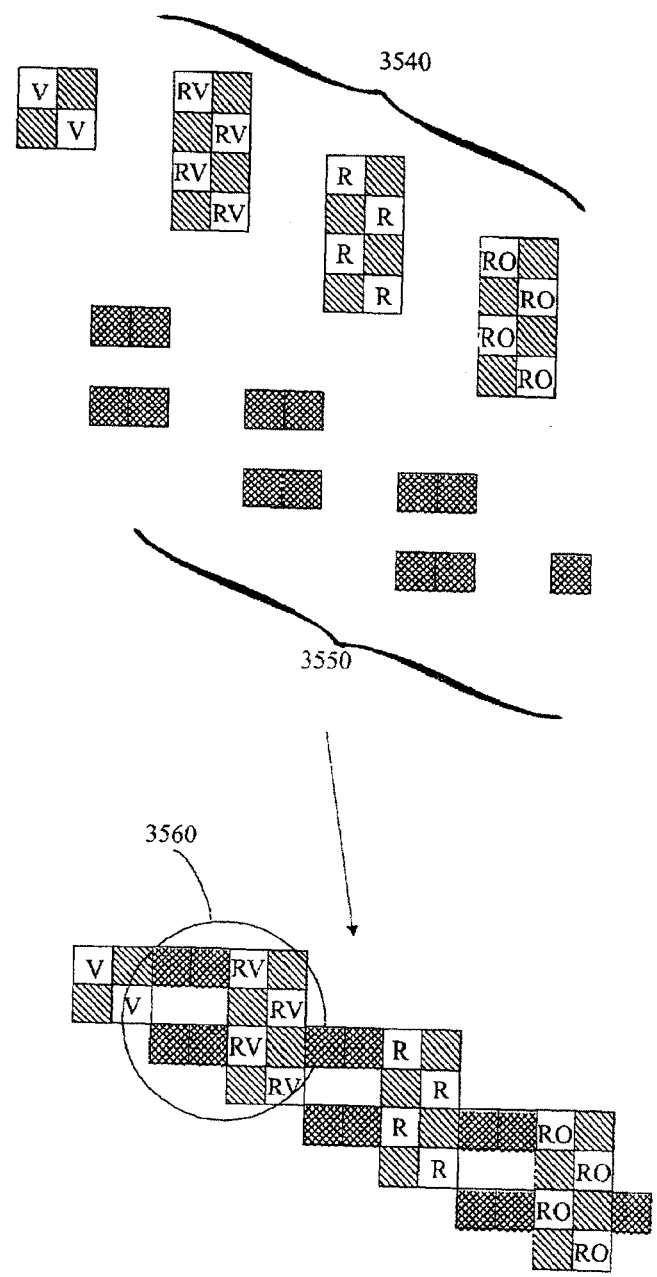

A vector set only accounts for one third of vector space which means three vector sets are required to fill vector space for a single type of charge such as positive (three sets for overtone and three for undertone). FIG. 35A shows three pairs of vector sets separated by primary colors such as yellow-orange, blue-green, and red-violet (equivalent frequency ratios of 5:4—or it's octaves). FIG. 35B shows the same three pairs of vector sets rearranged so that same colors between overtone and undertone vector sets are paired. The third overtone vector set and the third undertone vector set appear to be unpaired. This is an illusion of a linear presentation. In actuality the structures wraps around in a circle so that the same color undertone and overtone alpha waves are found along the same radial lines. FIG. 35C shows a simplified representation of how the overtone and undertone vector sets are bonded using the wave language system. Same color (frequency) overtone and undertone alpha waves are placed side-by-side to form a square of alpha waves 3510. The alpha wave square is a more stable arrangement of energy because all energy possibilities are accounted for within a single charge type. FIG. 35D shows all three, overtone and undertone vector sets bonded. The third vector set of each 3520, and 3530 do not form square alpha waves because, even though they overlap along radial lines, they are separated by a large number of energy octaves. In order to compensate, neutral alpha waves (comprised of two neutral quadrants, each formed from a 4-2 neutral wave and a 3-3 neutral wave) are placed in the missing alpha wave positions. FIG. 35E shows a vector set of neutral alpha waves 3550 paired with a vector set of alpha waves 3540 to form mimics 3560 of the stable alpha wave square 3510.

Figure 35F:
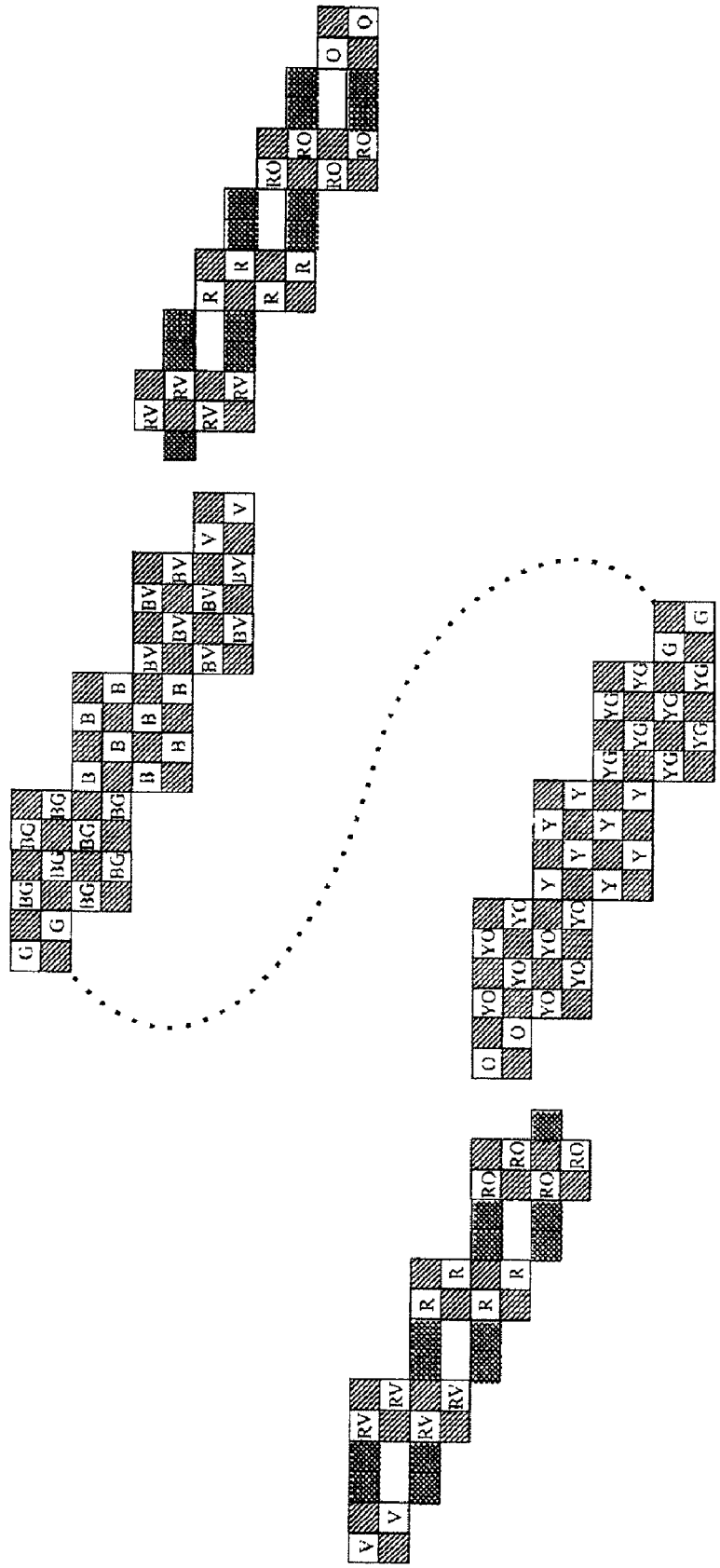

FIG. 35F shows the bonded three overtone and undertone vector sets with neutral charge overtone and undertone sets. This wave structure represents a variant of the proton and electron wave structures. Note that the dotted connecting line conveys the close association between the two sections, used herein due to available space constraints.

Figure 35G:
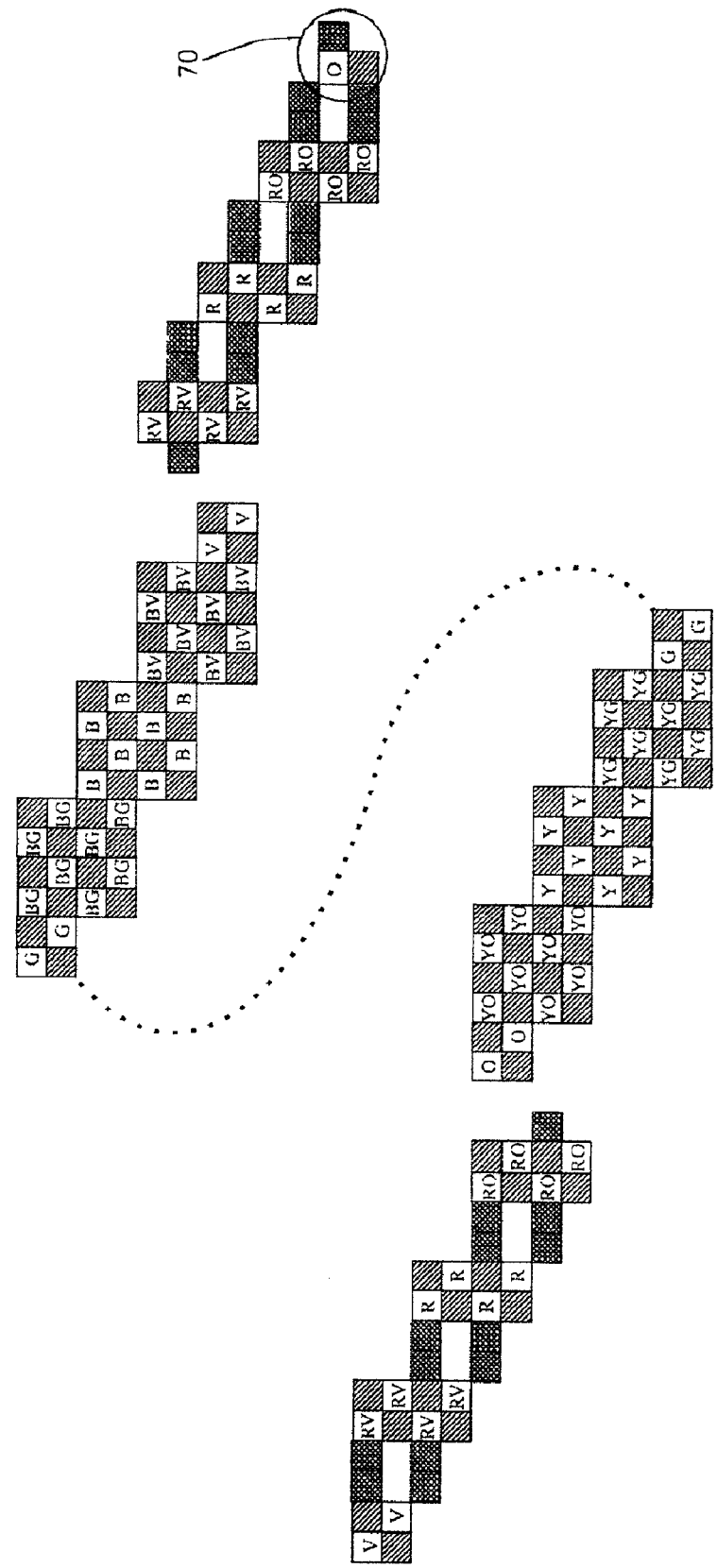

FIG. 35G shows the nucleus wave structure of an isotope of the Bismuth atom where the particle alpha wave is replaced by atomic alpha wave. Bismuth is the last of the known stable elements. The Bismuth wave structure leaves one anti-node as an altered alpha wave 3570.

Figure 36A:
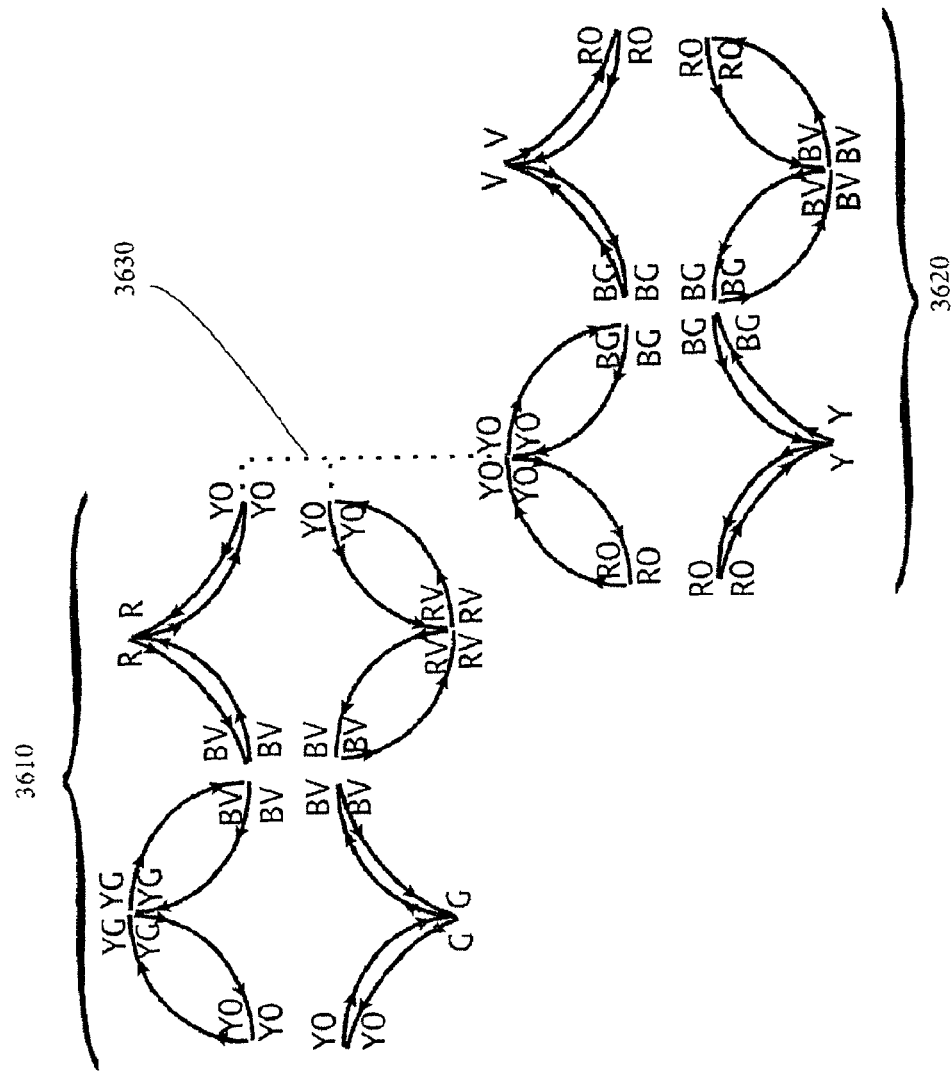
FIGS. 36A and 36B are schematic representations of vector sets, in accordance with an atomic physics embodiment of the color wave system described in association with FIGS. 1–28.
Figure 36B:
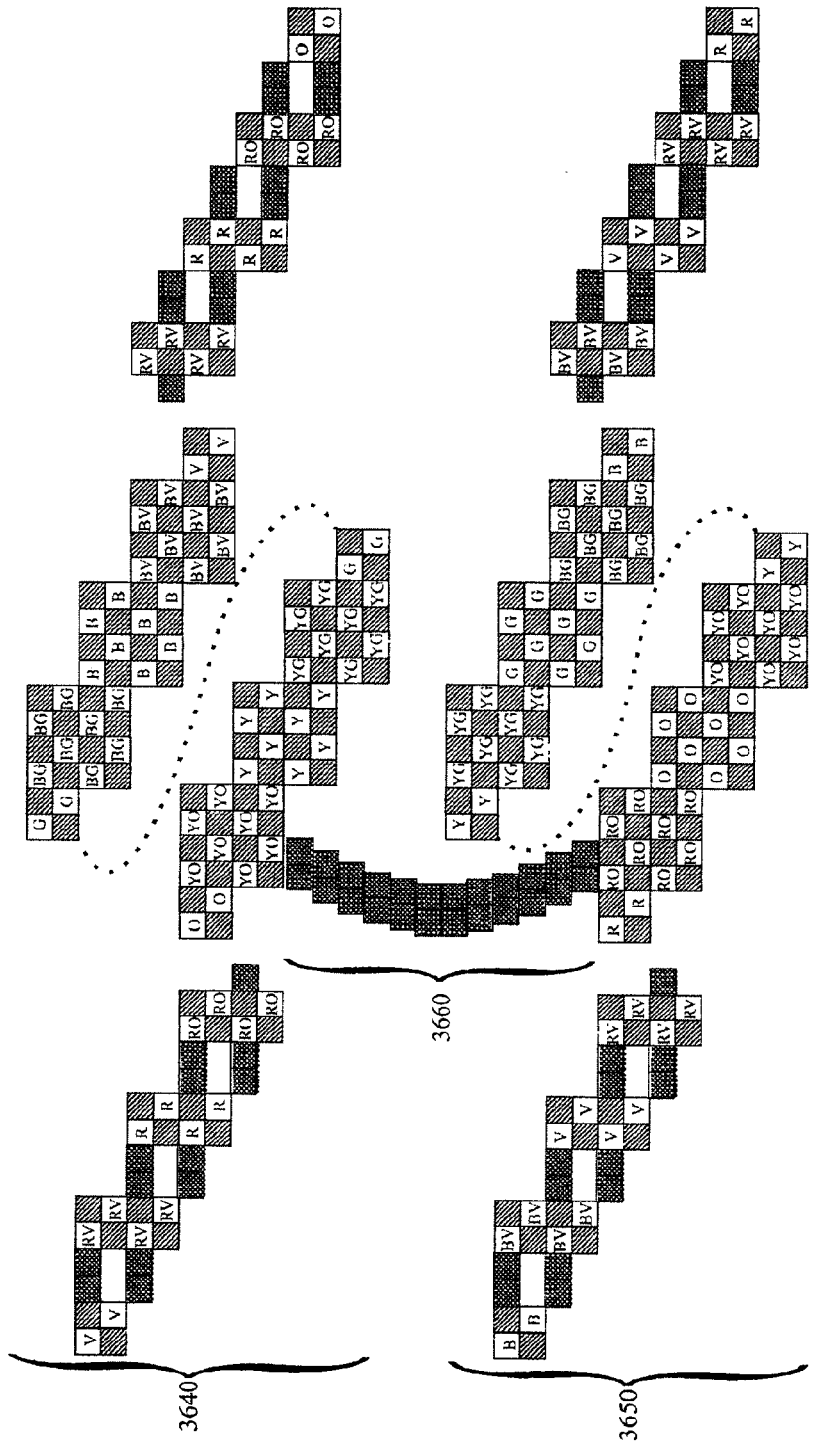

When the overtone and undertone three vector set structure is complete or nearly complete, a tether comprised of 3-3 and 4-2 neutral charge current loop waves forms from the fundamental overtone alpha wave square and moves through decreasing energy levels to a frequency position $1/1800$ of the fundamental overtone alpha wave position. This move requires twelve 3-3 and 4-2 neutral charge current loop waves. FIG. 36A shows how two 3-3 and 4-2 neutral charged waves 3610 and 3620 bond through an amplitude-to-node bond 3630 which shares one eighth of the current loop wave. FIG. 36B shows the first formation of an overtone and undertone three vector set structure which is compared to the proton or to Bismuth, from which the 3-3 and 4-2 neutral charge current loop wave tether 3660 is formed, which in turn forms the base for the formation of a second overtone and undertone three vector set structure 3650, which is compared to the electron or its theoretical atomic equivalent. The entirety of the structure in FIG. 36B is compared at the particle level to the neutron, and at the atomic level (comprised of atomic alpha waves) to what would be element 168.

The atomic wave is identical to the particle wave except that it uses protons and electrons to form the structure. Charged particle spin changes and neutral particles are obtained by changing the charged particle spins using the same relationship processes required to change current loop spins, including energy reversal, second half wave cycle positioning, 4-2, and 3-3 type orientations. The change is effected by changing the energy of the particle to a higher or lower overall energy which causes each current loop of the particle to shift to a new energy position which effects the charge of each current loop. For example, a proton at an energy level arbitrarily defined as '1' can be altered by shifting the energy to 50/49 or 5*(square root of 2)/7, or any of the energy positions which are created from the different types of spins and current loop structures. The basic principle is that forcing a proton to function relative to other protons by existing at a different relational energy position, and moving through space according to a particular wave pattern, forces charge changes to the current loops of which it is comprised.

Figure 37:
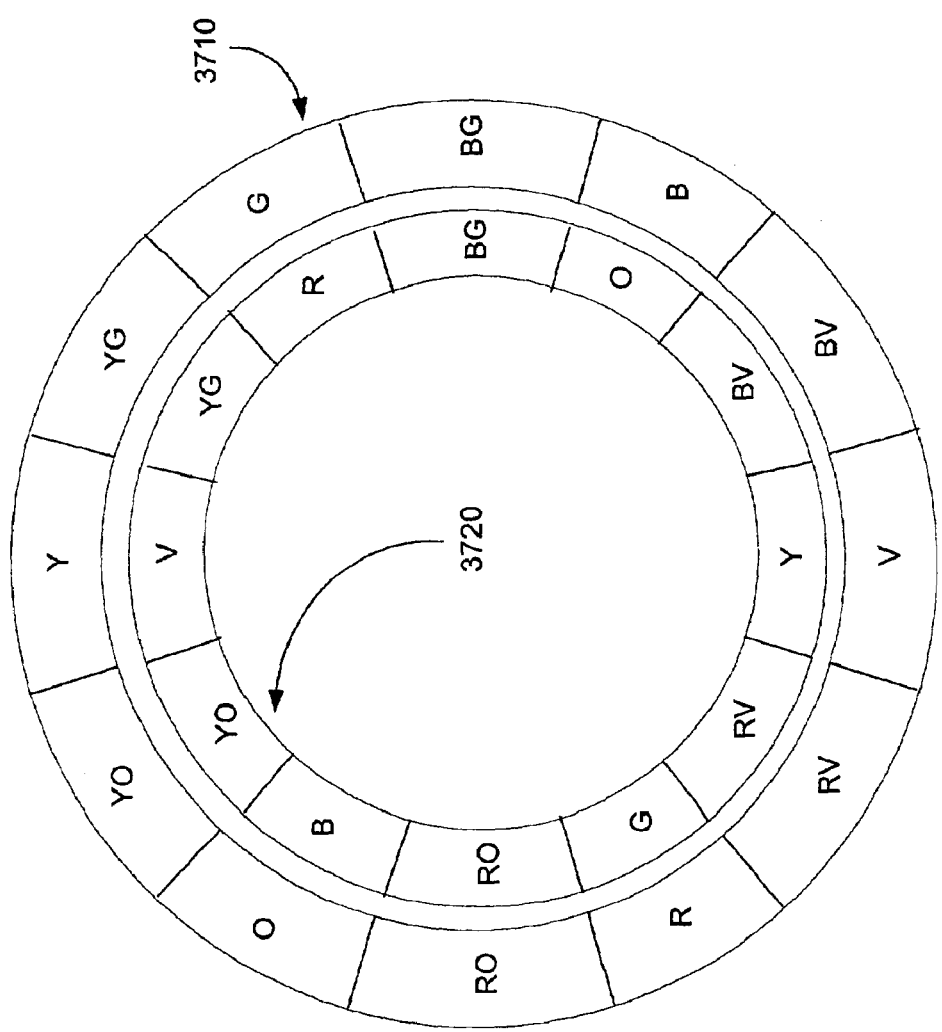
FIG. 37 is a schematic representation of a sound color circle and an electromagnetic color circle, in accordance with a musical system embodiment of the color wave system described in association with FIGS. 1–28.

The musical embodiments will include a notation grid based on the sound and color association described above, and a plurality of musical instruments that mirror the notation grid, in accordance with a musical embodiment of the wave language system. FIG. 37 shows a light spectrum color circle 3710 and a sound color circle 3720. The one-word colors of the sound color circle 3720 include (starting from the 12:00 position on the circle 3720 and proceeding clockwise): violet (V), red (R), orange (O), yellow (Y), green (G), and blue (B). These colors and designations are also found in the light spectrum color circle 3710. The two-color words of the sound color circle 3720 (also valid for the light spectrum color circle 3710) include (starting right after the 12:00 position of the sound color circle 3720 and proceeding in a clockwise direction): yellow-green (YG), blue-green (BG), blue-violet (BV), red-violet (RV), red-orange (RO), and yellow-orange (YO). As discussed above, there are 12 fundamental frequencies or tones that are identified by multiples of 3 within a harmonic series. However, the order of the colors in sound are different than the order in the light spectrum, as illustrated by the comparison in FIG. 37 of the light spectrum color circle 3710 and the sound color circle 3720.

In FIG. 37, two-word colors align between circles, but one-word colors are at opposite sides between circles (called complements, as discussed previously), or contrarily, if the one-word colors were chosen to align between color circles then the two-word colors would be at opposite sides between circles. The difference between the sound color circle 3720 and the light spectrum color circle 3710 is that the sound color circle 3720 has replaced the colors on either side of a selected color with the colors that are on either side of the complement of the selected color. This is accomplished by switching the selected color with its complement and putting the selected color in the position of the complement color on the color circle, as will be described below. These observations will be used to determine color positions on the notation grid described below.

In order to write down color that we hear, musicians can use a notation grid so that they can see the colored notes that they are hearing. The notation grid is not limited to music applications but equally describes any energy position in time, and describes the change in energy or current flow throughout a structure over time, or describes the path of energy over time, or describes the relationship of energy points at a given time and over time, and describes the mechanisms of relating one energy position to the next such that a current path can be defined to move from one energy position to the next. The notation grid can be a mechanism for describing electrical circuits whether natural or man-made and any other kind of energy motion and relationships.

The notation grid preferably shows what notes are being played at different times during a song. The 12 colored notes of the sound color circle 3720 (FIG. 37) are shown in the notation grid, or Universal Staff 3800, shown in FIG. 38. It will be understood that although the one or two-word color name is shown within each note, it will be understood that the notes will preferably be colored without the one or two word names within each note, with or without the corresponding colorization. However, in other embodiments, the color names can appear within each note. Further, only a portion of an entire Universal Staff 3800 is shown, with the understanding that the other octaves can be shown. For example, the 4th, 5th, and 6th octave colored notes are illustrated, with the understanding that the octaves are just a repetition of the notes shown at higher and lower frequencies.

The different parts of the Universal Staff 3800 are illustrated. The octave numbers 3830 each comprise 12 colored notes (the colors of the color circle 3720 of FIG. 37). High octave numbers will have higher sounding notes. Lower octave numbers will have lower sounding notes. For sound representation relating to music use, octave number 6 is preferably in the middle of the human hearing range. The staff set 3840 comprises a group of 5 lines between octave numbers. Also included are ledger lines, 3845, which are only found on the yellow note that is between staff sets 3840. If a note is on a line than it is called a line note 3850. Also included are spaces, which is the space between 2 staff lines or between a staff line and a ledger line 3845 of the yellow note. If a note is between 2 lines then it is called a space note 3855.

As illustrated, the 12 different colors repeat over and over as if repeatedly going around the sound color circle 3720 (FIG. 37). With continued reference to FIG. 37 and FIG. 38, note that starting at the yellow note (5th octave position) and moving up the Universal Staff 3800 through the colors to the next yellow note (6th octave) is the same order of colors as moving clockwise around the sound color circle 3720 starting from yellow. For sound representation relating to music use, the complete Universal Staff 3800 preferably contains 12 octaves (or 12 repetitions or 12 circles) of the 12 notes of the sound color circle 3720 (FIG. 37). It begins at octave 0 and ends at octave 12. The middle octave and the middle note are at octave 6. In music, the complete Universal Staff 3800 may not always be used. Typically, 3 to 4 octaves will be used. Because of this, the complete Universal Staff 3800 may not be shown for a particular song but only the octaves needed to show the notes of the song. For general use, the octaves have no defined limit.

As noted above, the color positions on the staff can generally be described by lines and spaces. Lines are preferably one-word color names. Every line on the Universal Staff 3800 corresponds to a color, which is a one-word color name such as yellow or blue. Navigating along the Universal Staff 3800, starting at the note position yellow and moving upward on a staff set 3840 is the same as moving clockwise around the sound color circle 3720 (FIG. 37) from yellow. Every space on the Universal Staff 3800 corresponds to a color, which is a two-word color name such as blue-green or red-orange. Since the order of color on the Universal Staff 3800 is the same as the order of color around the sound color circle 3720, then finding the Universal Staff 3800 position of each two-word color requires the same process as finding the two-word color positions on the sound color circle 3720.

Figure 38:
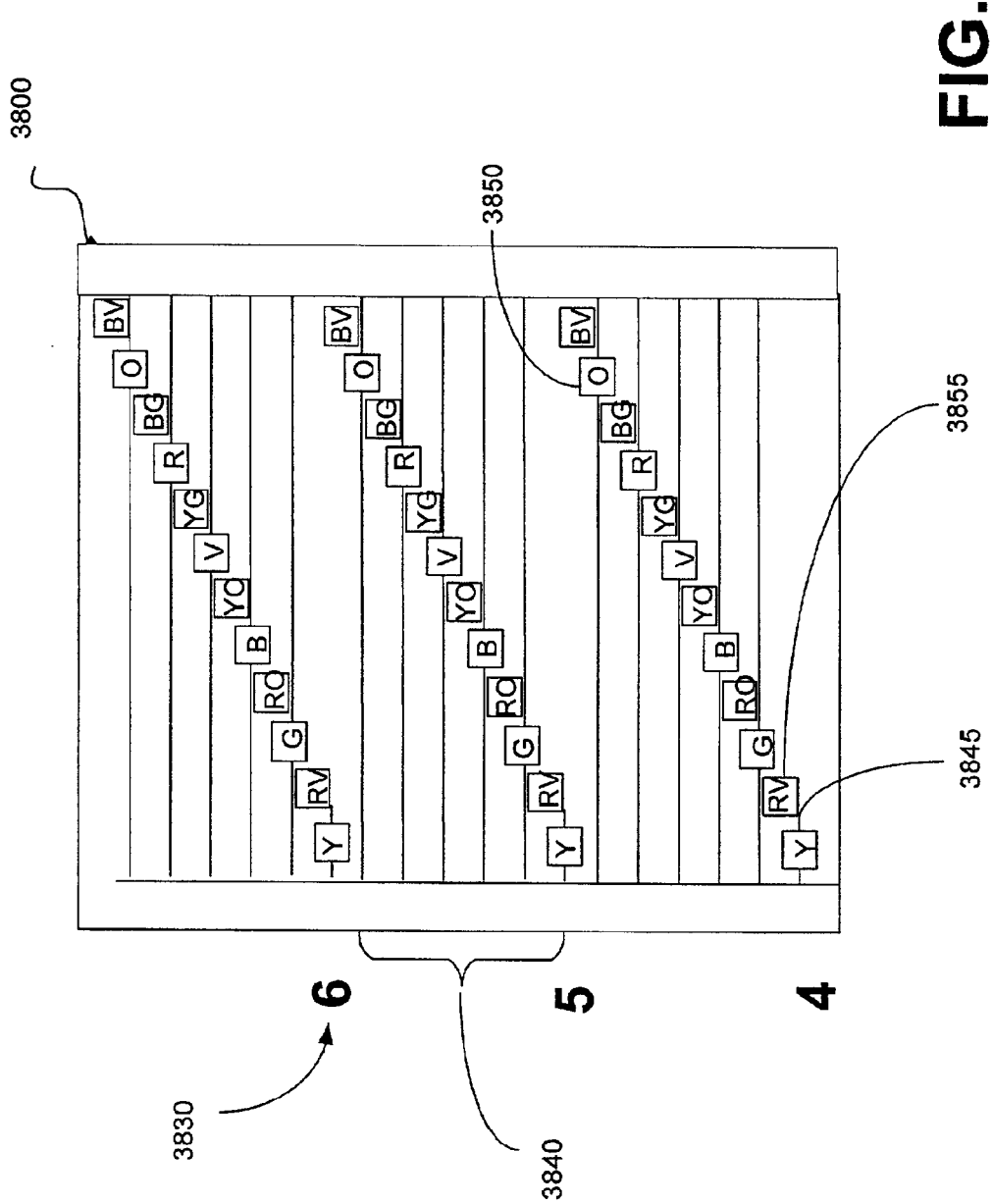
FIG. 38 is a schematic representation of an example notation grid, in accordance with a musical system embodiment of the color wave system described in association with FIGS. 1–28.
Figure 39:
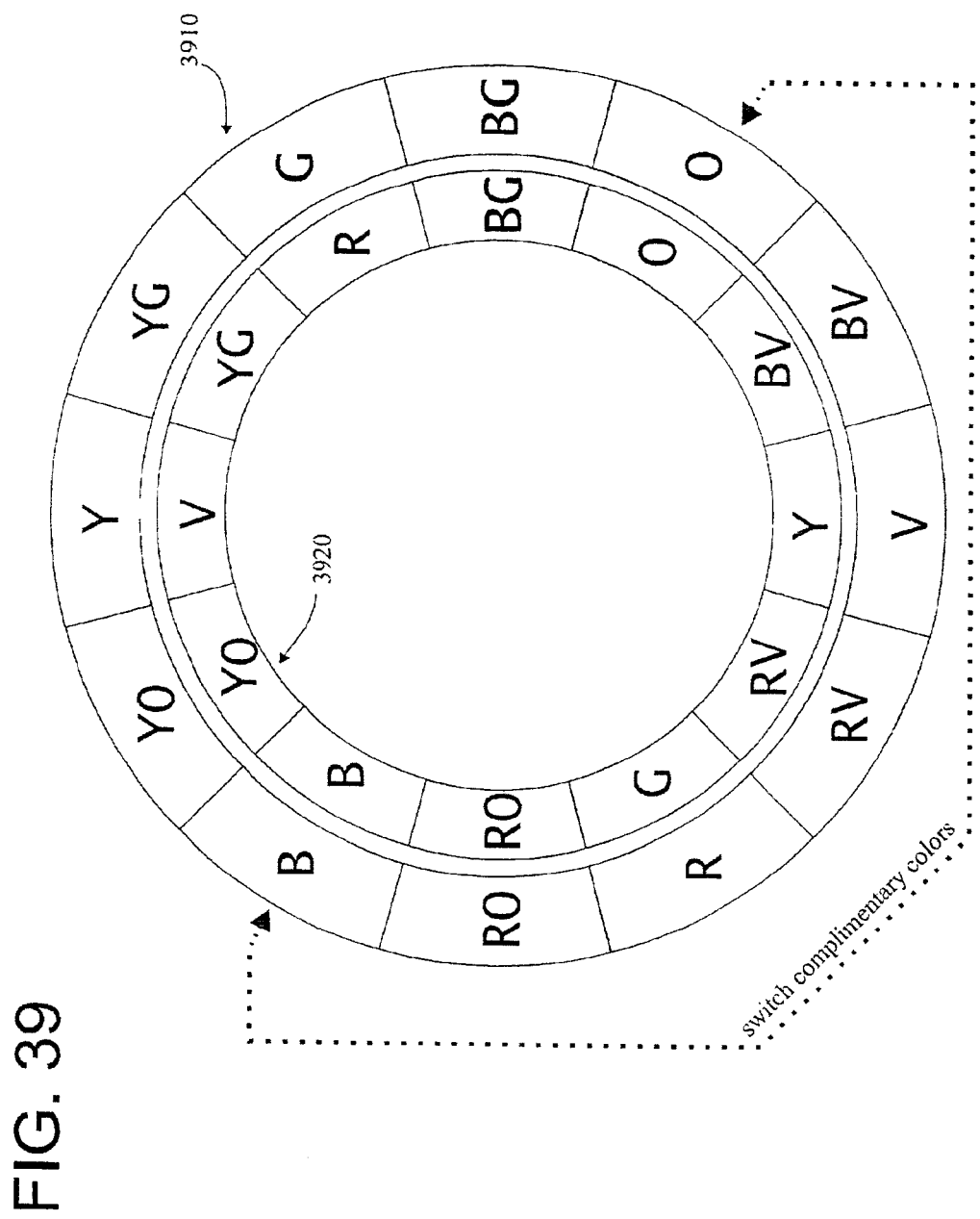
FIG. 39 is a schematic representation of the sound color circle and electromagnetic color circle of FIG. 37, with complementary colors replaced with the selected color, in accordance with a musical system embodiment of the color wave system described in association with FIGS. 1–28.

First, chose a one-word color name note on the Universal Staff 3800, which in this implementation must be a note that is on a line (a line note 3850), such as the color/note blue in the 4th octave, as shown in FIG. 38. Second, find the chosen color (blue) on the light spectrum color circle 3710. (FIG. 37) Third, find the complement of the chosen color on the light spectrum color circle 3710. From FIG. 37, the complement of the color blue is the color orange. Fourth, switch the chosen color (blue) with its complement (orange) and put the chosen color in the position of the complement color on the light spectrum color circle 3710, as shown in the revised color spectrum 3910 of FIG. 39. When all of the one-word color names are switched as shown in 3920 of FIG. 39, the result is the same as shown for the sound color circle 3720 of FIG. 37. The colors on either side of the chosen color of blue (here, RO and YO) on the revised color spectrums 3920 are the colors of the notes on either side of the blue note on the Universal Staff, as shown in FIG. 38. The note on the revised color spectrums 3920 that is clockwise next to blue is yellow-orange. Since moving clockwise around the revised color spectrum 3920 is the same thing as moving up the staff, the yellow-orange note will be found in the space directly above the blue note on the staff. The note on the revised color spectrum 3920 that is counter-clockwise next to blue is red-orange. Since moving counter-clockwise around the color circle 3920 is the same thing as moving down the staff, the red-orange note will be found in the space directly below the blue note on the staff.

Figure 40A:
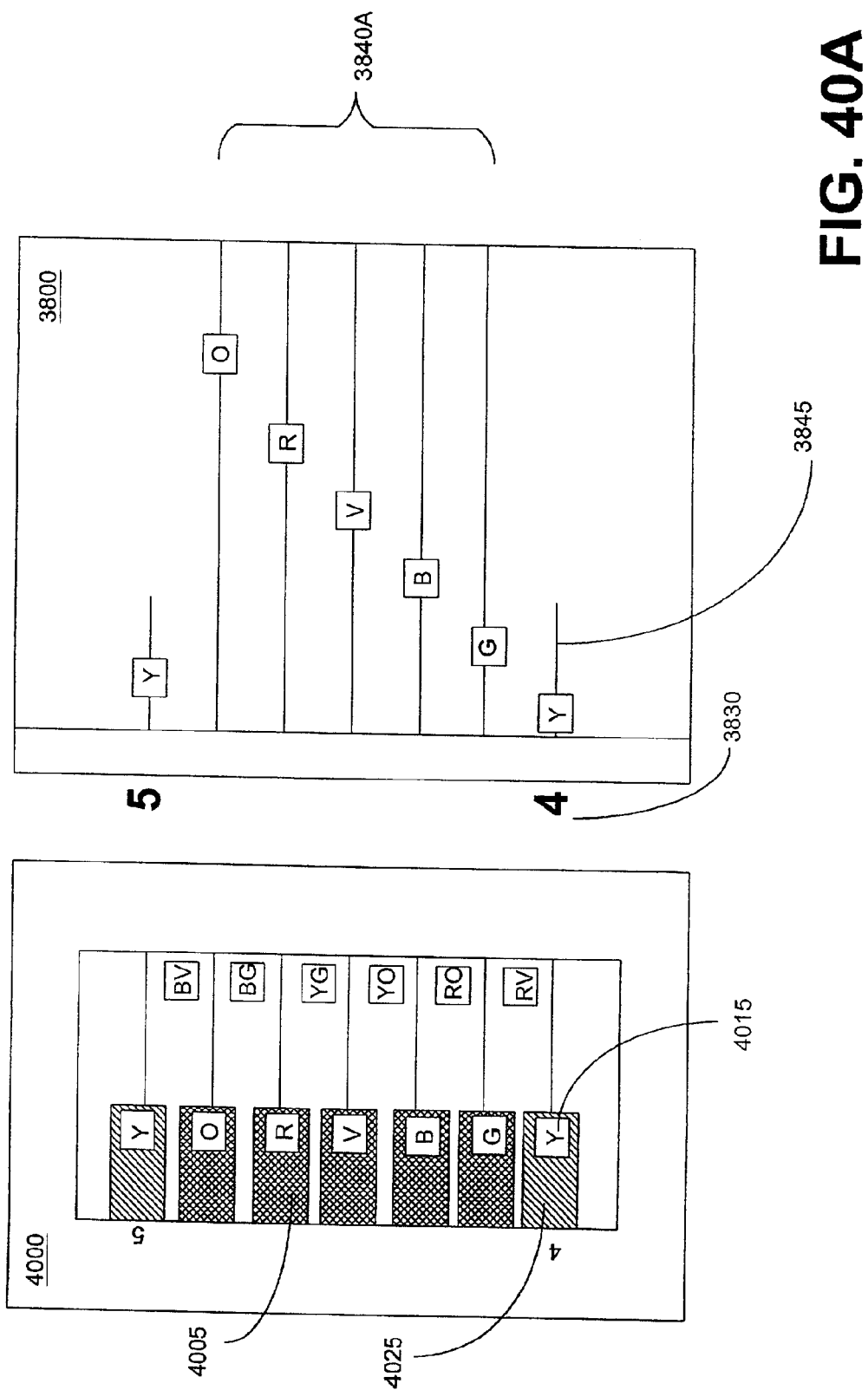
FIGS. 40A and 40B are composite diagrams of an example musical keyboard that mirrors the example notation grid of FIG. 38, in accordance with a musical system embodiment of the color wave system described in association with FIGS. 1–28.

The Universal Staff, among other embodiments of the wave language system, can be formed in or on any medium such as paper, a computer screen or on a physical device, which is used to generate frequencies such as musical instruments among others. Preferably, the musical instruments selected will have mechanisms to provide sound based on the color/notes selected from the notation grid in a on-to-one correspondence. The keyboard, or Universal Keyboard 4000, described in association with FIGS. 40A and 40B, has been developed to provide, among other features, the same organization of the colored notes as the Universal Staff 3800 (FIG. 38). The Universal Keyboard 4000 preferably includes keys for colored notes in 12 octaves, although keyboards of fewer or greater octave keys are considered within the scope of the preferred embodiments. FIG. 40A illustrates the black-key 4005 and gray key 4025 (gray key shown with diagonal lines to distinguish from the black keys 4005, which are shown with hatched, or cross hatched, lines) portions of the Universal Keyboard 4000 corresponding to the colored line notes on a partial staff set 3840A and the ledger line 3845 (of the Universal Staff 3800) ranging from the 4th to 5th octave (as indicated by the octave number 3830).

Each key includes a colored portion 4015 (represented in FIG. 40A by one-word color symbols), preferably at the end of each key (i.e., nearest the person playing the keyboard 4000 or frequency generating device). The colored portion 4015, in alternate embodiments, can be located elsewhere on the key, or on the non-key portion of the Universal Keyboard 4000, and/or the entire key can be colored the color of the colored portion 4015. The beginning of each octave is denoted preferably by a yellow colored portion 4015, and the key color containing the yellow colored portion 4015 is preferably gray. The yellow note on the ledger line 3845 matches up with the gray note on the Universal Keyboard 4000. Also, every octave number (e.g., 4 and 5) on the left of the staff set 3840A preferably has a matching octave number on the Universal Keyboard 4000. Other key colors can be used to distinguish the beginning of octaves from the rest of the black keys. Other key colors besides black may be used and still be considered within the scope of the preferred embodiments. Note that the number of the octaves are preferably located on the keyboard structure (i.e., non-key structure) above each gray key. In other embodiments, this octave representation on the keyboard or keyboard structure can be omitted. Every line on the staff 3840A and the ledger line 3845 has a matching black note on the Universal Keyboard 4000. For example, looking at the black note with the colored portion 4015 that is green (i.e., "green-black" key) on the keyboard 4000, and then following it to the right, the "green-black" key matches up with the green note line of the staff set 3840A. Moving up on the staff set 3840A is the same as moving right on the Universal Keyboard 4000, and moving down on the staff set 3840A is the same as moving left on the Universal Keyboard 4000.

Figure 40B:
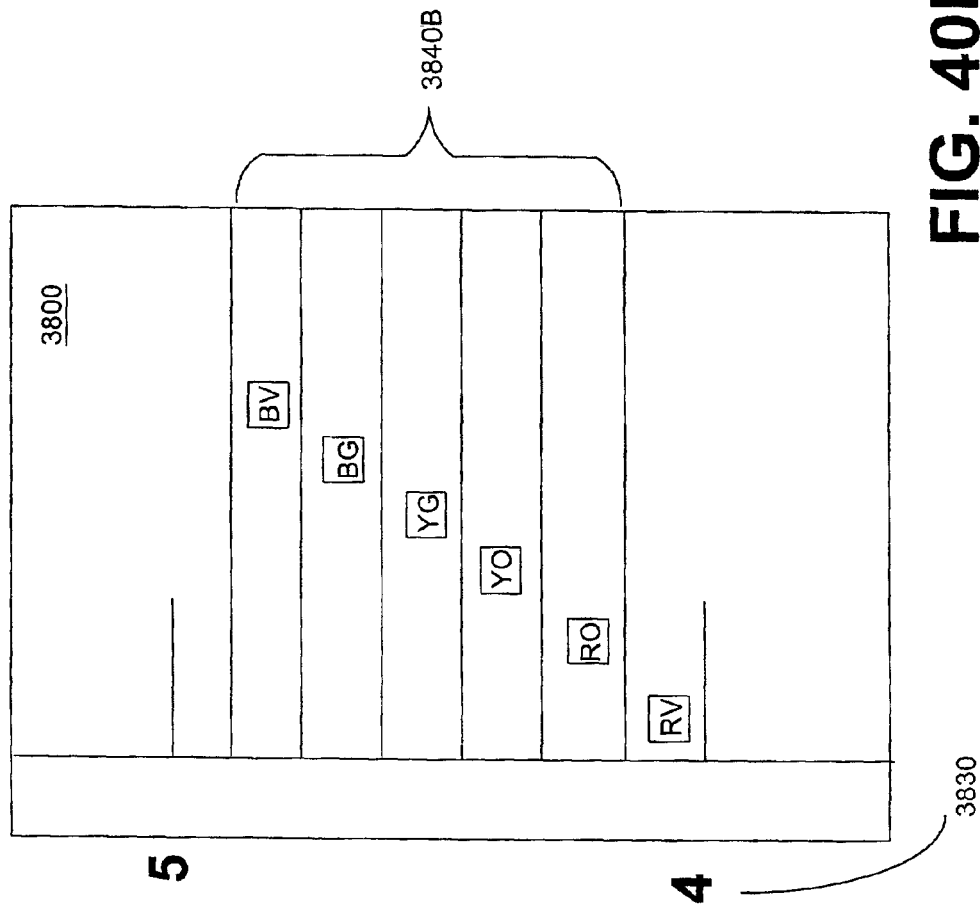
Figure 40B:
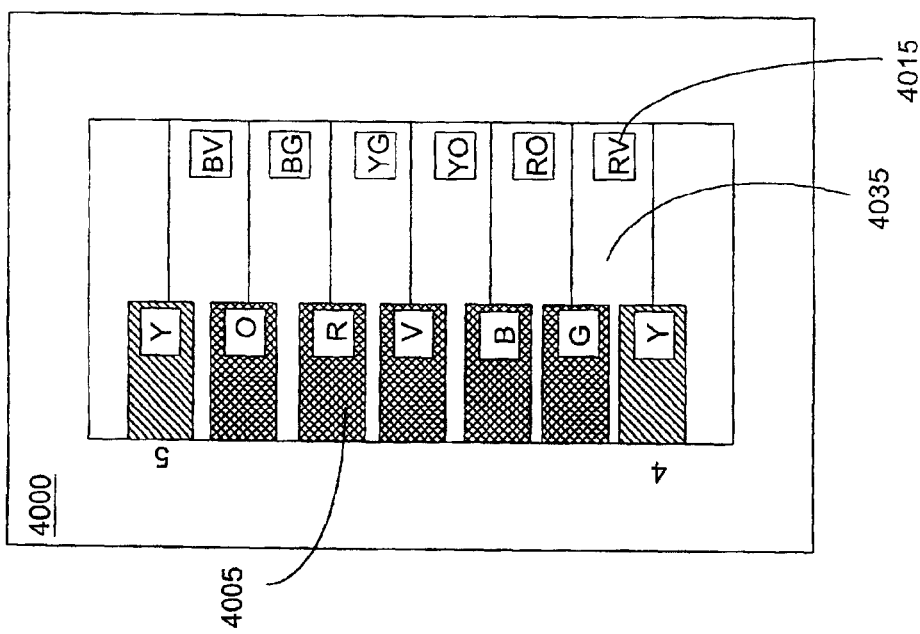

FIG. 40B shows how every space on the staff set 3840B has a matching colored portion 4015 on the white keys 4035 of the Universal Keyboard 4000. For example, looking at the white note with the colored portion 4015 that is yellow-orange (i.e., "yellow-orange" key), and then following it to the right, the "yellow-orange" key matches up with the yellow-orange space of the partial staff set 3840B. Similar to the black keys described in association with FIG. 40A, different colors, or different areas of color coverage can be applied in other embodiments. As with the black keys 4005, moving up on the staff set 3840B is the same as moving right on the Universal Keyboard 4000, and moving down on the staff set 3840B is the same as moving left on the Universal Keyboard 4000. Thus, the lines on the staff set 3840B match with black or gray notes on the Universal Keyboard 4000, the spaces on the staff set 3840B match up with white notes on the Universal Keyboard 4000, each color on the staff set 3840B matches with the same color on the Universal Keyboard 4000, and the selected notes on the staff set 3840B and the keyboard 4000 are positioned, in this example, between octaves 4 and 5.

With reference to FIGS. 40A and 40B, the following is a description of how the Universal Keyboard 4000 can be played by following the notation system. First, look to see if the staff set 3840 (comprises 3840A and 3840B) contains a note on a line or a space or if it is the yellow note with the short ledger line 3845. If the note is on a line then it must match up with a black note 4005 on the keyboard 4000. If the staff note is in a space between lines then it must match up with a white note 4035 on the keyboard 4000. If the note is a yellow note with the short ledger line 3845 through it then it must match up with a gray key 4025 on the keyboard 4000. Look to see what octave numbers 3830 the note is between. For example, if the note is between octaves 4 and 5, then the matching note on the keyboard 4000 will be between octaves 4 and 5. In other embodiments, the octave numbers can be omitted from the keyboard or keyboard structure. If the note is a yellow note with the short ledger line 3845 through it, then it will line up exactly with the octave number 3830 to the left of the staff. Once the octave and note type (black, white, or gray) have been identified, simply match the color of the note to the color of the keyboard 4000 (i.e., the color of the colored portion 4015).

The colored portion 4015 on the Universal Keyboard 4000, and the note on the Universal Staff 3800, can be represented by numbers or letters, among other representations, and can be represented as an approximation to the specific tone.

The wave language system can be embodied, in whole or in part, in other instruments. String instruments (for example, fretted instruments such as the guitar and non-fretted instruments such as the violin) with a fingerboard are instruments that the Universal Staff 3800 (FIG. 38) of the wave language system can also be adapted to. The finger positions, or contact positions, of string instruments represent frequency positions, which describe musical tones. The wave language system is applied to the fingerboard by associating the frequency positions with color, and/or with the black lines, white spaces, and ledger lines (gray) of the Universal Staff 3800. As such it is a recognizable embodiment of the Universal Staff 3800, physically applied to the fingerboard or fret board with paint, applied stickers, and/or by any other mechanisms which successfully creates the recognizable embodiment. The individual then uses the instrument to physically create the sounds that are described in sheet music incorporating the colored notes and other elements of the Universal Staff 3800.

By using the Universal Staff 3800 (FIG. 38), this effects a one-to-one correspondence of colored notes on the sheet music staff to colored finger positions on, for example, the guitar neck. This embodiment can be used with the Universal Staff 3800 because it has a one-to-one correspondence with the note colors, lines, spaces, and ledger lines, and includes the entirety of tone relationships therein implied. This embodiment performs a function of relating tones or frequencies in one format or medium to a fret board instrument (such as the guitar, FIGS. 41A–41B), and fingerboard instruments (such as the violin FIGS. 41C–41D).

Figure 41A:
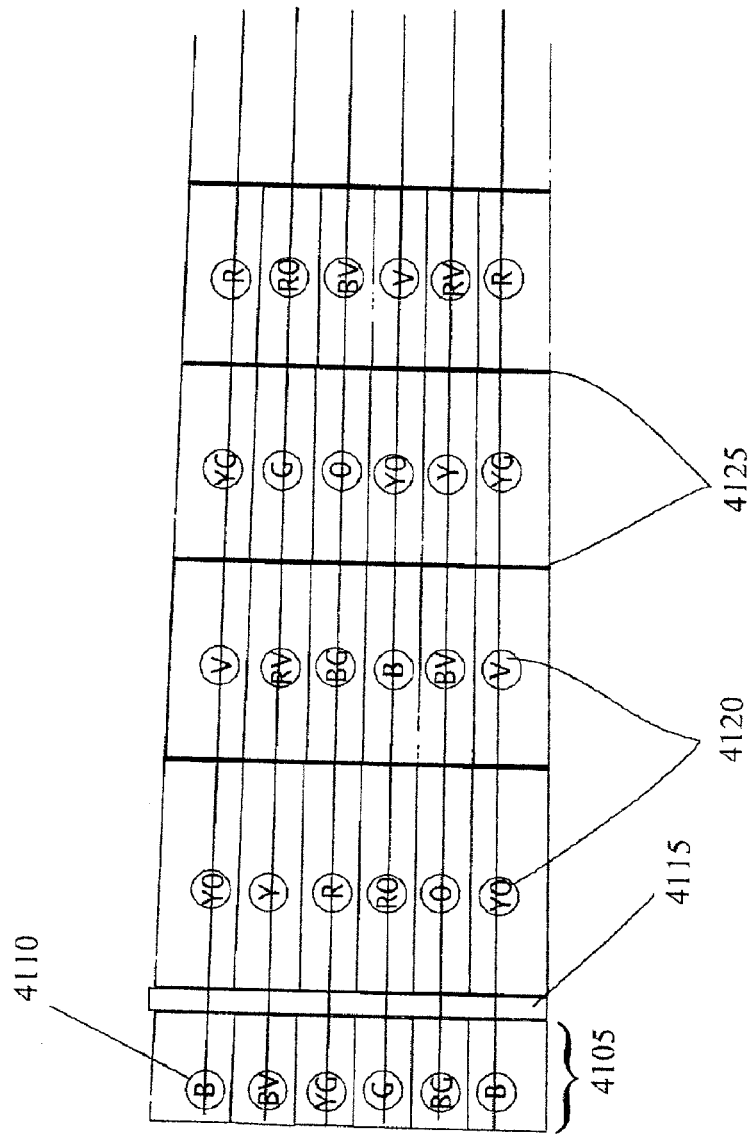
FIGS. 41A–41D are schematic representations of example fretted and non-fretted instruments that mirror the example notation grid of FIG. 38, in accordance with a musical system embodiment of the color wave system described in association with FIGS. 1–28.

FIG. 41A shows the top portion of a guitar neck. The nut 4115 separates the playable portion of the string from the tuning area 4105 of the string. Within the playable area, frets 4125 define the length of the string when the finger depresses the string in between the frets. The position of the finger depression 4120 is then marked as the mechanical point for defining the frequency of the string (tone). Color is applied to the finger positions 4120 as defining the frequency generated by the finger position, and defining the relationships between the various finger positions. The open string is not generated by a finger position but still needs to be defined so that the frequency of the open string can be related to the frequencies generated by the finger positions on the fret board. Color is applied to an implied finger position 4110, above the nut 4115 in the tuning area 4105 of the string.

Figure 41B:
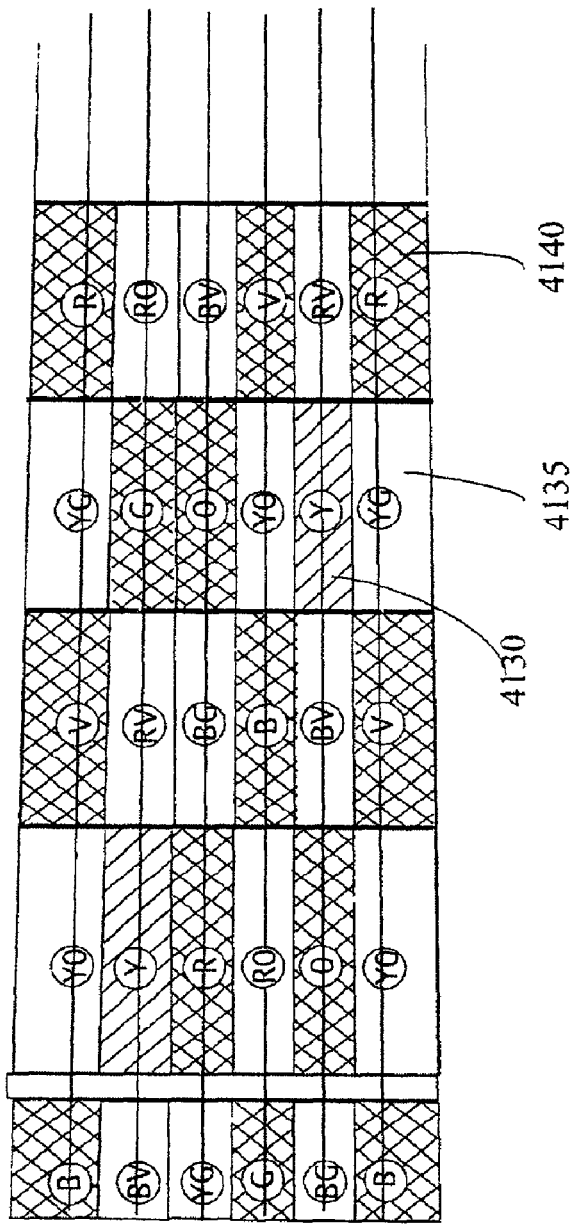

FIG. 41B shows the embodiment of FIG. 41A with an additional application of the black, white and gray system for representing the lines, spaces and ledger lines of the Universal Staff 3800 (FIG. 38). The area between frets, underneath the string, is colored with black 4140 representing a line on the Universal Staff 3800, or is colored white 4135 representing a space on the Universal Staff, or is colored gray 4130 (shown as diagonal lines) representing a ledger line on the Universal Staff. As described in other embodiments, the colors, black, white, and gray are not the only colors which can represent the system of lines, spaces, and ledger lines and are only used as one example among others as a system which recognizably describes the notation system of lines, spaces, and ledger lines of the Universal Staff 3800.

Figure 41C:
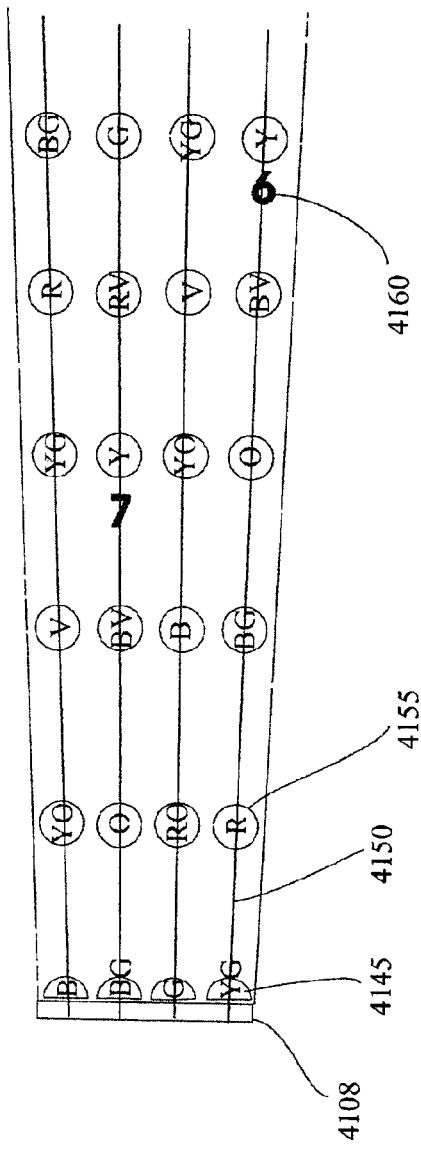

FIG. 41C shows a portion of a violin fingerboard. The nut 4108 is found at the top of the fingerboard and controls the open string frequencies. A colored half circle 4145 is placed at the top of the string 4150 next to the nut to represent the frequency of the open string. The finger positions for tones are defined by colored circles 4155. The octave number 4160 of the ledger line is displayed next to the colored circle representing the tone associated with the particular octave ledger line.

Figure 41D:
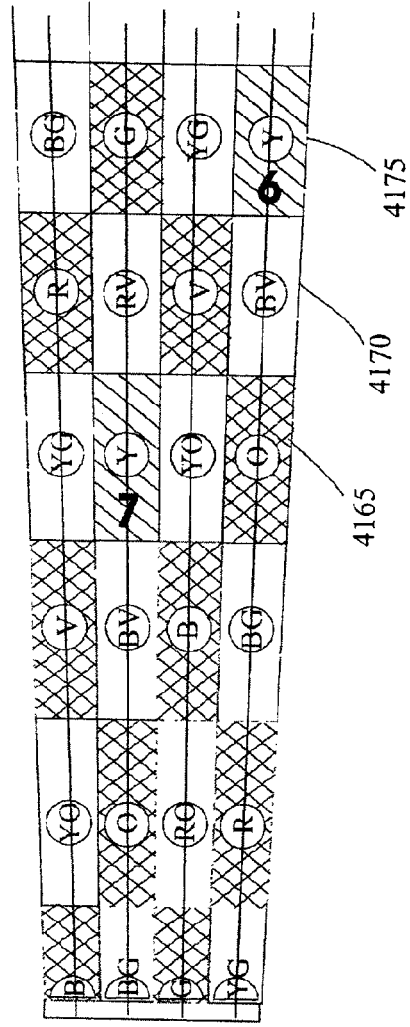

FIG. 41D shows the embodiment of FIG. 41C with an additional application of the black, white, and gray system for representing the lines, spaces and ledger lines of the universal staff embodiment of the present invention. The pattern consists of rectangular areas of black 4165, white 4170, and gray 4175 (again, represented as diagonal lines), with the color circle placed in the center of the rectangle.

The notation grids and instruments described in the embodiments above can also be used with conventional notation systems as a tool for composition analysis, understanding tone relationships, chord analysis, and music creation. Further, a transition version can be implemented, which uses the conventional staffs and modifies with the application of color to the note heads using the color relationships described in the wave language system, as described below.

Figure 42A:
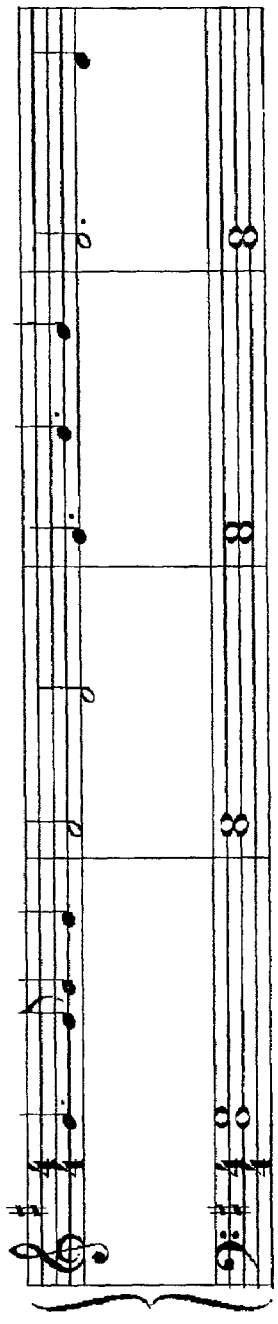
FIGS. 42A–42B are schematic representations of how color elements of the example notation grid of FIG. 38 can be used on conventional music staffs, in accordance with a musical system embodiment of the color wave system described in association with FIGS. 1–28.
Figure 42B:
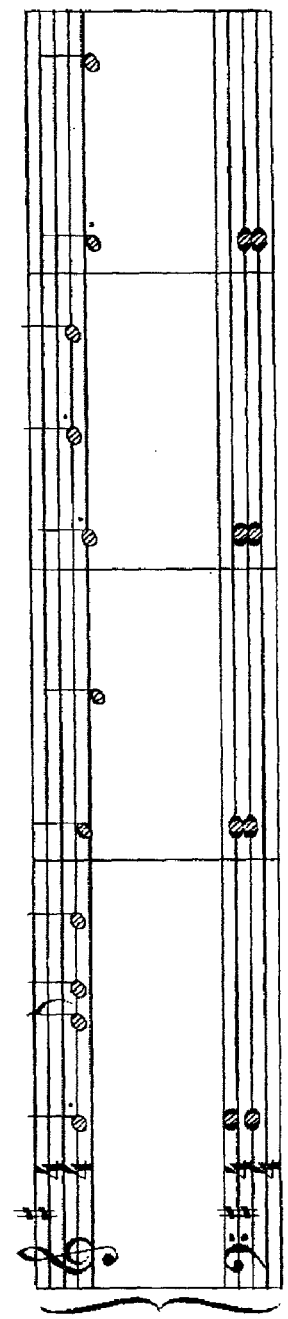

For example, the application of a color fill based on the wave language system described above can be used. FIGS. 42A–42C show the first four measures of the composition, "Puff the Magic Dragon." FIG. 42A shows the measures in conventional notation. FIG. 42B shows the measures in conventional notation with color fill (represented by diagonal lines), with the understanding that different colors pertaining to different notes will be applied as described above. The colorization functions as an intermediary step between the structure of conventional notation (FIG. 42A) and the entire elements of the Universal Staff 3800 (FIG. 38).

Another musical embodiment will be a refinement of the Universal Staff 3800 (FIG. 38) described above to include microtones. FIG. 37 shows a sound color circle 3720 which shows the alternating color pattern described (previously) as consisting of nearly complementary colors. FIGS. 19A–19C is used to show the wave language description of the inter-tone frequency range defined as microtones. The use of analogous color to describe the microtone range provides a mechanism for placing microtones in the Universal Staff 3800. Each line and each space on the Universal Staff 3800 represents one of the fundamental 12 colors-tones in chromatic order as shown in FIG. 18. The microtone range is then the range of frequency between these chromatic tone positions (1810, 1820 of FIG. 18). FIG. 19C shows 6 microtone color-tones between consecutive chromatic color-tones (C or yellow, and C# or red-violet in the example).

Figure 43:
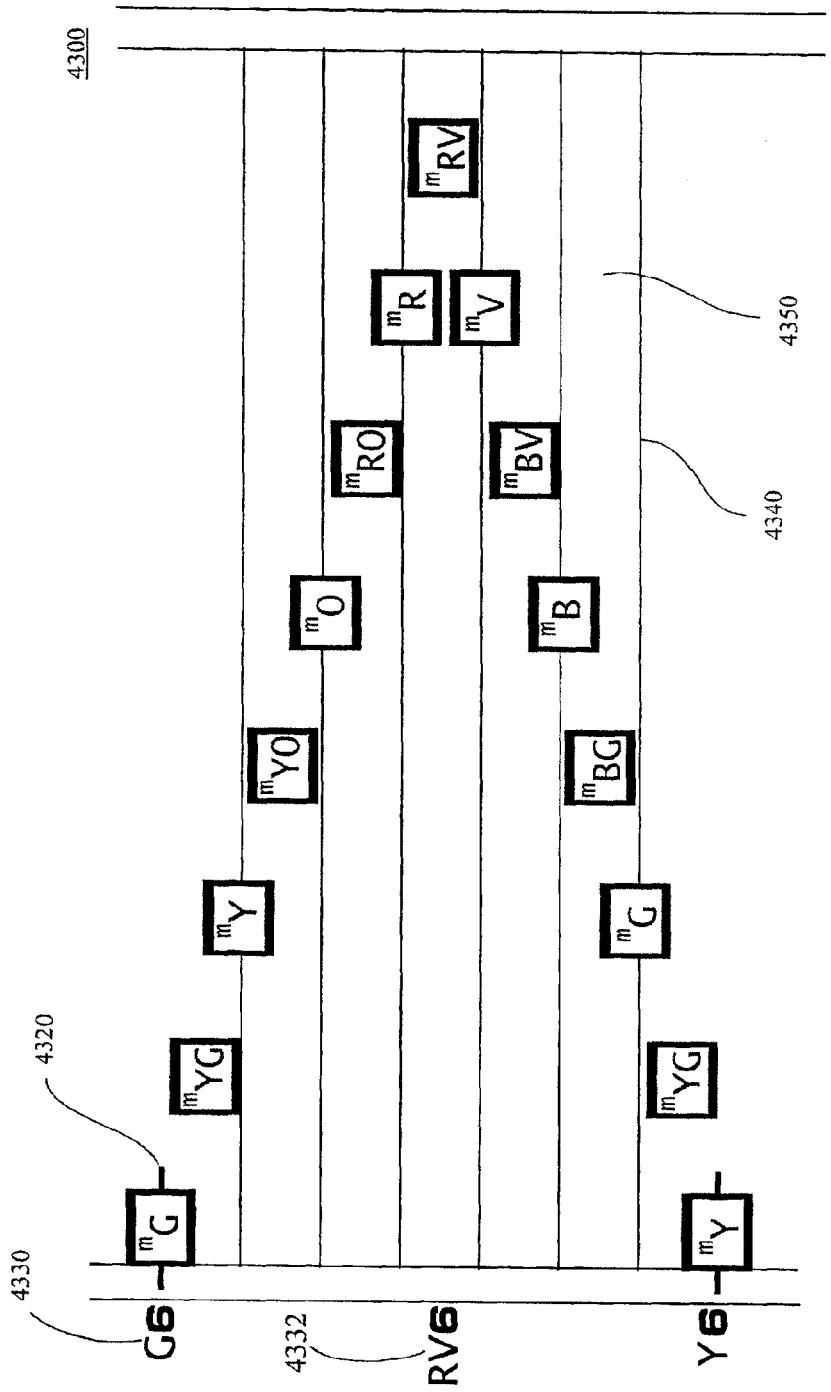
FIG. 43 is a schematic representation of the example notation grid of FIG. 38 expanded to include microtones, in accordance with a musical system embodiment of the color wave system described in association with FIGS. 1–28.

The microtone extension of the Universal Staff 3800 (FIG. 38) is defined as the Microtone Universal Staff 4300 shown in FIG. 43. The six microtone positions found between chromatic tones (consecutive lines and spaces on the Universal Staff 3800) are then added between consecutive lines and spaces as shown in FIG. 43. Shown are the tone positions yellow, red-violet, and green, located in octave 6 of the Universal Staff 3800, FIG. 38. The octave designators 3830, and tone positions as ledger lines 3845, lines 3850 and spaces 3855 of the Universal Staff 3800, are defined on the Microtone Universal Staff 4300 as a combination tone name/octave designator 4330, for example green-six or G6. The use of the ledger line 3845 on the Universal Staff 3800 becomes a line in the Microtone Universal Staff 4300. In the example shown in FIG. 43, and relating to FIG. 38, G6 4330 is a Universal Staff 3800 line position 3850, and RV6 4332 is a Universal Staff 3800 space position 3855. Between the RV6 and G6 Microtone Universal Staff 4300 positions there are three microtone lines 4340 and three microtone spaces 4350. The Microtone Universal Staff 4300 preferably uses a ledger line 4320 every fourteen positions as opposed to every twelve positions on the Universal Staff 3800. The microtone ledger line 4320 defines consecutive secondary tones, or consecutive one-word color names in the example, or consecutive two-word color names if the choice of color to Universal Staff 3800 position is changed. Each note on the Microtone Universal Staff 4300 is given a microtone name such as microtone green or ′″green or ′″G. As in the Universal Staff 3800, one-word color names are found on line positions 4340 on the Microtone Universal Staff 4300, and two-word color names are found on space positions 4350 on the Microtone Universal Staff 4300. It will be understood that although the one or two-word microtone color name is shown for each note, it will be understood that the notes will preferably be colored without the one or two word names within each note. However, in other embodiments, the microtone color names can appear within each note, in other embodiments. Further, only a portion of the Microtone Universal Staff 4300 is shown, with the understanding that the other tone positions can be shown. For example, the octave six blue, red-orange, and green tones are illustrated, with the understanding that each set of two consecutive tones from the Universal Staff 3800 adds fourteen positions to the Microtone Universal Staff 4300 at higher or lower frequencies.

With continued reference to FIG. 19C, navigating along the Microtone Universal Staff 4300 (FIG. 43), starting at the yellow six, Y6 note position and moving upward on the Microtone Universal Staff 4300 is the same as moving to the right along the schematic diagram of FIG. 19C. The next analogous microtone color on the Microtone Universal Staff 4300 moving upward from Y6 is the ′″YG or microtone yellow-green. The next analogous microtone color shown in FIG. 19C moving to the right from yellow or C is microtone yellow-green. Moving downward on the Microtone Universal Staff 4300 is the same as moving to the left along FIG. 19C. Starting with RV6 on the Microtone Universal Staff 4300 the next analogous color moving downward is microtone Violet or ′″V. The next analogous microtone color shown in FIG. 19C moving to the left from RV or red-violet is microtone violet or ′″V.

The Microtone Universal Staff 4300, like the Universal Staff 3800 (FIG. 38), can be formed in or on any medium such as paper, a computer screen or on a physical device which is used to generate frequencies such as musical instruments among others. Preferably, the musical instruments selected will have mechanisms to provide sound based on the color/notes selected from the notation grids described above in a on-to-one correspondence.

Figure 44:
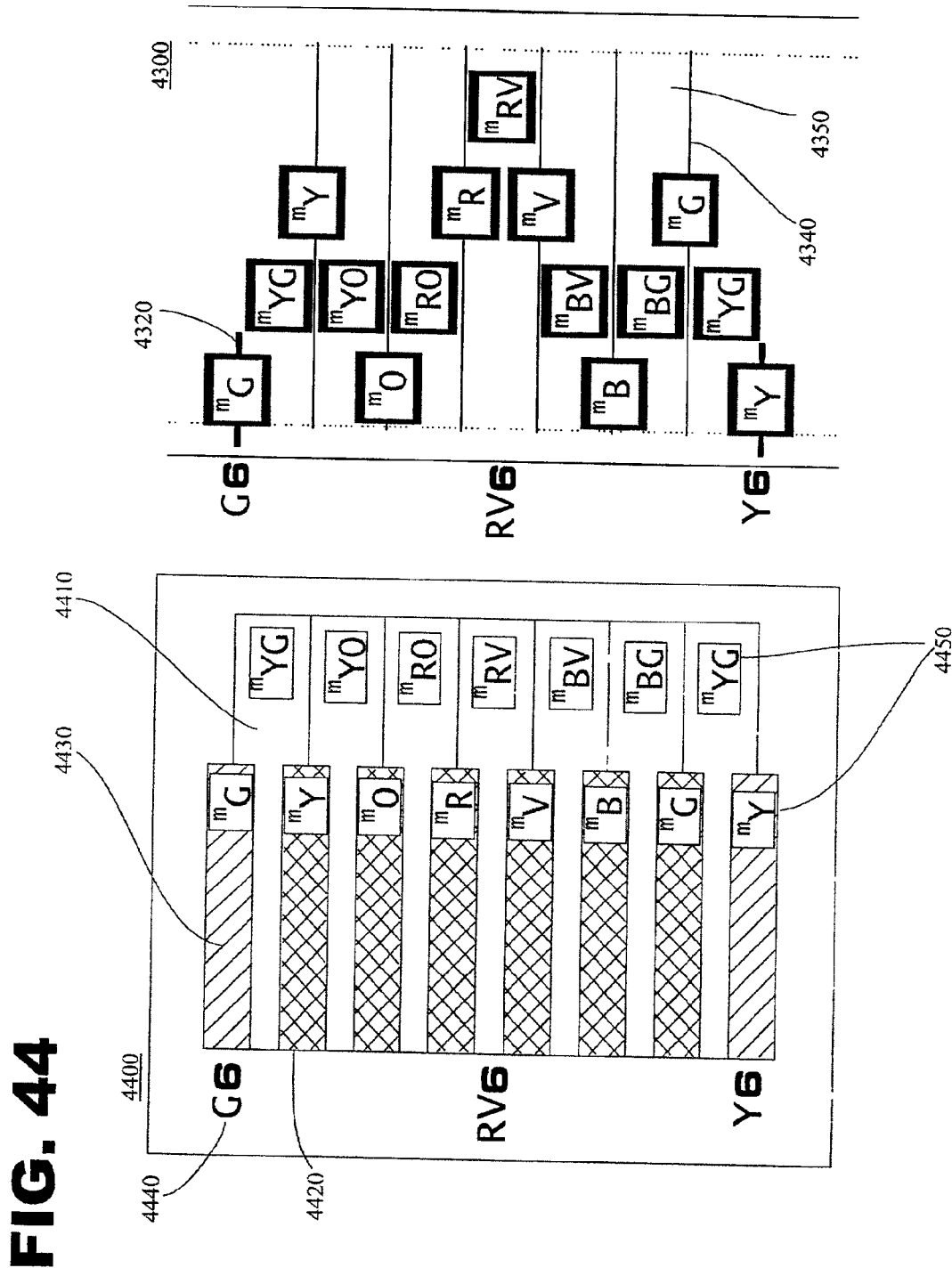
FIG. 44 is a composite diagram of the example notation grid of FIG. 43 and an example musical keyboard that mirrors the example notation grid, in accordance with a musical system embodiment of the color wave system described in association with FIGS. 1–28.

The keyboard, or Microtone Universal Keyboard 4400, described in association with portions of the Microtone Universal Staff 4300 (FIG. 43), has been developed to provide, among other advantages, the same organization of the colored notes as the Microtone Universal Staff 4300. The description of the Microtone Universal Keyboard 4400 specifically describes the application of the Microtone Universal Staff 4300 to a musical frequency generating device but includes within its descriptions application to any frequency generating device. The Microtone Universal Keyboard 4400 preferably includes keys for colored notes for 144 notes (12 octaves of microtones would be 7 times 144), although keyboards of fewer or greater notes are considered within the scope of the preferred embodiments. FIG. 44 illustrates the black key 4420 and the white key 4410 and the gray key 4430 (gray key shown with diagonal lines to distinguish from black keys 4410) portions of the Microtone Universal Keyboard 4400, corresponding to the colored line positions 4340, the colored ledger line positions 4320, and the colored space positions 4350 of the Microtone Universal Staff 4300 (which is reproduced in FIG. 44) ranging from yellow 6 or Y6 to green six or G6 (as indicated by the chromatic/octave tone position 4330).

Each key preferably includes a colored portion 4450, preferably at the end of each key (i.e., nearest the person playing the instrument or frequency generating device). The colored portion 4450, in alternate embodiments, can be located elsewhere on the key, or on the non-key portion of the Microtone Universal Keyboard 4400, and/or the entire key can be colored the color of the colored portion 4450. Every two chromatic tone steps (or fourteen microtone steps) is preferably denoted by gray key 4430 which corresponds to the microtone ledger line 4320. Also, every chromatic/octave designation 4330 (e.g., Y6 and RV6) on the left of the Microtone Universal Staff 4300 preferably has a matching chromatic/octave designation on the Microtone Universal Keyboard 4400. Other key colors can be used to distinguish the start of each double chromatic step (fourteen microtone steps) from the rest of the black keys. Other key colors besides black may be used and still be considered within the scope of the preferred embodiments. Note that the chromatic/octave designations 4440 are preferably located on the keyboard structure (i.e., non-key structure) above each gray key and above the white key 4460 centered between two consecutive gray keys. Other embodiments can omit this designation from the keyboard structure. Every line 4340 on the Microtone Universal Staff 4300 and the ledger line 4320 has a matching black note or gray note on the Microtone Universal Keyboard 4400. For example, looking at the black note with the colored portion 4450 that is microtone blue (i.e., "microtone-blue-black" key) on the keyboard, and then following it to the right, the "microtone-blue-black" key matches up with the microtone blue-note line of the Microtone Universal Staff 4300. Every space 4350 on the Microtone Universal Staff 4300 has a matching white note on the Microtone Universal Keyboard 4400. Moving up on the Microtone Universal Staff 4300 is the same as moving right on the Microtone Universal Keyboard 4400, and moving down on the Microtone Universal Staff 4300 is the same as moving left on the Universal Keyboard 4400.

Figure 45:
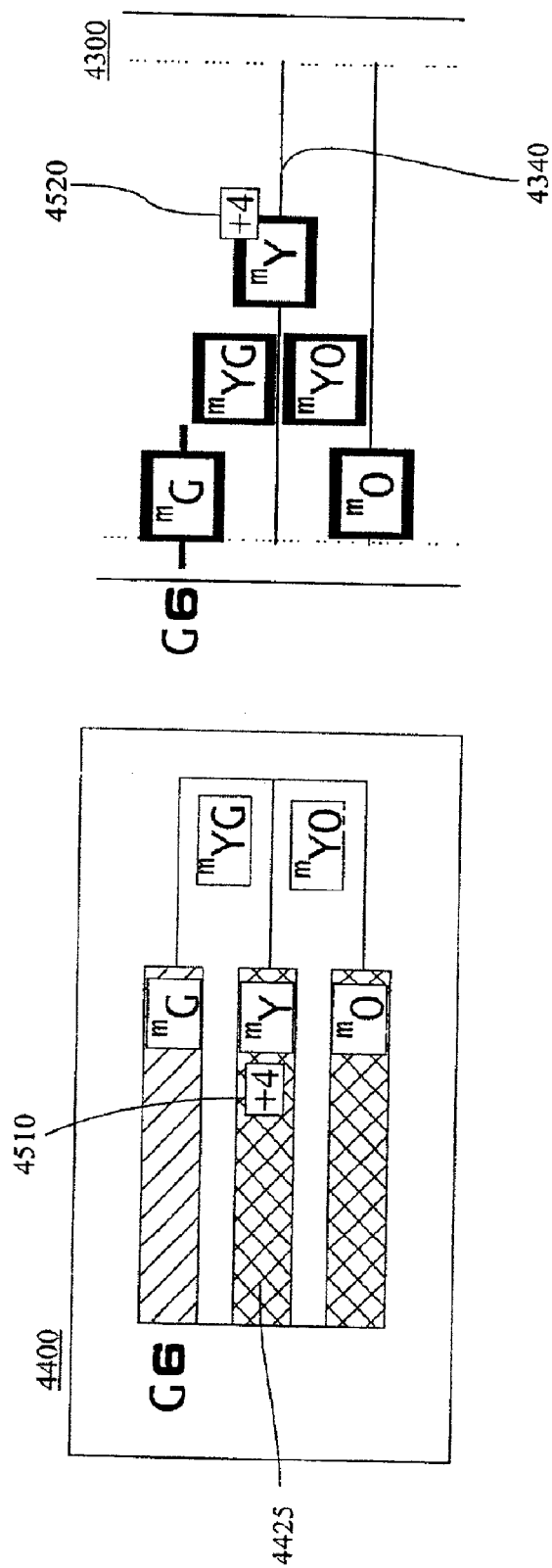
FIG. 45 is a schematic representation of a portion of the example musical keyboard of FIG. 44 and the example notation grid depicted in FIG. 43, with a deviation position assigned to the keys of the keyboard and the notes of the notation grid, in accordance with a musical system embodiment of the color wave system described in association with FIGS. 1–28.

The colored portion 4015 of the Universal Keyboard 4000 (FIG. 40) (and similar embodiments), and the note on the Universal Staff 3800 (FIG. 38), and the colored portion 4450 of the Microtone Universal Keyboard 4400 (FIG. 44), and the note on the Microtone Universal Staff 4300 (FIG. 43), can be represented by numbers or letters, and can be represented as an approximation to the specific microtone or tone. FIG. 45 shows a modified black key 4425 on the Microtone Universal Keyboard 4400 with an altered cent value 4510 of +4 cents, and a corresponding cent change 4340 to a note on a line position 4540 on the Microtone Universal Staff 4300. The number description applied to the key and the staff is one example among others of describing the change in frequency from the fundamental assigned frequency of a microtone or tone.

The application of microtones to the Universal Keyboard 4000 (FIG. 40) may be applied directly to an existing Universal Keyboard 4000 in which case the gray note 4025 (FIG. 40) of the Universal Keyboard octave will not match up with the microtone ledger line 4320 (FIG. 43). In this circumstance the gray note 4025 (FIG. 40) and the black note 4005 (FIG. 40) are commonly referred to as 'black' notes which are preferably assigned to the lines 4340 and ledger lines 4320 of the Microtone Universal Staff 4300 (FIG. 43).

Another musical embodiment will be a harmonic wave expansion of the Universal Staff 3800 (FIG. 38) and by default the Microtone Universal Staff 4300 which is an expansion of the Universal Staff 3800. FIG. 15 shows an example of a harmonic wave including color descriptions of each harmonic position. The energy positions such as the nodes, anti-nodes, maximum amplitudes, and other wave positions define tones or microtones, or are defined by them. In an energy structure such as a circuit or a musical composition, among others, sections of the energy structure form harmonic wave patterns and other energy relationships defined and controlled by the harmonic wave principles. These sections of harmonic waves and wave relationships are described (previously) as words, sentences and more complex language structures. A physical, visual, and aural language transmission or expression is needed to express elements and relationships of the harmonic wave.

Figure 46A:
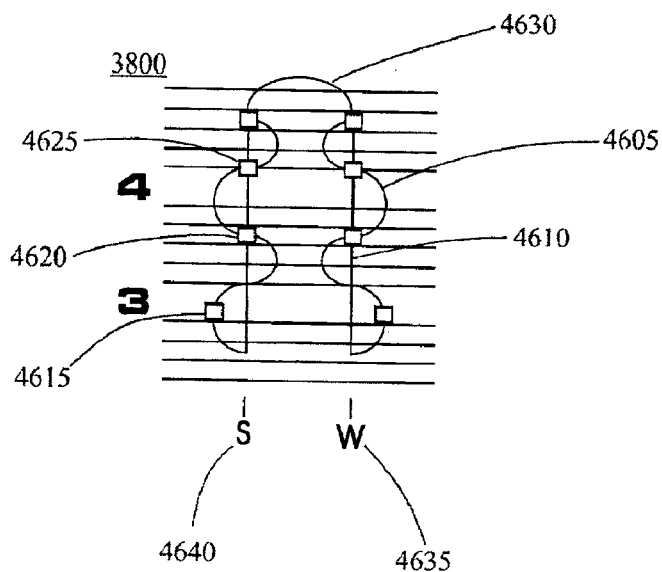
FIGS. 46A–46C are schematic representations of harmonic wave activity connecting notes in the notation grid of FIG. 38, in accordance with a musical system embodiment of the color wave system described in association with FIGS. 1–28.
Figure 46B:
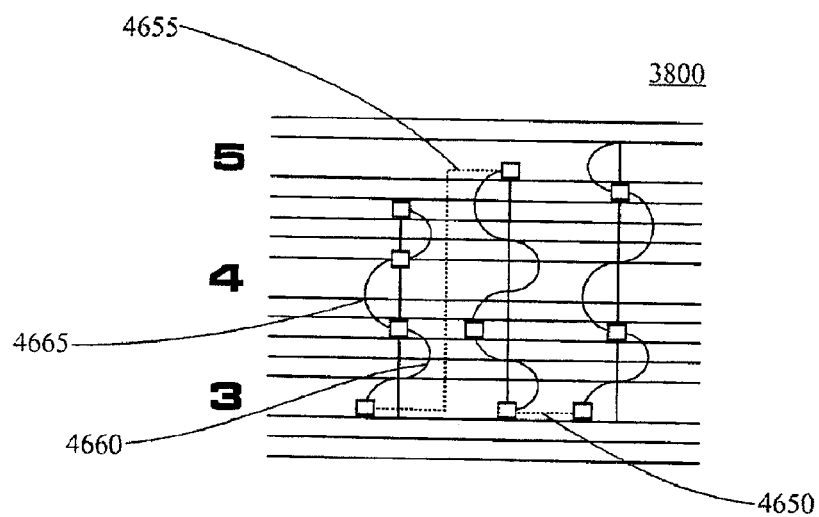
Figure 46C:
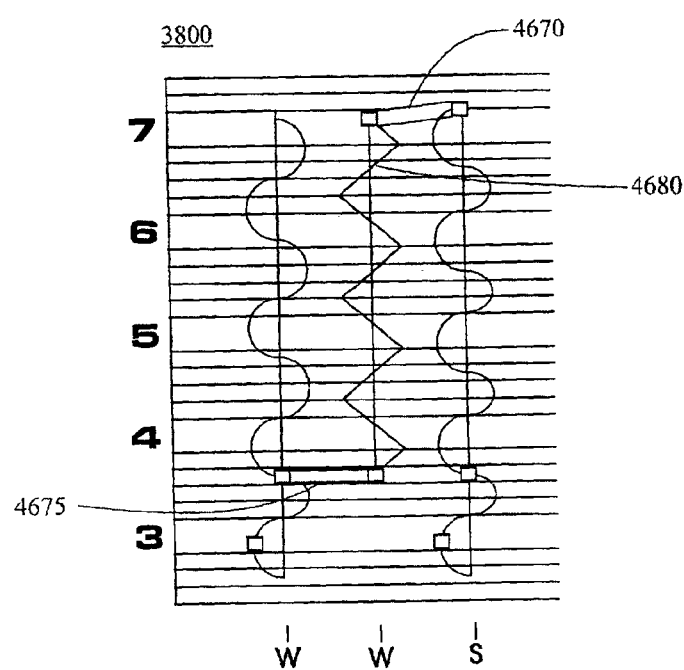

FIGS. 46A–46C show a representation of the harmonic wave on the Universal Staff 3800. In FIG. 38, a series of line notes 3850 and space notes 3855 are represented on the Universal Staff 3800. Considering FIG. 46A, a line 4610 is drawn through the vertically aligned notes which represents the neutral or node/anti-node part of the harmonic wave. A curved line 4605 connects the notes and represents the harmonic wave in which the connected notes exist. Referring to FIG. 46B, with continued reference to FIG. 46A, the first-half wave cycle 4665 is shown as the larger section of the harmonic wave, and the second-half wave cycle 4660 is shown as the smaller section of the harmonic wave. Not all positions on the wave are shown as physically existing notes but the positions are implied. The represented wave positions are the maximum amplitude 4615 (FIG. 46A), the node 4620 (FIG. 46A), and the anti-node 4625 (FIG. 46A).

In FIG. 46A, each vertical wave represents a rhythmic element, which has a strong beat 4640 or a weak beat 4635. A strong beat 4640, represented by S, is defined by motion through the harmonic wave in prime spin or retrograde-prime spin. A weak beat 4635, represented by W, is defined by motion through the harmonic wave in the inversion spin or retrograde-inversion spin. Since a wave can be overtone (increasing frequency) or undertone (decreasing frequency) a strong beat or a weak beat can have increasing or decreasing frequency motion depending upon the type of harmonic wave. A connecting curve 4630 is preferably used to connect the rhythmic harmonic waves into a series of energy points, which form circuits. For example, if a harmonic wave is repeated using a strong and weak beat then the flow of energy through the tones completes a circular motion or energy circuit. In other circumstances the connection between harmonic waves does not follow the simple strong and weak beat circuit. For example, and referring to FIG. 46B, two waves having a weak beat to weak beat relationship may be directly bonded through an amplitude to node bond 4650, or two waves having a strong beat to strong beat relationship may be directly bonded through an amplitude to node bond 4655. The amplitude to node bonds are represented as dotted lines.

Referring to FIG. 46C, if a tone is held such that it can be applied to more than one harmonic wave structure then a connecting bar 4675 having the same color as the held note is used to connect the multiple rhythmic wave positions. If two tones are connected through a related neutral wave position as defined by the overlap of overtone and undertone anti-nodes and perceptual wave anti-nodes, then a gray bar 4670 is preferably used to connect the tones. If two tones in the same wave structure have a perceptual wave relationship, for example a complementary color relationship, then an angled wave 4680 is used in place of a curved harmonic wave to connect the tones.

FIGS. 46A–46C show only the vertical energy or frequency positions relative to the harmonic and perceptual waves. The wave language system can be applied to horizontal or time based rhythmic positions, which correspond to points on a harmonic or perceptual wave. Subsequently, a horizontal wave structure can be grouped as a unit and a series of such units can be organized into a larger wave. This wave grouping function can be extended to describe the entire composition or circuit or energy structure as a single harmonic or perceptual wave or even a single tone or frequency.

Another musical embodiment relates to volume, or rather, a volume description that preferably uses the Universal Staff 3800 (FIG. 38) and by default the Microtone Universal Staff 4300 (FIG. 43) which is an expansion of the Universal Staff 3800. The volume description of the Universal Staff 3800 is defined as the Volume Universal Staff 4700 shown in FIG. 47. Volume is a description of energy intensity at a given frequency or energy level. Individual frequencies or harmonic waves are related by their respective volumes according to fundamental harmonic or perceptual wave relationships. Since volume defines a unit of energy, and the various harmonic positions define units of energy, and the harmonic wave represents units of energy, then volume is interchangeable with frequency. For example, if a position of 2 Hz. has a volume intensity $I_o$, then a position of 2 Hz. with a volume intensity 2 $I_o$ is interchangeable with a position of 4 Hz. having a volume intensity of $I_o$.

In order for the Volume Universal Staff 4700 to have specifically defined parameters, the volume generating device with which it is associated must be tested and assigned a volume reference value for its frequency range. When each volume generating device has an assigned volume reference value for its frequency range, then a standardized volume reference exists from device to device which can then be used to accurately express volume designations in the Volume Universal Staff 4700.

In order for the volume octaves of the Volume Universal Staff 4700 to match the octave assignments of the Universal Staff 3800 (FIG. 38), the wave language system describes a new terminology to replace decibels. The decibel range approximately completes octaves every 3 decibels. Two alternate forms exist for the Volume Universal Staff 4700, including a chromatic volume number 4730 (FIG. 47B), which defines each chromatic volume tone 4720 (FIG. 47A) position, and an octave volume number 4710 (FIG. 47A), which defines each volume octave. The equation for generating the volume chromatic tones 4720 is $39.86313714\log_{10}(I/I_o)$. A sample change in intensity from 1 to 2 generates a volume chromatic tone range from a reference 0 to 12 where $39.86313714\log_{10}(12I/I_o)=12$. The equation for generating the volume octave position is $3.321928095\log_{10}(I/I_o)$. A sample change in intensity from 1 to 2 generates a volume octave range from 0 to 1, or a change of 1 octave. The term for volume chromatic tone numbers is chromabel, and the term for volume octave numbers is octabel.

The application of chromabels 4730 (FIG. 47B) or octabels 4710 (FIG. 47A) to the Volume Universal Staff 4700 is not limited to a zero reference at the threshold of hearing. Any intensity level can be chosen for a reference zero-bels. For example, if a reference of 20 decibels is chosen to be the reference zero then each calculated volume tone or volume octave is lowered by 20 decibels or the equivalent chromabels or octabels. The Volume Universal Staff 4700 preferably uses the same elements as the Universal Staff 3800 (FIG. 38) except when using the chromabel numbers 4730 to replace the octabel numbers 4710.

Figure 47A:
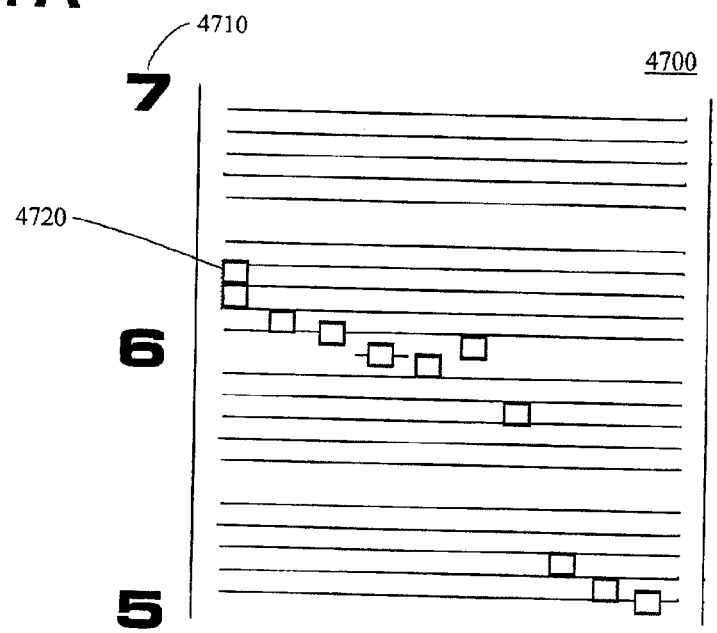
FIGS. 47A–47B are schematic representations of volume using the notation grid of FIG. 38 with the octave numbers expanded to include chromatic tone numbers, in accordance with a musical system embodiment of the color wave system described in association with FIGS. 1–28.
Figure 47B:
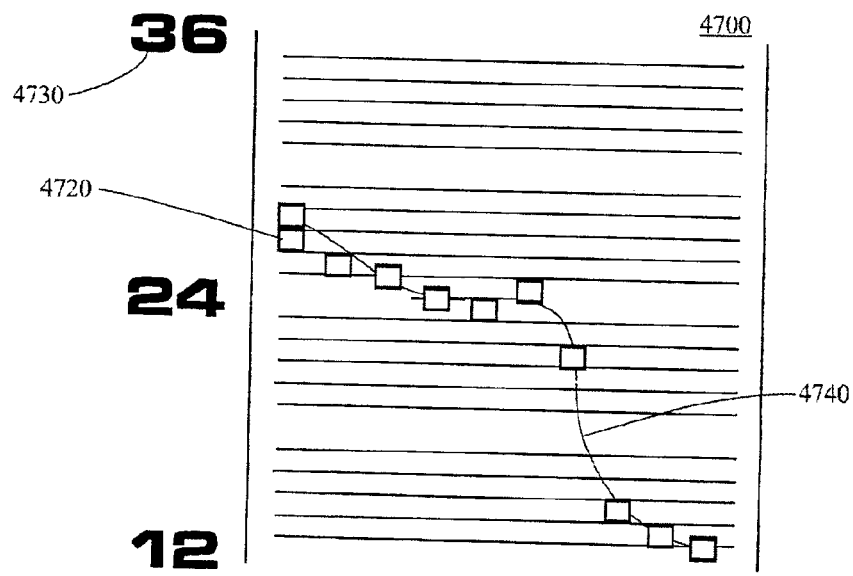
Figure 48:
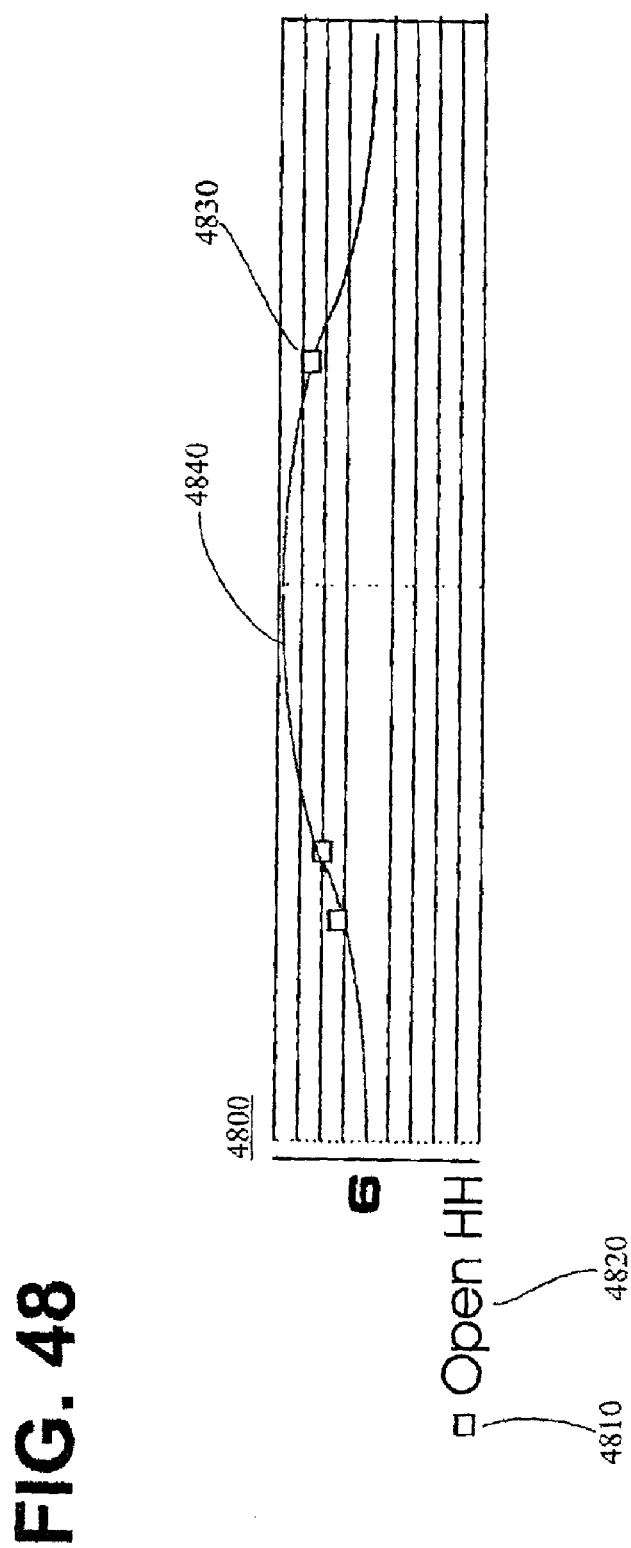
FIG. 48 is a schematic representation of rhythm notes in the notation system of FIG. 38 with a harmonic wave representation connecting the various rhythm notes, in accordance with a musical system embodiment of the color wave system described in association with FIGS. 1–28.

Volume is preferably constantly changing from note to note. The volume of a single note or a group of notes can be represented by volume lines 4740 (FIG. 47B). The volume path of a composition, represented by volume lines 4740, are used to show the volume wave patterns.

Another musical system embodiment will be a time description preferably of the Universal Staff 3800 (FIG. 38) and by default the Microtone Universal Staff 4300, which is an expansion of the Universal Staff 3800. The time description of the Universal Staff 3800 is defined as the Rhythm Universal Staff 4800 shown in FIG. 48. The Rhythm Universal Staff 4800 has the same structure as the Universal Staff 3800 but a different application of notes. A particular note head, for example a square note head, is defined as a rhythm note head 4810 and is associated with a particular time keeping device such as an open high hat rhythm instrument (Open HH 4820). The notes of the Open HH 4820 are placed on the Rhythm Universal Staff 4800 at the appropriate frequency and time position 4830. A line 4840 connecting the rhythm positions shows where each rhythm position falls on the rhythm harmonic wave.

Figure 49:
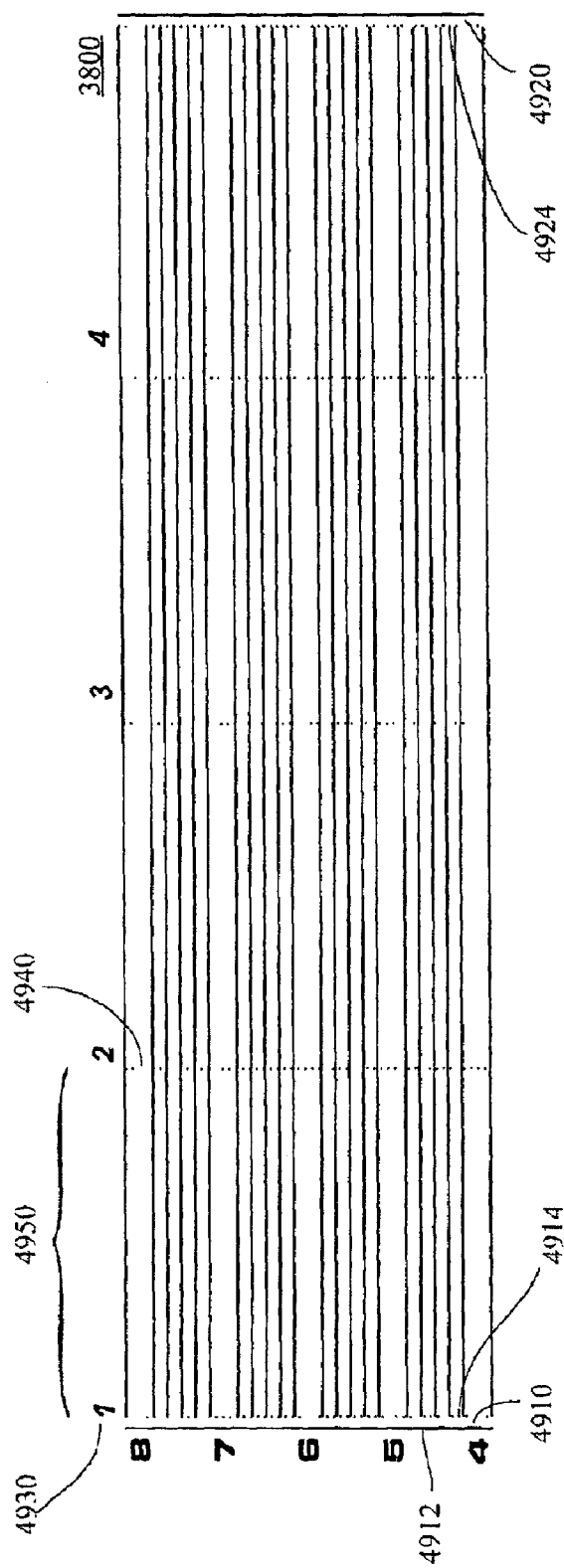
FIG. 49 is a schematic representation of units of time, which segment the notation system of FIG. 38, in accordance with a musical system embodiment of the color wave system described in association with FIGS. 1–28.
Figure 50:
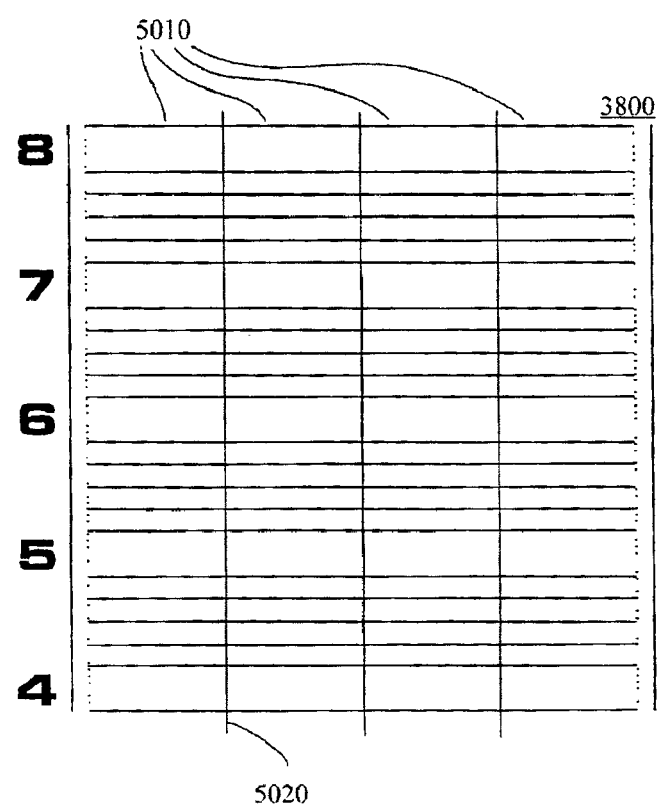
FIG. 50 is a schematic representation of further divisions of units of time, which segment the notation system of FIG. 38, in accordance with a musical system embodiment of the color wave system described in association with FIGS. 1–28.

Another musical system embodiment is the description of the note time values and the waves and/or wave relationships which certain groupings of note time values can describe, as shown in FIG. 49. The Universal Staff 3800 defines a specific unit of time called the Unit Measure 4950. The Unit Measure 4950 is defined as the time length of 1 harmonic wave. Recall that FIG. 4 shows the first three octaves of a harmonic wave. Each octave defines the length of the Unit Measure 4950. Music compositions and other energy structures are preferably divided into phrases consisting of one or more Unit Measures 4950. The start of a phrase is shown as a white bar 4910 with a solid line 4912 on the left side of the white bar 4910 and a dotted line 4914 on the right side of the white bar 4910. The dotted line 4914 defines the start of the first Unit Measure 4950 of the phrase. The end of the phrase is shown as a white bar 4920 with a solid line 4922 on the right side of the white bar 4920 with a dotted line 4924 on the left side of the white bar 4920. The dotted line 4924 represents the end of the last Unit Measure 4950 of the phrase. If the phrase contains more than one Unit Measures 4950 the Unit Measures 4950 are separated by a dotted line 4940. The number of the Unit Measure 3950 which represents each new complete harmonic wave cycle is called the measure counting number 4930 and is preferably located above each Unit Measure 4950 at or near the beginning of each Unit Measure 4950. Note that other line formats, for example alternate dashes, dashes, etc. can similarly be used to designate beginning and endings of phrases The fundamental counting division of the Unit Measure 4950 is the third octave of the harmonic wave. The third octave of the harmonic wave (see FIG. 4) is defined by the harmonic numbers 4, 5, 6, and 7. When a constantly changing time is assumed, these four harmonic positions are counted the same way four quarter notes are counted in ¼ time, or 1, 2, 3, 4, 1, 2, 3, 4, etc., with each beat having the same rhythmic length of time. FIG. 50 shows the division of the Unit Measure 4950 (FIG. 49) by 4 equal length time divisions 5010. Each division is physically, visually and aurally one fourth of the Unit Measure 4950.

There are multiple time divisions of the Unit Measure 4950 (FIG. 49), which create a need for a global time division, which can be used to reference all other time divisions. The global time division for the Unit Measure 4950 is preferably 1200 time units called ticks. One fourth of the Unit Measure 4950 would then be 300 ticks. A tick value can include decimals. For example, one seventh of the Unit Measure 4950 would be approximately 171.43 ticks.

Time and distance are functionally the same thing in the wave terminology of the wave language system. The length of a wave defines unit time and the length of a wave defines distance. But distance represents a unit of energy and just as with volume, distance can be quantified by harmonic wave properties. Each harmonic represents a different time element when not assuming a constantly changing time. The Unit Measure 4950 (FIG. 49) is fundamentally referenced to the 4th harmonic which begins the third harmonic octave and is defined as a time reference of 1 which is the time it takes to complete the Unit Measure. The term for the Unit Measure time is tempo.

Drawing from the description of the wave language system in FIGS. 1–28, overtone harmonic 2 represents a time length twice that of overtone harmonic 4 which means that if the time reference of the Unit Measure is changed from overtone harmonic 4 to overtone harmonic 2, then the tempo changes from 1 to ½. A ½ tempo is twice as slow as a 1 tempo. Overtone harmonic 3 represents a time length ¾ that of overtone harmonic 4 and is ⅔ as slow. Each harmonic can then be referenced to the fundamental 4th harmonic for either overtone or undertone harmonic time units.

Figure 51A:
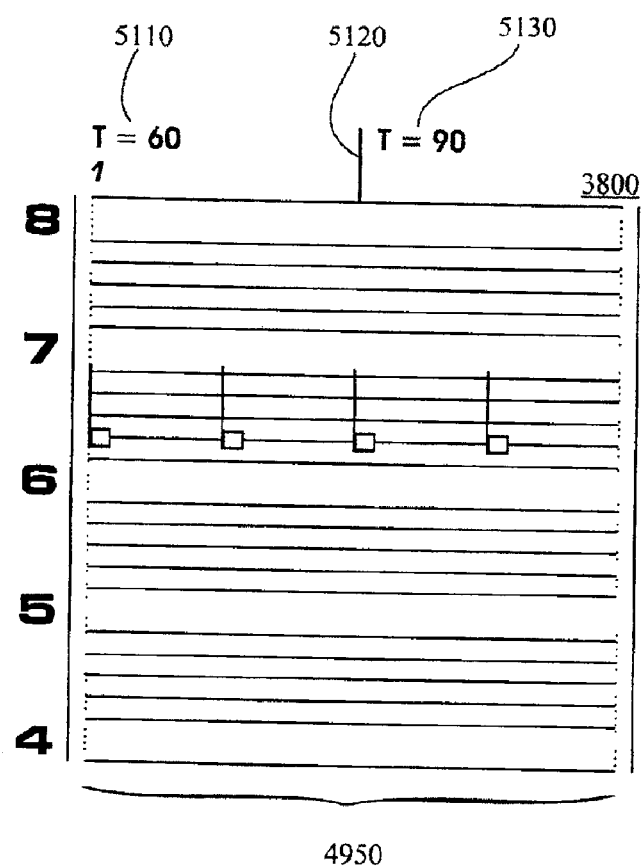
FIGS. 51A–51B are schematic representations of the application of tempo to units of time for the notation system of FIG. 38, in accordance with a musical system embodiment of the color wave system described in association with FIGS. 1–28.
Figure 51B:
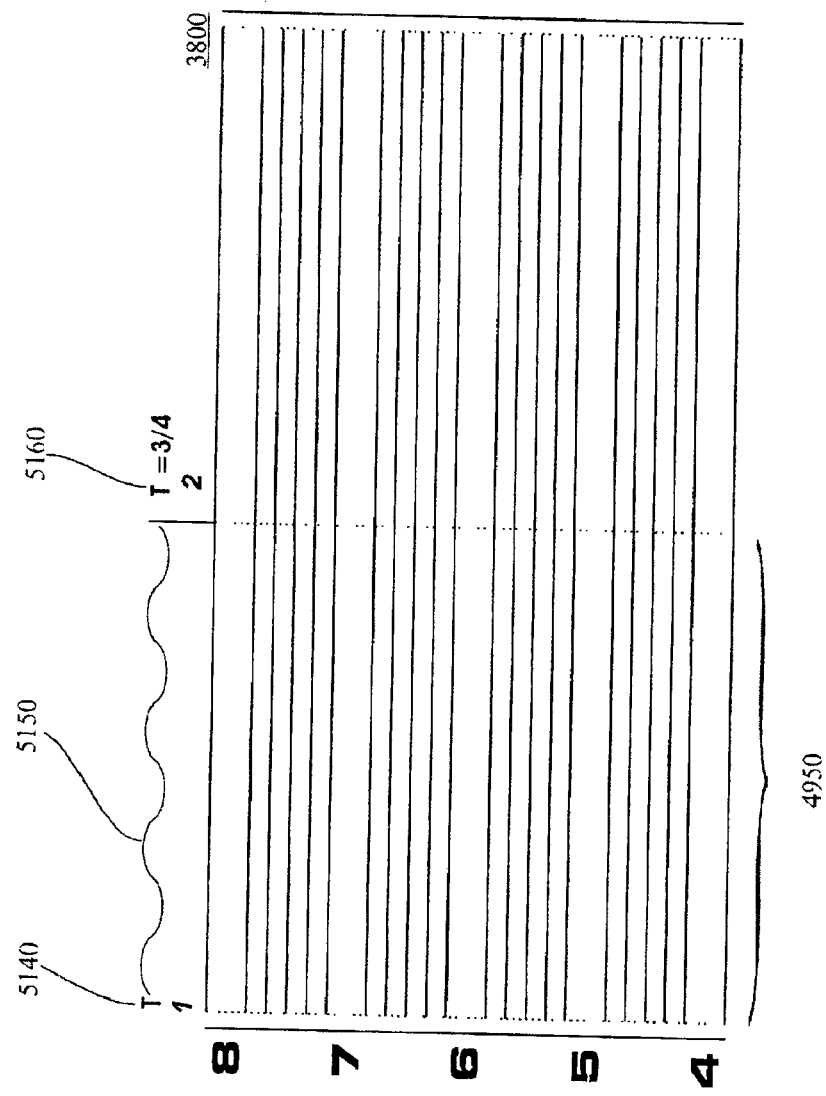

Tempo has a global time division referenced at beats per minute. A reference tempo of 1 must be assigned a number of beats per minute. For example, if the reference tempo for a wave structure is defined as 60 beats per minute then all tempo changes will be referenced to 60 beats per minute. (FIGS. 51A–51B show the tempo designations of the Unit Measure 4950). The tempo number in beats per minute 5110 is preferably placed above the Unit Measure 4950. If the tempo changes during the Unit Measure 4950 then a line 5120 is drawn at the exact position of the tempo change followed by the new tempo 5130.

Referring to FIG. 51B, if the fundamental tempo is referenced in the introduction to the composition or wave structure, then T 5140 or T=1 defines the fundamental tempo. The tempo can be referenced as changes to the fundamental tempo (reference of 1 time unit). For example, a ¾ tempo 5160 represents ¾ of the fundamental tempo.

Some tempo changes occur as a constantly changing tempo over part or all of the Unit Measure 4950. The constantly changing tempo begins with the currently defined tempo 5140 and ends with the ending defined tempo 5160 and is defined by a wavy line 5150 connecting the starting and ending tempos of the tempo change.

Specific frequencies or tones have defined lengths within the tempo of the Unit Measure 4950 (FIG. 49). As with tempo, the length of a tone has harmonic properties and needs a visual identifier which clearly communicates the harmonic number it defines. The fundamental division of the Unit Measure 4950 is four units of equal length. Each fourth of a Unit Measure 4950 is defined by note head 5220 (FIG. 52A), having four sides (geometric square) referencing the division of the Unit Measure 4950 by 4. A fourth note 5230, which has a length of one fourth of the Unit Measure 4950, has square note head 5220 and a stem 5210. The stem 5210 shows the exact placement in the Unit Measure 4950. The stem can also have a single line or flag 5235, which represents a division of the fundamental note length by 1. For example, a fourth note 5230 with a single flag or without a flag has the same value.

The remaining fundamental note heads (FIG. 52B) are the triangle or third note 5240, the pentagram or fifth note 5250, the seven point star or seventh note 5260, the circle or twelfth tone 5270.

Figure 52A:
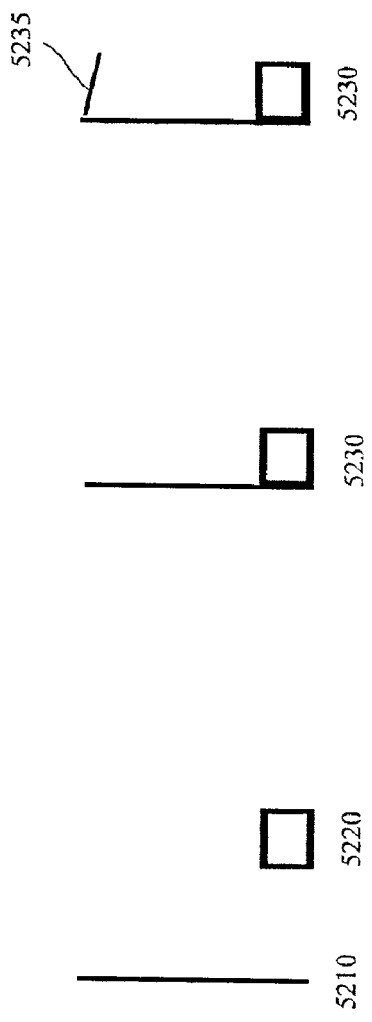
FIGS. 52A–52B are schematic representations of fundamental time values represented by notes having geometric shaped note heads for the notation system of FIG. 38, in accordance with a musical system embodiment of the color wave system described in association with FIGS. 1–28.
Figure 52B:
Figure 52B:
Figure 52B:
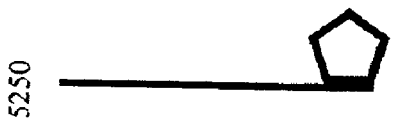
Figure 52B:
Figure 53A:
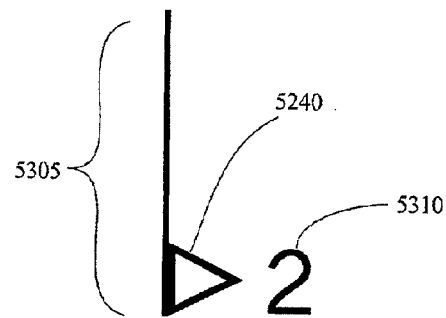
FIGS. 53A–53E are schematic representations that provide further definitions of the fundamental time values of FIGS. 52A–52B, which define methods for dividing or multiplying or grouping the fundamental note time values, in accordance with a musical system embodiment of the color wave system described in association with FIGS. 1–28.

The reference value of a note as defined by the note head can be extended by multiplying the reference value by a number. FIG. 53A, which incorporates portions of FIGS. 52A and 52B, shows a two thirds note 5305 comprised of a third note 5240 with a fundamental reference of one third of the Unit Measure 4950 (FIG. 49) multiplied by 2 (5310). In the example the number 2 multiplier 5310 is placed to the right of the note head of the third note 5240. The third note 5240 with a 2 multiplier 5310 is read as a two thirds note 5305 which last twice as long as a third note 5240 or two thirds the length of the Unit Measure 4950.

Figure 53B:
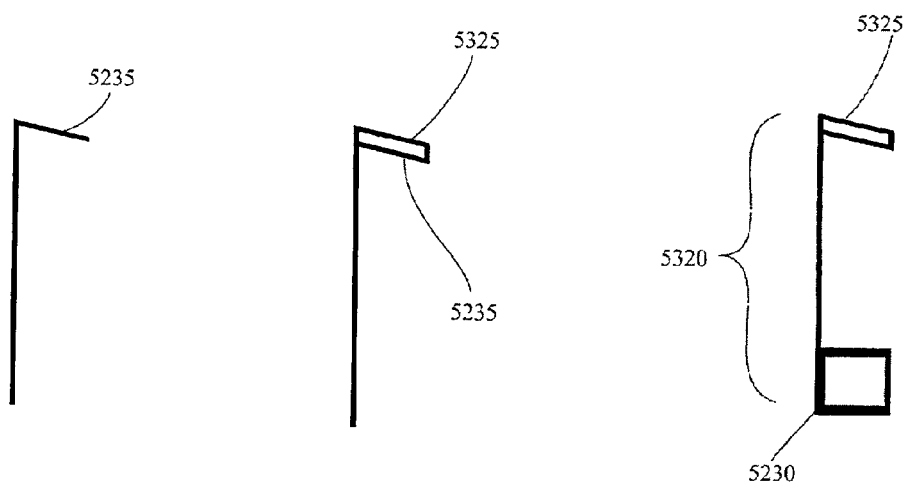

The reference value of a note as defined by the note head can be shortened by dividing the reference value by multiples of 2. Each division by 2 is shown as new flag addition. FIG. 53B shows a stem 5210 with a single flag 5235 which represents a division by 1, and a stem with a second flag 5325 which represents a division by 2, and a fourth note 5230 with two flags 5325 which is a fourth note divided by 2 and is read as an eighth note 5320.

Figure 53C:
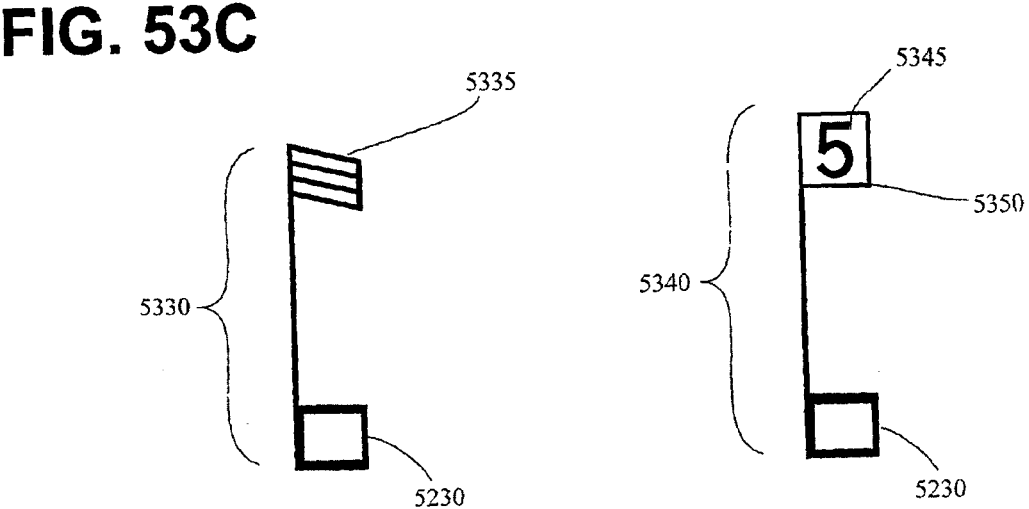
Figure 53D:
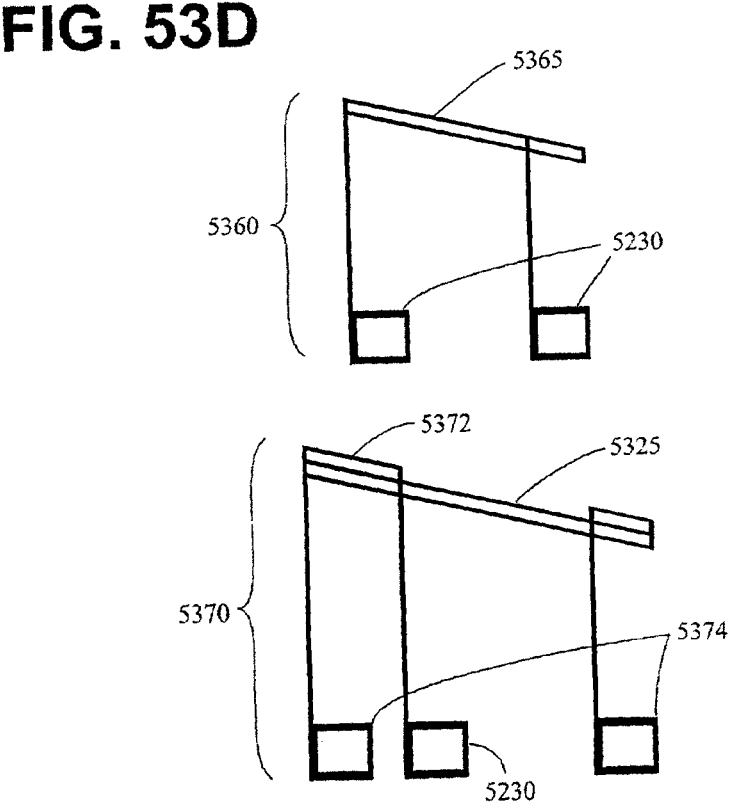

FIG. 53C shows a thirty second note 5330 which is a fourth note 5230 divided by 3 octaves or $2^3$ or 8. The division by 8 is represented by 4 flags 5335. Each flag after the first flag represents a multiple of 2 and the total flags act as the divisor to the fundamental note length.

Four flags is preferably the limit before using a box 5350 with a number 5345 representing the number of flags. For example, the sixty-fourth note 5340 has 5 flags for a total division of 16 or 1×2×2×2×2. The five flags are represented by the number 5 (5345) which is placed in a box 5350 representing the totality of flags.

Two or more notes can be grouped to represent a unit counting amount. For example, two eighth notes 5320 (FIG. 53D) can be grouped to represent a fourth note counting amount 5360. When notes are grouped their flags 5365 are extended to tie the notes together. For example, a grouped counting time 5370 representing a fourth note 5230 can be comprised of a sixteenth note 5374 plus an eighth note 5320 plus a sixteenth note 5374. The flags 5372 of the first sixteenth note 5374 are extended to the eighth note 5320. The flags 5325 of the eighth note 5320 are extended to the next sixteenth note 5374.

Figure 53E:
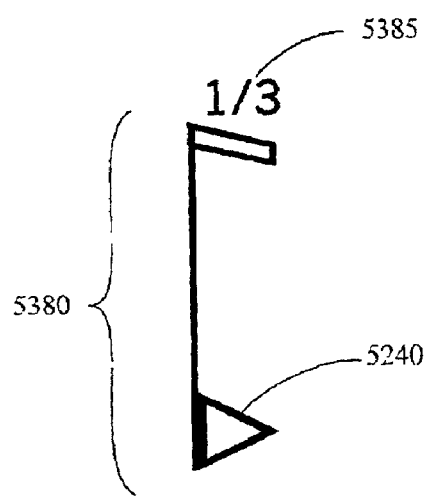

A divisor other than 2 is denoted by placing the new multiplier 5385 (FIG. 53E) above the note flags. FIG. 53E shows a ⅓ multiplier (5385) placed above the flags signifying that the new divisor is 3, or the new multiplier of the reference divisor of 1 is ⅓. Each flag except for the first flag then represents a new multiple of 3. For example, two flags represents 1×3 as the divisor, and 3 flags represents 1×3×3 or 9 as the divisor. The ninth note 5380 is shown as a third note 5240 with two flags and a ⅓ multiplier 5385 which means that the flags represent a 1×3 divisor or a third note divided by 3 which is a ninth note.

Figure 54A:
FIGS. 54A–54D are schematic representations that provide further definitions of the fundamental time values of FIGS. 52–53 by defining methods for defining summation time value series to the fundamental note time value after all other time manipulations, and singular time additions after all other time manipulations, in accordance with a musical system embodiment of the color wave system described in association with FIGS. 1–28.

A wave property which crosses different time references is a series curve or limit curve. The fundamental limit curve is the (½) series. For example, starting with a fourth note of ¼ time value, a series is generated where each new position is half of the previous position. For example, ¼, ⅛, ¹⁄₁₆, ¹⁄₃₂, etc. The summation of this series defines a new type of notation called dotted notes. In FIG. 54A, for example, a singly dotted fourth note 5410 is a fourth note 5230 followed by a single dot 5415 and represents a time value of ¼+⅛ for a total time value of three eighths. There is no limit to the number of dots, which can be applied to a note. However, in many cases a functional limit exists in which case preferably a single dot followed by a number representing the total dots to be applied is placed in brackets following the note. For example, an eight dotted quarter note 5420 representing ¼+⅛+¹⁄₁₆+¹⁄₃₂+¹⁄₆₄+¹⁄₁₂₈+¹⁄₂₅₆+¹⁄₅₁₂+¹⁄₁₀₂₄ is shown with a single dot 5415 followed by an 8 (5425) all within brackets 5428.

Figure 54B:
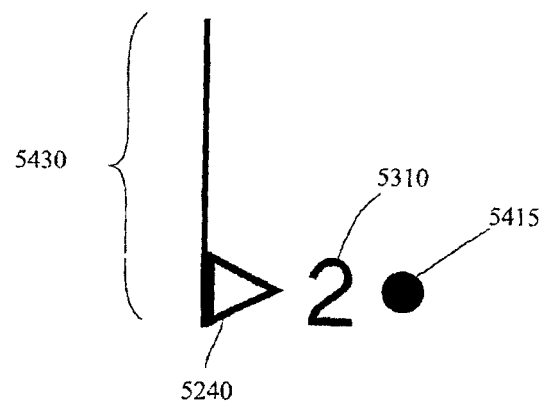

A fundamental note which is multiplied by a number multiplier can become a dotted note. In FIG. 54B, for example, a dotted two thirds note 5430 is a third note 5240 multiplied by 2 (5310) with a single dot 5415 and represents ⅔+⅓.

Figure 54C:
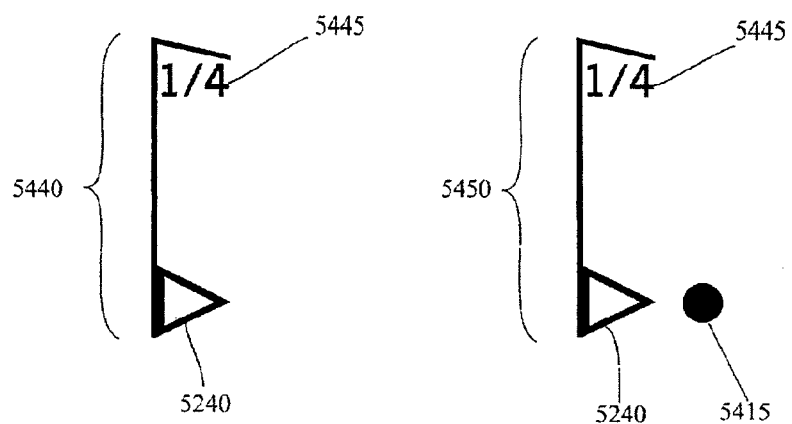

Referring to FIG. 54C, when a number 5445 is placed under the flags it represents a time addition to be made after all other manipulations to the fundamental time value are made. For example, a third note 5240 with a ¼ number (5445) placed under the flag represents a time value of ⅓+(¼) for (5440). For example, a dotted third note 5240 with a ¼ number (5445) placed under the flag represents a time value of ⅓+⅙+(¼) for note 5450.

Figure 54D:
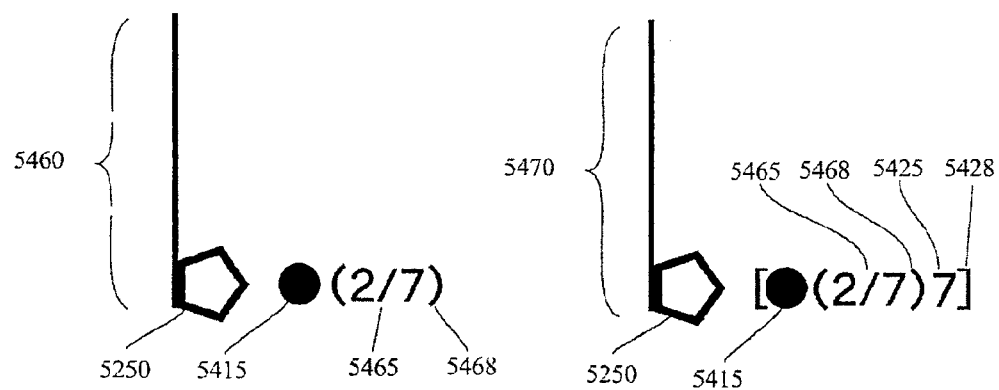

As shown in FIG. 54D, a dot 5415 can represent multipliers other than ½. For example, a ²⁄₇ multiplier (5465) can be a dotted function. A dotted fifth note 5250 with a ²⁄₇ multiplier 5465 applied to the dot 5415 would be ⅕, ²⁄₃₅, ⁴⁄₂₄₅, etc. For example, a ²⁄₇ dotted fifth note 5460 is represented by a fifth note 5250 followed by a single dot 5415 followed by a ²⁄₇ multiplier 5465 in parenthesis 5468. For example, a seven ²⁄₇ dotted fifth note 5470 is represented by a fifth note 5250 followed by a single dot 5415 followed by ²⁄₇ multiplier 5465 in parenthesis 5468 followed by 7 (5425) all in brackets 5428.

Figure 55:
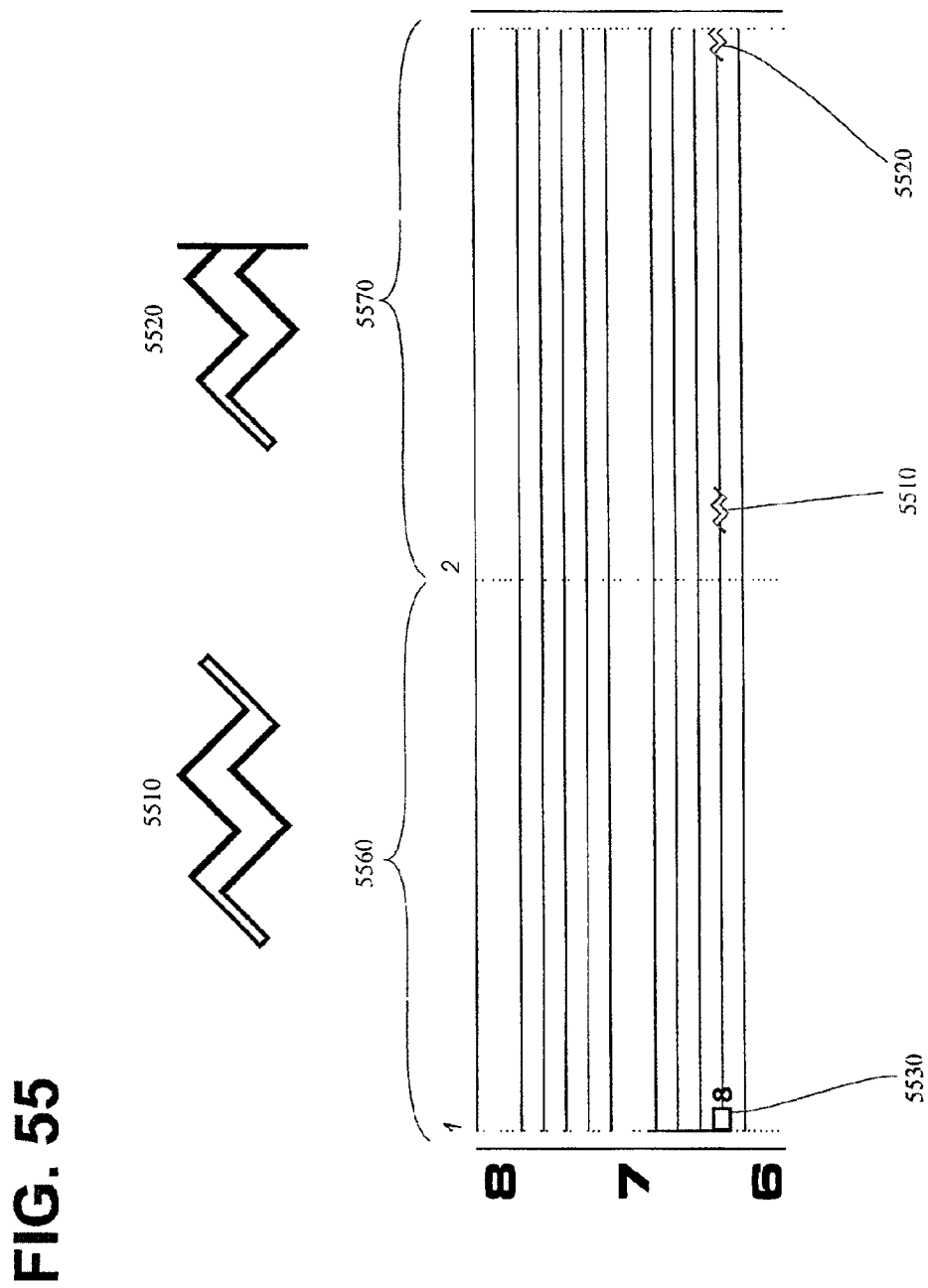
FIG. 55 is a schematic diagram showing the extension of a fundamental note time value of beyond the unit of time of FIG. 49 within the notation system of FIG. 38, as a symbol representing the extension of the note time value into another unit of time and the end of the extension of the note time value, in accordance with a musical system embodiment of the color wave system described in association with FIGS. 1–28.

A note which is longer than a Unit Measure 4950 (FIG. 49) is preferably notated with continuation symbols 5510 and 5520, as shown in FIG. 55, to remind the reader that the note continues into the next Unit Measure 4950. For example, in Unit Measure 1 (5560), the measure begins with an eight quarter note 5530 represented by a quarter note 5230 followed by an 8 (5310) which has a continuation symbol 5510 at the start of the Unit Measure 2 (5570), and an end continuation symbol 5520 at the end of the Unit Measure 2 (5570).

Figure 56:
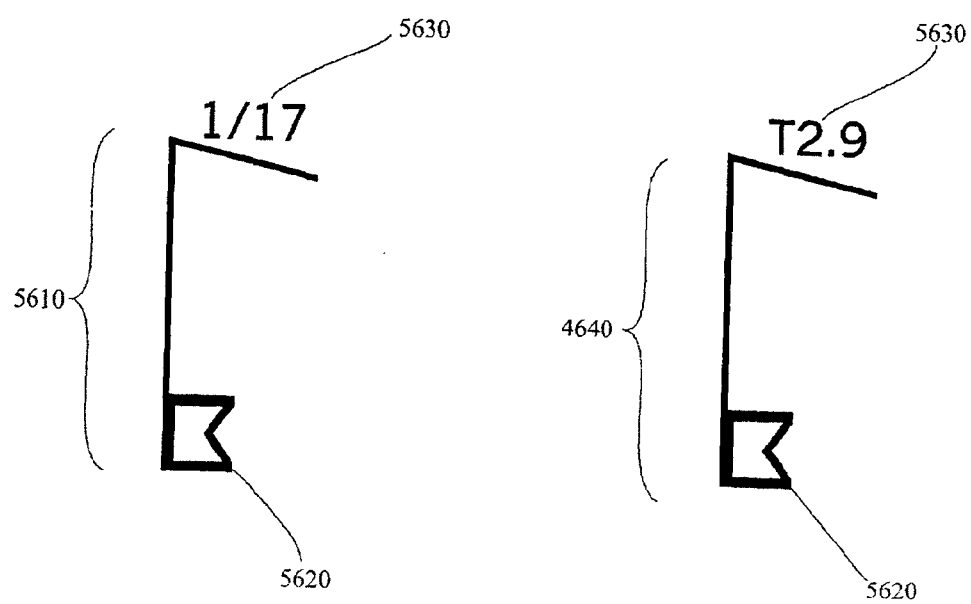
FIG. 56 is a schematic diagram showing a note with a unique note head and time definition describing an assignable time value for the notation system depicted in FIG. 38, in accordance with a musical system embodiment of the color wave system described in association with FIGS. 1–28.

Some notes have values that do not correspond to the fundamental note values or their manipulations. There is a need for an assignable note head. FIG. 56 shows two types of assignable note examples. For example, the one seventeenth note 5610 has an assignable note head 5620 and a ⅟₁₇ (5630) placed over the single flag. For example, the 2.9 tick note 5640 has an assignable note head 5620 and a T2.9 (5630) placed over the single flag (T2.9=tick value 2.9).

Figure 57:
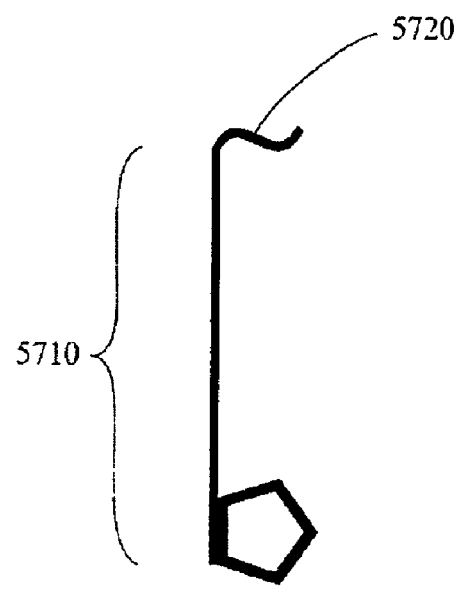
FIG. 57 is a schematic diagram of an approximation note which represents an approximation to a defined note time value for the notation system depicted in FIG. 38, in accordance with a musical system embodiment of the color wave system described in association with FIGS. 1–28.

Certain complex fractions are close to simple fraction values or even imply simple fraction values. For example, a limit curve implies a definable limit even when the limit is not attained. When a complex note value is close to a more simply defined note value then the note is preferably defined as the more simple note value and is called an approximation note. The method for defining an approximation note is preferably a wavy flag 5720 (FIG. 57). For example, an approximation fifth note 5710 has a single wavy flag 5720.

Curves within a composition are preferably notated by placing the appropriate time values at the appropriate locations. For example, a fourth note followed immediately by an eighth note followed immediately by a sixteenth note identifies a series curve. For example, a fourth note followed by a singly dotted fourth note followed by a doubly dotted fourth note identifies a series curve. For example, a fourth note followed by a fourth time value space followed by a singly dotted fourth note followed by a fourth time value space followed by a doubly dotted fourth note identifies a series curve. Time spaces separating curve positions combine with the note values to create a new series.

Figure 58A:
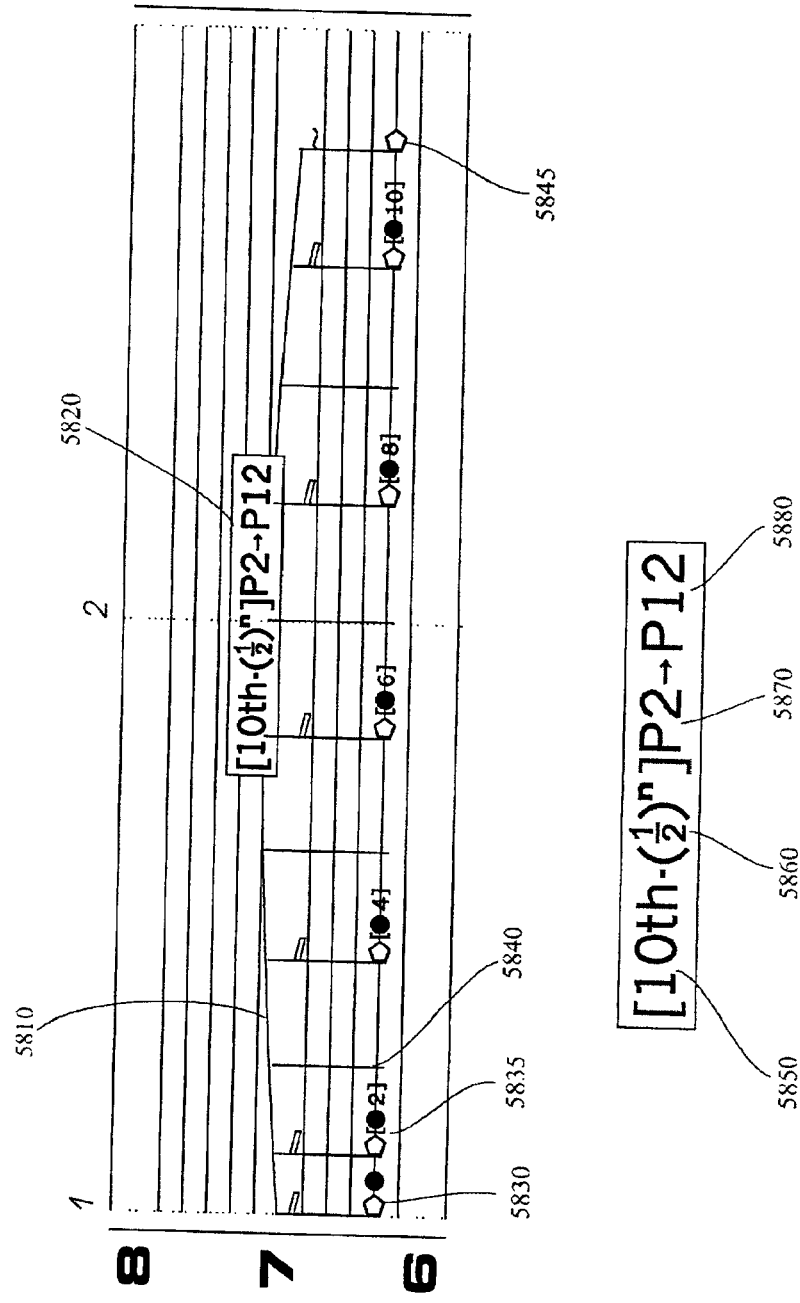
FIGS. 58A–58B are schematic diagrams of a grouping of notes by a mathematical series or equation, in accordance with a musical system embodiment of the color wave system described in association with FIGS. 1–28.

Complex curves are preferably more clearly defined using a curve symbol 5810 and a curve definition 5820, as shown in FIG. 58A. For example, a tenth note, (½), curve begins at position 2 in the series and ends at position 12 in the series. The series definitions are the fundamental n note of the curve (10th note 5850 in the example), the series type ((½) (5860) in the example) which defines the fundamental multiplier, the first position being used (position 2 or P2 (5870) in the example), and the last position being used (position 12 or P12 (5880) in the example). The curve begins at 5830 with a singly dotted 10th note (second position in the series). The third series position is a doubly dotted tenth note 5835. The fourth series position does note contain a note but is marked with a line 5840 for visual identification and clarity in recognizing the curve. The twelfth and last position is defined with an approximation note 5845 signifying that the curve is approaching a limit and that the twelfth position 5845 is close enough to functionally become the limit.

The positions defined by the curve are not required to match the values of the notes assigned to the curve. For example, each note on the curve described in FIG. 58A could be $20^{th}$ notes. The note value does not change the defined curve positions.

Figure 58B:
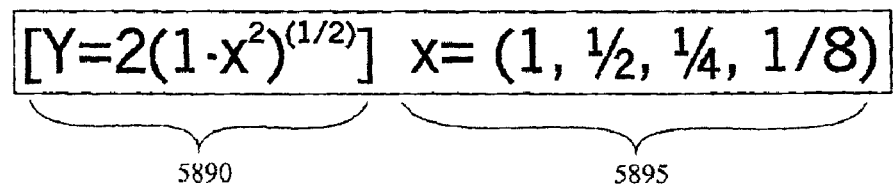

There is no limit to the number of complex curves available to notate. The method for such notation is to preferably use the curve symbol 5810 and the curve definition box 5820, and place within the curve definition box the most functional mathematical description of the curve. If the curve is a mathematical equation which can easily fit within the box then describe the equation in the box, as shown in FIG. 58B. Descriptions can include input and output values 5895, or any other means to identify the defined positions of the curve. Another method is to simply write "equation" in the box and then describe the equation and the input and output values elsewhere as an attachment to the composition or wave structure. Positions which are defined but not used for notes will be notated as a line 5840 (FIG. 58A).

Figure 59:
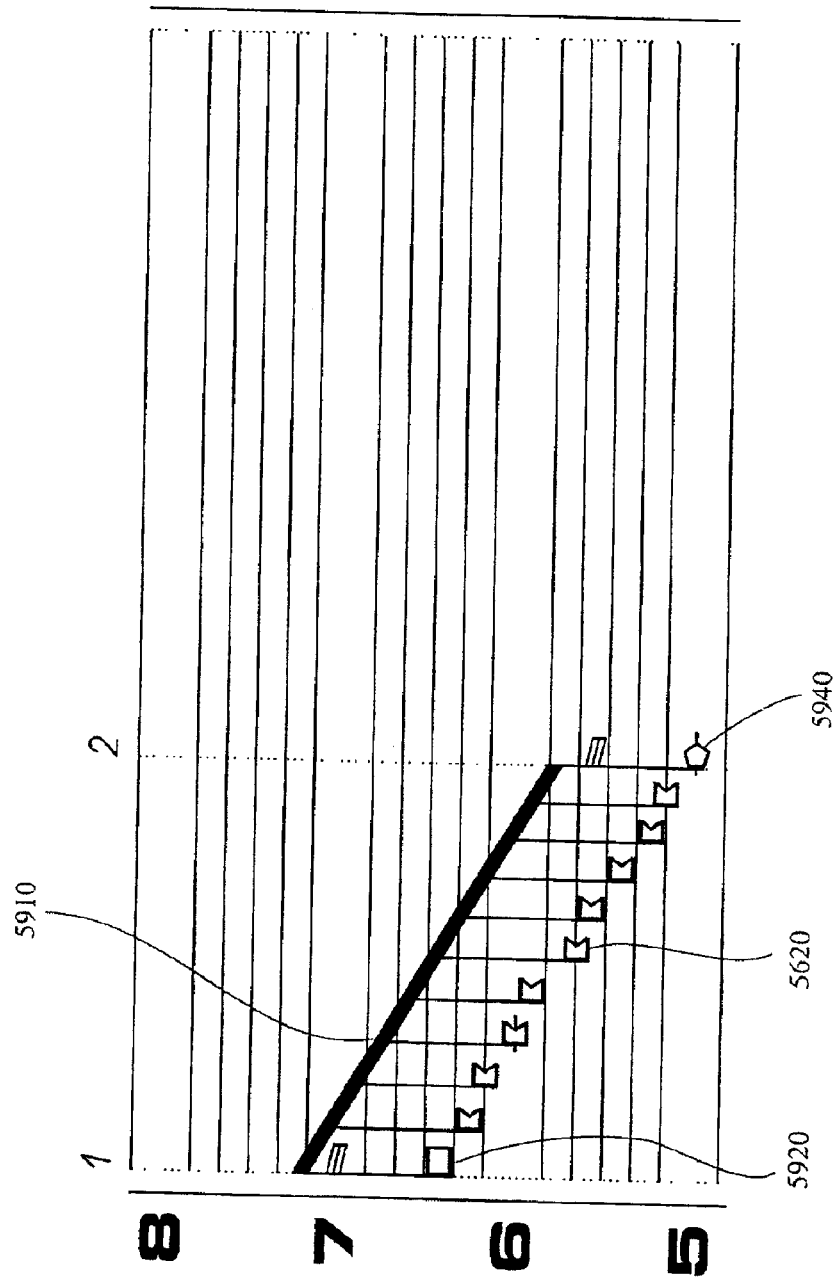
FIG. 59 is a schematic diagram of a group of notes, which define constantly changing time values, in accordance with a musical system embodiment of the color wave system described in association with FIGS. 1–28.

Time changes that begin with an easily definable note value and end with an easily definable note value but have complex time changes for each note in between are called slides. FIG. 59 shows an example slide which begins with a sixteenth note 5920 and ends with a twentieth note 5940, and is connected with a black bar 5910, and all the notes in between are shown with assignable note heads 5620. The complex time changes for the slide are identified elsewhere as an attachment to the composition or wave structure.

Figure 60A:
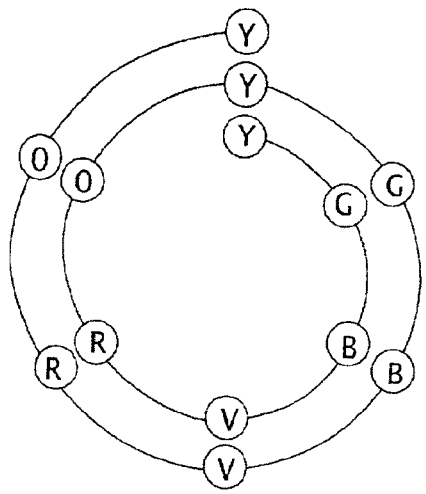
FIGS. 60A–60G are schematic diagrams of alterations of the notation system of FIG. 38, which show the circular color orientation of notes, or the same system shown in a linear format, in accordance with a training system embodiment of the color wave system described in association with FIGS. 1–28.
Figure 60B:
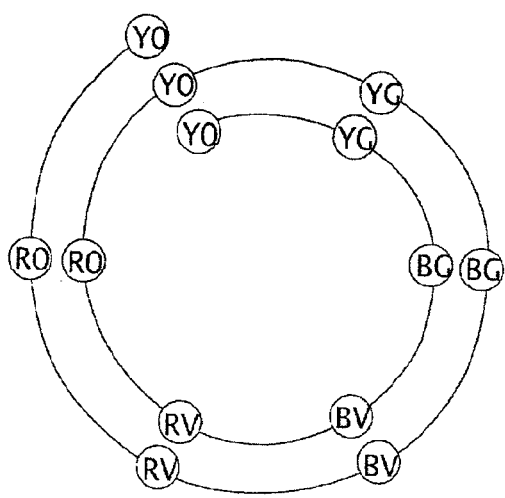
Figure 60C:
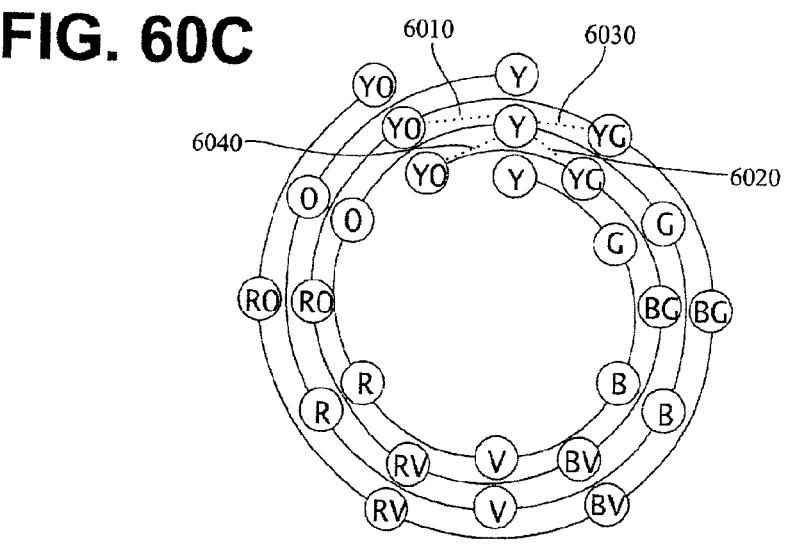
Figure 60D:
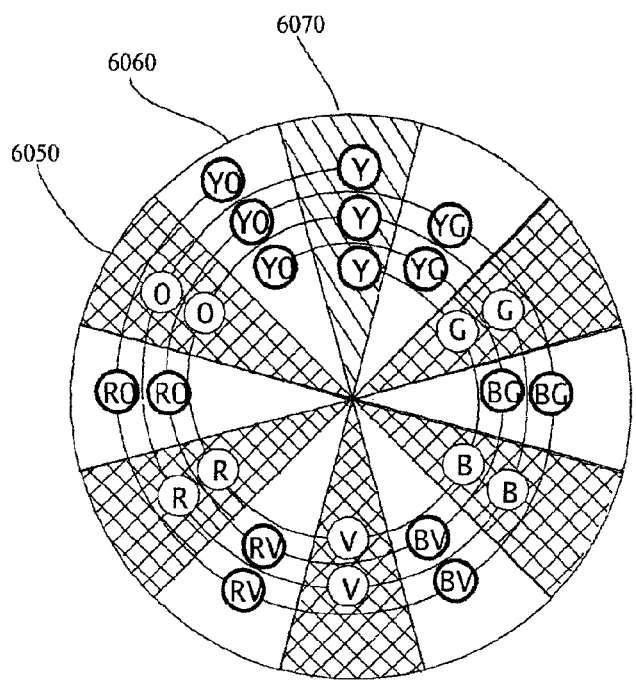

FIGS. 60A–60E describe an embodiment that incorporates the wave language system in terms of an analogous color circle system, which can be implemented as a mechanical and/or an electronic training system, for example as software, generates a signal to a frequency, or sound volume, or energy volume generating device. This training system can be used to associate numbers, or colors, or note names, or black, or white, or gray coloring, or any combination thereof, such that it is recognizable as a pattern or system of relationships and descriptions and acts as an interpreter for the player or user so that the player or user is able to easily and effectively access the full power of the music structure, or frequency or energy organization generally. The training system can be a push button or depressible key, or a touch-screen which displays a computer generated version of the system. The use of a computer generated version allows for selected portions of the training system to be displayed to be used as additional aids in displaying the harmonic and perceptual wave properties, and current loop properties. This training system embodiment will utilize circular orientation of the Universal Staff 3800 (FIG. 38) and Universal Keyboard 4000 (FIG. 40) to reflect the circular organization of overtone and undertone harmonic waves into a circular definition of space, as shown in FIGS. 16A and 16B. Embodied within the Universal Staff 3800 and Universal Keyboard 4000 are the analogous color relationships and secondary color relationships. The circular organization of the Universal Staff 3800 and the Universal Keyboard 4000 is derived from two spirals. The first spiral (FIG. 60A) is comprised of secondary color relationships consisting of one-word color names, specifically yellow, green, blue, violet, red, and orange. The first spiral (FIG. 60A) includes octaves for each spiral circuit completed. The second spiral (FIG. 60B) is comprised of secondary color relationships consisting of two-word color names, specifically yellow-green, blue-green, blue-violet, red-violet, red-orange, and yellow-orange. The second spiral (FIG. 60B) includes octaves for each spiral circuit completed. The two spirals of one-word and two-word color names (FIGS. 60A and 60B) are joined to form an analogous color circle system (FIG. 60C). The analogous color circle system relates the two spirals (FIGS. 60A and 60B) by musical 4th and musical 5th relationships. In the example shown in FIG. 60C, the overtone 4th relationship 6010 is a movement of increasing radius and counter clockwise motion. The undertone 4th relationship 6020 is a movement of decreasing radius and clockwise motion. The overtone 5th relationship 6030 is a movement of increasing radius and clockwise motion. The undertone 5th relationship 6040 is a movement of decreasing radius and counter clockwise motion. FIG. 60D shows the correspondence between the analogous color circle system (FIG. 60C) and the Universal Staff 3800 of the lines, ledger lines, and spaces of the Universal Staff 3800. Shown are he application of black sections 6050 to reflect the lines of the Universal Staff 3800, the application of gray sections 6070 to reflect the ledger lines of the Universal Staff 3800, and the application of white sections 6060 to reflect the spaces of the Universal Staff 3800.

Figure 60E:
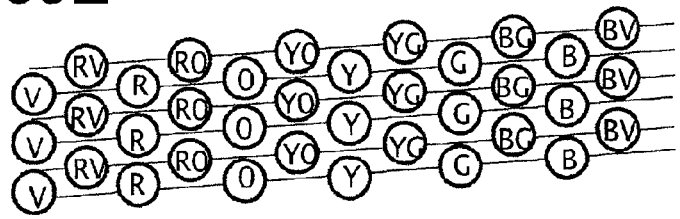
Figure 60F:
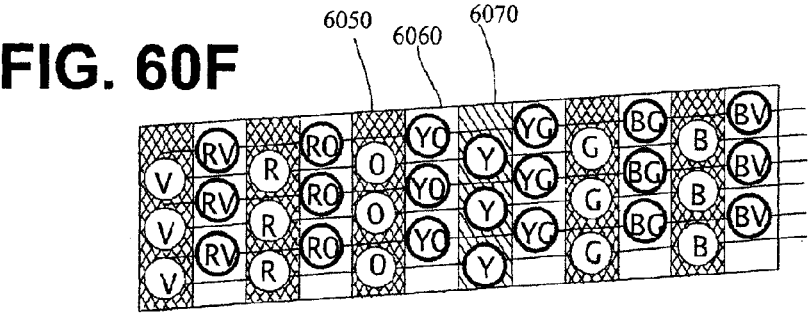

The analogous color circular system (FIG. 60C) can also be expressed in linear form where each secondary color spiral is transformed into a diagonal line and multiple such diagonal lines are stacked to create octaves as shown in FIG. 60E. Octaves can also be formed by extending the linear expression of each spiral to include octaves. The black sections 6050, the gray sections 6070, and the white sections 6060 of the analogous color circle system (FIG. 60C), as expressed in FIG. 60D, is transferable to the linear expression of the analogous color circle system (FIG. 60E) as shown in FIG. 60F.

Figure 60G:
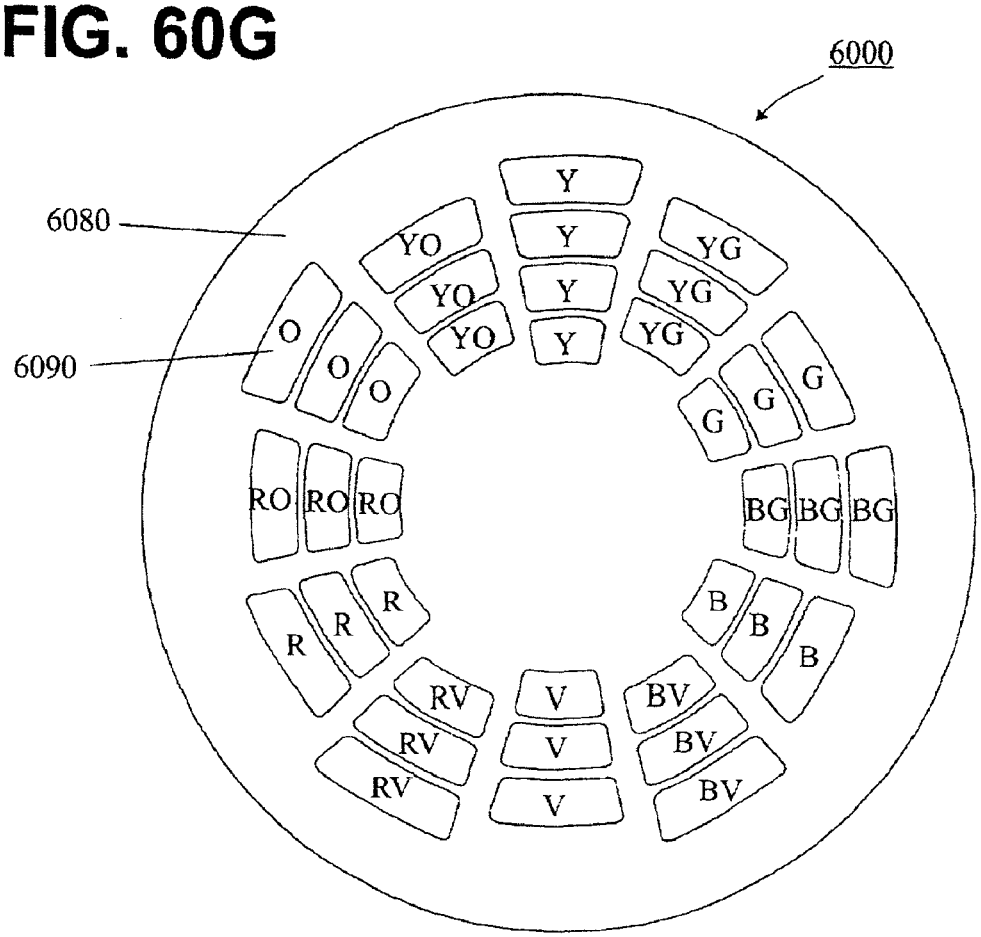

FIG. 60G shows a training system that incorporates the analogous color circle system described in FIGS. 60A–60D, in accordance with one embodiment of the invention. The training system 6000 includes an instrument body 6080 with an arrangement of push buttons 6090 which employ the analogous color circle system described in FIGS. 60A–60D. This embodiment physically displays the vector space properties of the wave language system. As indicated above, it can be used to physically employ the vector space system of frequencies so that the user can easily and effectively study tone relationships, and use these relationships the same way a painter would use a color wheel to help them think through color schemes. The fact that the training system 6000 incorporates a new arrangement of frequencies means that the structure of the embodiment, that is the physical arrangement of frequencies, is a physical implementation of the vector space property of the wave language system. As such, it physically organizes tones for the user to be employed according to their vector space properties.

Ribbon controllers, voltage control oscillators, and other display/control devices can be integrated with the wave language system to provide further embodiments of the wave language system in the form of color fields. For example, two colors (tones) can be related by a range of tone mixtures. For example, if a frequency of 200 hertz and a frequency of 300 hertz is selected as reference tones, then a sound range can be created which is a blend of the two frequencies. For example, the middle of the sound range would include equal portions of both frequencies, and a quarter position in the sound range would include 75% of one frequency and 25% of the other frequency. For example, the two colors (tones) can be related by frequency range, which includes all the possible frequencies between 200 hertz and 300 hertz. For example, three or more colors can be related by a combination of tone mixtures and frequency ranges.

Figure 61A:
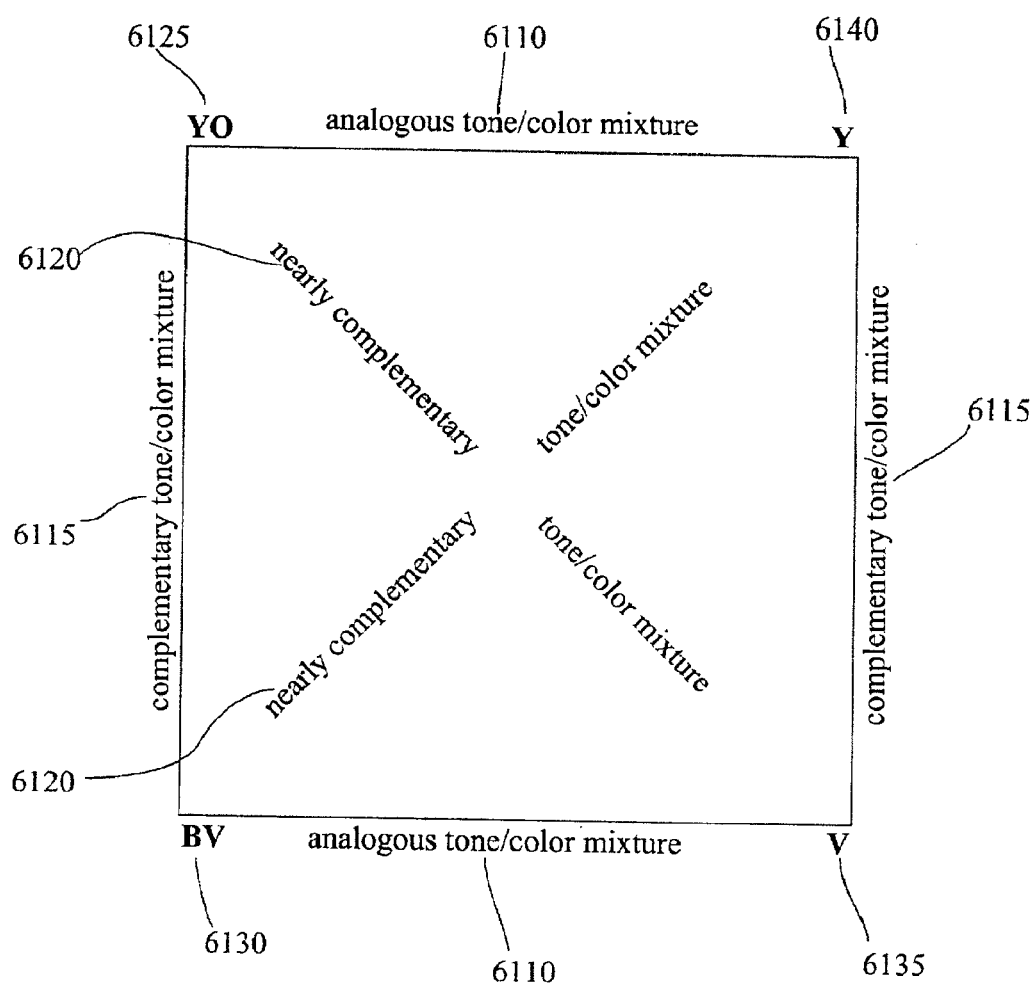
FIGS. 61A–61F are schematic representations of how the wave language system can be used to produce color fields, in accordance with a color field embodiments of the color wave system described in association with FIGS. 1–28.

FIG. 61A shows the display screen 6100A of an example tone mixture display device, which displays analogous color relationships 6110 and complementary color relationships, and nearly complementary color relationships. The display screen 6100A operates as a color field. This device can display the output of another device (not shown, but which relates various selected frequencies through frequency mixtures) as colors and color mixtures. The color mixtures produced on the display screens can be useful for art applications. The display device works in conjunction with a pointer (not shown), controlled by a device such as a mouse (not shown), which selects frequencies and frequency mixtures by its position in the display screen 6100A. Continuous motion throughout the displayed range produces a continuously changing sound mixture that correlates to the points on the display screen 6100A that are being selected. For example, if a joystick controls a pointer (not shown) on an LCD computer monitor that uses this display screen 6100A, and the individual moves the pointer from yellow-orange 6125 to blue-violet 6130, then a continuously changing sound can be produced by the device which would be a continuously changing mixture of two frequencies represented by yellow-orange and blue-violet. A motion between yellow-orange 6125 and violet 6135 would produce a continuously changing sound, which would be a continuously changing mixture of yellow-orange 6125, yellow 6140, blue-violet 6130, and violet 6135, or the frequencies they represent.

Figure 61B:
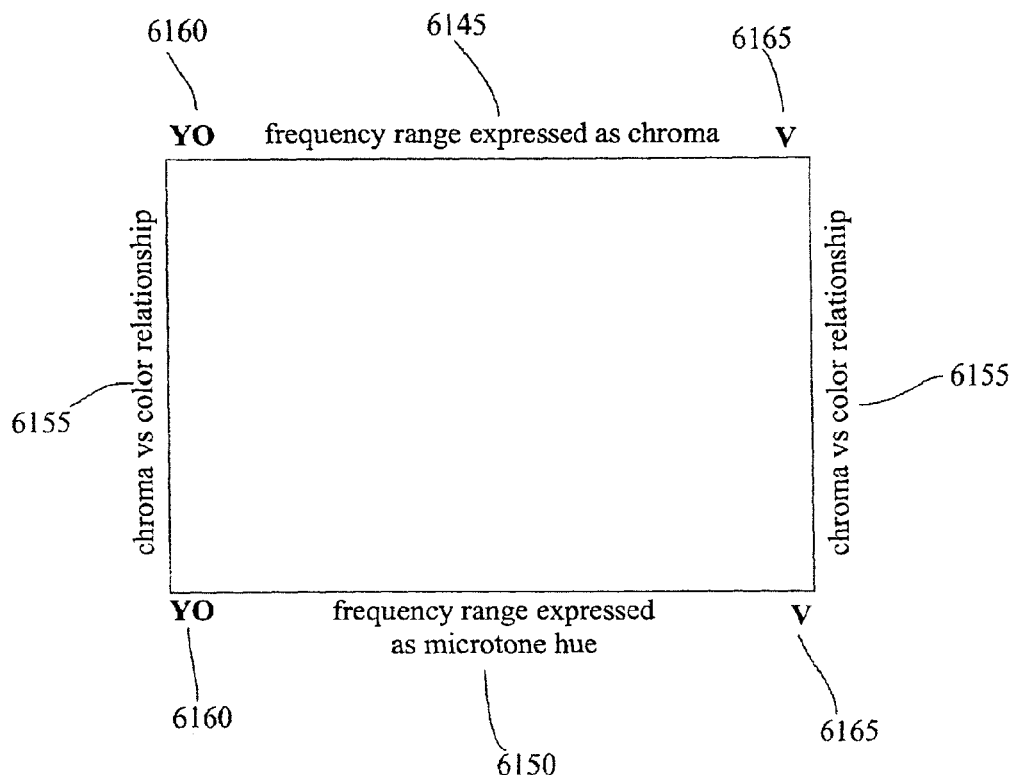

FIG. 61B shows a display screen 6100B with a frequency range between YO 6160 and violet 6165 expressed as microtonal chroma changes 6145, microtonal color changes 6150, and mixtures of microtone chroma and microtone color 6155, which show the relationship between the two types of display screens 6100A and 6100B.

Figure 61C:
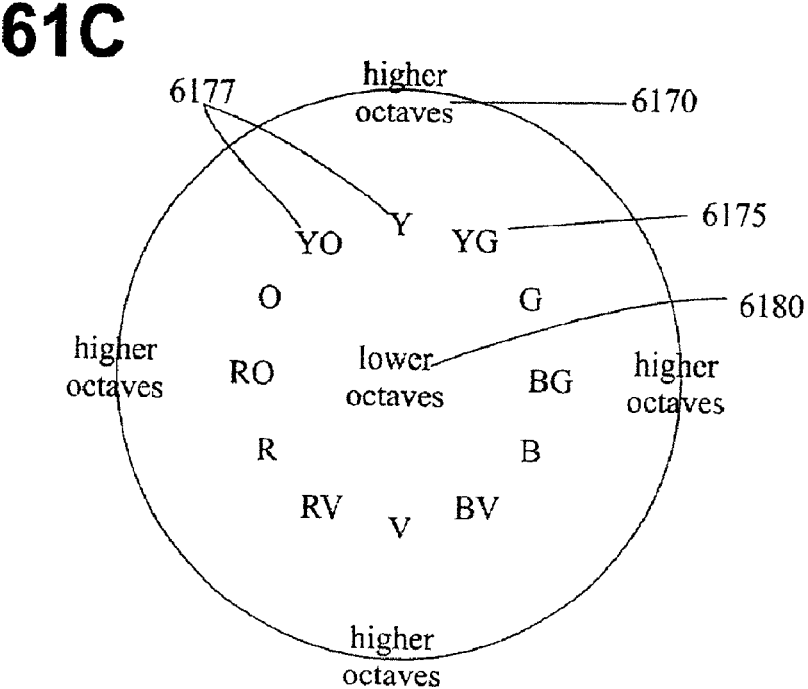

FIG. 61C shows another display screen 6100C with mixtures of tone octaves, and analogous colors within the area of a circle. The center of the circle is chosen to represent low octaves (dark gray) 6180, the middle radius is chosen to represent tones within the central hearing range (middle gray) 6175, which are organized by analogous color relationships 6177, and the circumference is chosen to represent high octaves (light gray) 6170. Radial motion from low to high octaves moves between successive mixtures of octaves. Angular motion moves between successive mixtures of analogous colors (tones related by 3:2 and/or 4:3 relationships)

Figure 61D:
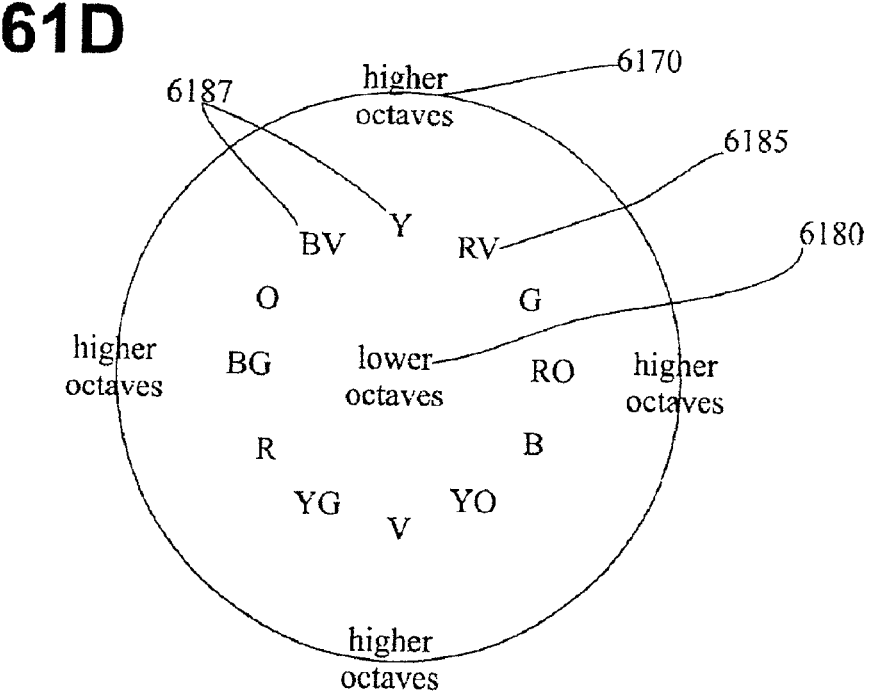

FIG. 61D includes another display screen 6100D that shows mixtures of tone octaves, and chromatic colors within the area of a circle. The center of the circle is chosen to represent low octaves (dark gray) 6180, the middle radius is chosen to represent tones within the central hearing range (middle gray) 6185, which are organized by chromatic color relationships 6187, and the circumference is chosen to represent high octaves (light gray) 6170. Radial motion from low to high octaves moves between successive mixtures of octaves. Angular motion moves between successive mixtures of chromatic colors (tones related by 15:16 or 16:15, and/or 17:16 or 16:17 relationships).

The display screens of FIGS. 61C and 61D can be reformed into a linear expression with the radial motion being transformed to a vertical motion, and the angular motion being transformed to a horizontal motion.

Figure 61E:
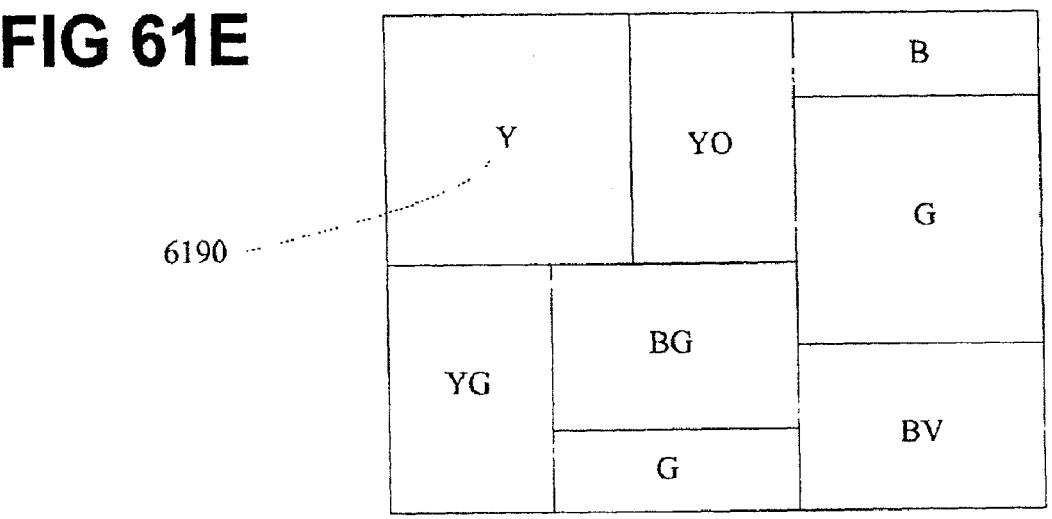

FIG. 61E is an illustrative example of color field painting and is designed to show an art application of the frequency control property of the color display screens described in association with FIGS. 61A–61D. Each color area (for example Y 6290) represents a sound (frequency). A controller device allows the individual to move around in the composition from color field to color field to generate the sounds of the composition. The structure of the composition determines the various orders in which sounds will be generated through continuous movement. Typically, in a painting there are defined paths of movement for the eye which are the core motions to be emulated in sound generation. Beyond the natural movements of the eye are more refined movements as the individual begins to move beyond the initial view of the painting to areas of detail. In these areas of detail there are also natural eye movements which means there are also natural sound structures just as in a music composition. This provides the basic means of correlating music to painting (or other color displays) in a one-to-one correspondence. Beyond the simple color associations are chord structures which define spins, direction, and charge. In more complex paintings these functions will be understood from the direct application of paint as chord structure, for example, Y-B-YG, blended together or closely interwoven will imply the music chord C Major. To a large degree the spin of the chord will be determined based on the surrounding color events and the theme of the painting. This is also true in music. The tones preceding and following a chord will determine how it is perceived. This embodiment has multiple uses. It can be used to transfer and transform information from a painting (or color display) to a musical composition or vice versa, or to some other wave structure. It can be used as a complex frequency controller for music. It can be used as a blank structure of shapes, which can be colored by the user (similar to a coloring book), and then sounded by the user.

Figure 61F:
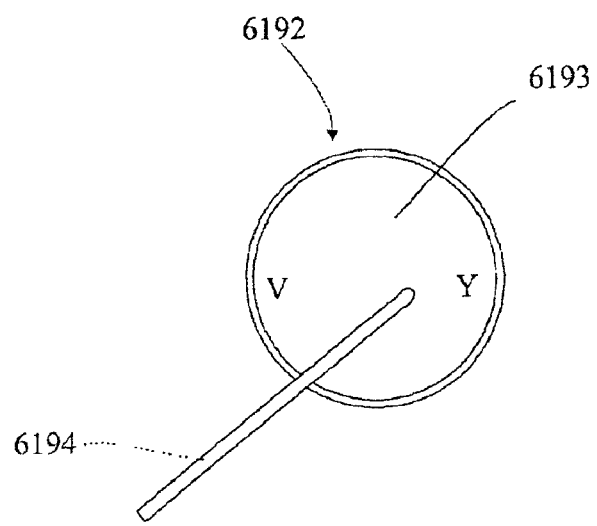

FIG. 61F is a further refined implementation of the display screens described in association with FIGS. 61A–61D to provide a color field, based on the color to sound relationships described by the wave language system. The display screens can be modified into rhythm instruments, such as a type of ribbon controller, where the drum is the ribbon (i.e., the color display) and the drum stick 6194 is the controller which hits a selected color or a selected area of a color field 6193 to generate a sound. FIG. 61F shows an example of a MIDI drum pad 6192 with an applied color field 6193.

The above described color field screen displays can also be used as an interactive device with any frequency generating instrument. For example, a voice box, wherein the individual uses displayed color fields to learn pinpoint frequency control, and/or wherein the individual uses the displayed color fields to learn perfect pitch. Another example includes the guitar, wherein the guitar is connected to the visual display and the bending of a string is displayed as changes in color or as motion in a color field. The color fields can be applied to a trombone (or other instrument), wherein the frequency produced by the trombone is translated by a sensing/processing device to the numerical language which is then translated to color preferably by software using the wave language system and then displayed, and read by the trombone player as a visual display for comprehension and pinpoint control.

Each application of color in a display that uses the color to sound to numbers association of the wave language system employs the meaning therein contained (as presented in the wave language system methodology). For example, the meaning implied by associating the musical 4ths and 5ths to analogous colors in a color display allows the person viewing and using the display to control frequencies in ways not currently possible. For example, an individual is able to currently use a ribbon controller, which bends frequencies by using practical knowledge gained from extended use or practice. But no amount of practice will provide the individual with the knowledgeable control that the visual color display provides. With the visual color display the individual is able to guide the ribbon control through precise frequencies or combinations of frequencies which integrate more faithfully with the composition being played or comprised. This embodiment includes the following: volume to color, time (rhythm) to color, echo to color, panning (control of stereo field or surround sound field) to color, or combinations thereof.

A further embodiment is the application of the wave language system to spoken, melodically based languages. In simple words, vowel sounds tie together two consonants. The consonants act as nodes and anti-nodes of a wave, and the vowel sounds act as the motion from one consonant sound to the next. Language is constructed from at least 12 vowel sounds and at least 24 consonant sounds. The vowel sounds are divided into two groups, long and short sounds, for example, long a and short a. The difference between long and short vowel sounds is associated with wave amplitude positions, and charge, wherein long vowel sounds will be located on one side of the tone circle, and short vowel sounds will be located on the other side of the tone circle. Vowel sounds, which are on opposite sides of the tone circle, are complementary or have a destructive interference relationship. Vowel sounds that are next to each other on the tone circle have an analogous color relationship. The following is an example of how a language to color construction can be formed:

The vowel sounds, in analogous order include, oo, o, i, e, a, u, a, u, o, i, e, and ä.

These Vowel Sounds can be Described as Follows:

oo is the sound, for example, generated by the word book.
o is the sound, for example, generated by the word poke.
i is the sound, for example, generated by the word bike.
e is the sound, for example, generated by the word peak.
a is the sound, for example, generated by the word bake.
u is the sound, for example, generated by the word puke.
a is the sound, for example, generated by the word back.
u is the sound, for example, generated by the word puck.
o is the sound, for example, generated by the word boss.
i is the sound, for example, generated by the word pick.
e is the sound, for example, generated by the word beck.
ä is the sound, for example, generated by the word bach (in between short o and short a).

The vowel sounds are arranged into the vowel sound circle (FIG. 62A) which is compared to the color circle. The direct comparison to color is achieved by selecting one vowel sound and relating it to a specific color, then selecting direction, clockwise or counterclockwise, which the remaining vowel sounds will be related. The vowel sound circle, just as the color circle, is always divided in half with each half representing a key. Because a key contains seven tones there is always an overlap of one tone between keys. The overlapping tone is a transition tone. Because keys exist in both overtone and undertone systems, there exists an overtone overlapping tone and an undertone overlapping tone. In addition, each overlapping tone forms the basis for a key, which is one tone removed from the fundamental two keys. This adds yet another pair of overlapping tones for a total of four. The sounds oo and ä, and u and a, are transition sounds, that is, they can act as either positive or negative from a structural basis. All other vowel sounds can be positive and negative only as regards the spin of the wave.

For example, the consonants can be grouped by the position in the mouth where they are generated, and the particular manipulation of the tongue, mouth, lips and throat required to generate the sound.

P and B: are formed with the lips using a similar method (pack, back).

K and G: are formed with the middle of the tongue against the roof of the mouth using active vs passive sound (cut, gut).

D and T: are formed with the tip of the tongue against the roof of the mouth using active vs passive sound (dot, tot).

Ch and J: are formed with the tip of the tongue against the front of the mouth (teeth) using active and passive sound (chirp, jerk).

N and Th: are formed with the tip of the tongue against the top of the mouth using active or passive resonation (not, thought).

V and F: are formed with the teeth against the lips using an active or passive sound (vote, foam).

Sh and Zh: are formed with the teeth using active or passive resonation (sure, azure).

M and W: are formed with the lips using the lips as closed or open to generate an active or passive sound (mitt, wit).

H and Y: are formed with the open mouth using an open or partially closed mouth to generate and active or passive sound.

S and Z: are formed with the tip of the tongue against the roof of the mouth using active or passive resonation (sip, zip)

R and R: are formed using the throat to create an active or passive sound (R is the French r).

L and Th: are formed using the front part of the tongue using an active or passive sound.

Figure 62A:
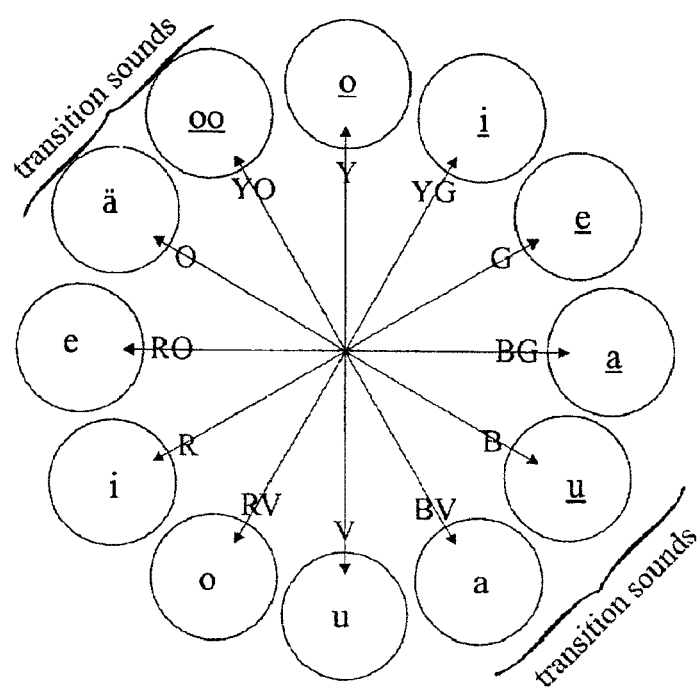
FIGS. 62A–62C are schematic representations of how the wave language system can be used to transform melodic based languages to music, in accordance with a music embodiment of the color wave system described in association with FIGS. 1–28.
Figure 62B:
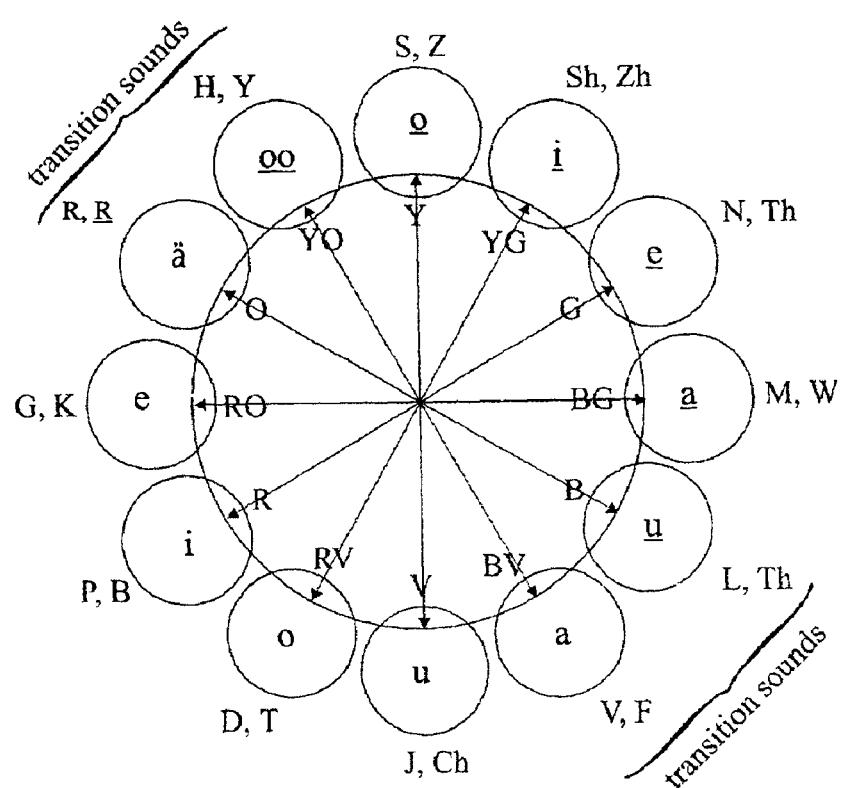

The method of forming consonant sounds also shows their relationships in terms of hard and soft sounds, as shown in FIG. 62B. The difference between hard and soft can be related to charge in the wave language system. The grouping of tones into sets forms the relationship between the active and passive qualities of the nodes and anti-nodes of the waves. There are two sets of transition consonants [R, R, and H,Y], and [L,Th, and V,F], which can function as positive or negative structurally. This sets up a parallel between consonants and vowels, where the only correlation that must be defined is the comparison of long and short vowels to hard and soft consonants. For example, a close comparison of transition consonants is that R, R correlates to ä, and H,Y correlates to oo. This comparison means that the hard consonants will relate to the short vowels and the soft consonants will relate to the long vowels (6B). All consonants can be positive or negative as defined by spin.

| Hard | | Soft | |
|---|---|---|---|
| active | passive | active | passive |
| R | R | L | Th |
| G | K | M | W |
| P | B | N | Th |
| D | T | Zh | Sh |
| J | Ch | Z | S |
| V | F | Y | H |

The nature of word and sentence construction in the English language is melodic. That is, it is not fundamentally based on complete half-wave cycles, rather it is a system of one or more components of a half-wave cycle connected to one or more components of another wave cycle through the variety of possible wave connections such as analogous color, chromatic color, octaves, primary pairs, secondary pairs, and any and all other connections. Sentences are functionally solid wave structures which means that, generally speaking they will be fundamentally in key. Key will generally be understood at the sentence level to be a general description of similarity of idea. For example, the sentence 'the dog ate the cat' is a unitary idea and thus should be able to be described by a single key. A more complex idea such as 'The dog played in the sunshine all day. But, as the day wore on, he got hungry. He saw a fat cat and chased it down and ate it.' Clearly there are differences in emotion and description between playing in the sun and killing a cat. Such differences can be expressed by key changes. Given that individual sentences which remain unitary in idea generally stay in key, and that a sentence can contain any of the vowel sounds, and any of the consonant sounds, means that the spins of wave structures must be organized so that all sounds will be found within key. In fact, this is the nature of energy as described in the four spins.

Figure 62C:
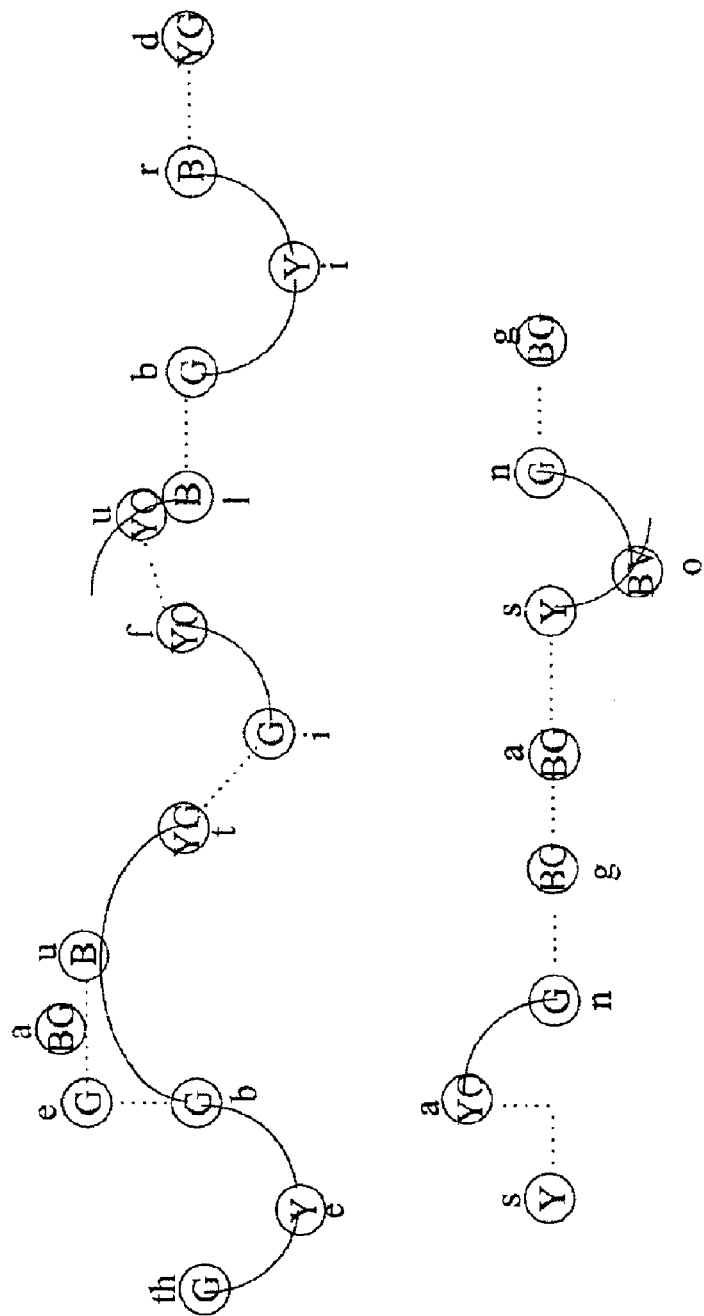
Figure 63A:
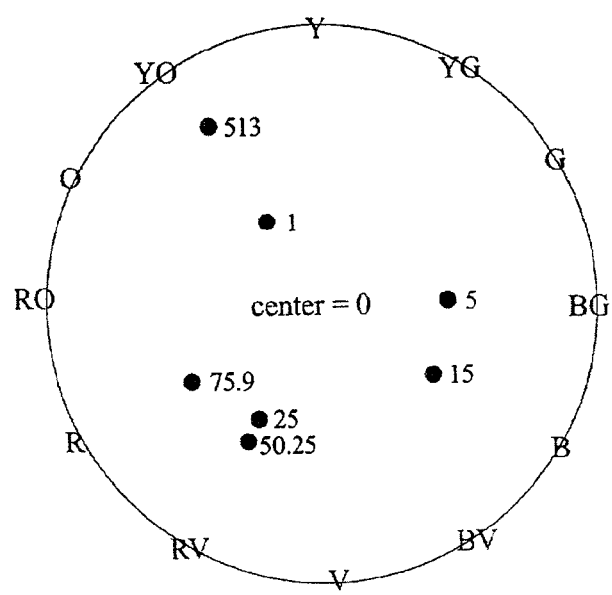
FIGS. 63A–63B are schematic representations of how the wave language system can be used in imaging, in accordance with an imaging embodiment of the color wave system described in association with FIGS. 1–28.
Figure 63B:
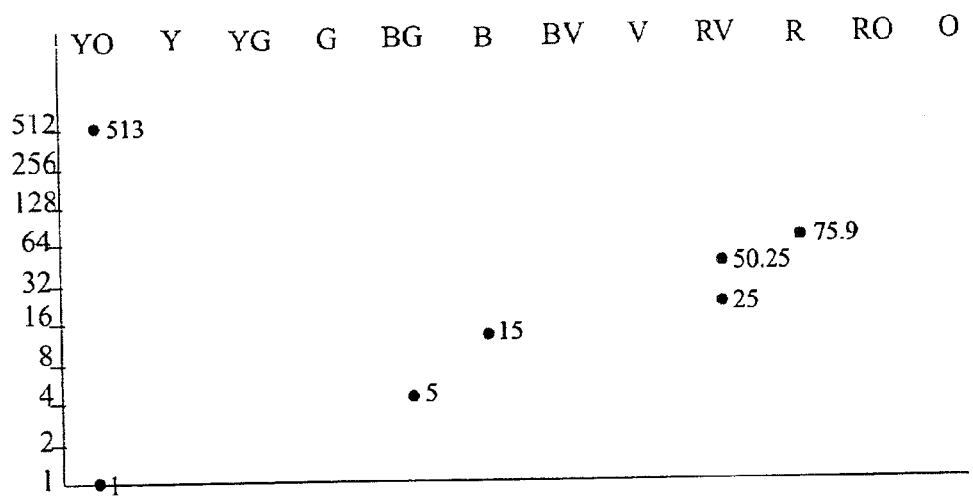

FIG. 62C shows a simple transformation of the sentence 'The beautiful bird sang a song' into melodic wave structures. The first transformation is to change from standard English to the basic vowel sounds.

Th-u b-e-a-u-t-i-f-oo-l b-oo-r-d s-a-n-g a s-o-n-g

The second transformation is to locate the colors within a single color key.

G-Y G-G-BG-B-YG-G-YO-YO-B G-Y-B-YG Y-YO-G-BG BG Y-BV-G-BG

The third transformation is to determine the wave structure required to fit the circumstances. The following transformation is a series of examples of how the sounds fit particular wave cycles, and other energy relationships.

The: The relationship between G and Y is found in the G min chord (G-Y-BG). The step between Y and G can be as simple as reversing the motion of the previous chord.

beautiful: The word begins with a G node, but then connects directly to a new wave with a G amplitude. From the G amplitude the wave cycles through analogous color steps from G to BG to B. When the B amplitude is achieved a wave cycle is formed between B and YG (Y Major chord Y-B-YG). The step between YG and G is an analogous color. It implies an analogous node change but the G amplitude is inserted instead. The step between G and YO is the second half of the Y Min chord (Y- G-YO). The step between YO and YO is a same color shift between a node and an amplitude position. The YO amplitude position is not a max amplitude position and equates to a 15th harmonic position. The step from YO to B is the harmonic wave step from harmonic 15 to harmonic 16.

bird: The relationship between the B of beautiful and the G of bird is normally a function of a Max or Min chord. But, since both positions are nodes, it implies an analogous color move which mimics a wave function. The step from G to yellow is the first half of a G Min chord (G-Y-BG). The step from Y to B is the second half of a BG Minor chord (BG-Y-B). The step from B to YG is normally a function of Major and Minor chords, but because both positions are nodes, it implies a number of analogous color steps which mimic a wave function. An illusion is generated which makes the nodes appear to act as amplitudes.

sang: The relationship between YG of bird and Y of sang is a simple analogous color step. The step from a Y node to a YO amplitude implies either a nodal analogous color shift, or an amplitude analogous color shift. For example, if the Y node shifts to a YO node, then the YO node connects directly to a YO amplitude. The step from YO to G is likely the second half of a YG Min chord (YG-YO-G). The step from G to BG is a simple analogous color step.

a: BG is a same color from the previous node, and relates to Y through an implied wave cycle relationship (example, BG-Y-B, or YG-BG-Y).

sang: The step from Y to BV is a wave step from harmonic 16 to 15. The step from BV to G is the second half of the YG Major chord (YG-BV-G), or the BG Min chord (BG-BV-G). It would make more sense to relation it to the YG Major chord because this would imply an analogous color shift between Y and the implied YG. The step between G and BG is a simple analogous color shift.

These steps are all common steps employed in melodic lines. For reference, the sequence of color-tones would be the western musical notes: D, C, D, D, A, E, G, D, F, F, E, D, C, E, G, C, F, D,A, A, C, B, D, A.

Imaging is the representation of data as a visual image, transformed into meaningful landscapes or colors-capes or monochromatic-scapes. The use of the wave language system to present color-scapes, chroma-scapes, monochromatic-scapes, and any combination thereof, provides a new method of analysis which includes fundamental numerical relationships that are recognizable by color. For example, data which includes the numbers 1, 5, 15, 25, 50.25, 75.9, and 513 can be organized by color and octaves

| YO | BG | B | R | RV |
|---|---|---|---|---|
| 1 | 5 | 15 | 75.9 | 25 |
| 513 | | | | 50.25 |

For example the numbers can be arranged in a circular grid (FIG. 63A) with a chroma accounted for as a simple coloration change or as a vertical component which would make the graph 3-dimensional. For example, the numbers can be arranged in a linear grid (FIG. 63B), with chroma accounted for as a simple coloration change, or as a front to back component which would make the graph 3-dimensional. For example, a 3-dimensional landscape graph with peaks and valleys, wherein specific elevations are specific colors following the chromatic color pattern which can be described as color and microtone chroma, or as color and microtone color.

Another embodiment includes computer language. Current computer language is based on 1's and 0's read as on and off. A more advanced language can be built from the basic number relationships and current loop spins of the wave language system. Spins involve the following properties: +direction prime, −direction prime, +charge, −charge, +neutrality, −neutrality, +direction retrograde, −direction retrograde, +direction inversion, −direction inversion, +direction retrograde-inversion, −direction retrograde-inversion, directionless neutrality. Each unit will contain a choice of +/−direction (overtone or undertone), a choice of 4 spins, a choice of charged wave vs neutral wave (spin selection will determine +/−charge), and if neutral, a choice of directional neutrality or directionless neutrality.

Numbers relate to vector space which allows the defined spins to have the entire range of the color circle with the infinitude of possible colors, with the infinitude of possible color mixtures, with the ability to organize and group color ranges for higher order processing. The advanced wave structures presented in the wave language system form systems of 'bits' similar to say a 64 bit system of 1's and 2's. Higher order bit systems can be generated which are based on connecting a string of advanced wave structures.

The nature of numbers involves rotation, which involves imprecision. Imprecision is accounted for in the wave language system the same way the mind accounts for it, through a definition of acceptable precision. The microtone methodology described by the wave language system shows how the mind recognizes notes within the general range of +/−7 cents. This recognition extends to all numbers, colors, measurements, levels, or values. The range can be extended or compressed depending upon the choice of the language user, but generally speaking precision is an ideal within this language system.

The wave language system, when used as a computer language, has a self-contained meaning independent from the code written by the programmer. The relationships contained therein are used to guide the programmer toward advanced structures with pin-point control. A goal of the wave language system in programming is an output which has the same qualities as the language from which it is formed. The output then has the capacity to be 'memory' containing the entirety of audio, visual, tactile, all of which is encompassed in the new 'bit' system.

A further expression of the wave language system is in the form of electronic circuitry, wherein the language is hard-wired. For example, as a hard-wired device in a robot, it would provide the entire range of electronic activity possible, with the additional control capabilities provided by the multi-layered wave organization.

A further expression of the wave language system is its expression in an electro-mechanical device wherein the output of the device is an expression of the wave language. For example, a device which uses the structure of the wave language system to produce an energy field which captures energy into specific paths which form the circuits of the wave language, which form the advanced structures of the wave language, which form particles and atoms. Energy is then an input, the wave language system is the controlling device which controls the electromechanical device which transforms the energy, and the particles and atoms are the output. Particles and atoms are then the input, the language is the controlling device which controls the electromechanical device which deconstructs the particles and atoms. Particles and atoms are then the input, the language is the controlling device, which controls the electro-mechanical device, which transforms and/or bonds particles and/or atoms to create heavier elements or molecules.

The multiple expressions of the computer/machine language embodiment is understood to be uniquely different from existing computer languages, and an advancement of analog circuitry. It is not new circuits such as a new transistor, but it is an advancement in circuit organization. The organization is then the use of the present invention, both as a structure, and as a controlling mechanism to transfer and transform energy.

Figure 64:
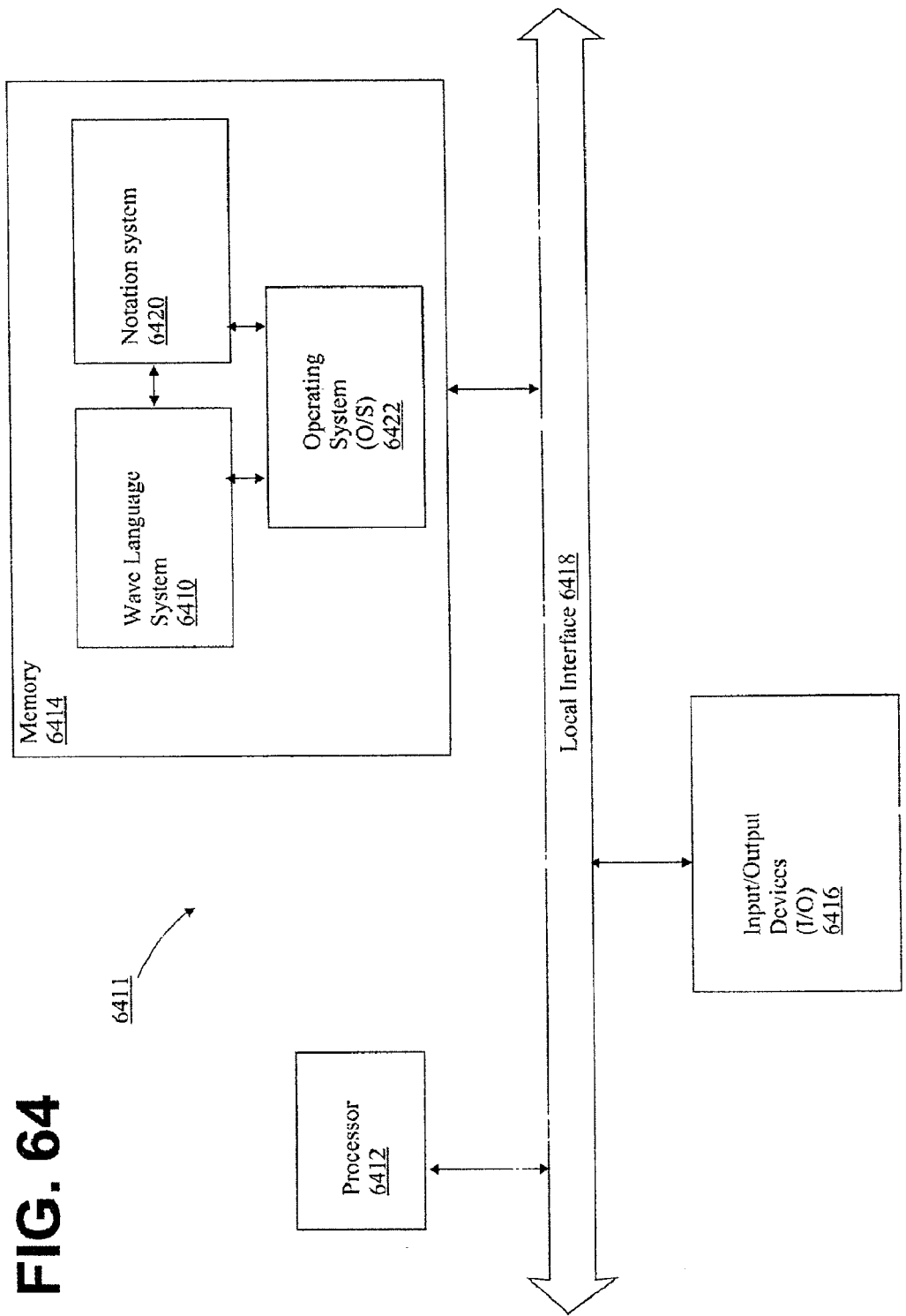
FIG. 64 is a schematic representation of one example processing system using the wave language system, in accordance with one embodiment of the invention.

The wave language system, and/or the embodiments thereof including the notation system, color field system, imaging system, and training system, can be implemented in software (e.g., firmware), hardware, or a combination thereof. In the currently contemplated best mode, the wave language system and/or the embodiments thereof including the notation system, color field system, imaging system, and training system is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the wave language system is shown in FIG. 64. In FIG. 64, the wave language system is denoted by reference numeral 6410. The notation system 6420 is an embodiment of the wave language system and a primary visual expression of the wave language system that acts as a higher order visual language as well as a method of input/output to the wave language system 6410. Note that the notation system 6420 and other embodiments thereof including the color field system, imaging system, and training system and/or its corresponding functionality (not shown, but can replace the notation system 6420, and/or be used as modules in addition to the wave language system 6410) can be implemented as sub-routines, or sub-modules under the control of the wave language system 6410, or in other embodiments, implemented as separate modules that cooperate with the wave language system, or in other embodiments, the wave language system can be incorporated, in whole or in part, as a sub-module of the notation system 6420, color field system, imaging system, and training system.

Generally, in terms of hardware architecture, as shown in FIG. 64, the computer 6411 includes a processor 6412, memory 6414, and one or more input and/or output (I/O) devices 6416 (or peripherals) that are communicatively coupled via a local interface 6418. The local interface 6418 can be, for example but not limited to, one or more buses or other wired or wireless connections, as is known in the art.

The local interface 6418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 6412 is a hardware device for executing software, particularly that stored in memory 6414. The processor 6412 can be any custom made or commercially available processor, a central processing unit (CPU), an auxiliary processor among several processors associated with the computer 6411, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 6414 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 6414 may incorporate electronic, magnetic, optical, and/or other types of storage media. Note that the memory 6414 can have a distributed architecture, where various components are situated remote from one another, but can be accessed by the processor 6412.

The software in memory 6414 may include one or more separate programs, each of which comprises an ordered listing of executable instructions for implementing logical functions. In the example of FIG. 64, the software in the memory 6414 includes the wave language system and a suitable operating system (O/S) 6422. A nonexhaustive list of examples of suitable commercially available operating systems 6422 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in hand-held computers or personal data assistants (PDAS) (e.g., PalmOS available from Palm Computing, Inc., and Windows CE available from Microsoft Corporation). The operating system 6422 essentially controls the execution of other computer programs, such as the wave language system 6410, and provides scheduling, input-output control, file and data management, memory management, and communication control and related services.

The wave language system 6410 and/or the embodiments thereof including the notation system 6420, color field system, imaging system, and training system, can be implemented as a source program, executable program (object code), script, or any other entity comprising a set of instructions to be performed. When a source program, then the program needs to be translated via a compiler, assembler, interpreter, or the like, which may or may not be included within the memory 6414, so as to operate properly in connection with the O/S 6422. Furthermore, the wave language system 6410, and/or the embodiments thereof including the notation system 6420, color field system, imaging system, and training system, can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing the invention, the wave language system 6410 is software.

The I/O devices 6416 may include input devices, for example but not limited to, a keyboard, mouse, scanner, microphone, etc. Furthermore, the I/O devices 6416 may also include output devices, for example but not limited to, a printer, display, frequency generator, musical instrument, etc. Finally, the I/O devices 6416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 6411 is a PC, workstation, or the like, the software in the memory 6414 may further include a basic input output system (BIOS) (omitted for simplicity). The BIOS is a set of essential software routines that initialize and test hardware at startup, start the O/S 6422, and support the transfer of data among the hardware devices. The BIOS is stored in ROM so that the BIOS can be executed when the computer 6411 is activated.

When the computer 6411 is in operation, the processor 6412 is configured to execute software stored within the memory 6414, to communicate data to and from the memory 6414, and to generally control operations of the computer 6411 pursuant to the software. The wave language system 6410, and/or the embodiments thereof including the notation system 6420, color field system, imaging system, and training system, and the O/S 6422, in whole or in part, but typically the latter, are read by the processor 6412, perhaps buffered within the processor 6412, and then executed.

When the wave language system 6410 and/or the embodiments thereof including the notation system 6420, color field system, imaging system, and training system are implemented in software, as is shown in FIG. 64, it should be noted that the wave language system 6410 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The wave language system 6410 and/or the embodiments thereof including the notation system 6420, color field system, imaging system, and training system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the wave language system 6410 and/or the embodiments thereof including the notation system 6420, color field system, imaging system, and training system are implemented in hardware, the wave language system can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for relating electromagnetic waves to harmonic sound waves, comprising the steps of:
   assigning one fundamental color of a color spectrum of twelve analogous colors to one of twelve fundamental tones of a musical $5^{th}$ relationship, wherein the tones are represented by notes; and
   consecutively associating the remaining analogous colors to the tones.

2. The method of claim 1, wherein relating electromagnetic waves to harmonic sounds waves includes the step of relating the properties of electromagnetic waves to harmonic sound waves by relating the individual harmonic sound waves, and their association to color by musical 5ths, to the positions of a harmonic energy wave.

3. The method of claim 2, wherein relating the individual harmonic sound waves, and their association to color by musical 5ths, to the positions of a harmonic energy wave, includes the steps:
   assigning a fundamental frequency and its consecutive octaves to consecutive nodes of the harmonic energy wave;
   assigning a third harmonic frequency and its consecutive octaves to consecutive anti-nodes of the harmonic energy wave;
   assigning a fifth harmonic frequency and its consecutive octaves to consecutive maximum amplitudes of first-half wave cycles of the harmonic energy wave;
   assigning a seventh harmonic frequency and its consecutive octaves to consecutive maximum amplitudes of second half wave cycles of the harmonic energy wave; and
   assigning each newly defined harmonic to equidistant positions between previously defined harmonic energy wave positions.

4. The method of claim 3, wherein the step of relating the individual harmonic sound waves, and their association to color by musical 5ths, to the positions of a harmonic energy wave, including the node, anti-node, and amplitude positions, further comprises the step of relating the color and tone of each harmonic wave position to at least one of individual harmonic energy waves, energy levels, and measurements.

5. The method of claim 1, further comprising the step of positioning twelve equidistant points on a circle representing twelve equal angle divisions of a circle, twelve directional vectors, twelve analogous colors and twelve equal tempered musical 5ths based on roots of 2.

6. The method of claim 5, wherein the step of positioning twelve equidistant points include the steps:
   starting an overtone harmonic series and an undertone harmonic series at a defined position;
   starting a second overtone harmonic series and a second undertone harmonic series at a second position related to the first position by the square root of 2;
   tempering the differences generated between the overtone and undertone harmonic positions resulting in new positions based on roots of 2;
   repeating the steps of starting, starting, and tempering until all 12 equidistant points on a circle defined by roots of 2 are generated.

7. The method of claim 1, further comprising the step of defining the color of frequency by defining the color of a chromatic frequency cycle.

8. The method of claim 7, wherein the step of defining the color of frequency includes the steps of:
   assigning an equidistant analogous color pattern between consecutive chromatic frequency positions which represents the anologous color pattern, wherein the consecutive chromatic frequency positions are microtones;
   defining the microtones as being separated by multiples of $2^{\wedge}(\frac{1}{84})$, wherein the separation of $2^{\wedge}(\frac{1}{84})$ is approximately 14.28 cents;
   locating the relative position of the frequency to the at least one of one of the twelve equidistant points on the chromatic frequency circle and the one of six equidistant microtone points between consecutive equidistant chromatic points on the chromatic frequency circle;
   locating at least one of the color, chroma, and gray of the relative position on the chromatic frequency circle; and
   assigning the at least one of the located color, chroma, and gray to the frequency.

9. The method of claim 1, further comprising the step of relating the properties of electromagnetic waves and harmonic sound waves by relating the electromagnetic properties of positive and negative charge to the properties of a harmonic energy wave, wherein the flow of energy of a reference harmonic energy level, having an overtone energy orientation, is related to the energy flow and type properties of one of a positive and negative electromagnetic charge, and by default assigning the same-reference undertone harmonic energy level and orientation to the remaining electromagnetic charge property.

10. The method of claim 9, wherein the step of relating the electromagnetic properties of positive and negative charge to the energy level and the harmonic orientation of the harmonic energy wave further comprises the step of assigning a reference electromagnetic charge property to represent the harmonic energy orientation of a first-half harmonic wave cycle and assigning its opposition electromagnetic charge property to represent the harmonic energy orientation of a second-half harmonic wave cycle, wherein the step of assigning the positive and the negative electromagnetic charge properties to the first and second half harmonic energy wave cycles includes the steps of:

assigning the reference electromagnetic charge property to the first-half cycle of an overtone harmonic energy wave located at one of defined equidistant positions on a color circle;

assigning an opposition electromagnetic charge property to the second-half cycle of the chosen overtone harmonic energy wave;

assigning the opposition electromagnetic charge property to the first-half cycle of an undertone harmonic energy wave beginning at the same frequency; and assigning the reference electromagnetic charge property to the second-half cycle of the undertone harmonic energy wave.

11. The method of claim 1, further comprising the step of bonding overtone and undertone harmonic energy wave half-wave and quarter-wave cycles to form a current loop having at least one of a neutral charge, a charge as defined by the position of the current loop within a current loop wave within an overtone defined wave structure, and a charge as defined by the position of the current loop within a current loop wave within an undertone defined wave structure.

12. The method of claim 11, further comprising the step of forming a current loop wave.

13. The method of claim 12, wherein the step of forming a current loop wave includes the steps of:

assigning at least one of a prime spin and a retrograde spin to two current loops;

assigning a first-half cycle to the first current loop and a second-half cycle to the second current loop; and assigning the order of the two current loops in order to determine inversion and retrograde-inversion spins.

14. The method of claim 13, further comprising the step of defining the color of the current loops by the square of the harmonic series $1^2$, $2^2$, $3^2$, to infinity based on the total harmonic distance between the overtone and the undertone harmonic positions.

15. The method of claims 1, further comprising the step of relating the properties of electromagnetic waves and harmonic sound waves by bonding and relating the energy states, properties, and order of the harmonic energy wave with the electromagnetic wave properties of a harmonic current loop and its system of order and organization, represented by measurements and frequencies.

16. The method of claim 15, wherein the step of bonding and relating the energy states, properties, and order of the harmonic energy wave with the electromagnetic wave properties of the harmonic current loop and its system of order and organization, represented by measurements and frequencies, includes the energy organization steps of:

bonding a harmonic energy wave node of a current loop to a harmonic energy wave node of a current loop, wherein said bonding points are represented by measurements and frequencies;

bonding a harmonic energy wave anti-node of a current loop to a harmonic energy wave node of a current loop, wherein said bonding points are represented by measurements and frequencies; and bonding a harmonic energy wave maximum amplitude of a current loop to a harmonic energy wave node of a current loop, wherein said bonding points are represented by measurements and frequencies.

17. The method of claim 16, wherein the step of relating the energy states, properties, and order of the harmonic energy wave with the electromagnetic wave properties of the harmonic current loop and its system or order and organization, represented by measurements and frequencies, is further comprised of the step of forming a vector wave, wherein the electromagnetic properties of the current loops within the vector waves are related to the properties of the harmonic energy wave.

18. The method of claim 17, wherein the step of forming a vector wave to relate the properties of electromagnetic current loop with the properties of harmonic energy wave includes the steps of:

forming a charged first octave harmonic energy wave of a current loop at a specified energy level and assigning it a specific charge property defining energy flow and type;

bonding an octave harmonic energy wave of a current loop using a node-to-node bond; and assigning a neutral charge property, exhibiting no external energy flow and type, to a third harmonic position of a second octave harmonic energy wave of a current loop, wherein the vector wave is represented by at least one of integer numbers, inversion of the integer numbers or fractions, and octaves.

19. The method of claim 17, wherein the step of relating the energy states, properties and order of the harmonic energy wave with the electromagnetic wave properties of the harmonic current loop and its system of order and organization further comprises forming a vector set wave that includes three vector waves bonded with anti-node-to-node bonds, wherein the vector set defines and relates the properties of the electromagnetic waves and current loops with properties of the harmonic sound waves and harmonic energy waves represented within it.

20. The method of claim 19, wherein the step of forming a vector set wave includes the steps of:

changing the third harmonic position of the first vector wave from an electromagnetically neutral charged to an electromagnetically charged position;

using the electromagnetically charged third harmonic position of the first vector wave as the starting position of the second vector wave; and repeat the steps of changing and using for bonding a third vector wave to the second vector wave, wherein the total vector set is represented by at least one of the numbers 1, 2, 3, 6, 9, 18, 27 and the corresponding octaves, and the inversions of 1, 2, 3, 6 9, 18, 27 and the corresponding octaves.

21. The method of claim 20, wherein the step of bonding a third vector wave to form a vector set wave includes the step of changing the electromagnetic charge properties of the third harmonic of the third vector set from a neutral to one of a positive and negative electrical charge.

22. The method of claim 19, wherein the step of relating the energy states, properties and order of the harmonic energy wave with the electromagnetic wave properties of the harmonic current loop and its system of order and organization further comprises the step of forming a 3-vector set wave that includes three vector waves bonded with anti-node-to-node bonds, wherein the 3-vector set wave defines and relates the 12 stable electromagnetic energy positions to 12 unique colors, musical 5ths, numbers, frequencies, and measurements.

23. The method of claim 22, wherein the step of forming a 3-vector set wave includes the steps of:
bonding the second vector set wave to the first vector set wave using an amplitude to node bond, wherein the first position of the second vector set bonds to the amplitude represented by harmonic 5 and the corresponding octaves of the first vector set wave, wherein the first position of the second vector set wave is defined by the number 5 and the corresponding octaves relative to the first vector set wave;
repeating the step of bonding for the third vector set wave to the second vector set wave, wherein the first position of the third vector set is defined by the number 5 and its octaves relative to the second vector set wave, and by the number 25 and its octaves relative to the first vector set wave.

24. The method of claim 22, wherein the step of relating the energy states, properties and order of the harmonic energy wave with the electromagnetic wave properties of the harmonic current loop and its system of order and organization further comprises the step of bonding an overtone 3-vector set wave to an undertone 3-vector set wave, wherein the relationship between the first position of the overtone 3-vector set wave and the first position of the undertone 3-vector set wave are related by the square root of 2 and the corresponding octaves, wherein the resulting energy structure relates the overtone associated properties of electromagnetic waves and harmonic energy waves with the undertone associated properties of electromagnetic waves and harmonic energy waves.

25. The method of claim 24, wherein the relationship between the first position of the overtone 3-vector set wave and the first position of the undertone 3-vector set wave are related by the number 729 and the corresponding octaves.

26. The method of claim 24, wherein the step of bonding an overtone 3-vector set wave to an undertone 3-vector set wave includes the steps of at least partly using charged positions and bonding two 3-vector set waves through amplitude-to-node bonds with the first position of the second 3-vector set wave relating to the first position of the first 3-vector set wave by 225 and the corresponding octaves.

27. The method of claim 24, wherein the step of bonding an overtone 3-vector set wave to an undertone 3-vector set wave includes the step of at least partly using neutral positions and bonding two 3-vector set waves through amplitude-to-node bonds with the first position of the second 3-vector set wave relating to the first position of the first 3-vector set wave by 225 and the corresponding octaves.

28. The method of claim 4, wherein the step of bonding an overtone 3-vector set wave to an undertone 3-vector set wave includes the steps of at least partly using charged positions and neutral positions and bonding two 3-vector set waves through amplitude-to-node bonds with the first position of the second 3-vector set wave relating to the first position of the first 3-vector set wave by 225 and the corresponding octaves.

29. The method of claims 2, wherein the step of relating the properties of electromagnetic waves to harmonic sound waves by relating the individual harmonic sound waves, and their association to color by musical 5ths, to the positions of a harmonic energy wave includes a relation simplification step of applying a constantly changing time reference to at least one of a harmonic energy wave and the representatives of the harmonic energy wave resulting in a representation of a harmonic energy sine wave.

30. The method of claim 1, further comprising the step of describing mixtures of frequencies, harmonic energy waves, current loop waves, energy levels, and measurements as mixtures of at least one of color, chroma, and gray.

31. The method of claim 1, further comprising the step of displaying on a medium consecutive chromatic colors to define consecutive chromatic notes in a twelve note based musical notation system that comprises a ledger line and five staff lines and spaces between the lines and the ledger line and the lines, wherein the ledger lines are separated by octaves, wherein the twelve fundamental colors are representative of at least one of selected colors, chromas, and grays, wherein the consecutive chromatic notes are applied consecutively to consecutive lines and spaces.

32. The method of claim 31, further comprising the step of displaying on the medium one-word color names for notes on the staff line and the ledger line, and two-word color names for the spaces between the staff lines and the ledger lines, wherein one-word color names are yellow, green, blue, violet, red, and orange, and two-word color names are yellow-green, blue-green, blue-violet, red-violet, red-orange, and yellow-orange, wherein the defined one-word and two-word color names are representative of at least one of selected colors, chromas, and grays.

33. The method of claim 31, further comprising the step of displaying on the medium two-word color names for notes on the staff line and the ledger line, and one-word color names for the spaces between the staff lines and the ledger lines, wherein one-word color names are yellow, green, blue, violet, red, and orange, and two-word color names are yellow-green, blue-green, blue-violet, red-violet, red-orange, and yellow-orange, wherein the defined one-word and two-word color names are representative of at least one of selected colors, chromas, and grays.

34. The method of claim 31, wherein the twelve chromatic colors are repeated for every octave.

35. The method of claim 31, wherein the space between two lines and the space between a line and a ledger line are further divided by six lines generating a total of seven lines and spaces from one chromatic tone to the next, wherein the analogous microtone colors are applied to the additional consecutive lines and spaces between chromatic tones, wherein the ledger line is represented every fourteen microtone tones or two chromatic tones.

36. The method of claim 31, further comprising the step of connecting tones in a vertical and horizontal placement by a line representing a harmonic energy wave, further comprising the step of passing a straight line through node and anti-node positions of the represented harmonic energy wave.

37. The method of claim 36, wherein a line representing at least one of a first half wave cycle and a second half wave cycle connects consecutive harmonic wave designations.

38. The method of claim 37, further comprising representing the first-half wave cycle as a strong beat and the second-half wave cycle as a weak beat.

39. The method of claims 38, further comprising the step of connecting two same type beats using a connecting line.

40. The method of claims 39, further comprising the step of describing an amplitude to node connection between the harmonic wave designations by a connecting line.

41. The method of claims 40, further comprising the step of representing the extension of a note through multiple harmonic wave designations by at least one of a bar of the same color and a description stretching the length of the extension.

42. The method of claim 41, further comprising the step of representing a perceptual wave by diagonal lines.

43. The method of claim 42, farther comprising the step of representing the connection between perceptual wave nodes and harmonic wave nodes or perceptual wave amplitudes and harmonic wave amplitudes by a gray connecting bar.

44. The method of claim 31, further comprising the step of relating the properties of electromagnetic waves and harmonic sound waves by relating the measurable volume properties of an harmonic sound wave to the pitch properties of an harmonic sound wave and the properties of an electromagnetic wave and displaying on a medium consecutive chromatic colors to define consecutive chromatic volume notes in a twelve volume note based musical notation system that comprises a ledger line and five staff lines and spaces between the lines and the ledger line and the lines, wherein the ledger lines are separated by octaves, wherein the twelve fundamental colors are representative of at least one of selected colors, chromas, and grays, wherein the consecutive chromatic volume notes are applied consecutively to consecutive lines and spaces.

45. The method of claim 44, further comprising the step of describing the volume levels of measurable volume properties by chromatic intensities based on roots of 2, further comprising the step of grouping twelve chromatic volumes by octaves.

46. The method of claim 31, further comprising the step of relating the properties of electromagnetic waves and harmonic sound waves by relating the measurable rhythm properties of an harmonic sound wave to the pitch properties of an harmonic sound wave and the properties of an electromagnetic wave and displaying on a medium consecutive chromatic colors to define consecutive chromatic rhythm notes in a twelve rhythm note based musical notation system that comprises a ledger line and five staff lines and spaces between the lines and the ledger line and the lines, wherein the ledger lines are separated by octaves, wherein the twelve fundamental colors are representative of at least one of selected colors, chromas, and grays, wherein the consecutive chromatic rhythm notes are applied consecutively to consecutive lines and spaces.

47. The method of claim 46, further comprising the step of relating the rhythm properties of harmonic sound waves with the pitch properties of harmonic sound waves and harmonic energy waves and electromagnetic waves by connecting rhythm positions of a particular rhythm device with a line representing a rhythm harmonic energy wave or a rhythm sine wave.

48. The method of claim 31, further comprising the step of dividing the staff by units of time representing the length of a harmonic octave in at least one of a given time, given times, and constantly changing time.

49. The method of claim 48, further comprising the step of describing the start of the unit of time with a vertical line on the staff and the end of the unit of time with a vertical line on the staff, wherein the space in between the defined start and end is absolutely defined by at least one of time, times, and constantly changing times applied to the unit of time.

50. The method of claim 49, further comprising the step of placing a tempo above the unit of time as at least one of the number of beats per minute, a fraction of a reference tempo, and a multiple of the reference tempo.

51. The method of claim 50, further comprising the step of describing a continuously changing tempo between two points with a wavy line connecting two defined tempos.

52. The method of claim 48, further comprising the step of dividing the unit of time into twelve hundred equal time units called ticks.

53. The method of claim 48, further comprising the step of dividing the unit of time by harmonic and other time divisions represented by notes, wherein a stem of the note absolutely marks the starting position of the represented time value within the unit of time.

54. The method of claim 53, further comprising the step of describing the division of the unit of time into three equal units by at least one of a triangle note head and a representative number.

55. The method of claim 53, further comprising the step of describing the division of the unit of time into four equal units by at least one of a square note head and a representative number.

56. The method of claim 53, further comprising the step of describing the division of the unit of time into five equal units by at least one of a pentagram note head and a representative number.

57. The method of claim 53, further comprising the step of describing the division of the unit of time by seven equal units by at least one of a seven point star and a representative number.

58. The method of claim 53, further comprising the step of describing the division of the unit of time by twelve equal units by at least one of a circle and a representative number.

59. The method of claim 53, further comprising the step of describing with a note head the division of the unit of time into an assignable number of equal divisions, wherein the assignable number is placed above the note.

60. The method of claim 53, further comprising the step of describing with a note head the division of the unit of time into an assignable number of equal divisions, wherein the assignable number replaces the note.

61. The method of claim 60, further comprising the step of describing the division of the fundamental note time value by a flag attached to the stem of the note, wherein a line flag represents the zero power of 2, and each additional flag represents an additional power of two, wherein a box flag with a number defines the number of flags, wherein a number placed above the flags changes the fundamental division number of 2, wherein the highest represented flag number is the divisor of the fundamental note time value.

62. The method of claim 61, further comprising the step of multiplying the fundamental note time value and flag alterations by placing at least one of the multiplying number and the fraction next to the note head.

63. The method of claim 62, further comprising the step of placing dots next to the note head, wherein each dot represents a value in a series, wherein the base value of the series is the fundamental note value after flag and multiplier operations, wherein the fundamental dot division is 2, wherein the fundamental dot division is alterable by placing at least one of a number and fraction next to the dot, wherein the number of dots defines the number of positions in the series, wherein the number of dots can be represented by a single dot followed by a number, wherein a dot representing a number other than 2 is placed inside parentheses with the altering number followed by a number representing the total number of dots, wherein the time value of the note is the sum of the value of each represented dot.

64. The method of claim 63, further comprising the step of placing at least one of a number and fraction below the flag representing a time value to be added to the note after all other time manipulations are accounted for.

65. The method of claim 64, further comprising the step of using a wavy flag attached to a particular note value to describe a time value which is an approximation of the note value to which the flag is attached, including the implication that the flags represent normal flags and are included in the value of the approximated note.

66. The method of claim 65, further comprising the step of using a geometric shape to represent note time values which extend beyond the unit of time, wherein the end of the note extension beyond a unit of time or units of time is represented by half of the defined geometric shape attached to a vertical line, wherein the line marks the absolute position with the unit of time which defines the end of the note time value.

67. The method of claim 66, further comprising the step of grouping notes by at least one of a mathematical series and equation, wherein the step of grouping includes:
    marking the positions of at least one of the series and the defined positions of the equation by vertical lines;
    joining the vertical lines with at least one of an overarching and underarching curved line;
    placing the notes which begin at positions defined by the series or equation on the vertical lines;
    describing the series and equation and the starting and ending points within the series and the equation; and
    placing at least one of the description of the series and the equation and a reference of the series and the equation above the joining line.

68. The method of claim 67, further comprising the step of describing a group of consecutive notes, each of which represents points along a complex, constantly changing time value, with a black connecting bar, wherein a description of at least one of the note time values and a reference of the note time values is placed near the black connecting bar.

69. The method of claim 31, further comprising the step of forming two spirals, wherein the first spiral consists of secondary color relationships of one-word color names and the second spiral consists of secondary color relationships of two-word color names, wherein the two spirals are merged to form an analogous color pattern with octaves found along radial lines, wherein the radial lines alternated between black and white patterns with an optional gray section representing the lines, ledger lines, and spaces of the staff, wherein the colors define at least one of tones, microtones, any defined group of colors, chromas, gray, and deviations from tones.

70. The method of claim 69, further comprising the step of representing the spirals in a linear format, wherein multiple two-word color lines and one-word color lines of undefined length are vertically arrayed with vertical positions representing consecutive octaves.

71. The method of claim 1, further comprising the step of representing the consecutive analogous colors as consecutive note positions on a musical instrument.

72. A system for relating electromagnetic waves to harmonic sound waves, comprising:
    means for assigning one fundamental color of a color spectrum of twelve analogous colors to one of twelve fundamental tones of a musical 5th relationship, wherein the tones are represented by notes; and
    means for consecutively associating the remaining analogous colors to the tones.

73. The system of claim 72, further comprising means for relating the properties of electromagnetic waves to harmonic sound waves by relating the individual harmonic sound waves, and their association to color by musical 5ths, to the positions of a harmonic energy wave.

74. The system of claim 72, further comprising means for positioning twelve equidistant points on a circle representing twelve equal angle divisions of a circle, twelve directional vectors, twelve analogous colors and twelve equal tempered musical 5ths based on roots of 2.

75. The system of claim 72, further comprising means for defining the color of frequency by defining the color of a chromatic frequency circle.

76. The system of claim 72, further comprising means for relating the properties of electromagnetic waves and harmonic sound waves including means for relating the electromagnetic properties of positive and negative charge to the properties of an harmonic energy wave, wherein the means for relating charge properties includes means for relating the flow of energy of a reference harmonic energy level, having an overtone energy orientation to the energy flow and type properties of one of a positive and negative electromagnetic charge, and means for assigning by default the same-reference undertone harmonic energy level and orientation to the remaining electromagnetic charge property.

77. The system of claim 76, further comprising means for relating the electromagnetic properties of positive and negative charge to the energy level and harmonic orientation of an harmonic energy wave by the means for assigning the reference chosen electromagnetic charge property to represent the harmonic energy orientation of the first-half harmonic wave cycle and the means for assigning its opposition electromagnetic charge property to represent the harmonic energy orientation of the second-half harmonic wave cycle, wherein the means for assigning the positive and the negative electromagnetic charge properties to first and second half harmonic energy wave cycles includes:
    means for assigning a reference electromagnetic charge property to the first-half cycle of an overtone harmonic energy wave located at one of defined equidistant positions on a color circle;
    means for assigning an opposition electromagnetic charge property to the second-half cycle of the chosen overtone harmonic energy wave;
    means for assigning the opposition electromagnetic charge property to the first-half cycle of an undertone harmonic energy wave beginning at the same frequency; and
    means for assigning the reference electromagnetic charge property to the second-half cycle of the undertone harmonic energy wave.

78. The system of claim 77, further comprising means for bonding overtone and undertone harmonic energy wave half-wave and quarter-wave cycles to form a current loop having at least one of neutral charge, a charge as defined by the position of the current loop within a current loop wave within an overtone defined wave structure, and a charge as defined by the position of the current loop within a current loop wave within an undertone defined wave structure.

79. The system of claim 78, further comprising means for forming a current loop wave, including:
    means for assigning at least one of a prime spin and a retrograde spin to two current loops;
    means for assigning a first-half cycle to the first current loop and a second-half cycle to the second current loop; and
    means for assigning the order of the two current loops in order to determine inversion and retrograde-inversion spins.

80. The system of claim 79, further comprising means for relating the properties of electromagnetic waves and sound waves within the current loop, the means for relating including means for defining the color of the current loops by the square of the harmonic series $1^2, 2^2, 3^2$, to infinity based on the total harmonic distance between the overtone and the undertone harmonic positions.

81. The system of claim 72, further comprising means for relating the properties of electromagnetic waves and harmonic sound waves by the means for bonding and the means for relating the energy states, properties and order of the harmonic energy wave with the electromagnetic wave properties of the harmonic current loop and its system of order and organization, represented by measurements and frequencies, including:

means for bonding a harmonic energy wave node of a current loop to a harmonic energy wave node of a current loop, wherein said bonding points are represented by measurements and frequencies;

means for bonding a harmonic energy wave anti-node of a current loop to a harmonic energy wave node of a current loop, wherein said bonding points are represented by measurements and frequencies; and means for bonding a harmonic energy wave maximum amplitude of a current loop to a harmonic energy wave node of a current loop, wherein said bonding points are represented by measurements and frequencies.

82. The system of claim 81, further comprising means for relating the energy states, properties and order of the harmonic energy wave with the electromagnetic wave properties of the harmonic current loop and its system of order and organization, represented by measurements and frequencies, by the means for forming a vector wave, wherein the electromagnetic properties of the current loops within the vector wave are related to the properties of the harmonic energy wave, wherein the means for forming a vector wave includes:

means for forming a first octave harmonic energy wave of a current loop at a specified energy level and means for assigning it a specific charge property defining energy flow and type;

means for bonding an octave harmonic energy wave of a current loop using a node-to-node bond; and means for assigning a neutral charge property, exhibiting no external energy flow and type, to the third harmonic energy position of a second octave harmonic energy wave of a current loop, wherein the vector wave is represented by at least one of integer numbers, inversion of the integer numbers or fractions, and octaves.

83. The system of claim 82, further comprising means for relating the energy states, properties and order of the harmonic energy wave with the electromagnetic wave properties of the harmonic current loop and its system of order and organization by the means for forming a vector set wave that includes three vector waves bonded with anti-node-to-node bonds, wherein the vector set defines and relates the properties of the electromagnetic waves and current loops with properties of the harmonic sound waves and harmonic energy waves represented within it, wherein the means for forming a vector set includes:

means for changing the third harmonic position of the first vector wave from an electromagnetically neutral charged to an electromagnetically charged position;

means for using the electromagnetically charged third harmonic position of the first vector wave as the starting position of the second vector wave;

means for repeating the steps of changing and using for bonding a third vector wave to the second vector wave, wherein the total vector set is represented by at least one of the numbers 1, 2, 3, 6, 9, 18, 27 and the corresponding octaves, and the inversions of 1, 2, 3, 6, 9, 18, 27 and the corresponding octaves; and means for changing the electromagnetic charge properties of the third harmonic of the third vector set from neutral to one of positive or negative electrical charge.

84. The system of claim 83, further comprising means for relating the energy states, properties and order of the harmonic energy wave with the electromagnetic wave properties of the harmonic current loop and its system of order and organization by the means for forming a 3-vector set wave that includes three vector waves bonded with anti-node-to-node bonds, wherein the 3-vector set wave defines and relates the 12 stable electromagnetic energy positions to 12 unique colors, musical 5ths, numbers, frequencies, and measurements, wherein the means for forming a 3-vector set wave includes:

means for bonding the second vector set wave to the first vector set wave using an amplitude to node bond, wherein the first position of the second vector set bonds to the amplitude represented by harmonic 5 and the corresponding octaves of the first vector set wave, wherein the first position of the second vector set wave is defined by the number 5 and the corresponding octaves relative to the first vector set wave; and means for repeating the step of bonding for the third vector set wave to the second vector set wave, wherein the first position of the third vector set is defined by the number 5 and its octaves relative to the second vector set wave, and by the number 25 and its octaves relative to the first vector set wave.

85. The system of claim 73, further comprising means for relating the properties of electromagnetic waves to harmonic sound waves by the means for relating the individual harmonic sound waves, and their association to color by musical 5ths, to the positions of an harmonic energy wave, wherein the means for relating includes means for applying a constantly changing time reference to at least one of a harmonic energy wave and the representatives of the harmonic energy wave which results in a representation of a harmonic energy sine wave.

86. The system of claim 72, further comprising means for relating the properties of electromagnetic waves and sound waves by means for describing mixtures of frequencies, harmonic energy waves, current loop waves, energy levels, and measurements as mixtures of at least one of color, chroma, and gray.

87. A system for relating electromagnetic waves to harmonic sound waves, comprising:

a memory with logic; and a processor configured with the logic to assign one fundamental color of a color spectrum of twelve analogous colors to one of twelve fundamental tones of a musical $5^{th}$ relationship, wherein the tones are represented by notes, wherein the processor is further configured with the logic to consecutively associate the remaining analogous colors to the tones.

88. The system of claim 87, wherein the processor is further configured with the logic to relate the properties of electromagnetic waves to harmonic sound waves by being further configured to relate the individual harmonic sound waves, and their association to color by musical 5ths, to the positions of a harmonic energy wave.

89. The system of claim 87, wherein the processor is further configured with the logic to position twelve equidistant points on a circle representing twelve equal angle divisions of a circle, twelve directional vectors, twelve analogous colors and twelve equal tempered musical 5ths based on roots of 2.

90. The system of claim 88, wherein the processor is further configured with the logic to relate a color to a sound frequency and associated numeric descriptions by being further configured with the logic relating the frequencies of a chromatic sound frequency circle with colors as defined by the relationship between a 12 analogous color circle and the musical circle of $5^{ths}$, and produce in a colorized chromatic frequency circle, the processor configured with the logic to:
  assign an equidistant analogous color pattern between consecutive chromatic frequency positions which represents the analogous color pattern, wherein the consecutive chromatic frequency positions are microtones;
  define the microtones as being separated by multiples of $2^{\wedge}(1/84)$, wherein the separation of $2^{\wedge}(1/84)$ is approximately 14.28 cents;
  locate the relative position of the frequency to the at least one of one of the twelve equidistant points on the chromatic frequency circle and the one of six equidistant microtone points between consecutive equidistant chromatic points on the chromatic frequency circle;
  locate at least one of the color, chroma, and gray of the relative position on the chromatic frequency circle; and
  assign the at least one of the located color, chroma, and gray to the frequency.

91. The system of claim 87, wherein the processor is further configured with the logic to relate the directional properties of overtone and undertone harmonic orientations to the directional properties of positive and negative charge, wherein the processor is further configured with the logic to relate the properties of electromagnetic waves and harmonic sound waves by relating the electromagnetic properties of positive and negative charge to the properties of an harmonic energy wave, wherein the flow of energy of a reference harmonic energy level, having an overtone energy orientation, is related to the energy flow and type properties of one of a positive and negative electromagnetic charge, wherein the processor is further configured with the logic to assign by default the same-reference undertone harmonic energy level and orientation to the remaining electromagnetic charge property.

92. The system of claim 91, wherein the processor is further configured with the logic to assign the directional properties of positive and negative charge to directional properties of first-half and second-half cycles of a harmonic energy wave, wherein the processor is further configured with the logic to relate the positive and negative charge properties of electromagnetic waves to the overtone and undertone properties of harmonic sound waves by being further configured to assign the reference chosen electromagnetic charge property to represent the harmonic energy orientation of the first-half harmonic wave cycle and by being further configured to assign its opposition electromagnetic charge property to represent the harmonic energy orientation of the second-half harmonic wave cycle, the processor configured with the logic to:
  assign a reference electromagnetic charge property to the first-half cycle of an overtone harmonic energy wave located at one of defined equidistant positions on a color circle;
  assign an opposition electromagnetic charge property to the second-half cycle of the chosen overtone harmonic energy wave;
  assign the opposition electromagnetic charge property to the first-half cycle of an undertone harmonic energy wave beginning at the same frequency; and
  assign the reference electromagnetic charge property to the second-half cycle of the undertone harmonic energy wave.

93. The system of claim 87, wherein the processor is further configured with the logic to bond overtone and undertone harmonic energy wave half-wave and quarter-wave cycles to form a current loop, wherein the processor is further configured with the logic to assign the electromagnetic properties of neutral, positive, and negative charge to the half-wave cycles, quarter wave cycles, and bonded current loops, and assign a dependency to the associated electromagnetic properties of neutral, positive and negative charge based upon the position of the current loop within an overtone or undertone defined wave structure.

94. The system of claim 93, wherein the processor is further configured with the logic to form a current loop wave, the processor configured with the logic to:
  assign at least one of a prime spin and a retrograde spin to two current loops;
  assign a first-half cycle to the first current loop and a second-half cycle to the second current loop; and
  assign the order of the two current loops in order to determine inversion and retrograde-inversion spins.

95. The system of claim 94, wherein the processor is further configured with the logic to relate the chromatic properties of color to the analogous color properties of the current loops by the square of the harmonic series $1^2, 2^2, 3^2$, to infinity based on the total harmonic distance between the overtone and the undertone harmonic positions.

96. The system of claim 87, wherein the processor is further configured with the logic to further relate the properties of electromagnetic waves and harmonic sound waves by bonding and relating the energy states, properties, and order of the harmonic energy wave with the electromagnetic wave properties of the harmonic current loop and its system of order and organization, wherein the processor is further configured with the logic to represent the positions and properties of the harmonic energy wave and the harmonic current loop by measurements and frequencies, the processor configured with the logic to:
  bond a harmonic energy wave node of a current loop to a harmonic energy wave node of a current loop, wherein said bonding points are represented by measurements and frequencies;
  bond a harmonic energy wave anti-node of a current loop to a harmonic energy wave node of a current loop, wherein said bonding points are represented by measurements and frequencies; and
  bond a harmonic energy wave maximum amplitude of a current loop to a harmonic energy wave node of a current loop, wherein said bonding points are represented by measurements and frequencies.

97. The system of claim 96, wherein the processor is further configured with the logic to further relate the energy states, properties, and order of the harmonic energy wave with the electromagnetic wave properties of the harmonic current loop and its system of order and organization, represented by measurements and frequencies, wherein the processor is further configured with the logic to form a vector wave and relate the electromagnetic properties of the current loops within the vector wave to the properties of the harmonic energy wave, the processor configured with the logic to:
  form a first octave harmonic energy wave of a current loop at a specified energy level and assigning it a specific charge property defining energy flow and type;

bond an octave harmonic energy wave of a current loop using a node-to-node bond; and assigning a neutral charge property, exhibiting no external energy flow and type, to the third harmonic energy position of a second octave harmonic energy wave of a current loop; and represent the vector wave is by at least one of integer numbers, inversion of the integer numbers or fractions, and octaves.

98. The system of claim 97, wherein the processor is further configured with the logic to relate the energy states, properties and order of the harmonic energy wave with the electromagnetic wave properties of the harmonic current loop and its system of order and organization by forming a vector set wave that includes three vector waves bonded with anti-node-to-node bonds, wherein the processor is further configured with the logic to define and relate the properties of the electromagnetic waves and current loops with properties of the harmonic sound waves and harmonic energy waves as defined within the confines of the vector set, wherein the processor configured with the logic to:

change the third harmonic position of the first vector wave from an electromagnetically neutral charged to an electromagnetically charged position;

use the electromagnetically charged third harmonic position of the first vector wave as the starting position of the second vector wave;

repeat the steps of changing and using for bonding a third vector wave to the second vector wave, wherein the total vector set is represented by at least one of the numbers 1, 2, 3, 6, 9, 18, 27 and the corresponding octaves, and the inversions of 1, 2, 3, 6, 9, 18, 27 and the corresponding octaves; and change the electromagnetic charge properties of the third harmonic of the third vector set from neutral to one of a positive or negative electrical charge.

99. The system of claim 87, wherein the processor is further configured with the logic to further relate the energy states, properties and order of the harmonic energy wave with the electromagnetic wave properties of the harmonic current loop and its system of order and organization by forming a 3-vector set wave that includes three vector waves bonded with anti-node-to-node bonds, wherein the processor is further configured with the logic to relate the 12 stable electromagnetic energy positions of the 3-vector set wave to 12 unique colors, musical 5ths, numbers, frequencies, and measurements, the processor configured with the logic to:

bond the second vector set wave to the first vector set wave using an amplitude to node bond, wherein the first position of the second vector set bonds to the amplitude represented by harmonic 5 and the corresponding octaves of the first vector set wave, wherein the first position of the second vector set wave is defined by the number 5 and the corresponding octaves relative to the first vector set wave; and repeat the step of bonding for the third vector set wave to the second vector set wave, wherein the first position of the third vector set is defined by the number 5 and its octaves relative to the second vector set wave, and by the number 25 and its octaves relative to the first vector set wave.

100. The system of claim 87, wherein the processor is further configured with the logic to apply a constantly changing time reference to at least one of a harmonic energy wave and the representatives of the harmonic energy wave resulting in a representation of a harmonic energy sine wave.

101. The system of claim 87, wherein the processor is further configured with the logic to describe mixtures of frequencies, harmonic energy waves, current loop waves, energy levels, and measurements as mixtures of at least one of color, chroma, and gray.

102. A notation system on a recordable medium, comprising:

logic configured to display a ledger line and five staff lines and spaces between the lines and the ledger line and the lines; and logic configured to display twelve consecutive chromatic notes representing consecutive tones of a musical $5^{th}$ relationship, wherein the consecutive chromatic notes are applied consecutively to the lines and spaces, wherein the twelve consecutive notes are configured with consecutive chromatic colors, wherein the colors are twelve fundamental colors representative of at least one of selected colors, chromas, and grays.

103. The system of claim 102, wherein the logic is further configured to display ledger lines separated by octaves, such that the twelve consecutive chromatic notes are repeated for every octave.

104. The system of claim 102, wherein the logic is further configured to display one-word color name notes positioned on the staff line and the ledger line, and two-word color name notes positioned on the spaces between the staff lines and the ledger lines, wherein the one-word color names include yellow, green, blue, violet, red, and orange, and the two-word color names include yellow-green, blue-green, blue-violet, red-violet, red-orange, and yellow-orange.

* * * * *